US 8,438,366 B2

(12) United States Patent
Akizuki et al.

(10) Patent No.: US 8,438,366 B2
(45) Date of Patent: May 7, 2013

(54) ALLOCATING RENAME REGISTER FROM SEPARATE REGISTER SETS FOR EACH RESULT DATA OF MULTIPLE DATA PROCESSING INSTRUCTION

(75) Inventors: Yasunobu Akizuki, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 12/805,476

(22) Filed: Aug. 2, 2010

(65) Prior Publication Data

US 2011/0035572 A1    Feb. 10, 2011

(30) Foreign Application Priority Data

Aug. 4, 2009   (JP) ................. 2009-181849

(51) Int. Cl.
*G06F 9/345*    (2006.01)
(52) U.S. Cl.
USPC ............................................ 712/22; 712/219
(58) Field of Classification Search .................. None
See application file for complete search history.

(56) References Cited

U.S. PATENT DOCUMENTS

| | | | |
|---|---|---|---|
| 5,446,912 A | | 8/1995 | Colwell et al. |
| 5,805,916 A * | | 9/1998 | Mallick et al. .................. 712/23 |
| 5,913,054 A | | 6/1999 | Mallick et al. |
| 6,016,541 A | | 1/2000 | Tashima et al. |
| 6,304,958 B1 | | 10/2001 | Kiuchi et al. |
| 8,312,424 B2 * | | 11/2012 | Gschwind et al. ............ 717/106 |
| 2009/0150647 A1 | | 6/2009 | Mejdrich et al. |

FOREIGN PATENT DOCUMENTS

| | | |
|---|---|---|
| EP | 0 767 425 | 4/1997 |
| JP | 10-228376 | 8/1998 |
| JP | 11-175339 | 7/1999 |
| JP | 3452771 | 7/2003 |
| WO | 01/61479 | 8/2001 |

OTHER PUBLICATIONS

Patent Abstracts of Japan, Publication No. 11-110214, Published Apr. 23, 1999.
Patent Abstracts of Japan, Publication No. 10-228376, Published Aug. 25, 1998.
Patent Abstracts of Japan, Publication No. 11-175339, Published Jul. 2, 1999.
"A Small, Fast and Low-Power Register File by Bit-Partitioning," Kondo et al., Proceedings of the 11th Int'l Symposium on High Performance Computer Architecture, 2005, HPCA-11, San Francisco, CA, Feb. 12-16, 2005, pp. 40-49.
Extended European Search Report dated Mar. 31, 2011 in Appln. 10171786.6.

* cited by examiner

*Primary Examiner* — Kenneth Kim
(74) *Attorney, Agent, or Firm* — Staas & Halsey LLP

(57) ABSTRACT

Multiple data processing instructions instruct a computing device to process multiple data including first data and second data. When a multiple data processing instruction is decoded, two allocatable registers are selected. One is used to store the result of a processing operation performed on first data by one processing unit, and the other is used to store the result of a processing operation performed on second data by another processing unit. Those stored processing results are then transferred to result registers. Normal data processing instructions, on the other hand, instruct a processing operation on third data. When a normal data processing instruction is decoded, one allocatable register is selected and used to store the result of processing that a processing unit performs on the third data. The stored processing result is then transferred to a result register.

20 Claims, 66 Drawing Sheets

RSF ENTRY STRUCTURE
FOR FLOATING-POINT STORE INSTRUCTION

ALLOCATING RENAME REGISTER FROM SEPARATE REGISTER SETS FOR EACH RESULT DATA OF MULTIPLE DATA PROCESSING INSTRUCTION

CROSS-REFERENCE TO RELATED APPLICATION(S)

This application is based upon and claims the benefit of priority of the prior Japanese Patent Application No. 2009-181849, filed on Aug. 4, 2009, the entire contents of which are incorporated herein by reference.

FIELD

The embodiments discussed herein relate to a computing device, an information processing apparatus, and a method of controlling a computing device.

BACKGROUND

A variety of techniques are available to boost the processing speed of computing devices such as central processing unit (CPU) or processor. These techniques include, for example, pipelining, superscalar, and out-of-order execution of instructions. Superscalar architecture enables concurrent execution of multiple computational operations. Out-of-order execution techniques execute instructions of a program, not necessarily in the order that they are specified in the program, but in the order that their input data is available. In connection with the out-of-order processing, a technique known as the register renaming is used to complete instructions in the programmed order.

Parallelism of processing may be exploited to speed up the CPU. One such approach is the single instruction multiple data (SIMD) architecture, which permits a single instruction to perform the same operation on multiple data in a parallel fashion. As an example of this type of processing technique, there is a device having first and second data computation circuits. According to decoding results of a single instruction code (operation code), operand data values are read out of first and second memory areas in the same specified address and subjected respectively to the first and second data computation circuits.

SIMD processing is implemented with multiple hardware resources such as registers and arithmetic logic units to store and process two or more data values simultaneously. In the case of, for example, non-SIMD instructions that handle a single 64-bit data value at a time, their processing results are stored in registers with a width of 64 bits. In contrast, to store the outcomes of two-way SIMD instructions that handle two data values at a time, the destination SIMD registers have to be 128-bit wide since those instructions produce two 64-bit data values.

Such SIMD features, when implemented in a CPU, enable the CPU to handle a greater amount of data at a time, and thus increase its processing speed. In the example mentioned above, SIMD processing can handle 128-bit data with a single instruction, whereas non-SIMD processing needs two instructions to achieve the same.

For example, the following literature provides background information in this technical field:
Japanese Patent No. 3452771
Japanese Laid-open Patent Publication No. 10-228376
Japanese Laid-open Patent Publication No. 11-175339

From the viewpoint of software compatibility and hardware resource usage, however, it is impractical to code all processing operations of CPU in the form of SIMD programming. Rather, the CPU has also to execute non-SIMD processing operations, i.e., data processing that does not necessitate SIMD features. While an SIMD-capable CPU may execute non-SIMD processing as well, the efficiency of its internal register usage may be degraded in some cases as will be discussed below.

The aforementioned CPU with two-way SIMD capabilities employs SIMD registers with a bit width of 128 bits, which is twice the width of normal registers. This SIMD CPU may also perform non-SIMD processing by using half the width of SIMD registers, leaving the other half unused.

The SIMD processing may be implemented together with the register renaming technique mentioned earlier. Suppose, for example, that an SIMD register is subjected to register renaming during the execution of an instruction, and then the subsequent instruction requests the value of that SIMD register. In this case, the requested value should be read, not from the specified SIMD register, but from another register actually holding the value because of the register renaming. To make such operation possible, the register renaming operation should also be adapted to the wide width of SIMD registers, whether it is for SIMD processing or for non-SIMD processing. This means that non-SIMD processing uses only half the bit width of SIMD registers also for renamed registers.

SUMMARY

According to an aspect of the invention, a computing device includes the following elements: an instruction decoding unit configured to decode a multiple data processing instruction that performs a processing operation on multiple data including first data and second data; a plurality of first allocatable registers to store data; a plurality of second allocatable registers to store data; an allocatable register selection unit configured to select one of the first allocatable registers, as well as one of the second allocatable registers, based on a decoding result of the multiple data processing instruction; a first processing unit configured to perform first processing on the first data, based on the decoding result of the multiple data processing instruction, and make the selected first allocatable register hold a first processing result obtained as a result of the first processing; a second processing unit configured to perform second processing on the second data, based on the decoding result of the multiple data processing instruction, and make the selected second allocatable register hold a second processing result obtained as a result of the second processing; a first result register configured to receive the first processing result from the selected first allocatable register; and a second result register configured to receive the second processing result from the selected second allocatable register.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
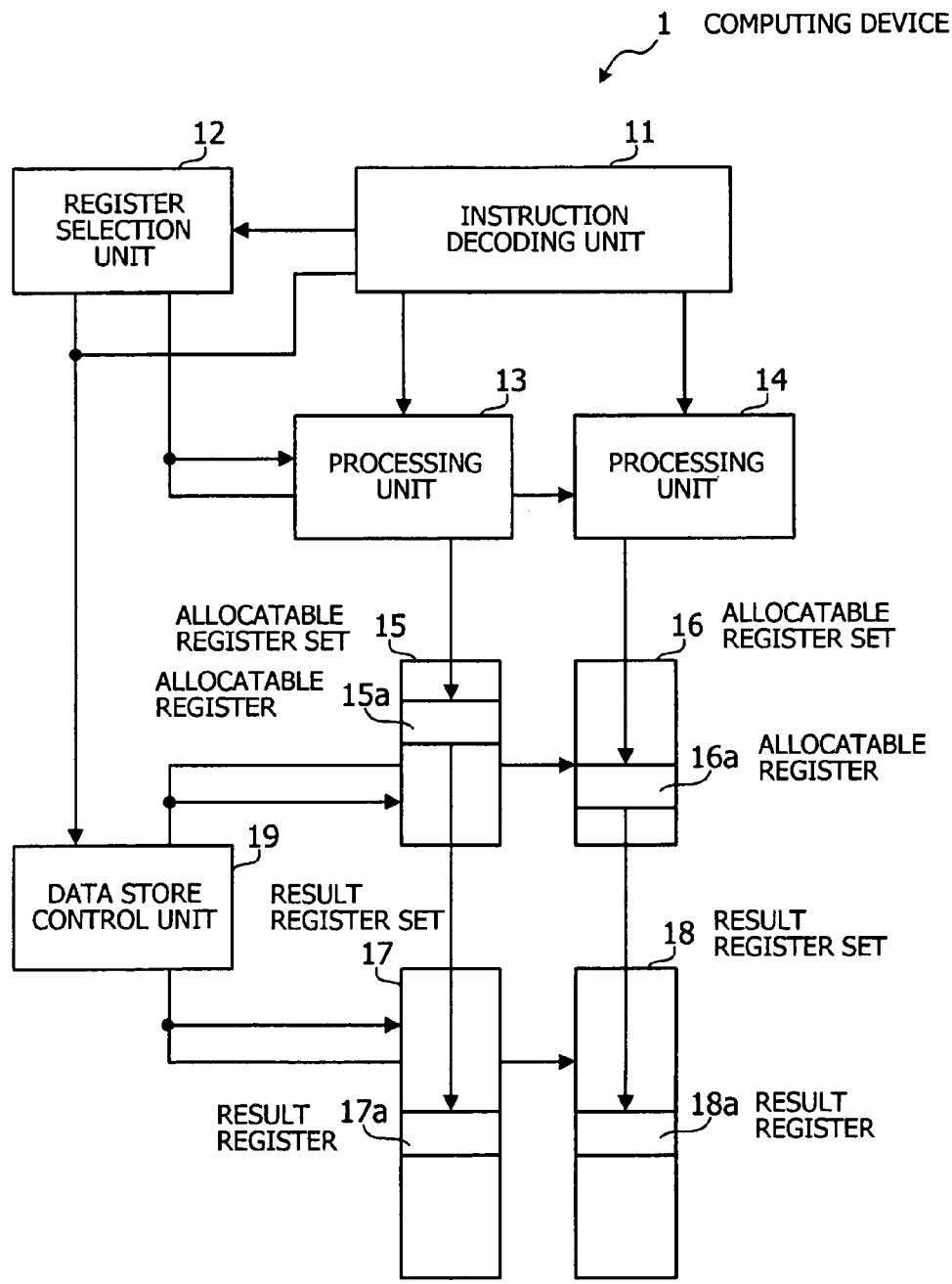
FIG. 1 illustrates a structure of a computing device according to a first embodiment.

Embodiments of the present invention will be described below with reference to the accompanying drawings, wherein like reference numerals refer to like elements throughout.

First Embodiment

FIG. 1 illustrates a structure of a computing device according to a first embodiment. The illustrated computing device 1 may be implemented as, for example, a CPU, a processor or one of its constituent elements (e.g., CPU core). This computing device 1 is formed from an instruction decoding unit 11, a register selection unit 12, processing units 13 and 14, allocatable register sets 15 and 16, result register sets 17 and 18, and a data store control unit 19.

The instruction decoding unit 11 decodes an instruction that is fetched and outputs a decoding result of that instruction. The instruction decoding unit 11 can decode at least multiple data processing instructions and normal data processing instructions. Multiple data processing instructions are a class of instructions that instruct the computing device to perform, with a single instruction code, the same operation on multiple data simultaneously. In the present embodiment, two data values constitute multiple data, which are referred to as "first data" and "second data." Multiple data processing instructions may be called, for example, "SIMD instructions." For example, a multiple data processing instruction instructs the computing device to obtain first data and second data from registers specified by an operand of the instruction and execute a computing operation or other specified processing operation on the first data, as well as on the second data. Here the first data and second data may have the same data width. Normal data processing instructions, on the other hand, instruct the computing device to perform an operation on data with the same data width as the first and second data.

The register selection unit 12 selects a register or registers out of the allocatable register sets 15 and 16, based on a decoding result that the instruction decoding unit 11 provides by decoding a fetched instruction. When, for example, the instruction decoding unit 11 has decoded a multiple data processing instruction, the register selection unit 12 selects two allocatable registers 15a and 16a. When, on the other hand, the instruction decoding unit 11 has decoded a normal data processing instruction, the register selection unit 12 selects either an allocatable register 15a or another allocatable register 16a.

The processing units 13 and 14 perform a computing operation or other specified processing operation on the data they are given. In the case where the instruction decoding unit 11 has decoded a multiple data processing instruction, one processing unit 13 processes the first data, while the other processing unit processes the second data. In the case where the instruction decoding unit 11 has decoded a normal data processing instruction, either the processing unit 13 or the processing unit 14 executes a processing operation on the given data. The processing units 13 and 14 may be configured to execute the same processing operation.

The allocatable register set 15 is formed from a plurality of allocatable registers 15a. Similarly, the allocatable register set 16 is formed from a plurality of allocatable registers 16a. The outcome (e.g., computing result) of one processing unit 13 is entered to an allocatable register 15a that the register selection unit 12 has selected out of those in one allocatable register set 15. Similarly, the outcome of the other processing unit 14 is entered to the allocatable register 16a that the register selection unit 12 has selected out of those in the other allocatable register set 16.

The result register set 17 is formed from a plurality of result registers 17a. Similarly, the result register set 18 is formed from a plurality of result registers 18a. For example, the result register set 18 is formed from as many result registers 18a as the number of result registers 17a. The result register set 17 is to receive data from the allocatable register set 15. The result register set 18 is to receive data from the allocatable register set 16.

The data store control unit 19 controls the operation of transferring data from the allocatable register set 15 to the result register set 17, as well as from the allocatable register set 16 to the result register set 18. While the present embodiment employs this data store control unit 19 to control such data transfer operation, it may be possible to modify the embodiment to use some other method to achieve the purpose.

When a multiple data processing instruction is supplied to the instruction decoding unit 11, the above-described computing device 1 operates as follows. The instruction decoding unit 11 decodes the multiple data processing instruction, which causes the register selection unit 12 to select allocatable registers 15a and 16a from among those in the allocatable register set 15 and 16, respectively. Also based on the decoding result of the instruction, the processing unit 13 executes a processing operation on first data and stores its result in the allocatable register 15a selected by the register selection unit 12. Simultaneously, based on the decoding result of the instruction, the processing unit 14 executes a processing operation on second data and stores its result in the allocatable register 16a selected by the register selection unit 12. Under the control of the data store control unit 19, the processing result stored in the allocatable register 15a is transferred to a result register 17a. Also, under the control of the data store control unit 19, the processing result stored in the allocatable register 16a is transferred to another result register 18a.

When, on the other hand, a normal data processing instruction is supplied to the instruction decoding unit 11, the computing device 1 operates as follows. The instruction decoding unit 11 decodes the normal data processing instruction and outputs the decoding result. Based on this decoding result, the instruction decoding unit 11 selects either a result register set 17 or a result register set 18 for use as the destination of data. In the case where the result register set 17 is selected as the destination of data, the register selection unit 12 selects one allocatable register 15a out of the allocatable register set 15. Based on the decoding result of the instruction, the processing unit 13 executes a specified processing operation on specified data and stores the result in the allocatable register 15a selected by the register selection unit 12. The processing result stored in the allocatable register 15*a* is then transferred to a result register 17*a*, under the control of the data store control unit 19.

The instruction decoding unit 11 may instead select another result register set 18 as the destination of data. When this is the case, the register selection unit 12 selects one allocatable register 16*a* out of the allocatable register set 16. Based on the decoding result of the normal data processing instruction, the processing unit 14 executes a specified processing operation on specified data and stores the result in the allocatable register 16*a* selected by the register selection unit 12. The processing result stored in the allocatable register 16*a* is transferred to a result register 18*a*, under the control of the data store control unit 19.

As can be seen from the above, the register selection unit 12 selects one register from each allocatable register set 15 and 16 when executing a multiple data processing instruction. The selected allocatable registers 15*a* and 16*a* are supposed to receive processing results of the first data and second data, respectively. In this selection of registers, the register selection unit 12 may choose allocatable registers 15*a* and 16*a* with different register identifiers (e.g., addresses) when executing a single multiple data processing instruction. This feature increases the efficiency of register usage in the allocatable register sets 15 and 16.

When the decoded instruction is a normal data processing instruction, the processing result is directed to either the allocatable register set 15 or the allocatable register set 16. The computing device 1 can thus prevent useless vacancies from being produced in the allocatable register sets 15 and 16 even when the program in execution contains both multiple data processing instructions and normal data processing instructions.

The result register sets 17 and 18 provide registers for the purpose of storing processing results of two processing units 13 and 14. Which of those registers to use may be specified by, for example, the instruction decoded by the instruction decoding unit 11. In this case, the instruction decoding unit 11 provides the data store control unit 19 with a specific register identifier to designate which registers in the result register sets 17 and 18 should receive the processing result of that instruction. When a processing result is ready in the allocatable register sets 15 and 16, the data store control unit 19 transfers it to result registers in the result register sets 17 and 18 which are identified by the register identifier provided by the instruction decoding unit 11.

In the above case, the instruction decoding unit may be configured to specify destination registers depending on the type of instructions in the following way. Suppose, for example, that a multiple data processing instruction specifies one result register 17*a* in the result register set 17 as a destination register. The instruction decoding unit 11 then designates a result register 18*a* having the same register identifier (e.g., address) as the specified result register 17*a*, for the purpose of storing a processing result of second data. On the other hand, normal data processing instructions may specify any result register among those in two result register sets 17 and 18 as the destination register of their processing result.

Accordingly, the two processing results of a multiple data processing instruction are directed to a pair of result registers 17*a* and 18*a* sharing the same register identifier in the result register sets 17 and 18. In other words, those two processing results can be handled simply together by using a pair of result registers 17*a* and 18*a* with the same register identifier. Normal data processing instructions, on the other hand, can use individual result registers as their destination registers. That is, twice the number of result registers are available for normal data processing instructions, compared with those for multiple data processing instructions. This feature provides more choices of registers in program coding, besides improving the efficiency of register usage in the result register sets 17 and 18.

Second Embodiment

This section describes a second embodiment. The description begins with an example structure of an information processing apparatus having a CPU core capable of executing both SIMD processing and non-SIMD processing (processing that does not necessitate SIMD mechanisms), and will then proceed to more detailed discussion on the CPU core itself.

Figure 2:
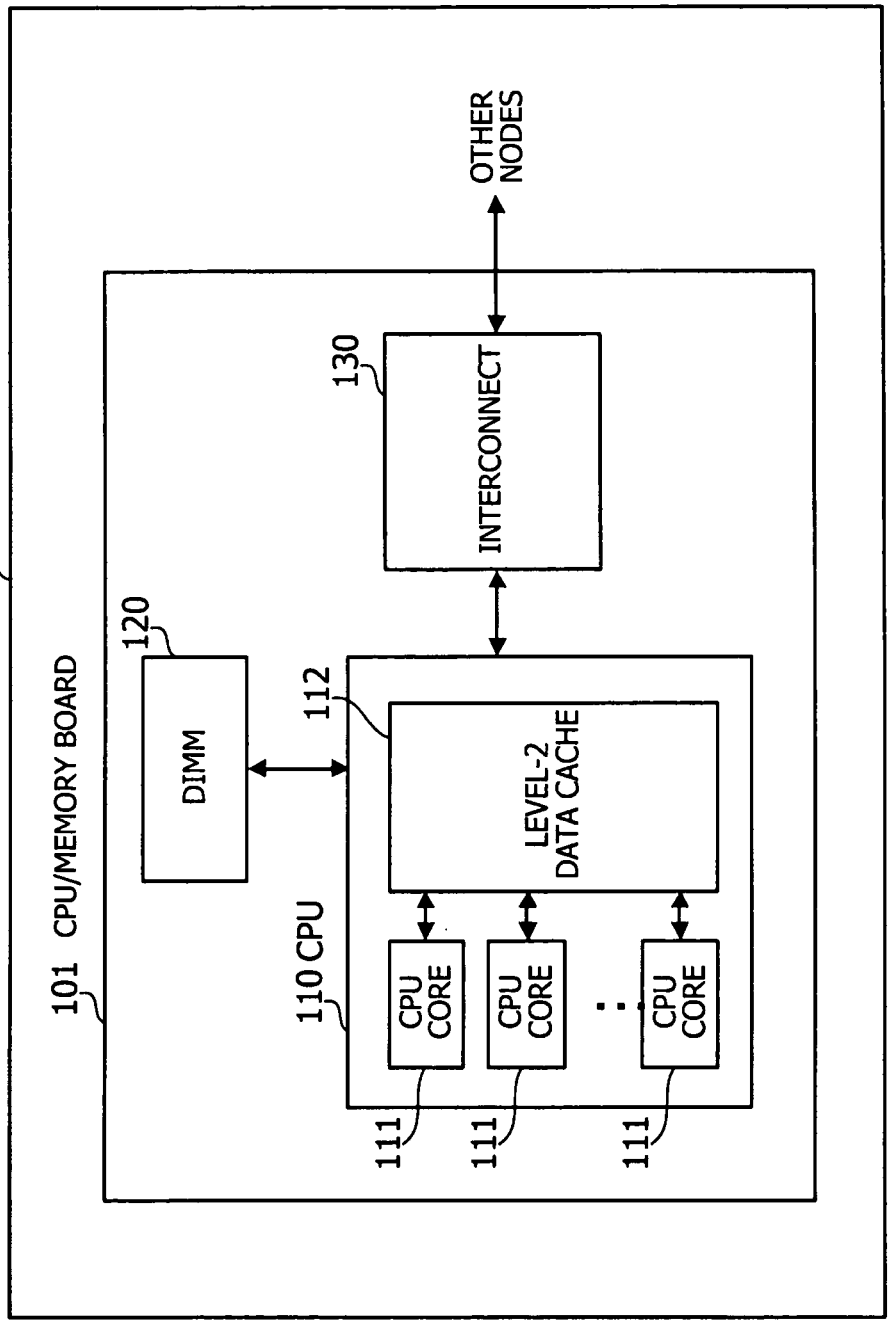
FIG. 2 illustrates an example structure of an information processing apparatus.

FIG. 2 illustrates an example structure of an information processing apparatus. The illustrated information processing apparatus 100*a* includes a CPU/Memory board 101, or a circuit board on which a CPU, memory, and other components are mounted. Mounted on the CPU/Memory board 101 in the example of FIG. 2 are a CPU 110, dual inline memory modules (DIMM) 120, and an interconnect 130.

The CPU 110 is made up of a plurality of CPU cores 111 and a level-2 data cache 112 shared by those CPU cores 111. Each CPU core 111 is directly coupled to the DIMM 120, enabling them to exchange data with each other. The CPU 110 uses the DIMM 120 as its main memory. The interconnect 130 provides connection between the CPU/Memory board 101 and other circuit nodes in the information processing apparatus 100*a* to enable them to send data to each other.

Figure 3:
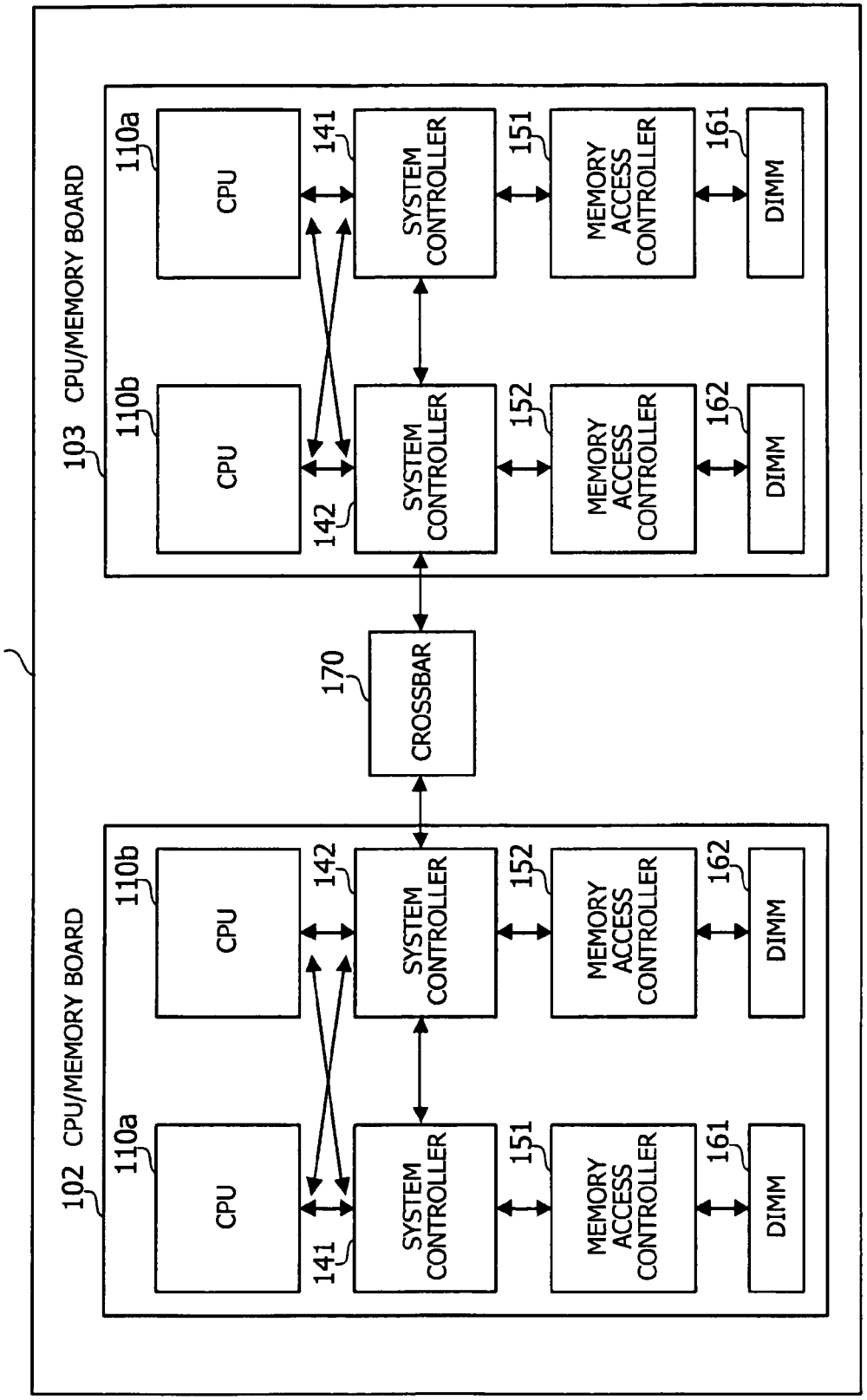
FIG. 3 illustrates another example structure of an information processing apparatus.

FIG. 3 illustrates another example structure of an information processing apparatus. Some elements seen in FIGS. 2 and 3 share the same reference numerals to indicate their likeness. Specifically, FIG. 3 gives an example of an information processing apparatus formed from a plurality of CPU/Memory boards, on each of which a plurality of CPUs are mounted. More specifically, the information processing apparatus 100*b* of FIG. 3 has two such CPU/Memory boards 102 and 103. As these CPU/Memory boards 102 and 103 have the same configuration, the following explanation of circuit structure will focus on one CPU/Memory board 102.

The CPU/Memory board 102 contains, for example, two CPUs 110*a* and 110*b* with the same internal structure as the CPU 110 discussed in FIG. 2. Other components mounted on the CPU/Memory board 102 include system controllers 141 and 142, memory access controllers 151 and 152, and DIMMs 161 and 162.

Both CPUs 110*a* and 110*b* can make access to one DIMM 161 via its corresponding system controller 141 and memory access controller 151. The two CPUs 110*a* and 110*b* can also make access to another DIMM 162 via its corresponding system controller 142 and memory access controller 152. The illustrated structure of CPU-to-memory connection via a system controller and memory access controller may be expanded so as to mount, for example, three or more CPUs on the same CPU/Memory board.

The illustrated CPU/Memory boards 102 and 103 are interconnected by a crossbar 170. For example, the CPUs 110*a* and 110*b* on one CPU/Memory board 102 can communicate with the other CPU/Memory board 103 via the system controller 142 and crossbar 170. It may also be possible to interconnect three or more CPU/Memory boards via the crossbar 170 in a similar way.

The following description will now discuss the internal structure and operation of a CPU core 111 used in the above-described CPUs 110, 110*a*, and 110*b*. It is noted that the CPU core 111 is configured to execute both SIMD processing and non-SIMD processing.

Figure 4:
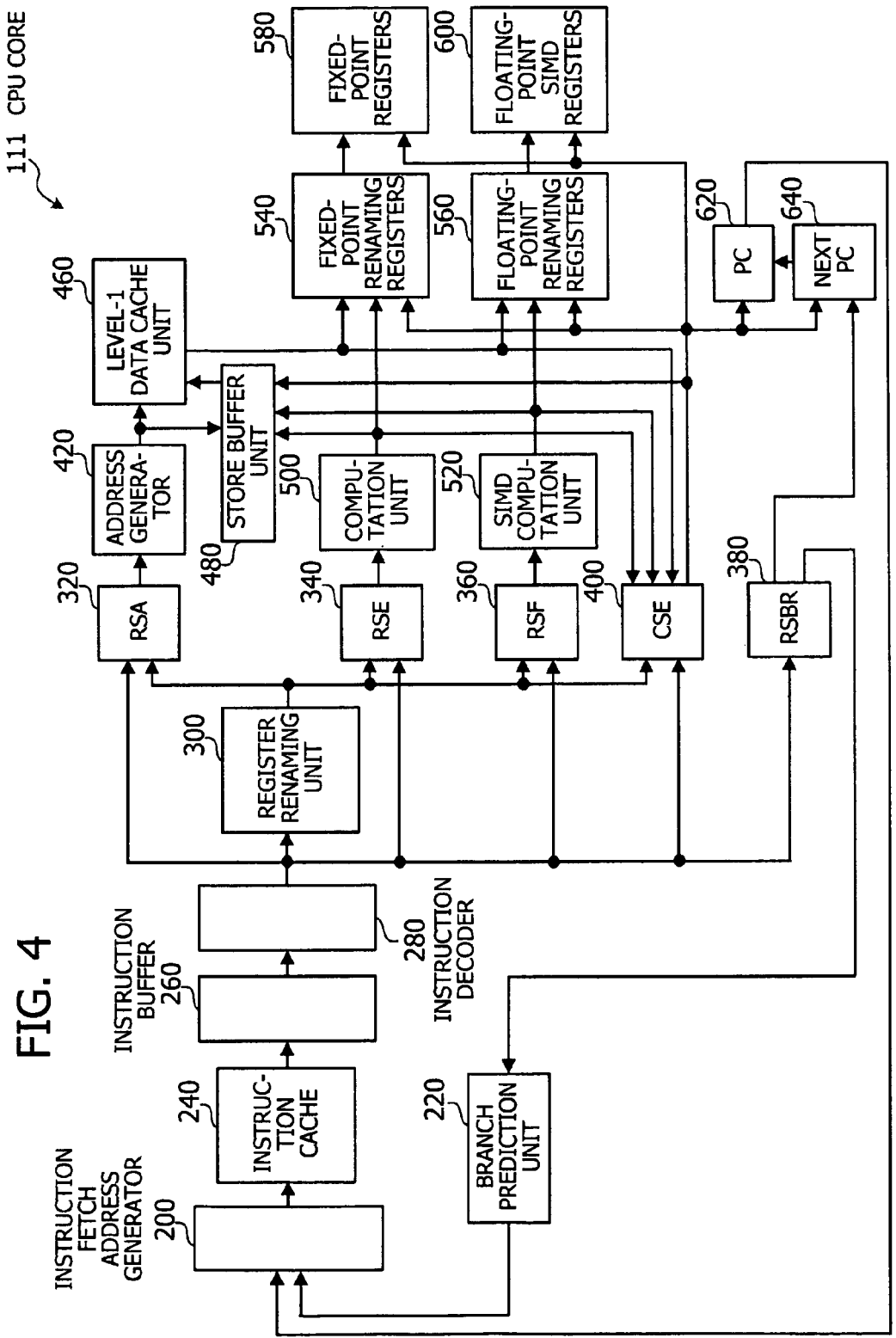
FIG. 4 illustrates an example overall structure of a CPU core.

FIG. 4 illustrates an example overall structure of a CPU core. According to the present embodiment, this CPU core 111 is supposed to perform SIMD processing as instructed by SIMD instructions of, for example, floating-point load, floating-point computation, and floating-point store operations. It is assumed that the CPU core 111 executes two-way SIMD operations which process two 64-bit (8-byte) data operands in parallel.

The illustrated CPU core 111 is formed from the following components: an instruction fetch address generator 200, a branch prediction unit 220, an instruction cache 240, an instruction buffer 260, an instruction decoder 280, a register renaming unit 300, a reservation station for address generation (RSA) 320, a reservation station for execution (RSE) 340, a reservation station for floating-point (RSF) 360, a reservation station for branch (RSBR) 380, a commit stack entry (CSE) 400, an address generator 420, a level-1 data cache unit 460, a store buffer unit 480, a computation unit 500, an SIMD computation unit 520, fixed-point renaming registers 540, floating-point renaming registers 560, fixed-point registers 580, floating-point SIMD registers 600, and program counters 620 and 640. RSA 320 is a reservation station for generation of main memory operand address. RSE 340 is a reservation station for fixed-point computation. RSF 360 is a reservation station for floating-point computation instruction. RSBR 380 is a reservation station for branch instructions.

The instruction fetch address generator 200 selects an instruction address based on count values of the program counter 620 or information from the branch prediction unit 220, and issues an instruction fetch request to the instruction cache 240. The branch prediction unit 220 predicts which way a branch will go, based on the entries of RSBR 380. The instruction cache 240 supplies the instruction buffer 260 with an instruction according to each instruction fetch request from the instruction fetch address generator 200. The instructions are then supplied from the instruction buffer 260 to the instruction decoder 280 in the order that they are originally specified in the program in execution. This "in-order" series of instructions are then decoded by the instruction decoder 280 in an "in-order" fashion.

Depending on the type of each decoded instruction, the instruction decoder 280 produces necessary entries for the RSA 320, RSE 340, RSF 360, or RSBR 380. In addition, the instruction decoder 280 produces an entry of the CSE 400 for each and every decoded instruction.

When an entry has been created in the RSA 320, RSE 340, or RSF 360, the register renaming unit 300 assigns an address of a renaming register to the address specifying which architectural register is to be used in processing the instruction of that entry. Architectural registers are the registers referenced by software programs, which are actually implemented, in the CPU core 111, as fixed-point registers 580 and floating-point SIMD registers 600. The renaming registers include fixed-point renaming registers 540 and floating-point renaming registers 560. In the case where a fixed-point register 580 is used, the address of a fixed-point renaming register 540 is assigned thereto as a renaming register address. In the case where a floating-point SIMD register 600 is used, the address of a floating-point renaming register 560 is assigned thereto as a renaming register address. The assigned renaming register address is supplied to relevant functional blocks, including the RSA 320, RSE 340, RSF 360, and CSE 400.

The RSA 320 holds a plurality of entries and outputs them one by one in the order that their required resources are ready, so that the subsequent block can execute an operation corresponding to the supplied entry. This feature of reservation stations also applies to the RSE 340 and RSF 360. The described mechanism of RSA 320, RSE 340, and RSF 360 enables out-of-order execution of instructions. The resulting data is then stored in the fixed-point renaming registers 540 or floating-point renaming registers 560.

The RSA 320 stores entries created from a load instruction and a store instruction, for example. Based on one of such RSA entries, the address generator 420 selects operand data and produces an operand address based on the selected data. Specifically, when the instruction in process is a load instruction, the address generator 420 supplies the produced operand address to the level-1 data cache unit 460. The level-1 data cache unit 460 outputs data in the operand address specified by the address generator 420 and sends it to a fixed-point renaming register 540 or a floating-point renaming register 560. When, on the other hand, the instruction in process is a store instruction, the address generator 420 produces and supplies an operand address to the store buffer unit 480.

The RSE 340 may store an entry created from a fixed-point computation instruction, for example. In this case, the computation unit 500 performs fixed-point computation based on an entry supplied from the RSE 340 and stores the computation result in a fixed-point renaming register 540. When the instruction in process is a fixed-point store instruction, the computation unit 500 feeds the selected operand data to the store buffer unit 480 without performing any operation on that data. In this case, the store buffer unit 480 specifies to the level-1 data cache unit 460 an operand address generated by the address generator 420, so that the output data of the computation unit 500 will be written in that address of the level-1 data cache unit 460.

The RSF 360 stores entries created from a floating-point computation instruction and a floating-point store instruction, for example. The SIMD computation unit 520 selects operand data based on an entry supplied from the RSF 360 and performs a floating-point operation on that data. When the instruction in process is a floating-point computation instruction, the SIMD computation unit 520 stores its computation result in a floating-point renaming register 560. When the instruction in process is a floating-point store instruction, the SIMD computation unit 520 feeds the selected operand data to the store buffer unit 480 without performing any operation on that data. In this case, the store buffer unit 480 specifies to the level-1 data cache unit 460 an operand address generated by the address generator 420, so that the output data of the SIMD computation unit 520 will be written in that address of the level-1 data cache unit 460.

The RSBR 380 stores entries corresponding to branch instructions. Information deriving from those RSBR entries are supplied to the branch prediction unit 220 and program counter 640.

The CSE 400 stores entries created from every instruction decoded by the instruction decoder 280. The CSE 400 manages the processing operation of each CSE entry, thus committing those instructions in order (i.e., in the order that they are decoded). Suppose, for example, that the CSE 400 has determined that a specific fixed-point renaming register 540 or floating-point renaming register 560 has received a processing result of the entry that is to be completed in the next place. In this case, the CSE 400 causes the fixed-point renaming register 540 or floating-point renaming register 560 to output its stored data to the corresponding fixed-point register 580 or floating-point SIMD register 600. With this mechanism, the instructions executed out-of-order by the RSA 320, RSE 340, and RSF 360 are completed in-order.

The number of fixed-point renaming registers 540 is equal to or smaller than the number of entries that the CSE 400 accommodates. The floating-point SIMD registers 600, on the other hand, are formed from the same number of basic registers and the same number of extended registers, as will be described later. The number of basic registers is equal to or smaller than the number of entries that the CSE 400 can accommodate. This condition also applies to the number of extended registers.

One program counter (PC) 620 increments itself each time the CSE 400 commits an instruction. Another program counter (NEXT PC) 640 holds a count value based on entries of the RSBR 380. This count value of NEXT PC corresponds to an instruction at the branch destination and is used to update the program counter 620.

The following description will now provide details of the register renaming of floating-point SIMD registers 600. To begin with, FIG. 5 illustrates a register renaming operation performed when an SIMD instruction is executed.

Figure 5:
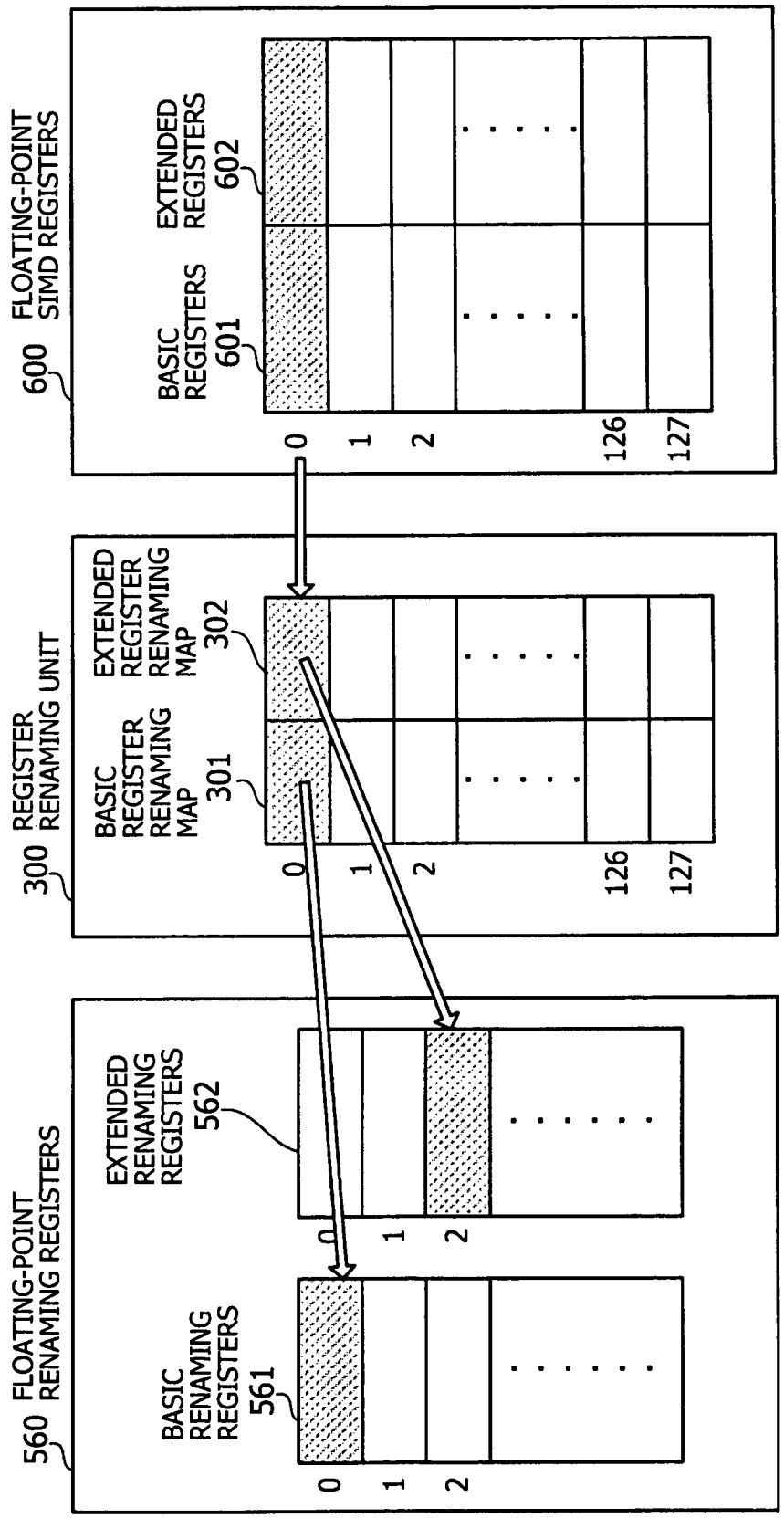
FIG. 5 illustrates a register renaming operation performed when an SIMD instruction is executed.

As can be seen from FIG. 5, the floating-point SIMD registers 600 are formed from basic registers 601 and extended registers 602. The basic registers 601 and the extended registers 602 have a bit width of eight bytes and are equal in number. The present embodiment employs, for example, 128 basic registers 601 and 128 extended registers 602, the individual registers being identified by register numbers ranging from 0 to 127. Where appropriate, those basic registers 601 and extended registers 602 may respectively be represented as upper and lower halves of SIMD registers with a bit width of 16 bytes (128 bits).

The floating-point renaming registers 560 are formed from basic renaming registers 561 and extended renaming registers 562. The basic renaming registers 561 and the extended renaming registers 562 have a bit width of eight bytes and are equal in number. The number of basic renaming registers 561, as well as the number of extended renaming registers 562, may be equal to or smaller than the number of entries of the CSE 400.

The register renaming unit 300 includes a basic register renaming map 301 and an extended register renaming map 302. The basic register renaming map 301 is formed from a plurality of entries each corresponding to a different basic register 601. More specifically, the entry corresponding to a specific basic register 601 contains a register number or address that indicates which basic renaming register 561 is assigned to that basic register 601. Similarly, the extended register renaming map 302 is formed from a plurality of entries each corresponding to a different extended register 602. The entry corresponding to a specific extended register 602 contains a register number or address that indicates which extended renaming register 562 is assigned to that extended register 602. The instruction decoder 280 makes this assignment of register number or address to the basic register renaming map 301 and extended register renaming map 302.

When executed with the floating-point SIMD registers 600, an SIMD instruction uses a set of basic register 601 and extended register 602 with the same register number (between 0 and 127), so that two 8-byte data values can be processed in parallel by assigning them to those two registers 601 and 602. Suppose, for example, that the current SIMD instruction specifies a floating-point SIMD register 600 with a register number of "0" in its destination operand. In this case, the CPU core 111 executes a processing operation on the two 8-byte data values simultaneously as specified by the SIMD instruction. The results are first written in floating-point renaming registers 560 before they are written to the destination floating-point SIMD registers 600. As a result, one processed 8-byte data value is stored in a basic register 601, while the other 8-byte data value is stored in an extended register 602, both having a register number of "0."

The register renaming unit 300 can assign a basic renaming register 561 and an extended renaming register 562 with different register numbers to the basic register 601 and extended register 602 sharing the same register number. In the example of FIG. 5, a basic renaming register 561 with register number 0 is assigned to the basic register 601, while an extended renaming register 562 with register number 2 is assigned to the extended register 602 with register number 0.

That is, the SIMD instruction in process specifies the floating-point SIMD register 600 with register number 0 in its destination operand, and the assignment of renaming registers has been performed as depicted in FIG. 5. Accordingly, one resultant 8-byte data value is temporarily stored in the basic renaming register 561 with register number 0, and the other resultant 8-byte data value is temporarily stored in the extended renaming register 562 with register number 2. Now that two data values are ready in the basic renaming register 561 and extended renaming register 562, they are transferred to the basic register 601 with register number 0 and extended register 602 with register number 0, thus completing in-order execution of the SIMD instruction.

Figure 6:
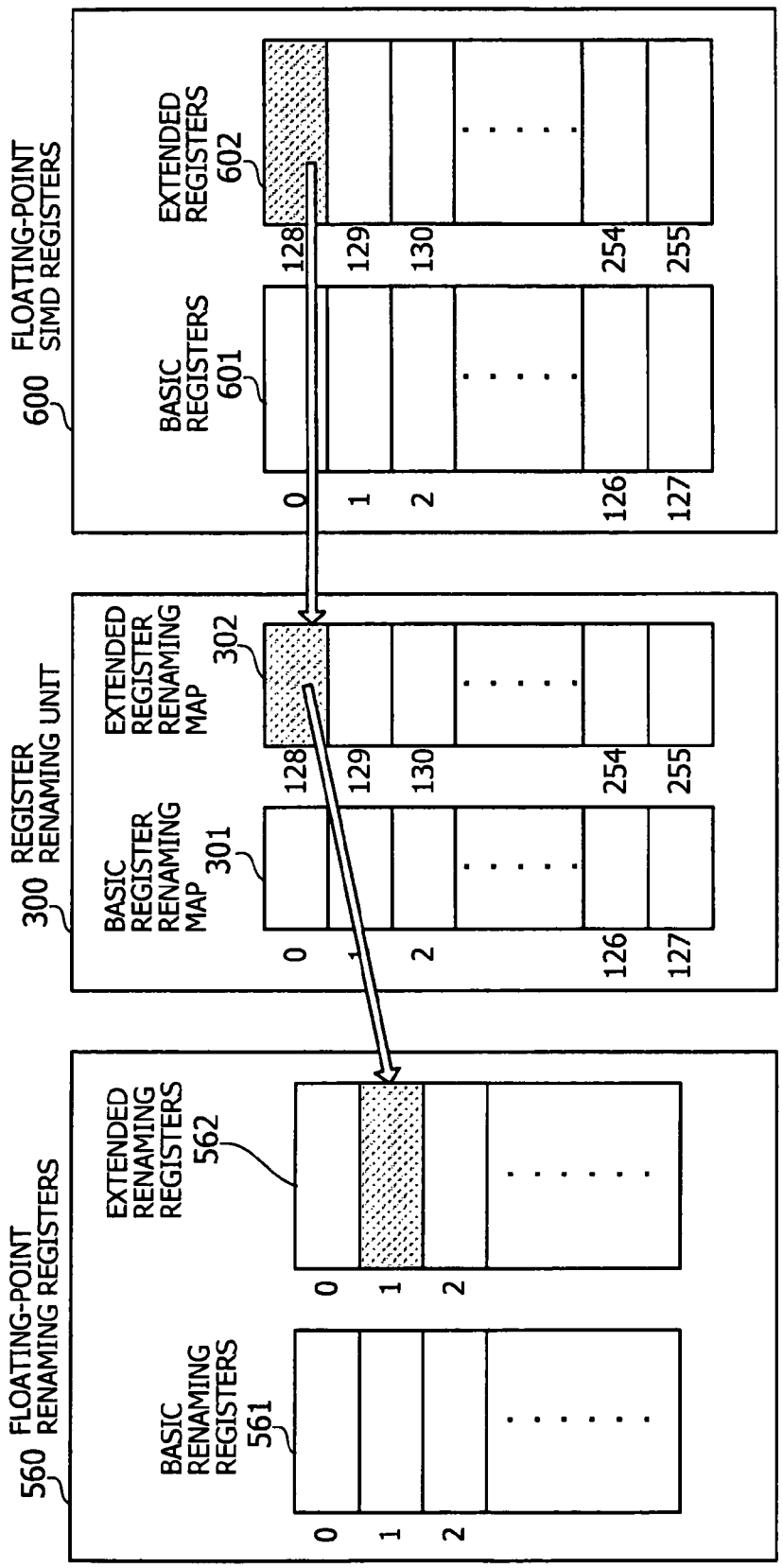
FIG. 6 illustrates a register renaming operation performed when a non-SIMD instruction is executed.

FIG. 6 illustrates a register renaming operation performed when a non-SIMD instruction is executed. When a non-SIMD instruction is given, the CPU core 111 executes a single specified operation on a single 8-byte data value. In this case, the basic registers 601 and extended registers 602 in the floating-point SIMD registers 600 are treated as discrete registers, thus allowing the non-SIMD operation to act on one of those 256 registers. Suppose, for example, that the non-SIMD instruction in process specifies one of the 256 registers in its destination operand designating a destination register to which the result of computation is to be stored. Specifically, the destination operand gives a specific register number in the range of 0 to 255 to specify one of the floating-point SIMD registers 600.

The register renaming unit 300 now assigns a register number or address of a basic renaming register 561 or extended renaming register 562 to the basic register 601 or extended register 602 that the non-SIMD instruction specifies in its destination operand. In the example illustrated in FIG. 6, an extended renaming register 562 with register number 1 is assigned to the extended register 602 with register number 128.

Figure 7:
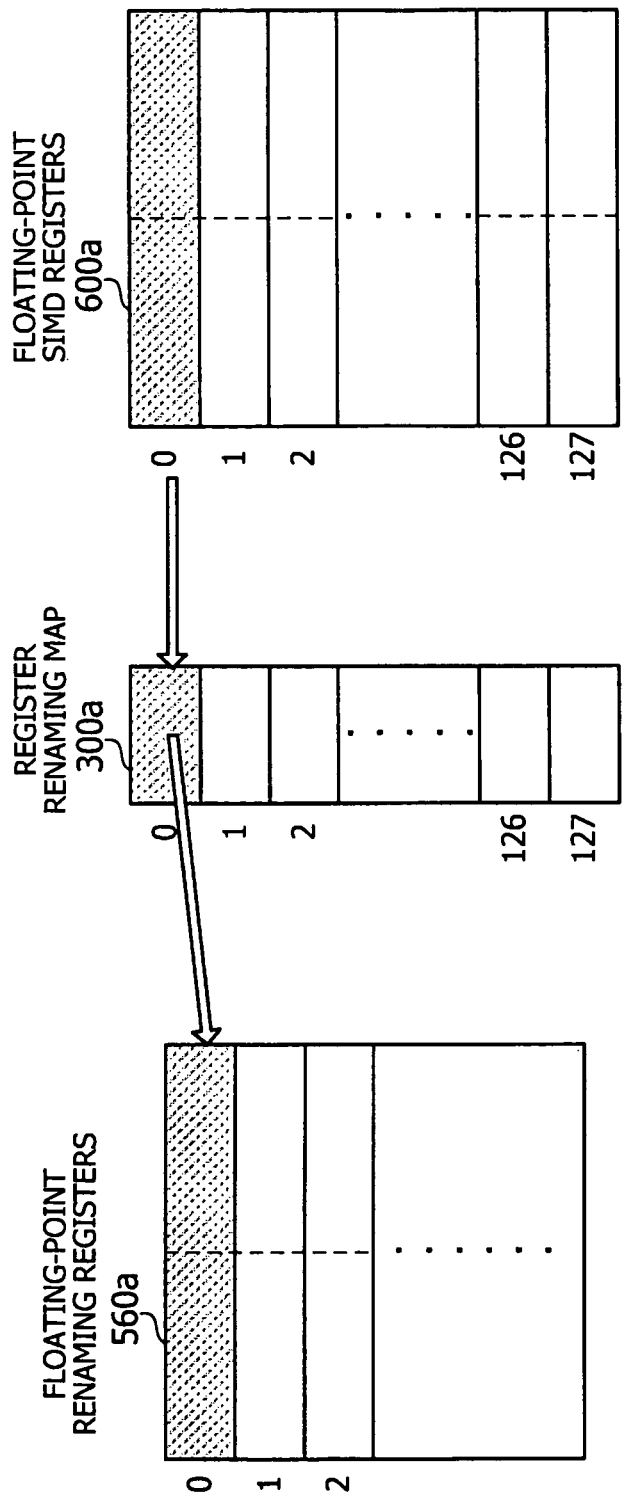
FIG. 7 illustrates, for reference, an example of register renaming in the case where floating-point SIMD registers have a fixed bit-width of 16 bytes.

For comparison purposes, FIG. 7 illustrates an example of register renaming in the case where floating-point SIMD registers have a fixed bit-width of 16 bytes. The following section will discuss the difference between the register renaming of FIG. 7 and that of the present embodiment described in FIGS. 5 and 6.

Referring to FIG. 7, each floating-point SIMD register 600a has a bit width of 16 bytes. Similarly, each floating-point renaming register 560a has a bit width of 16 bytes. The register renaming map 300a contains register numbers or addresses that indicate which floating-point renaming register 560a is assigned to each floating-point SIMD registers 600a.

With the above-described arrangement, an SIMD instruction is executed with a destination operand specifying one of the floating-point SIMD registers 600a. The execution yields two 8-byte data values. One 8-byte data value is stored in the first half of the assigned floating-point renaming register 560a, while the other 8-byte data value is stored in the second half of the same. Upon completion of this store operation, the two stored data values are transferred from the floating-point renaming register 560a to its associated floating-point SIMD register 600a.

The register renaming of FIG. 7 may also be applied to execution of a non-SIMD instruction. In that case, however, only a half of the floating-point SIMD register 600a is used to store the processing result since the non-SIMD instruction produces only one 8-byte data value. This is also true to the floating-point renaming register 560a associated with the floating-point SIMD register 600a. The register renaming of FIG. 7 is thus inefficient in terms of register usage.

In contrast to the above, the present embodiment offers a different way of register renaming for the floating-point SIMD registers 600 as illustrated in FIGS. 5 and 6. That is, the present embodiment uses basic registers 601 and extended registers 602 as discrete registers for non-SIMD processing, while permitting combined use of basic registers 601 and extended registers 602 for SIMD processing. This feature of the present embodiment enables efficient use of floating-point SIMD registers 600 during the execution of SIMD instructions and non-SIMD instructions.

The present embodiment also configures the floating-point renaming registers 560 as a set of basic renaming registers 561 and extended renaming registers 562, so as to handle data in units of 8 bytes. This configuration enables the use of a single register, out of the basic renaming registers 561 and extended renaming registers 562, for the purpose of non-SIMD processing. In SIMD processing, on the other hand, the present embodiment allows a basic renaming register 561 and an extended renaming register 562 with different register numbers to be assigned to a combination of a basic register 601 and extended register 602 with the same register number. Accordingly, the present embodiment makes efficient use of floating-point renaming registers 560 even in the case where the program contains both SIMD instructions and non-SIMD instructions.

While the above explanation of FIGS. 5 and 6 has assumed that the instructions specify a floating-point SIMD register 600 in their destination operand, it is also possible to specify the same in a source operand of instructions. When this is the case, a basic renaming register 561 and an extended renaming register 562 are similarly assigned to the specified source operand, but to read operand data from those assigned registers.

The above-described extended registers 602 are numbered from 128 to 255 for explanatory purposes. In the rest of this description, however, the extended registers 602 will be numbered from 0 to 127 similarly to the basic registers 601. Non-SIMD instructions are, however, allowed to use a register number in the range of 128 to 255 to specify one of those extended registers 602 with register numbers of 0 to 127.

Instructions supplied to the instruction decoder 280 may be, for example, floating-point load instructions, floating-point computation instructions, and floating-point store instructions. The following sections will describe how the CPU core 111 operates when executing these three kinds of instructions.

Floating-Point Load Instruction

Upon decoding a floating-point load instruction, the CPU core 111 reads data from an address specified by its source operand and writes the data in a register specified by its destination operand. The instruction code of an SIMD instruction to load floating-point values (hereafter, "SIMD load instruction") is expressed in the form of, for example, "Simd-load [address] % f127." This instruction instructs the CPU core 111 to read two 8-byte data values stored in consecutive addresses beginning at the address specified by the source operand [address] and write those 8-byte data values in a specific basic register 601 and extended register 602 as part of a floating-point SIMD register 600 that the destination operand % f127 specifies. Here, the destination operand % f127 indicates a register number of 127, which identifies one of the floating-point SIMD registers 600.

The instruction code of a non-SIMD instruction to load a floating-point value (hereafter, "non-SIMD load instruction") is also expressed in a similar form as described above, except that a different operation code is used. This non-SIMD instruction instructs the CPU core 111 to read one 8-byte data value stored in the address specified by the source operand and write that 8-byte data value in one register in the floating-point SIMD registers 600 that the destination operand specifies.

SIMD load instructions contain a register number in the range of 0 to 127 in their destination operand. In contrast, non-SIMD load instructions contain a register number in the range of 0 to 255 in their destination operand to specify a register belonging to the floating-point SIMD registers 600. The present embodiment assumes, for illustrative purposes, that the source operand in an instruction code is specified with a register number of a fixed-point register 580.

Figure 8:
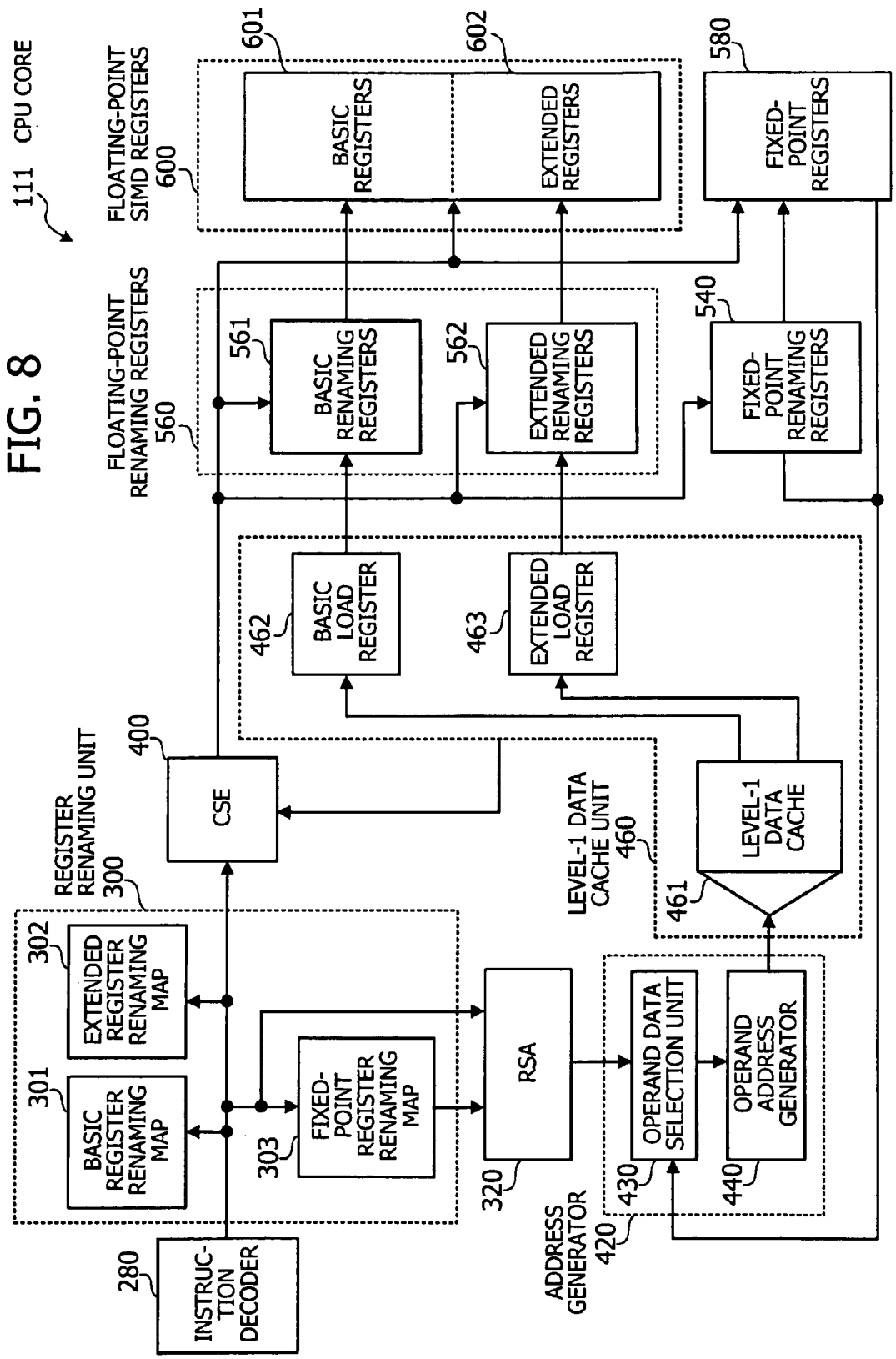
FIG. 8 illustrates components of a CPU core which execute a floating-point load instruction.

FIG. 8 illustrates components of the CPU core 111 which are involved in execution of a floating-point load instruction. Upon decoding a floating-point load instruction, the instruction decoder 280 places an entry of the instruction in the CSE 400 and RSA 320. The instruction decoder 280 also assigns a floating-point renaming register 560 to the floating-point SIMD register 600 that the instruction specifies as the destination of load data. The address of the assigned renaming register is recorded in both the basic register renaming map 301 and extended register renaming map 302 of the register renaming unit 300, as well as in relevant entries of the CSE 400 and RSA 320.

The source operand of the instruction specifies a register as noted above, and the data contained that source register is referred to herein as "operand data." The operand data may have also been stored in a fixed-point renaming register 540. When this is the case, the storage address is retrieved from the fixed-point register renaming map 303 and recorded in a relevant entry of the RSA 320.

The address generator 420 includes an operand data selection unit 430 and an operand address generator 440. When an entry corresponding to a floating-point load instruction is dispatched from RSA 320, the operand data selection unit 430 reads operand data from the specified fixed-point register 580 or fixed-point renaming register 540. The operand address generator 440 generates an operand address based on the operand data supplied from the operand data selection unit 430.

The level-1 data cache unit 460 includes a level-1 data cache 461 for storing cached data. Also included are a basic load register 462 and an extended load register 463 for temporarily holding data outputs of the level-1 data cache 461. The level-1 data cache 461 supplies the floating-point renaming register 560 with data corresponding to an operand address that the operand address generator 440 generates. More specifically, data destined for a basic renaming register 561 is supplied via the basic load register 462. Data destined for an extended renaming register 562 is supplied via the extended load register 463. The data stored in the basic renaming register 561 is transferred to a basic register 601 under the control of CSE 400. Similarly, the data stored in the extended renaming register 562 is transferred to an extended register 602 under the control of CSE 400.

According to the above-described arrangement, the data supplied from the level-1 data cache 461 to the basic load register 462 is then sent to a basic renaming register 561 before it is transferred to a basic register 601. Likewise, the data supplied from the level-1 data cache 461 to the extended load register 463 is then sent to an extended renaming register 562 before it is transferred to an extended register 602. In the rest of this description, the term "basic bus" will be used to refer to the former transfer route of data, i.e., the bus running through the basic load register 462, basic renaming registers 561, and basic registers 601 in that order. Also, the term "extended bus" will be used to refer to the latter transfer route of data, i.e., the bus running through the extended load register 463, extended renaming registers 562, and extended registers 602 in that order.

Figure 9:
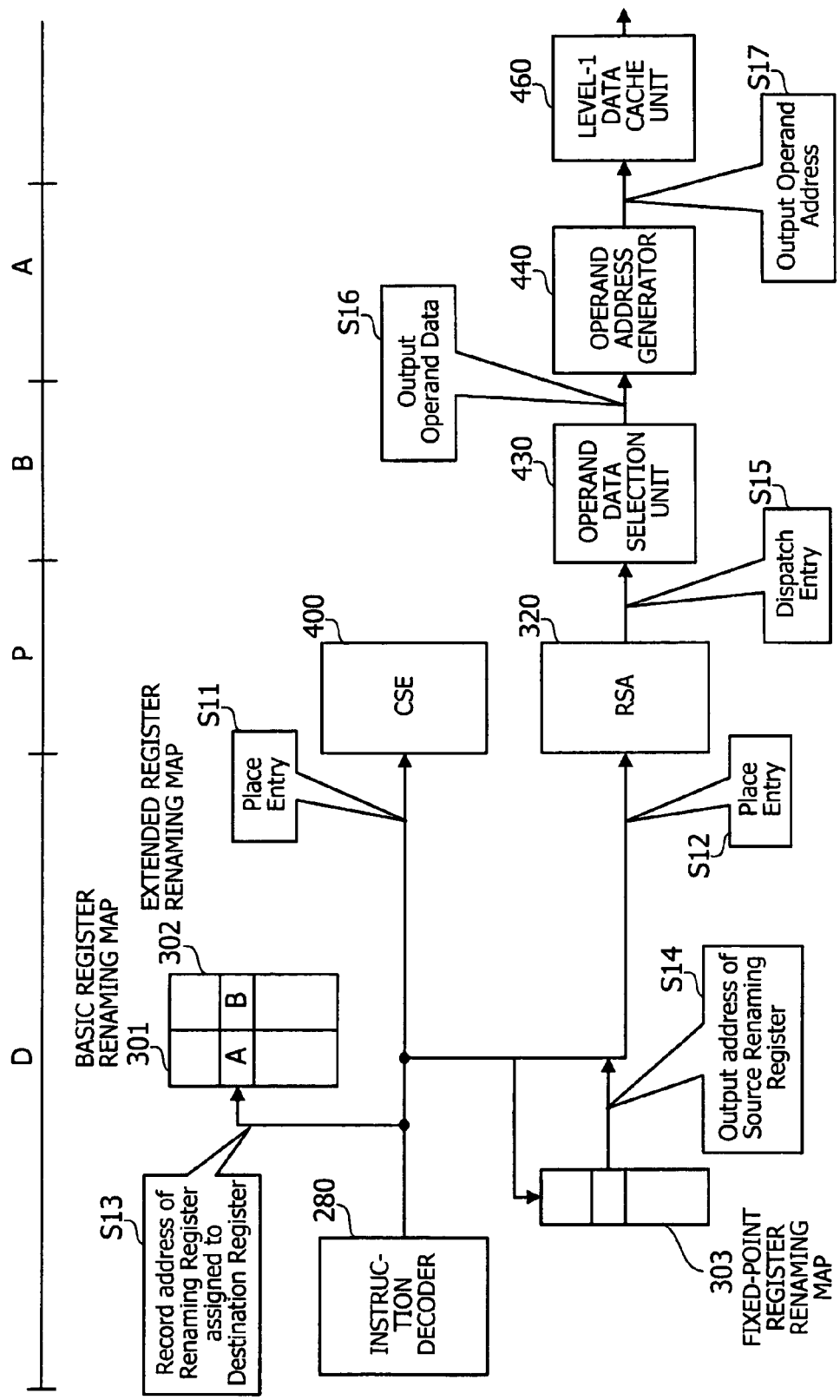
FIG. 9 is a first diagram illustrating operation of a pipeline to execute a floating-point load instruction.
Figure 10:
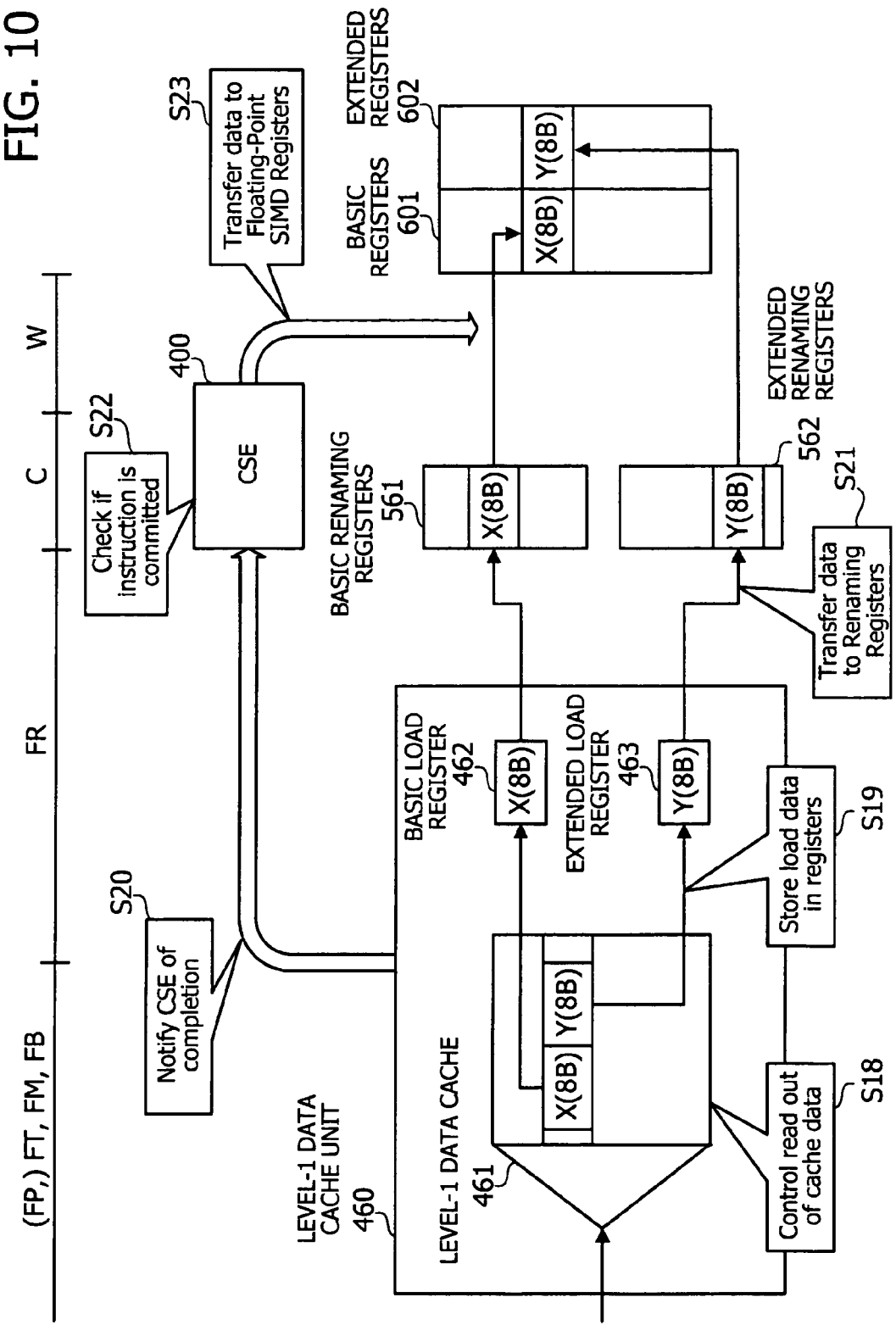
FIG. 10 is a second diagram illustrating operation of a pipeline to execute a floating-point load instruction.

FIGS. 9 and 10 illustrate a pipeline to execute a floating-point load instruction. When executing a floating-point load instruction, the pipeline provides the stages of, for example, D cycle, P cycle, B cycle, A cycle, FT cycle, FM cycle, FB cycle, FR cycle, C cycle, and W cycle in that order. Note that FP cycle may be inserted between A cycle and ST cycle as necessary.

In D cycle (decode cycle), a given instruction is decoded. Specifically, the instruction decoder 280 decodes a floating-point load instruction in D cycle. Based on the decoding result, the instruction decoder 280 places an entry in the CSE 400 (step S11), as well as doing the same with the RSA 320 (step S12).

What the instruction decoder 280 gives in this step to the CSE 400 is primarily a piece of information about the destination of load data. Specifically, the information may include, for example, the address of a floating-point SIMD register 600 for which the load data is destined. The information may also indicate whether to write a basic register 601, as well as whether to write an extended register 602.

The instruction decoder 280 also assigns a floating-point renaming register 560 to the destination floating-point SIMD register 600 and records that assignment in a relevant register renaming map (step S13). This assignment uses the same method discussed in FIGS. 5 and 6. That is, when an SIMD load instruction is decoded, the instruction decoder 280 enters the address of a basic renaming register 561 in one entry of the basic register renaming map 301 that corresponds to the destination register. The instruction decoder 280 also enters the address of an extended renaming register 562 in one entry of the extended register renaming map 302 that corresponds to the destination register. Note here that the assigned basic renaming register 561 and extended renaming register 562 may have different addresses. In the example of FIG. 9, the assigned basic renaming register 561 has an address of "A," while the assigned extended renaming register 562 has an address of "B."

The instruction decoder 280 also records the addresses of the assigned basic renaming register 561 and extended renaming register 562 in the relevant entry of the CSE 400. Further, the instruction decoder 280 records the addresses of the assigned basic renaming register 561 and extended renaming register 562 in the relevant entry of the RSA 320.

In addition to the renaming register addresses for the destination register, the instruction decoder 280 also adds some information about source data in the relevant entry of the RSA 320. For example, the instruction decoder 280 records the address of a fixed-point register 580 that the instruction specifies in its source operand as a source data address in the relevant entry of the RSA 320.

A fixed-point renaming register 540 may have been assigned to the address of the specified fixed-point register 580. When this is the case, the fixed-point register renaming map 303 outputs the address of that fixed-point renaming register 540 (step S14). This renaming register address is thus recorded in the relevant entry of the RSA 320.

P cycle (priority cycle) is where the RSA 320 waits for necessary data to become ready. As mentioned above, the RSA 320 dispatches its pending entries in the order their necessary data becomes ready. When the entry corresponding to the floating-point load instruction is dispatched from the RSA 320 to the operand data selection unit 430, the execution proceeds to B cycle (step S15).

In B cycle (buffer cycle), the operand data selection unit 430 reads operand data from a fixed-point register 580 or a fixed-point renaming register 540 according to the entry that the RSA 320 has dispatched. The operand data selection unit 430 then outputs that data to the operand address generator 440 (step S16).

In A cycle (address cycle), the operand address generator 440 produces an address. Specifically, the operand address generator 440 produces an operand address indicating the source of load data, based on the operand data received from the operand data selection unit 430. The operand address generator 440 outputs this operand address to the level-1 data cache unit 460 (step S17).

In each of FT cycle (first cache-tag cycle), FM cycle (first cache-match cycle), FB cycle (first cache-buffer cycle), the level-1 data cache unit 460 executes what is necessary to send load data out of the level-1 data cache 461 (step S18). Depending on the content of the level-1 data cache unit 460, it may be necessary to read data from, for example, the level-2 data cache 112 or main memory. If this is the case, FP cycle (first cache-priority cycle) is inserted before FT cycle. The execution moves to FR cycle when the level-1 data cache 461 is ready to provide the data corresponding to the operand address produced by the operand address generator 440.

In FR cycle (first cache-result cycle), the processing of a dispatched entry of the RSA 320 is completed. Specifically, this FR cycle reads out load data from the level-1 data cache 461 to the basic load register 462 or extended load register 463, or both of them (step S19).

In the case of SIMD load instructions, the level-1 data cache 461 outputs two 8-byte load data values, which are stored temporarily in the basic load register 462 and extended load register 463. FIG. 10 depicts one 8-byte load data value as "X(8B)" and the other as "Y(8B)." Upon completion of storing data in the basic load register 462 and extended load register 463, the level-1 data cache unit 460 notifies the CSE 400 of the completion (step S20).

Then in the subsequent cycle, the load data stored in the basic load register 462 is transferred to the assigned address of the basic renaming registers 561. Similarly, the load data stored in the extended load register 463 is transferred to the assigned address of the extended renaming registers 562 (step S21).

It is noted that the RSA 320 has provided some address information to the level-1 data cache unit 460 via the operand data selection unit 430 and operand address generator 440. This address information specifies to which renaming register(s) the load data is supposed to go, where the destination may be either or both of a basic renaming register 561 and an extended renaming register 562. Along with the address information, the RSA 320 has also provided a signal specifying which bus to use to deliver the load data to those renaming registers. According to the provided address information and bus selection signals, the level-1 data cache unit 460 writes load data read out of the level-1 data cache 461 to the specified basic renaming register 561 and extended renaming register 562.

Load data is usually stored in consecutive addresses in the level-1 data cache 461. For this reason, two load data values are usually sent back-to-back to the basic load register 462 and extended load register 463. However, in the case where one of those two load data values has not been cached in the level-1 data cache 461, it is necessary to read the missing data out of a lower-layer memory space that is closer to the main memory. This situation may also be encountered when, for example, load data Y(8B) in FIG. 10 is stored not in the same line as load data X(8B), but in the next line.

In the above-noted situation, the basic load register 462 and extended load register 463 may be loaded with their respective data at separate times. When this is the case, the level-1 data cache unit 460 notifies the CSE 400 of the completion of storing load data in the extended load register 463, separately from such notification about the basic load register 462. The CSE 400 manages the entry of each instruction, including whether the instruction needs storing data in both the basic load register 462 and extended load register 463 or only one of the two. The described mechanism enables the CSE 400 to correctly determine whether the instruction has been committed, even in the case where the basic load register 462 and extended load register 463 receive load data at separate times.

In C cycle (commit cycle), the instruction is committed. In the present example, the CSE 400 determines that the floating-point load instruction has been committed (step S22).

In W cycle (write cycle), the registers are updated. Specifically, one load data value stored in the basic renaming register 561 is transferred to a relevant address of the basic registers 601. Also, another load data value stored in the extended renaming register 562 is transferred to a relevant address of the extended registers 602. These data transfer operations are controlled by the CSE 400 (step S23).

In the case of SIMD load instructions, both basic and extended renaming registers 561 and 562 are supposed to receive load data. Accordingly, the CSE 400 specifies a basic register 601 and an extended register 602 with the same register number as the destination of two load data values. The relevant CSE entry contains this destination register number, together with the addresses of the associated basic renaming register 561 and extended renaming register 562. Based on these values in the CSE entry, the CSE 400 controls transfer operation of load data to the basic register 601 and extended register 602.

Figure 11:
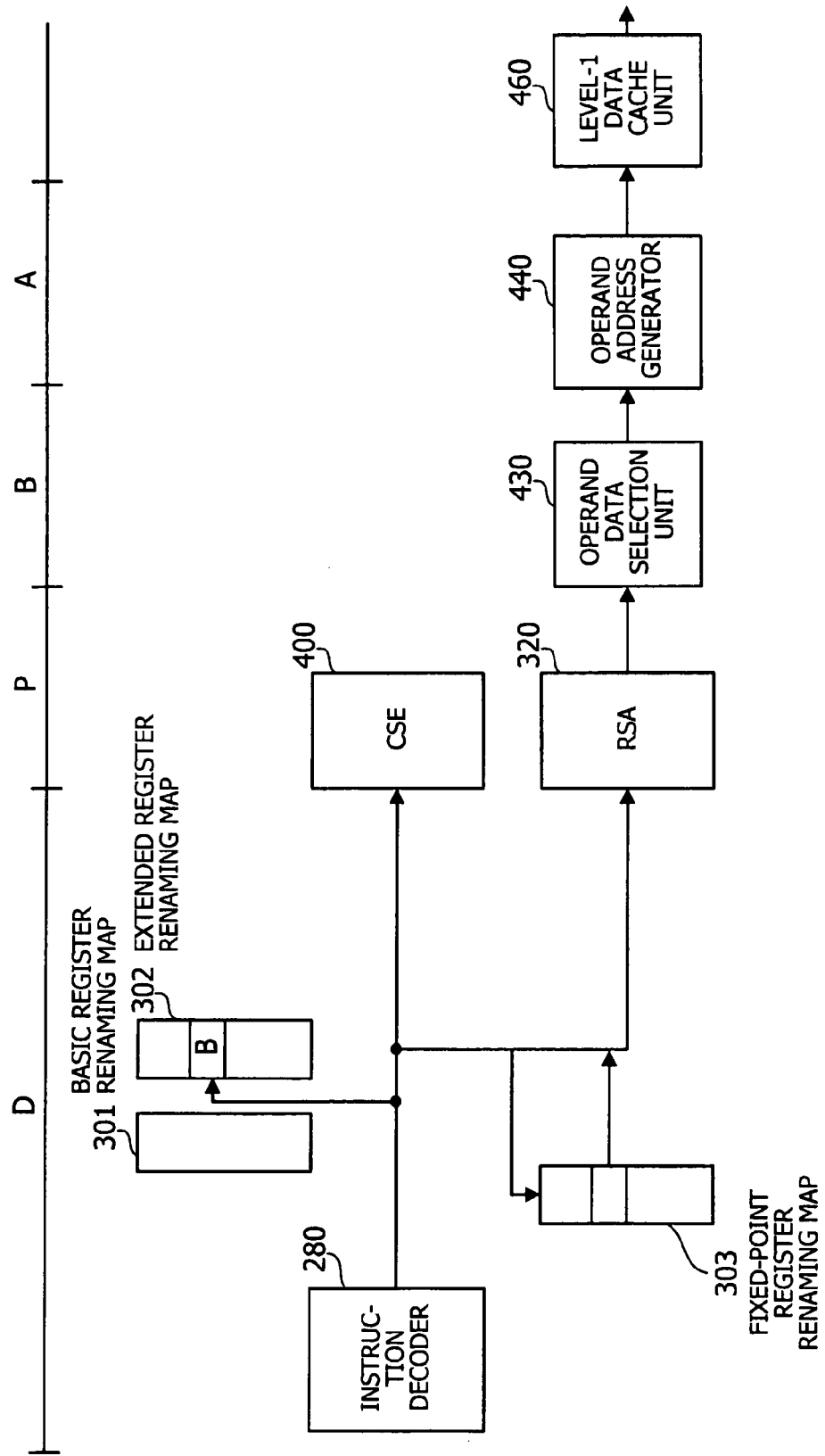
FIG. 11 is a first diagram illustrating a data flow during execution of a non-SIMD load instruction.
Figure 12:
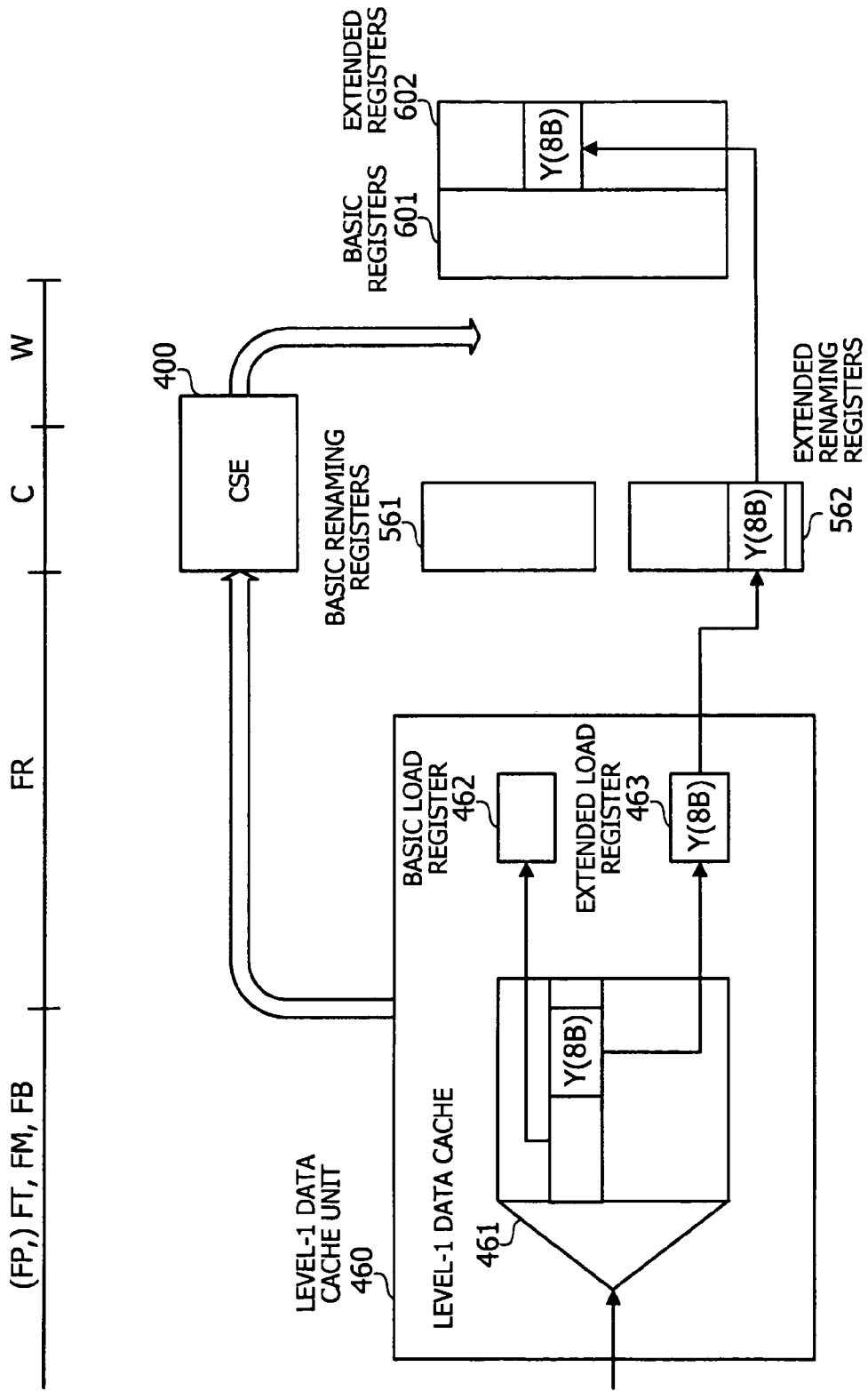
FIG. 12 is a second diagram illustrating a data flow during execution of a non-SIMD load instruction.

FIGS. 11 and 12 illustrate a data flow during execution of a non-SIMD load instruction. Referring to FIGS. 11 and 12, the following will describe the difference between SIMD load instructions and non-SIMD load instructions in terms of the way of execution.

Non-SIMD load instructions specify either a basic register 601 or an extended register 602, but not both, as a destination of load data. In D cycle, the instruction decoder 280 decodes a non-SIMD load instruction, thus assigning a renaming register to the specified destination register of load data. FIG. 11 illustrates the case where one of the extended registers 602 is designated as the destination of load data. In this case, the address of the extended renaming register 562 assigned by the instruction decoder 280 is placed in a corresponding field of the extended register renaming map 302.

In B cycle after the RSA 320 dispatches an entry, the operand data selection unit 430 selects operand data from either a fixed-point register 580 or a fixed-point renaming register 540. In A cycle, the operand address generator 440 produces an operand address based on the operand data received from the operand data selection unit 430, and outputs the produced operand address to the level-1 data cache unit 460. In FR cycle, the level-1 data cache 461 outputs a single 8-byte load data value. In the example of FIGS. 11 and 12, the load data read out of the level-1 data cache 461 is written in the extended load register 463, and then in subsequent C cycle, in a corresponding extended renaming register 562.

As will be described later, the instruction decoder 280 sends bus designation signals to the level-1 data cache unit 460 via the RSA 320, operand data selection unit 430, and operand address generator 440, so as to designate whether to use the basic bus, as well as whether to use the extended bus, for the purpose of transporting data. The level-1 data cache unit 460 consults these bus designation signals to route the load data read out of the level-1 data cache 461 to the basic load register 462 or extended load register 463.

The CSE 400 determines the commitment of the instruction when there is a notification that load data is available in the extended load register 463. This is followed by W cycle, where the load data stored in the extended renaming register 562 is transferred to a corresponding extended register 602 under the control of the CSE 400.

It is noted that, in the above-described execution of a non-SIMD load instruction, the floating-point renaming registers 560 are treated as discrete registers each having a bit width of 8 bytes. Similarly, W cycle handles the floating-point SIMD registers 600 as discrete registers each having a bit width of 8 bytes. This feature prevents the floating-point renaming registers 560 and floating-point SIMD registers 600 from being wasted, thus enabling more efficient use of storage space.

The following description will now provide greater details of each circuit block participating in the execution of a floating-point load instruction. Also discussed in the following description is a flow of signals between those blocks.

Figure 13:
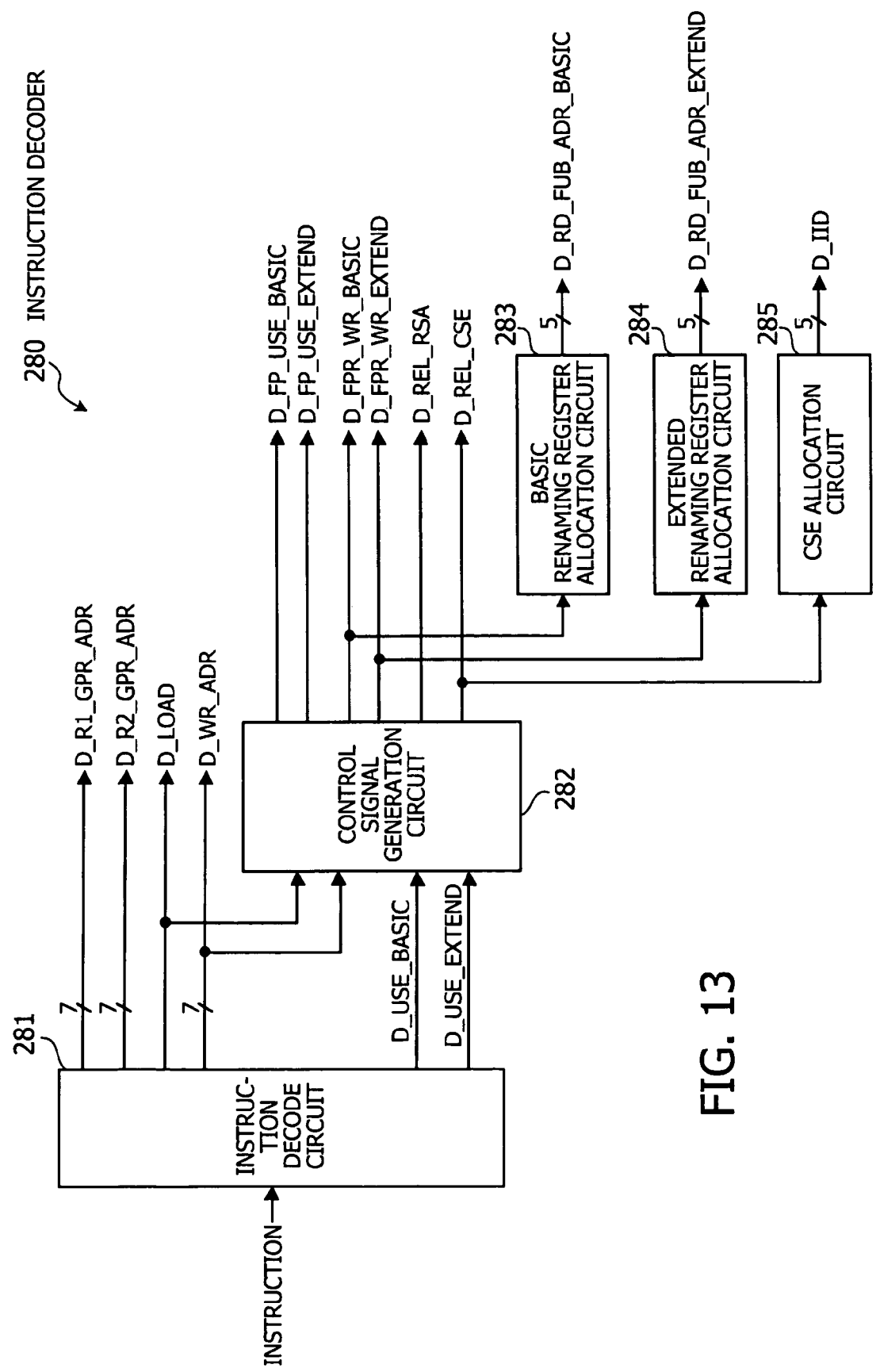
FIG. 13 illustrates output signals produced by an instruction decoder to execute a floating-point load instruction.

FIG. 13 illustrates output signals produced by an instruction decoder when executing a floating-point load instruction. The instruction decoder 280 includes an instruction decode circuit 281, a control signal generation circuit 282, a basic renaming register allocation circuit 283, an extended renaming register allocation circuit 284, and a CSE allocation circuit 285. While the instruction decoder 280 further includes a store buffer allocation circuit as will be described later, FIG. 13 omits this store buffer allocation circuit because it is not used in execution of floating-point load instructions. FIG. 13 also omits some existing signals so as to focus on the control signals and address signals produced in D cycle of a floating-point load instruction.

The instruction decode circuit 281 decodes an instruction read out of the instruction buffer 260. Upon decoding a floating-point load instruction, the instruction decode circuit 281 turns on a control signal D_LOAD to indicate that the decoded instruction is a floating-point load instruction. This control signal D_LOAD is supplied to the RSA 320.

The instruction decode circuit 281 also supplies the basic register renaming map 301, extended register renaming map 302, CSE 400, and control signal generation circuit 282 with an address signal D_WR_ADR that designates a specific floating-point SIMD register 600 as the destination of load data. This address signal D_WR_ADR takes a value in the range of 0 to 127.

The instruction decode circuit 281 also supplies the fixed-point register renaming map 303 and RSA 320 with address signals D_R1_GPR_ADR and D_R2_GPR_ADR each designating a specific fixed-point register 580 as a source of operand data.

The instruction decode circuit 281 also supplies the control signal generation circuit 282 with signals D_USE_BASIC and D_USE_EXTEND respectively indicating whether a basic register 601 and an extended register 602 have been designated as the destination of load data.

Upon receipt of address signal D_WR_ADR from the instruction decode circuit 281, the control signal generation circuit 282 produces several control signals as follows: Control signal D_FP_USE_BASIC indicates whether to use the basic bus to transfer load data. Control signal D_FP_USE_EXTEND indicates whether to use the extended bus to transfer load data. These two control signals D_FP_USE_BASIC and D_FP_USE_EXTEND are sent together to the CSE 400 and RSA 320. Control signal D_FPR_WR_BASIC indicates whether the destination of load data is a basic register 601. This signal D_FPR_WR_BASIC is supplied to the CSE 400, basic register renaming map 301, and basic renaming register allocation circuit 283. Control signal D_FPR_WR_EXTEND indicates whether the destination of load data is an extended register 602. This signal D_FPR_WR_EXTEND is supplied to the CSE 400, extended register renaming map 302, and extended renaming register allocation circuit 284. Control signal D_REL_RSA requests the RSA 320 to create an entry. Control signal D_REL_CSE requests the CSE 400 to create an entry. This control signal D_REL_CSE is supplied not only to the CSE 400, but also to the CSE allocation circuit 285.

When control signal D_FPR_WR_BASIC is in the ON state, the basic renaming register allocation circuit 283 assigns a vacant basic renaming register 561 to the destination basic register 601. The basic renaming register allocation circuit 283 thus produces an address signal D_RD_FUB_ADR_BASIC indicating the assigned basic renaming register 561 and supplies the signal to the basic register renaming map 301, CSE 400, and RSA 320.

When control signal D_FPR_WR_EXTEND is in the ON state, the extended renaming register allocation circuit 284 assigns a vacant extended renaming register 562 to the destination extended register 602. The extended renaming register allocation circuit 284 thus produces an address signal D_RD_FUB_ADR_EXTEND indicating the assigned extended renaming register 562 and supplies it to the extended register renaming map 302, CSE 400, and RSA 320.

For illustrative purposes, the present embodiment assumes that the CPU core 111 has 32 basic renaming registers 561 and 32 extended renaming registers 562. Accordingly, both the above address signals D_RD_FUB_ADR_BASIC and D_RD_FUB_ADR_EXTEND are 5 bits wide.

In response to control signal D_REL_CSE, the CSE allocation circuit 285 assigns an entry identification signal D_IID to a new entry for the CSE 400 so as to distinguish it from other CSE entries. Every instruction is assigned an entry identification signal D_IID in the order of decoding, before they are registered in the CSE 400. For illustrative purposes, the present embodiment assumes that the CSE 400 can accommodate up to 32 entries. Accordingly, the entry identification signal D_IID is 5 bits wide.

Figure 14:
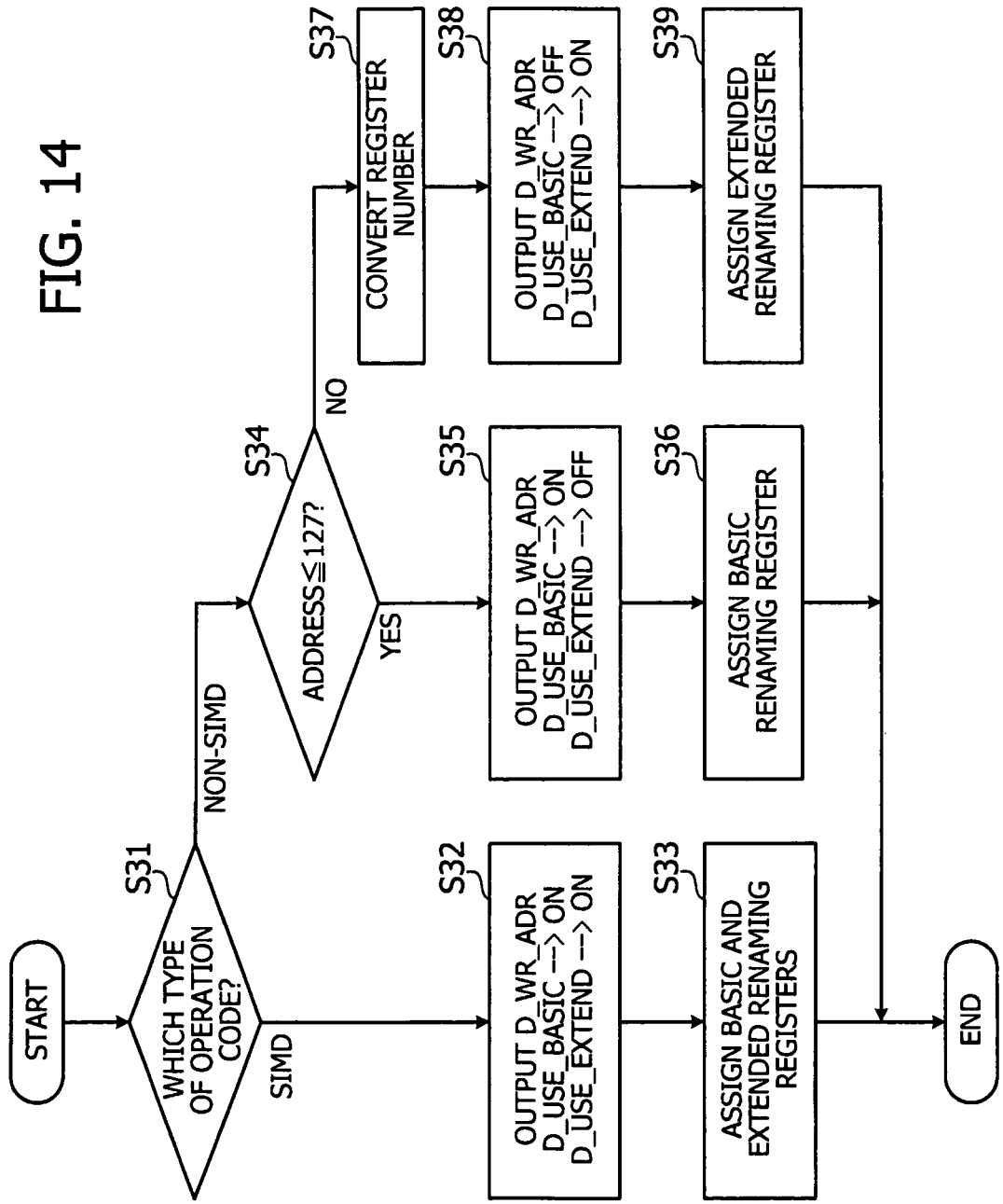
FIG. 14 is a flowchart depicting how the instruction decoder outputs signals when a floating-point load instruction is decoded.

FIG. 14 is a flowchart depicting how the instruction decoder 280 produces the above-noted signals when a floating-point load instruction is decoded.

(Step S31) The instruction decode circuit 281 decodes a given instruction and checks its operation code. If the decoded instruction is an SIMD load instruction, the instruction decode circuit 281 advances to step S32. If it is a non-SIMD instruction, the instruction decode circuit 281 proceeds to step S34.

(Step S32) The instruction decode circuit 281 outputs an address signal D_WR_ADR representing a register number that is found in the destination operand of the decoded SIMD load instruction. The instruction decode circuit 281 also turns on control signals D_USE_BASIC and D_USE_EXTEND.

(Step S33) The control signal generation circuit 282 recognizes that the received control signals D_USE_BASIC and D_USE_EXTEND are both in the ON state. Accordingly, the control signal generation circuit 282 turns on control signals D_FP_USE_BASIC, D_FP_USE_EXTEND, D_FPR_WR_BASIC, and D_FPR_WR_EXTEND.

In response to the activated control signal D_FPR_WR_BASIC, the basic renaming register allocation circuit 283 assigns a vacant basic renaming register 561 by sending its address as an address signal D_RD_FUB_ADR_BASIC. Also, in response to the activated control signal D_FPR_WR_EXTEND, the extended renaming register allocation circuit 284 assigns a vacant extended renaming register 562 by sending its address as an address signal D_RD_FUB_ADR_EXTEND.

(Step S34) The instruction decode circuit 281 examines the register number found in destination operand of the decoded non-SIMD instruction. If this register number is equal to or smaller than 127, the instruction decode circuit 281 advances to step S35. If the register number is greater than 127, the instruction decode circuit 281 goes to step S37.

(Step S35) The instruction decode circuit 281 outputs an address signal D_WR_ADR representing a register number that is found in the destination operand of the decoded instruction. The instruction decode circuit 281 also turns on control signal D_USE_BASIC, while turning off control signal D_USE_EXTEND.

(Step S36) The control signal generation circuit 282 recognizes that one control signal D_USE_BASIC is in the ON state while the other control signal D_USE_EXTEND is in the OFF state. Based on this, the control signal generation circuit 282 turns on control signals D_FP_USE_BASIC and D_FPR_WR_BASIC, and turns off control signals D_FP_USE_EXTEND and D_FPR_WR_EXTEND.

In response to the activated control signal D_FPR_WR_BASIC, the basic renaming register allocation circuit 283 assigns a vacant basic renaming register 561 by sending its address as an address signal D_RD_FUB_ADR_BASIC. It is noted that the extended renaming register allocation circuit 284 does not output another address signal D_RD_FUB_ADR_EXTEND in this step S36.

(Step S37) The instruction decode circuit 281 subtracts 128 from the register number found in destination operand of the decoded non-SIMD instruction, thereby converting the register number. It is noted that the above subtraction may be replaced with some bit shift operations or an operation of extracting upper bits.

(Step S38) The instruction decode circuit 281 outputs an address signal D_WR_ADR representing the register number that has been produced by the conversion in step S37. Also the instruction decode circuit 281 turns off control signal D_USE_BASIC and turns on control signal D_USE_EXTEND.

(Step S39) The control signal generation circuit 282 recognizes that one control signal D_USE_BASIC is in the OFF state while the other control signal D_USE_EXTEND is in the ON state. Accordingly, the control signal generation circuit 282 turns off control signals D_FP_USE_BASIC and D_FPR_WR_BASIC, and turns on control signals D_FP_USE_EXTEND and D_FPR_WR_EXTEND.

In response to the activated control signal D_FPR_WR_EXTEND, the extended renaming register allocation circuit 284 assigns a vacant extended renaming register 562 by sending its address as an address signal D_RD_FUB_ADR_EXTEND. It is noted that the basic renaming register allocation circuit 283 does not output another address signal D_RD_FUB_ADR_BASIC in this step S39.

While not stated expressly, steps S33, S36, and S39 also produce control signals D_REL_RSA and D_REL_CSE and an entry identification signal D_IID.

The above-discussed processing steps of FIG. 14 assign registers for use in executing a floating-point load instruction, thus permitting the subsequent blocks to correctly identify which registers to use. For example, the combination of control signals D_FP_USE_BASIC and D_FP_USE_EXTEND and an address signal D_WR_ADR identifies a particular destination register for load data.

Figure 15:
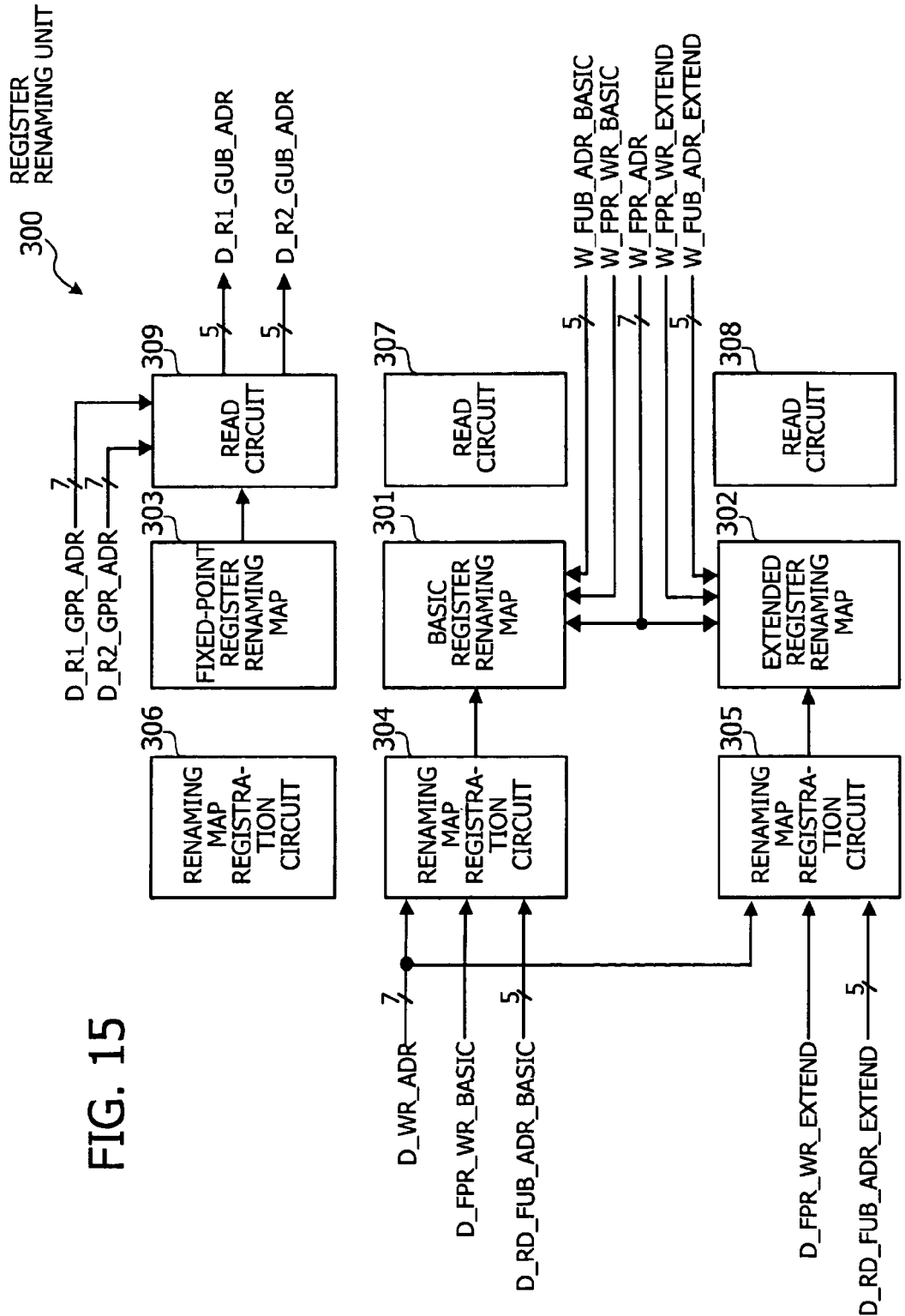
FIG. 15 illustrates input and output signals of a register renaming unit which relate to execution of floating-point load instructions.

FIG. 15 illustrates input and output signals of the register renaming unit 300 which relate to execution of floating-point load instructions. Note that FIG. 15 focuses on the control signals and address signals used to execute floating-point load instructions, thus omitting some other existing signals.

The register renaming unit 300 includes renaming map registration circuits 304 to 306 and read circuits 307 to 309 in addition to the foregoing basic register renaming map 301, extended register renaming map 302, and fixed-point register renaming map 303. Three renaming map registration circuits 304 to 306 perform registration of data in the basic register renaming map 301, extended register renaming map 302, and fixed-point register renaming map 303, respectively. Three read circuits 307 to 309 read data from the basic register renaming map 301, extended register renaming map 302, and fixed-point register renaming map 303, respectively.

In D cycle, address signal D_WR_ADR is supplied from the instruction decoder 280 to two renaming map registration circuits 304 and 305 to specify the destination register of load data. Control signal D_FPR_WR_BASIC and address signal D_RD_FUB_ADR_BASIC are also supplied from the instruction decoder 280 to one renaming map registration circuit 304. Further, control signal D_FPR_WR_EXTEND and address signal D_RD_FUB_ADR_EXTEND are supplied from the instruction decoder 280 to another renaming map registration circuit 305.

When the received control signal D_FPR_WR_BASIC is in the ON state, the renaming map registration circuit 304 records the address value given by address signal D_RD_FUB_ADR_BASIC in an entry of the basic register renaming map 301 that the address signal D_WR_ADR specifies. That is, in the case where a basic register 601 is specified as the destination of load data, the basic register renaming map 301 receives the address of a basic renaming register 561 that is associated with the register number of that basic register 601.

Similarly, when the received control signal D_FPR_WR_EXTEND is in the ON state, the renaming map registration circuit 305 records the address value given by address signal D_RD_FUB_ADR_EXTEND in an entry of the extended register renaming map 302 that the address signal D_WR_ADR specifies. That is, in the case where an extended register 602 is specified as the destination of load address, the extended register renaming map 302 receives the address of an extended renaming register 562 that is associated with the register number of that extended register 602.

The read circuit 309 receives two address signals D_R1_GPR_ADR and D_R2_GPR_ADR from the instruction decoder 280, each representing a source address of operand data. The read circuit 309 looks up the entries of the fixed-point register renaming map 303 that are specified by the received address signals D_R1_GPR_ADR and D_R2_GPR_ADR. If those entries are valid, the read circuit 309 reads their assigned address values and outputs them as address signals D_R1_GUB_ADR and D_R2_GUB_ADR to the RSA 320. The former address signal D_R1_GUB_ADR indicates the address of a renaming register corresponding to address signal D_R1_GPR_ADR. The latter address signal D_R2_GUB_ADR indicates the address of a renaming register corresponding to address signal D_R2_GPR_ADR.

In W cycle, an address signal W_FPR_ADR is supplied from the CSE 400 to both the basic register renaming map 301 and extended register renaming map 302. Also, more address signals W_FUB_ADR_BASIC and W_FUB_ADR_EXTEND are supplied from the CSE 400 to the basic register renaming map 301 and extended register renaming map 302, respectively. Further, control signals W_FPR_WR_BASIC and W_FPR_WR_EXTEND are supplied from the CSE 400 to the basic register renaming map 301 and extended register renaming map 302, respectively. The address signal W_FPR_ADR indicates the address of a specific basic register 601 and extended register 602.

The basic register renaming map 301 has an entry at address W_FPR_ADR to store the address of a basic renaming register 561 assigned to the destination basic register 601. This entry is nullified in W cycle if control signal W_FPR_WR_BASIC is in the ON state, and if the stored address of the assigned basic renaming register 561 coincides with the value of address signal W_FUB_ADR_BASIC. The renaming register assignment for the basic register 601 corresponding to address signal W_FPR_ADR is thus terminated.

Similarly, the extended register renaming map 302 has an entry at address W_FPR_ADR to store the address of an extended renaming register 562 assigned to the destination extended register 602. This entry is invalidated in W cycle if control signal W_FPR_WR_EXTEND is in the ON state, and if the stored address of the assigned extended renaming register 562 coincides with the value of address signal W_FUB_ADR_EXTEND. The renaming register assignment for the extended register 602 corresponding to address signal W_FPR_ADR is thus terminated.

It is noted that the renaming map registration circuit 306 and read circuits 307 and 308 have no active role to play in the execution of floating-point load instructions.

Figure 16:
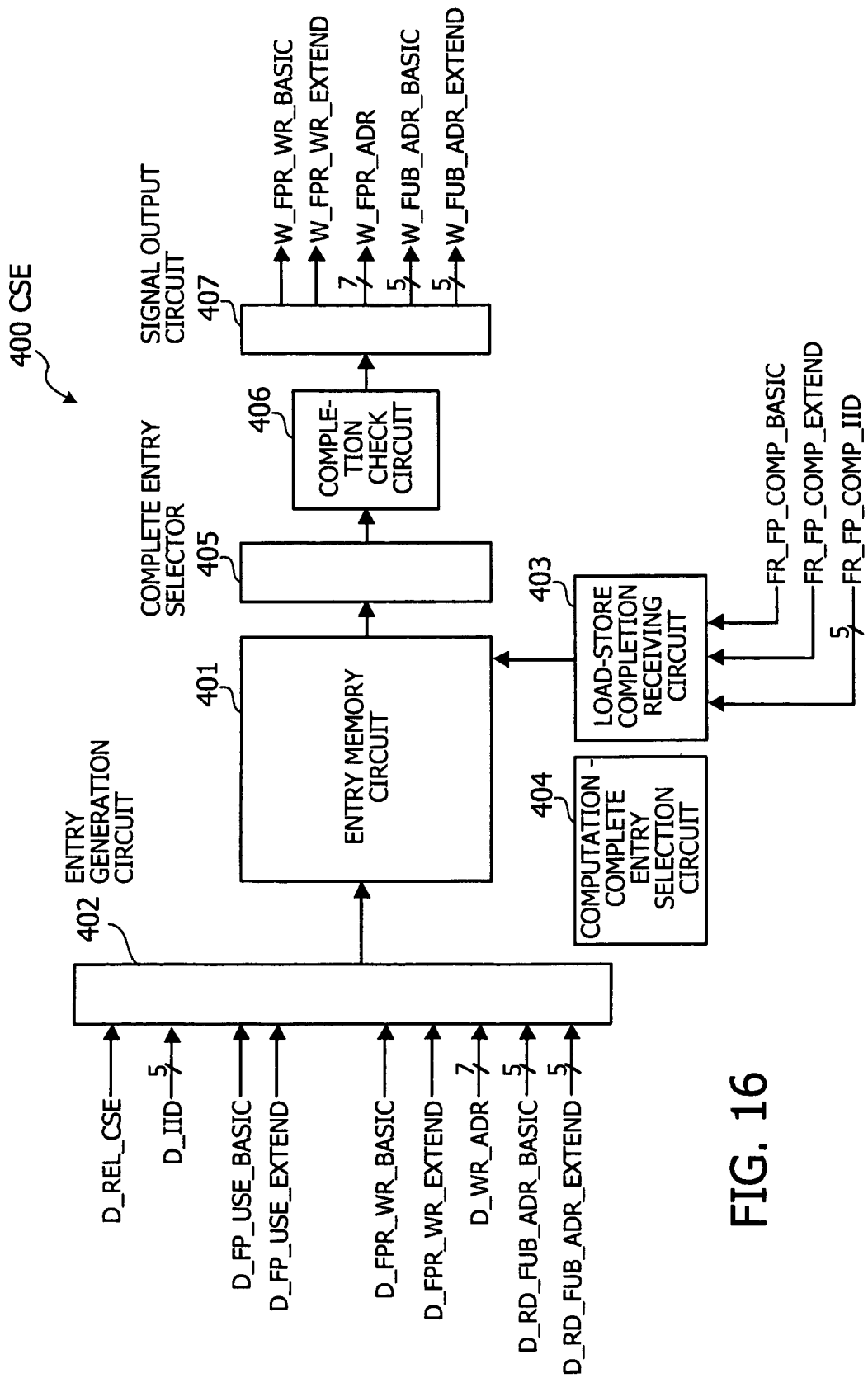
FIG. 16 illustrates input and output signals of a CSE which relate to execution of floating-point load instructions.

FIG. 16 illustrates input and output signals of the CSE 400 which relate to execution of floating-point load instructions. Note that FIG. 16 focuses on the control signals and address signals used to execute floating-point load instructions, thus omitting some other existing signals.

The CSE 400 includes an entry memory circuit 401, an entry generation circuit 402, a load-store completion receiving circuit 403, a computation-complete entry selection circuit 404, a complete entry selector 405, a completion check circuit 406, and a signal output circuit 407. The computation-complete entry selection circuit 404, however, plays no active role in the execution of floating-point load instructions.

In D cycle, the entry generation circuit 402 receives a control signal D_REL_CSE from the instruction decoder 280. Upon receipt, the entry generation circuit 402 creates an entry corresponding to entry identification signal D_IID supplied from the instruction decoder 280 and places the created entry in the entry memory circuit 401.

In the case where the decoded instruction is an SIMD load instruction, the entry generation circuit 402 receives more control signals D_FP_USE_BASIC, D_FP_USE_EXTEND, D_FPR_WR_BASIC, and D_FPR_WR_EXTEND, together with address signals D_WR_ADR, D_RD_FUB_ADR_BASIC, and D_RD_FUB_ADR_EXTEND, from the instruction decoder 280. The entry generation circuit 402 uses those signals as source information in producing a CSE entry.

The load-store completion receiving circuit 403 receives in FR cycle several control signals indicating that load data has been read out of the level-1 data cache unit 460. Specifically, those control signals include FR_FP_COMP_BASIC and FR_FP_COMP_EXTEND respectively indicating that load data is now available in the basic load register 462 and extended load register 463. Also included is an entry identification signal FR_FP_COMP_IID identifying the entry of the CSE 400 that handles output processing of load data. According to these control signals and entry identification signal, the load-store completion receiving circuit 403 writes information to a corresponding entry location in the entry memory circuit 401.

The complete entry selector 405 reads out in C cycle the topmost entry in the entry memory circuit 401 and supplies it to the completion check circuit 406. Based on the content of this entry, the completion check circuit 406 determines whether the processing operation for that entry has been completed. Also based on the content of this entry, the complete entry selector 405 waits until the processing operation for that entry is completed. The complete entry selector 405 then supplies the signal output circuit 407 with the information contained in the entry, thus requesting the signal output circuit 407 to produce control signals and address signals therefor. The instruction is thus committed in-order.

The signal output circuit 407 produces the following signals in W cycle: Control signal W_FPR_WR_BASIC is a signal that causes data transfer from a basic renaming register 561 to a basic register 601. Control signal W_FPR_WR_EXTEND is a signal that causes data transfer from an extended renaming register 562 to an extended register 602. Address signal W_FPR_ADR specifies a data write address of the above basic register 601 and extended register 602. Address signal W_FUB_ADR_BASIC specifies a data read address of the above basic renaming register 561. Address signal W_FUB_ADR_EXTEND specifies a data read address of the above extended renaming register 562.

In W cycle, the control signals W_FPR_WR_BASIC and W_FPR_WR_EXTEND and address signal W_FPR_ADR are supplied to the floating-point SIMD registers 600 and register renaming unit 300. Also in W cycle, the address signals W_FUB_ADR_BASIC and W_FUB_ADR_EXTEND are supplied to the floating-point renaming registers 560 and register renaming unit 300. With these signals, the floating-point SIMD registers 600 are updated in relevant part, and a corresponding entry of the register renaming map is nullified.

Figure 17:
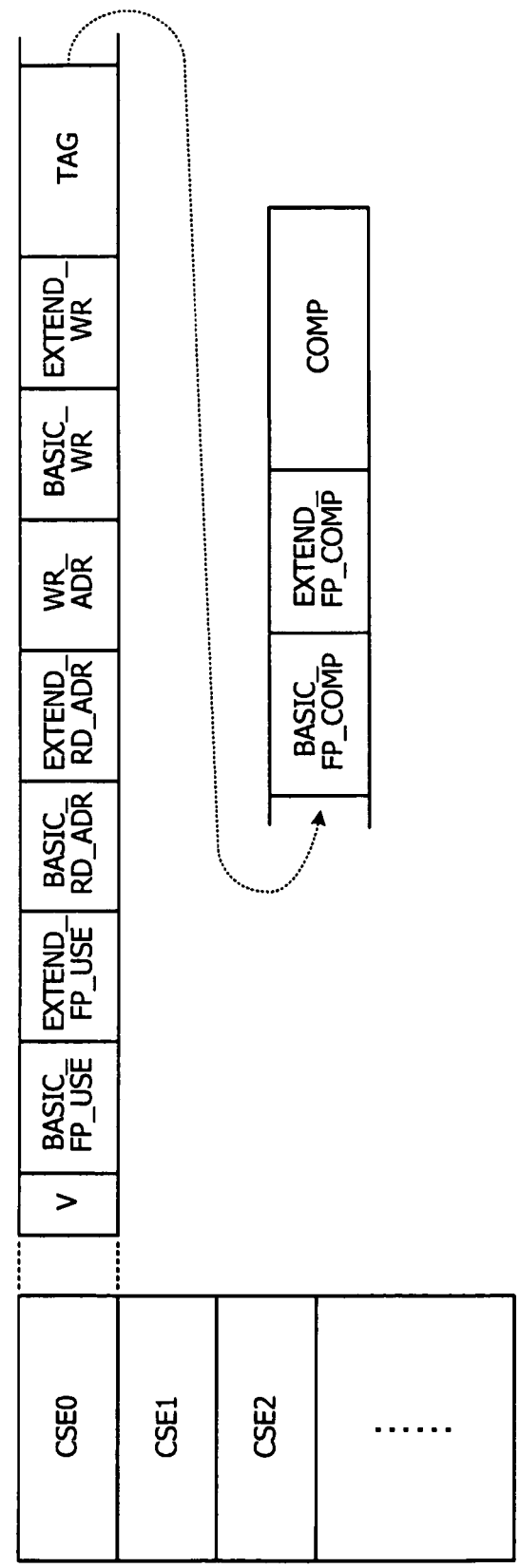
FIG. 17 illustrates details of a CSE entry.

FIG. 17 illustrates details of a CSE entry. A registered entry of the CSE 400 contains the following signals and address values in the case where the entry is of a floating-point load instruction. Signal V indicates whether the entry is valid. Signals BASIC_FP_USE and EXTEND_FP_USE respectively indicate whether the basic bus and the extended bus are used to write load data. Specifically, the value of signal BASIC_FP_USE derives from control signal D_FP_USE_BASIC that the instruction decoder 280 produces in D cycle. Also, the value of signal EXTEND_FP_USE derives from control signal D_FP_USE_EXTEND that the instruction decoder 280 produces.

Addresses BASIC_RD_ADR and EXTEND_RD_ADR indicate the addresses of a basic renaming register 561 and an extended renaming register 562, respectively. Specifically, the value of BASIC_RD_ADR derives from address signal D_RD_FUB_ADR_BASIC that the instruction decoder 280 assigns in D cycle. Also, the value of address EXTEND_RD_ADR derives from address signal D_RD_FUB_ADR_EXTEND that the instruction decoder 280 assigns.

Address WR_ADR indicates a data write address of a floating-point SIMD register 600. Specifically, the value of WR_ADR derives from address signal D_WR_ADR that the instruction decoder 280 produces. As described earlier, an SIMD instruction is executed with a set of basic register 601 and extended register 602 sharing the same register number in the floating-point SIMD registers 600. Accordingly, the noted address WR_ADR is used for both the basic register 601 and extended register 602.

Signals BASIC_WR and EXTEND_WR indicate that a data write operation has to be performed on the basic register 601 and extended register 602, respectively. Specifically, the value of BASIC_WR derives from control signal D_FPR_WR_BASIC that the instruction decoder 280 produces in D cycle. Also, the value of EXTEND_WR derives from control signal D_FPR_WR_EXTEND that the instruction decoder 280 produces.

Signal TAG is a tag signal used for some other purposes. Signals BASIC_FP_COMP and EXTEND_FP_COMP indicate that data has been transferred to the basic load register 462 and extended load register 463, respectively. Specifically, the value of this signal BASIC_FP_COMP derives from control signal FR_FP_COMP_BASIC that the level-1 data cache unit 460 produces in FR cycle. Also, the value of signal EXTEND_FP_COMP derives from control signal FR_FP_COMP_EXTEND that the level-1 data cache unit 460 produces. Signal COMP is a completion signal used for some other purposes.

Figure 18:
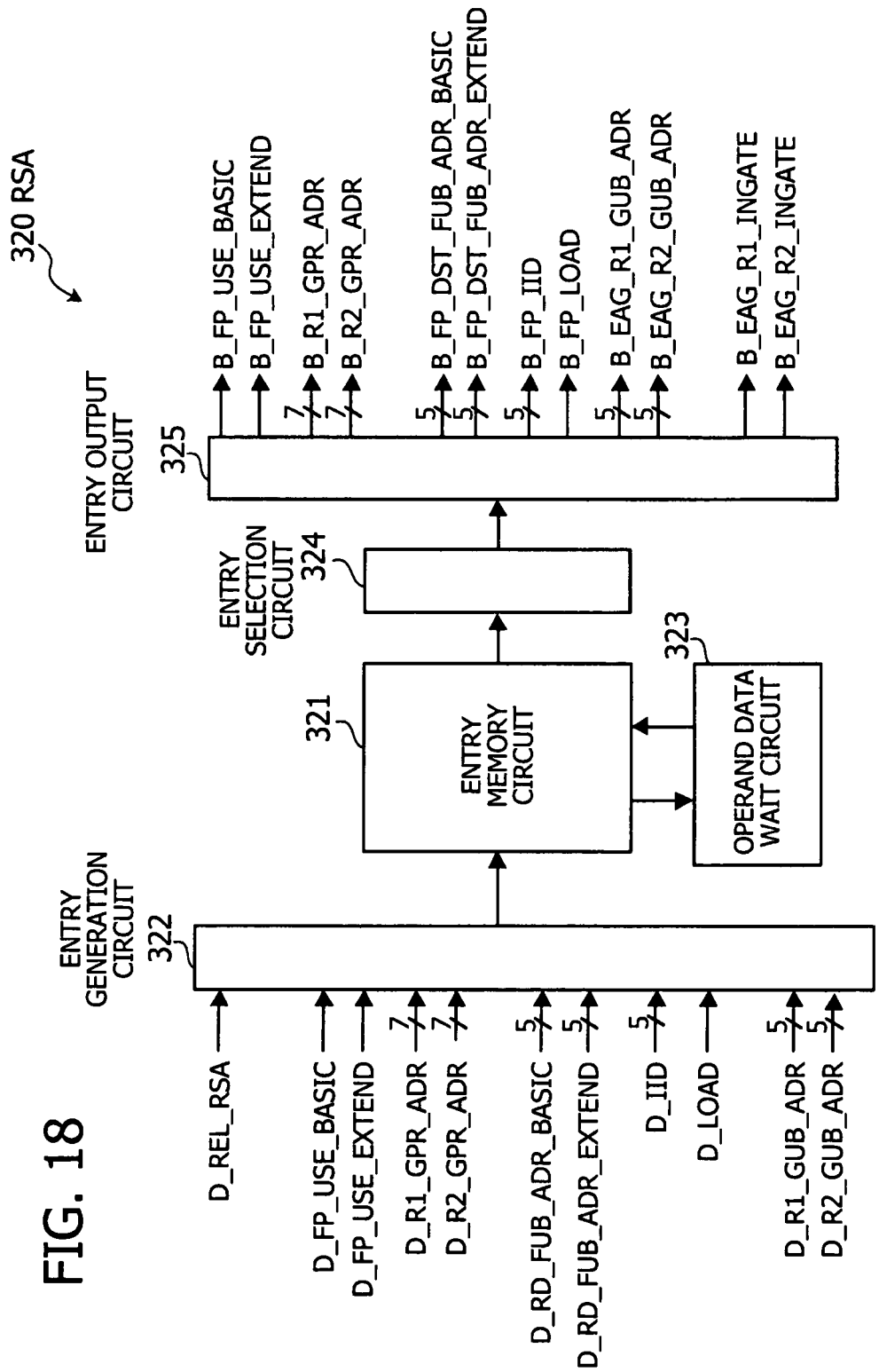
FIG. 18 illustrates input and output signals of an RSA which relate to execution of floating-point load instructions.

FIG. 18 illustrates input and output signals of the RSA 320 which relate to execution of floating-point load instructions. Note that FIG. 18 focuses on the control signals and address signals used to execute floating-point load instructions, thus omitting some other existing signals.

The illustrated RSA 320 includes an entry memory circuit 321, an entry generation circuit 322, an operand data wait circuit 323, an entry selection circuit 324, and an entry output circuit 325.

In D cycle, the entry generation circuit 322 receives a control signal D_REL_RSA from the instruction decoder 280, produces an entry corresponding to an entry identification signal D_IID supplied from the instruction decoder 280, and places the produced entry in the entry memory circuit 321. That is, the entry generation circuit 322 creates an entry for a floating-point load instruction when control signal D_REL_RSA is received.

During this entry generation, the entry generation circuit 322 receives two address signals D_R1_GPR_ADR and D_R2_GPR_ADR from the instruction decoder 280. Also, in the case where the decoded instruction is an SIMD load instruction, the entry generation circuit 322 further receives control signals D_FP_USE_BASIC and D_FP_USE_EXTEND, together with address signals D_RD_FUB_ADR_BASIC and D_RD_FUB_ADR_EXTEND, from the instruction decoder 280. In the case where the decoded instruction is a non-SIMD load instruction, only one of those two control signals D_FP_USE_BASIC and D_FP_USE_EXTEND is in the ON state, and only one of the two address signals D_RD_FUB_ADR_BASIC and D_RD_FUB_ADR_EXTEND carries a valid address value.

The source register specified by a source operand of the instruction may be renamed. In that case, the entry generation circuit 322 receives two address signals D_R1_GUB_ADR and D_R2_GUB_ADR from the fixed-point register renaming map 303.

The operand data wait circuit 323 waits in P cycle until operand data is available. That is, the operand data wait circuit 323 waits for the operand data specified by address signals D_R1_GPR_ADR and D_R2_GPR_ADR to be ready. The entry memory circuit 321 stores a plurality of entries, and some of those entries may have necessary data ready in relevant registers. The entry selection circuit 324 selects the oldest one of those data-ready entries and sends it to the entry output circuit 325.

Upon receipt of an entry for a floating-point load instruction from the entry selection circuit 324, the entry output circuit 325 supplies the following signals to the operand data selection unit 430. Control signals B_FP_USE_BASIC and B_FP_USE_EXTEND respectively indicate that the basic bus and extended bus are used to transfer load data. Address signals B_R1_GPR_ADR and B_R2_GPR_ADR each indicate a source address of operand data. Address signals B_FP_DST_FUB_ADR_BASIC and B_FP_DST_FUB_ADR_EXTEND give write addresses respectively indicating for which basic renaming register 561 and extended renaming register 562 the load data is destined. Entry identification signal B_FP_IID is a signal that specifies a particular entry of the CSE 400. Control signal B_FP_LOAD indicates that a floating-point load instruction is currently processed. Address signals B_EAG_R1_GUB_ADR and B_EAG_R2_GUB_ADR each give a read address of operand data in the fixed-point renaming registers 540. Control signals B_EAG_R1_INGATE and B_EAG_R2_INGATE specify which operand data the operand data selection unit 430 is supposed to select.

Figure 19:
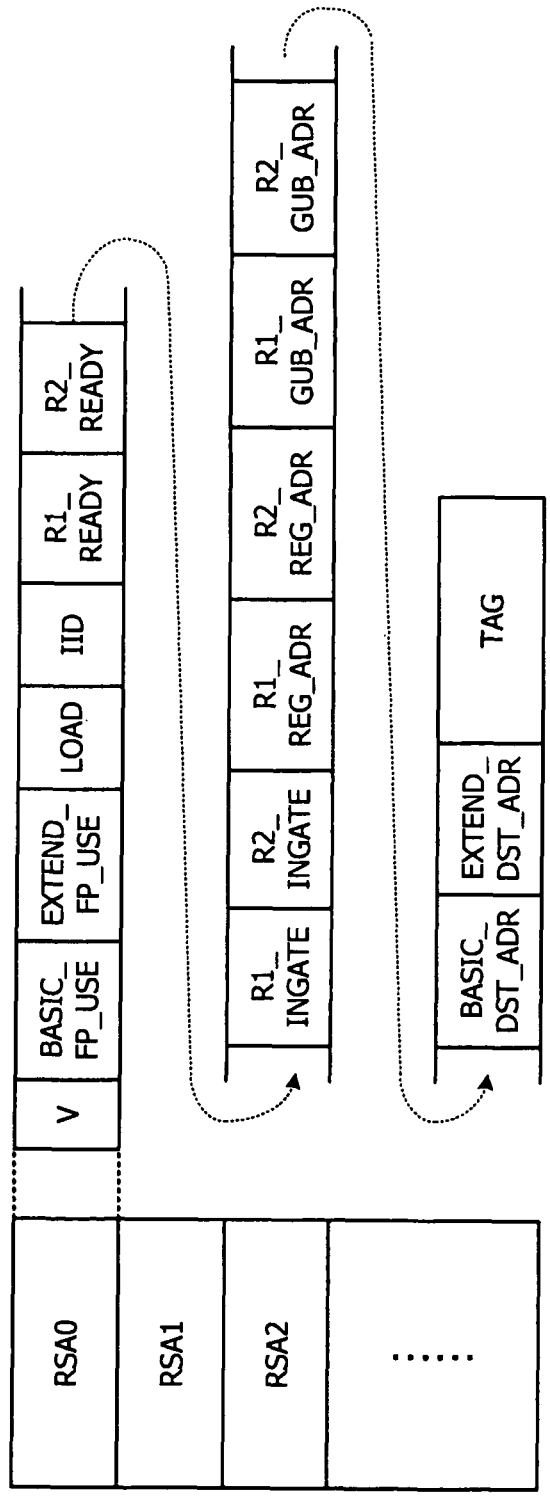
FIG. 19 illustrates details of an RSA entry for a floating-point load instruction.

FIG. 19 illustrates details of an RSA entry for a floating-point load instruction. A registered entry of the RSA 320 contains the following signals and address values in the case where the entry is of a floating-point load instruction. Signal V indicates whether the entry is valid. Signals BASIC_FP_USE and EXTEND_FP_USE respectively indicate whether the basic bus and the extended bus are used as a destination of load data. Specifically, the value of signal BASIC_FP_USE derives from control signal D_FP_USE_BASIC that the instruction decoder 280 produces in D cycle. Also, the value of signal EXTEND_FP_USE derives from control signal D_FP_USE_EXTEND that the instruction decoder 280 produces. Accordingly, both signals BASIC_FP_USE and EXTEND_FP_USE are in the ON state during execution of an SIMD load instruction, whereas either BASIC_FP_USE or EXTEND_FP_USE is in the ON state during execution of a non-SIMD load instruction. When this RSA entry is dispatched, those signal values of BASIC_FP_USE and EXTEND_FP_USE are sent out as control signals B_FP_USE_BASIC and B_FP_USE_EXTEND, respectively.

Signal LOAD indicates that a floating-point load instruction is currently processed. Signal IID specifies an entry of the CSE 400 and has a value deriving from entry identification signal D_IID that the instruction decoder 280 produces.

Signals R1_READY and R2_READY indicate that the corresponding operand data is ready. The values of R1_READY and R2_READY are given by the operand data wait circuit 323. Signals R1_INGATE and R2_INGATE specify which operand data the operand data selection unit 430 should select. The values of R1_INGATE and R2_INGATE are also given by the operand data wait circuit 323.

Addresses R1_REG_ADR and R2_REG_ADR are read addresses of operand data in the fixed-point registers 580. The values of R1_REG_ADR and R2_REG_ADR are respectively derived from control signals D_R1_GPR_ADR and D_R2_GPR_ADR in D cycle.

Addresses R1_GUB_ADR and R2_GUB_ADR each give a read address of operand data in the fixed-point renaming registers 540. The values of R1_GUB_ADR and R2_GUB_ADR are respectively derived from control signals D_R1_GUB_ADR and D_R2_GUB_ADR in D cycle.

Addresses BASIC_DST_ADR and EXTEND_DST_ADR are write addresses respectively indicating for which basic renaming register 561 and for which extended renaming register 562 the load data is destined. Specifically, the values of BASIC_DST_ADR and EXTEND_DST_ADR are respectively derived from address signals D_RD_FUB_ADR_BASIC and D_RD_FUB_ADR_EXTEND in D cycle. These values of BASIC_DST_ADR and EXTEND_DST_ADR are sent out as address signals B_FP_DST_FUB_ADR_BASIC and B_FP_DST_FUB_ADR_EXTEND when the entry is dispatched.

TAG field is a field containing other tag data.

In P cycle, the operand data wait circuit 323 in the RSA 320 determines whether the registers at addresses R1_REG_ADR and R2_REG_ADR have their data ready. In the case where the RSA entry contains some values in address fields R1_FUB_ADR and R2_FUB_ADR, the operand data wait circuit 323 determines whether the corresponding registers have their data ready. When operand data is ready on the R1 side, the operand data wait circuit 323 turns on signal R1_READY. Likewise, when the operand data is ready on the R2 side, the operand data wait circuit 323 turns on signal R2_READY. The operand data wait circuit 323 also enters signal values to signals R1_INGATE and R2_INGATE to indicate whether their corresponding operand data resides in a fixed-point register 580 or a fixed-point renaming register 540.

The entry selection circuit 324 dispatches such an entry of the RSA 320 when both signals R1_READY and R2_READY are turned on. Upon dispatching, the value of entry identification signal IID is supplied to the level-1 data cache unit 460 as signal B_FP_IID, together with its associated control signal B_FP_LOAD. The values of signals BASIC_FP_USE and EXTEND_FP_USE are also supplied to the level-1 data cache unit 460 as control signals B_FP_USE_BASIC and B_FP_USE_EXTEND, respectively. Further, the values of addresses BASIC_DST_ADR and EXTEND_DST_ADR are supplied to the level-1 data cache unit 460 as address signals B_FP_DST_FUB_ADR_BASIC and B_FP_DST_FUB_ADR_EXTEND, respectively.

In addition to the above, the values of signals R1_INGATE and R2_INGATE are supplied to the operand data selection unit 430 as signals B_EAG_R1_INGATE and B_EAG_R2_INGATE, respectively. When operand data is ready in the registers specified by addresses R1_REG_ADR and R2_REG_ADR, these address values are supplied to the operand data selection unit 430 as address signals B_R1_GPR_ADR and B_R2_GPR_ADR, respectively. When operand data is ready in the registers specified by addresses R1_FUB_ADR and R2_FUB_ADR, these address values are sent out as signals B_EAG_R1_GUB_ADR and B_EAG_R2_GUB_ADR, respectively.

Figure 20:
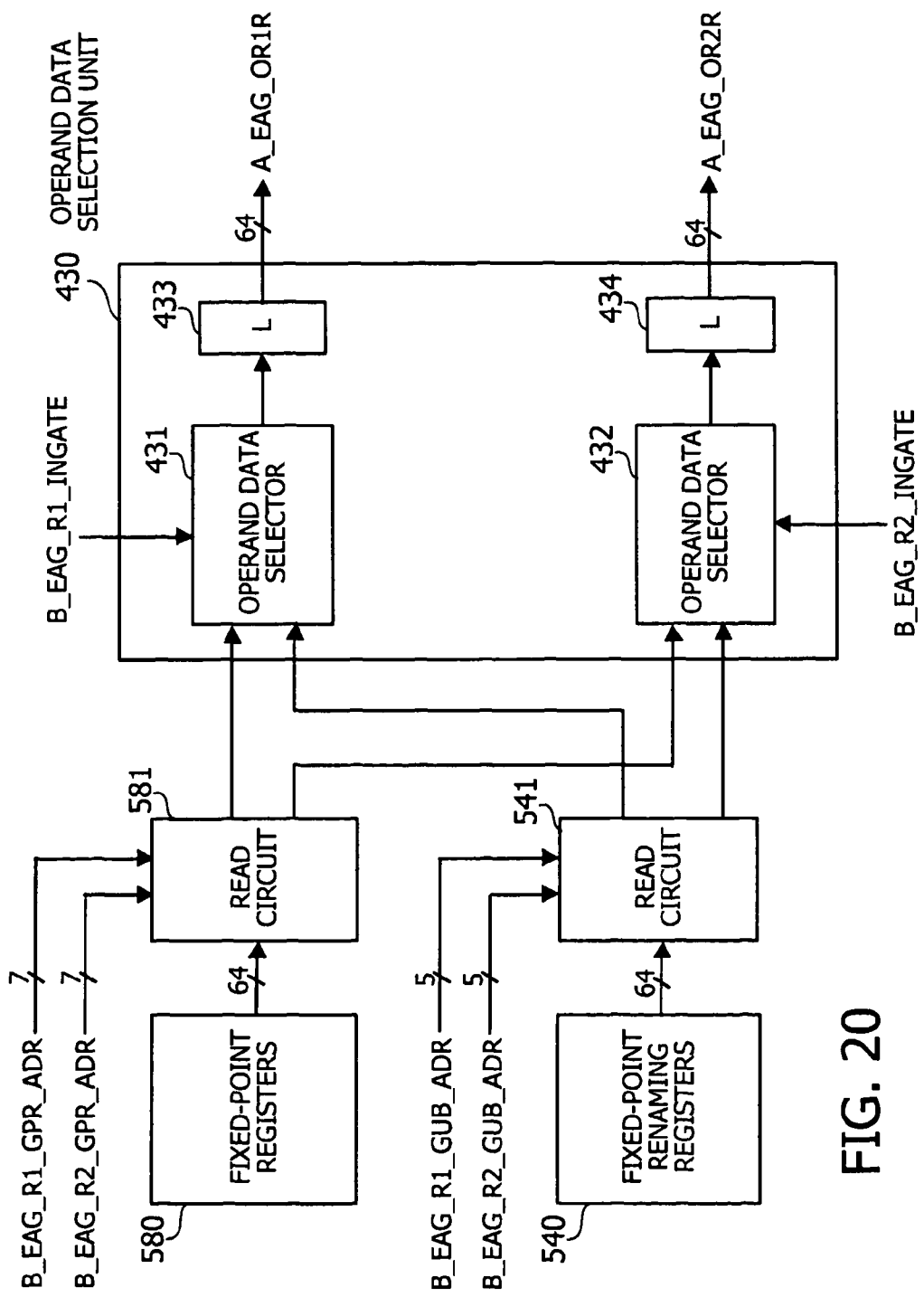
FIG. 20 illustrates input and output signals of an operand data selection unit which relate to execution of floating-point load instructions.

FIG. 20 illustrates input and output signals of the operand data selection unit 430 which relate to execution of floating-point load instructions. Note that FIG. 20 focuses on the control signals and address signals used to execute floating-point load instructions, thus omitting some other existing signals.

The operand data selection unit 430 includes operand data selectors 431 and 432 and latch circuits 433 and 434. In B cycle, one operand data selector 431 selectively outputs operand data supplied from either a fixed-point register 580 or a fixed-point renaming register 540, depending on control signal B_EAG_R1_INGATE received from the RSE 340. The other operand data selector 432 selectively outputs operand data supplied from either a fixed-point register 580 or a fixed-point renaming register 540, depending on control signal B_EAG_R2_INGATE received from the RSE 340.

The latch circuits 433 and 434 latch operand data received from the corresponding operand data selectors 431 and 432 so as to adjust their output timing. The latched operand data is then supplied from those latch circuits 433 and 434 to the operand address generator 440 as data signals A_EAG_OR1R and A_EAG_OR2R.

Data stored in fixed-point registers 580 is retrieved through a read circuit 581. In B cycle, this read circuit 581 reads operand data out of the fixed-point registers 580 specified by address signals B_EAG_R1_GPR_ADR and B_EAG_R2_GPR_ADR received from the RSA 320. Similarly, data stored in fixed-point renaming registers 540 is retrieved through a read circuit 541. In B cycle, this read circuit 541 reads operand data out of the fixed-point renaming registers 540 specified by address signals B_EAG_R1_GUB_ADR and B_EAG_R2_GUB_ADR received from the RSA 320.

Figure 21:
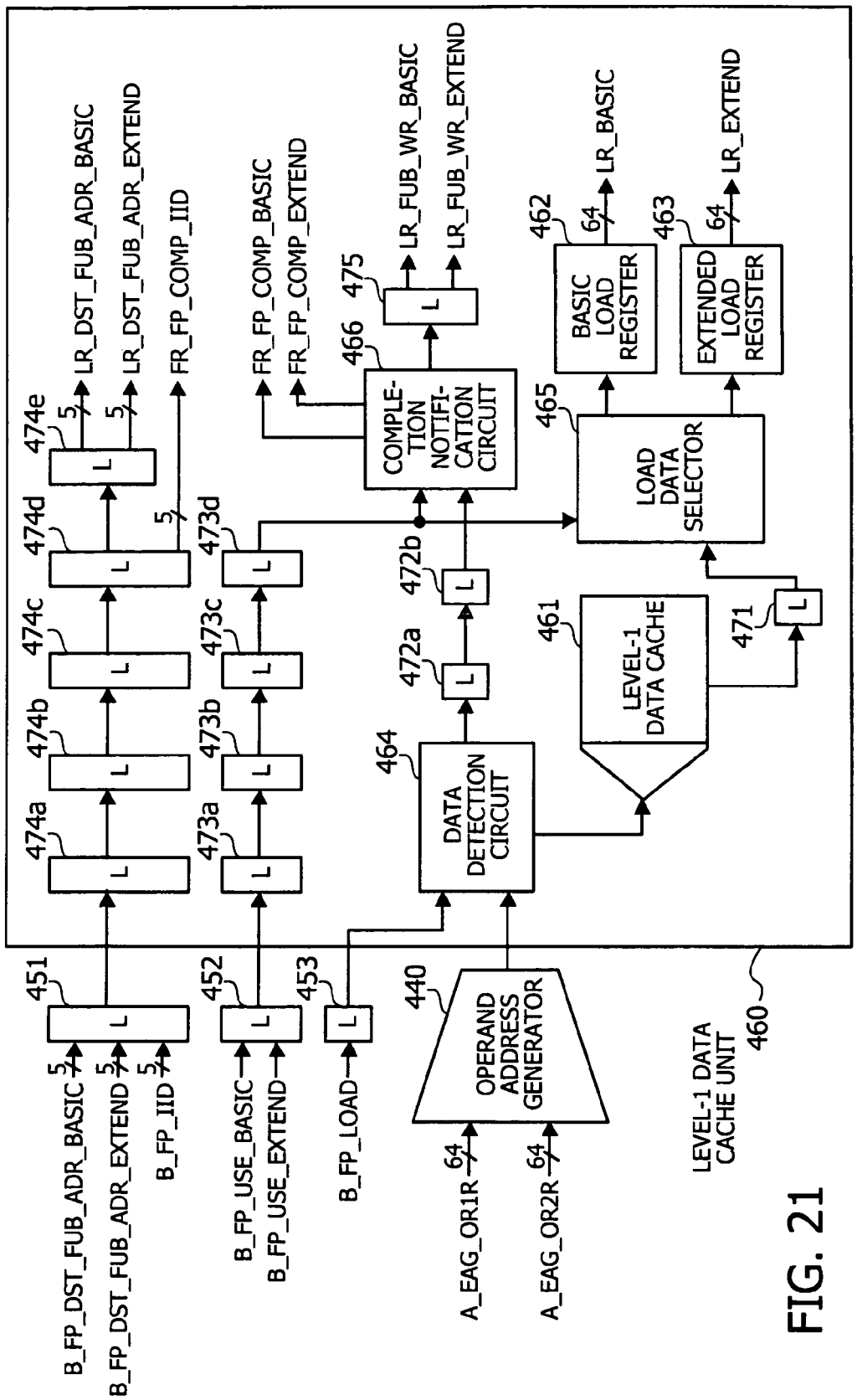
FIG. 21 illustrates input and output signals of a level-1 data cache unit which relate to execution of floating-point load instructions.

FIG. 21 illustrates input and output signals of the level-1 data cache unit 460 which relate to execution of floating-point load instructions. Note that FIG. 21 focuses on the control signals and address signals used to execute floating-point load instructions, thus omitting some other existing signals.

The level-1 data cache 461, basic load register 462, and extended load register 463 have been discussed above as part the level-1 data cache unit 460. In addition to those elements, the level-1 data cache unit 460 includes a data detection circuit 464, a load data selector 465, a completion notification circuit 466, and a plurality of latch circuits 471, 472a, 472b, 473a to 473d, 474a to 474e, and 475.

Data signals A_EAG_OR1R and A_EAG_OR2R of the operand data selection unit 430 are supplied to the operand address generator 440. In A cycle, the operand address generator 440 produces an operand address based on those data signals A_EAG_OR1R and A_EAG_OR2R, and outputs it to the level-1 data cache unit 460.

On the other hand, address signals B_FP_DST_FUB_ADR_BASIC and B_FP_DST_FUB_ADR_EXTEND, as well as entry identification signal B_FP_IID from the RSA 320, are supplied to the level-1 data cache unit 460 via a latch circuit 451. Control signals B_FP_USE_BASIC and B_FP_USE_EXTEND from the RSA 320 are supplied to the level-1 data cache unit 460 via a latch circuit 452. Control signal B_FP_LOAD of RSA 320 is supplied to the level-1 data cache unit 460 via a latch circuit 453. The latch circuits 451 to 453 adjust the output timing of entered signals in accordance with the processing delays of the operand data selection unit 430 and operand address generator 440.

The data detection circuit 464 operates in FT, FM, and FE cycles. More specifically, the data detection circuit 464 determines whether the level-1 data cache 461 contains load data specified by the operand address that the operand address generator 440 has produced. In the case where the level-1 data cache 461 contains specified load data, the data detection circuit 464 requests the level-1 data cache 461 to provide it to the load data selector 465. In addition to this request, the data, detection circuit 464 sends a completion notification signal to the completion notification circuit 466 to inform that the load data is ready. In the case where the specified load data is not present in the level-1 data cache 461, the load data is supposed to be fetched from a level-2 data cache 112, main memory, or other location where it resides to the level-1 data cache 461. Upon completion of this fetching, the data detection circuit 464 sends a completion notification signal to the completion notification circuit 466, besides requesting the level-1 data cache 461 to provide the load data. It is noted that the completion notification signal from the data detection circuit 464 passes through two latch circuits 472a and 472b before it reaches the completion notification circuit 466.

The load data of the SIMD load instruction in process, whose location is indicated by operand address that the operand address generator 440 produces, has a data width of 16 bytes. Accordingly, the data detection circuit 464 tests the presence of this 16-byte data in the level-1 data cache 461. However, the level-1 data cache 461 may contain, for example, only a half of the 16-byte load data, thus causing a partial cache miss. The data detection circuit 464 could encounter such situation in the case where the level-1 data cache 461 stores the first bytes of load data in a certain cache line and the second 8 bytes of the same in the next cache line.

To deal with the above situation, the data detection circuit 464 is configured to test the cache status of load data individually for each half of the load data. Specifically, when the first half of load data is stored in the level-1 data cache 461, the data detection circuit 464 requests the level-1 data cache 461 to provide that load data and sends a completion notification signal therefor. Further, when the second half of load data is stored in the level-1 data cache 461, the data detection circuit 464 requests the level-1 data cache 461 to provide that load data and sends a completion notification signal therefor.

That is, the data detection circuit 464 sends two completion notification signals to the completion notification circuit 466 in the course of executing an SIMD load instruction. In the case of a cache miss of the second half of load data, the aforementioned mechanism fetches the missing data to the level-1 data cache 461. This means that the first and second halves of output data may not always be obtained at once, but the latter could be delayed for some time. When this is the case, the second completion notification signal is also delayed with respect to the first one.

The load data read out of the level-1 data cache 461 is sent to the load data selector 465 via a latch circuit 471. The load data selector 465 also receives control signals B_FP_USE_BASIC and B_FP_USE_EXTEND through a series of latch circuits 452 and 473a to 473d. The latch circuits 473a to 473d are employed to adjust the output timing of given input signals so as to offset the processing times of the data detection circuit 464, level-1 data cache 461, and latch circuit 471. In FR cycle, the load data selector 465 selectively forwards load data from the level-1 data cache 461 to the basic load register 462 or extended load register 463 according to the control signals B_FP_USE_BASIC and B_FP_USE_EXTEND.

SIMD load instructions, when executed, activate both control signals B_FP_USE_BASIC and B_FP_USE_EXTEND. Accordingly, the load data selector 465 forwards the first and second halves of 16-byte load data to the basic load register 462 and extended load register 463, respectively. In the case of a cache miss of the second half of load data, the extended load register 463 receives the data later than the basic load register 462.

Non-SIMD load instructions, on the other hand, activate only one of the two control signals B_FP_USE_BASIC and B_FP_USE_EXTEND. Accordingly, the load data selector 465 forwards 8-byte load data from the level-1 data cache 461 to the basic load register 462 when control signal B_FP_USE_BASIC alone is in the ON state. The load data selector 465 forwards 8-byte load data from the level-1 data cache 461 to the extended load register 463 when control signal B_FP_USE_EXTEND alone is in the ON state.

The completion notification circuit 466 receives completion notification signals from the data detection circuit 464, as well as control signals B_FP_USE_BASIC and B_FP_USE_EXTEND through a series of latch circuits 473a to 473d. Upon receipt of a completion notification signal from the data detection circuit 464 in FR cycle, the completion notification circuit 466 supplies the CSE 400 with either or both of two control signals FR_FP_COMP_BASIC and FR_FP_COMP_EXTEND. Simultaneously, the completion notification circuit 466 supplies the floating-point renaming registers 560 with either or both of two control signals LR_FUB_WR_BASIC and LR_FUB_WR_EXTEND via a latch circuit 475.

As noted earlier, the control signals FR_FP_COMP_BASIC and FR_FP_COMP_EXTEND indicate that load data is ready in the basic load register 462 and extended load register 463, respectively. The control signal LR_FUB_WR_BASIC and LR_FUB_WR_EXTEND request the floating-point renaming registers 560 to store the load data to a basic renaming register 561 and an extended renaming register 562, respectively.

SIMD load instructions, when executed, activate both control signals B_FP_USE_BASIC and B_FP_USE_EXTEND, as noted above. In this case, the completion notification circuit 466 expects two completion notification signals coming from the data detection circuit 464. Upon receipt of a first completion notification signal, the completion notification circuit 466 outputs control signals FR_FP_COMP_BASIC and LR_FUB_WR_BASIC. Upon receipt of a second completion notification signal, the completion notification circuit 466 outputs control signals FR_FP_COMP_EXTEND and LR_FUB_WR_EXTEND.

Non-SIMD load instructions, on the other hand, activate one of the two control signals B_FP_USE_BASIC or B_FP_USE_EXTEND, but not both. Accordingly, the completion notification circuit 466 expects a single completion notification signal coming from the data detection circuit 464. When control signal B_FP_USE_BASIC alone is in the ON state, the completion notification circuit 466 outputs control signal FR_FP_COMP_BASIC and control signal LR_FUB_WR_BASIC upon receipt of a completion notification signal from the data detection circuit 464. When control signal B_FP_USE_EXTEND alone is in the ON state, the completion notification circuit 466 outputs control signals FR_FP_COMP_EXTEND and LR_FUB_WR_EXTEND upon receipt of a completion notification signal from the data detection circuit 464.

Meanwhile, the address signals B_FP_DST_FUB_ADR_BASIC and B_FP_DST_FUB_ADR_EXTEND provided via a latch circuit 451 propagate through more latch circuits 474a to 474e and are supplied to the floating-point renaming registers 560 as address signals LR_DST_FUB_ADR_BASIC and LR_DST_FUB_ADR_EXTEND. It is noted that the output timing of those address signals LR_DST_FUB_ADR_BASIC and LR_DST_FUB_ADR_EXTEND is synchronized with the foregoing control signals LR_FUB_WR_BASIC and LR_FUB_WR_EXTEND.

The latch circuit 451 also provides an entry identification signal B_FP_IID, which similarly propagates through the latch circuits 474a to 474d before it reaches the CSE 400 as an entry identification signal FR_FP_COMP_IID in FR cycle.

Figure 22:
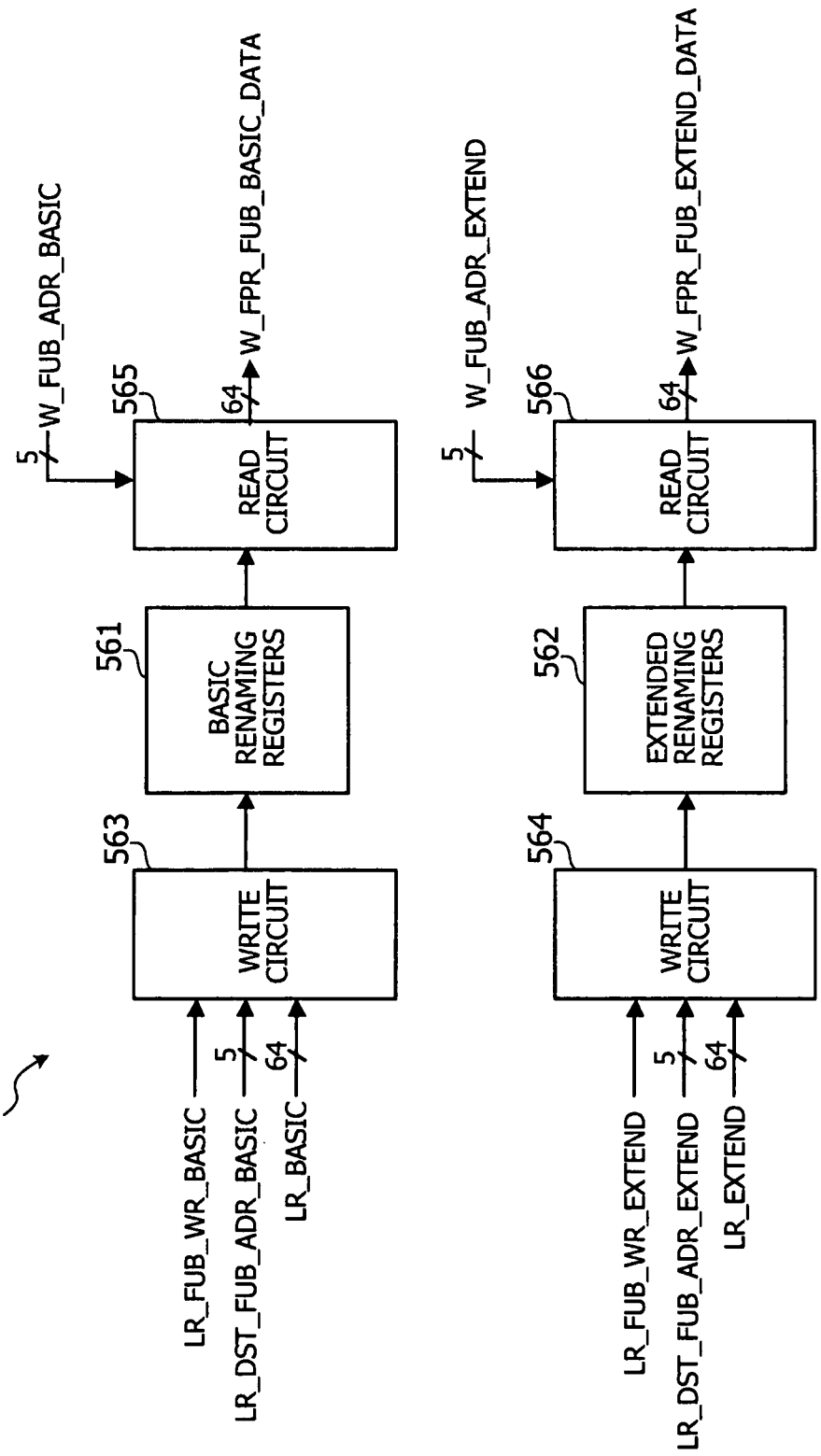
FIG. 22 illustrates input and output signals of floating-point renaming registers which relate to execution of floating-point load instructions.

FIG. 22 illustrates input and output signals of floating-point renaming registers which relate to execution of floating-point load instructions. Note that FIG. 22 focuses on the control signals and address signals used to execute floating-point load instructions, thus omitting some other existing signals.

The illustrated floating-point renaming registers 560 include two write circuits 563 and 564 and two read circuits 565 and 566, in addition to the basic renaming registers 561 and extended renaming registers 562 discussed so far. The write circuits 563 and 564 write data to a basic renaming register 561 and extended renaming register 562, respectively, according to a specified write address. The read circuits 565 and 566 read data out of a basic renaming register 561 and an extended renaming register 562, respectively, according to a specified read address.

Specifically, one write circuit 563 receives a data signal LR_BASIC from the basic load register 462. When control signal LR_FUB_WR_BASIC is in the ON state in FR+1 cycle subsequent to FR cycle, the write circuit 563 writes this data LR_BASIC to a basic renaming register 561 specified by address signal LR_DST_FUB_ADR_BASIC. The control signal LR_FUB_WR_BASIC and address signal LR_DST_FUB_ADR_BASIC are both supplied from the level-1 data cache unit 460.

Similarly, the other write circuit 564 receives a data signal LR_EXTEND from the extended load register 463. When control signal LR_FUB_WR_EXTEND is in the ON state, the write circuit 564 writes this data LR_EXTEND to an extended renaming register 562 specified by address signal LR_DST_FUB_ADR_EXTEND. The control signal LR_FUB_WR_EXTEND and address signal LR_DST_FUB_ADR_EXTEND are both supplied from the level-1 data cache unit 460.

In W cycle, one read circuit 565 reads load data from a basic renaming register 561 specified by an address signal W_FUB_ADR_BASIC received from the CSE 400 and supplies the load data to the floating-point SIMD registers 600 as a data signal W_FPR_FUB_BASIC_DATA. Similarly, the other read circuit 566 reads load data from an extended renaming register 562 specified by an address signal W_FUB_ADR_EXTEND received from the CSE 400 and supplies the load data to the floating-point SIMD registers 600 as a data signal W_FPR_FUB_EXTEND_DATA.

Figure 23:
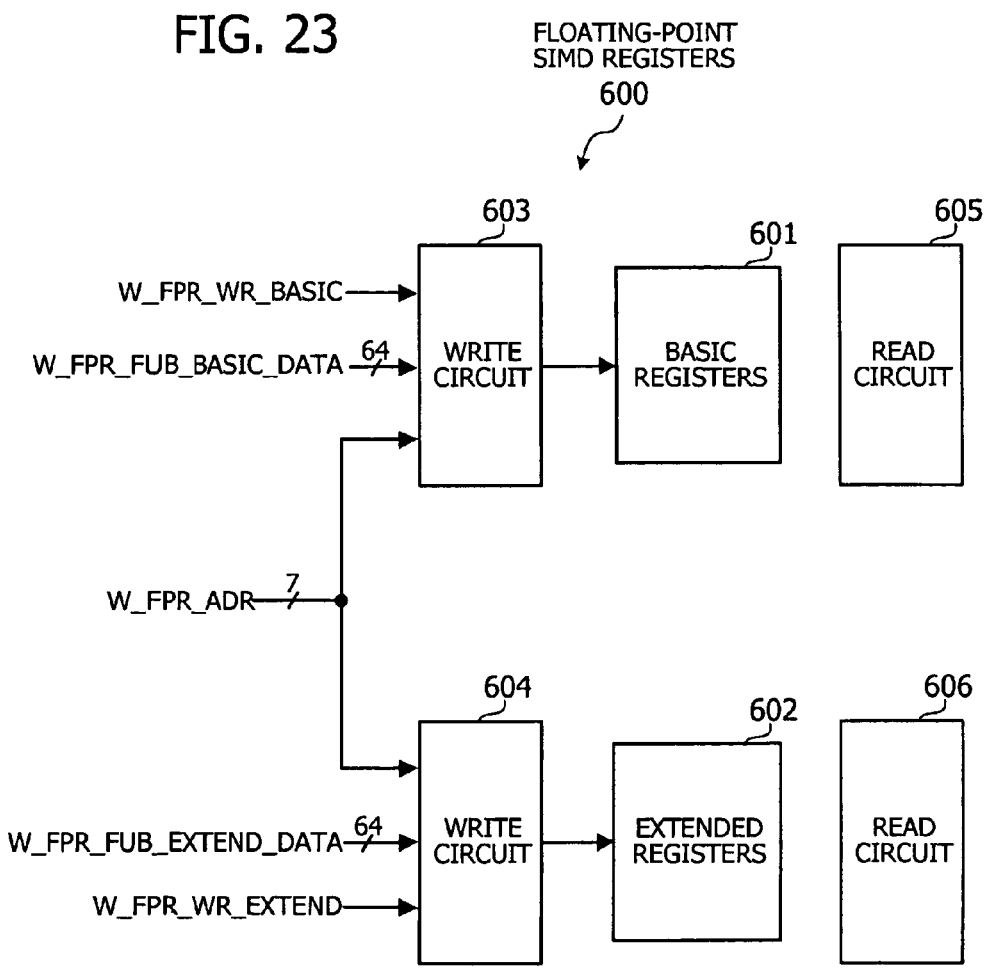
FIG. 23 illustrates input and output signals of floating-point SIMD registers which relate to execution of floating-point load instructions.

FIG. 23 illustrates input and output signals of floating-point SIMD registers which relate to execution of floating-point load instructions. Note that FIG. 23 focuses on the control signals and address signals used to execute floating-point load instructions, thus omitting some other existing signals.

The illustrated floating-point SIMD register 600 includes two write circuits 603 and 604 and two read circuits 605 and 606, in addition to the basic registers 601 and extended registers 602 discussed so far. The write circuits 603 and 604 write data to a basic register 601 and an extended register 602, respectively, according to a specified write address. The read circuits 605 and 606 read data out of a basic register 601 and an extended register 602, respectively, according to a specified read address.

In W cycle, a write operation of load data is performed on a specified floating-point SIMD register 600. When control signal W_FPR_WR_BASIC is in the ON state, one write circuit 603 writes data signal W_FPR_FUB_BASIC_DATA to a basic register 601 specified by address signal W_FPR_ADR. Here the control signal W_FPR_WR_BASIC and address signal W_FPR_ADR are both supplied from the CSE 400: The data signal W_FPR_FUB_BASIC_DATA carries load data read out of a relevant basic renaming register 561.

When control signal W_FPR_WR_EXTEND is in the ON state, the other write circuit 604 writes data signal W_FPR_FUB_EXTEND_DATA to an extended register 602 specified by address signal W_FPR_ADR. Here the control signal W_FPR_WR_EXTEND and address signal W_FPR_ADR are both supplied from the CSE 400. The data signal W_FPR_FUB_EXTEND_DATA carries load data read out of a relevant extended renaming register 562.

Figure 24:
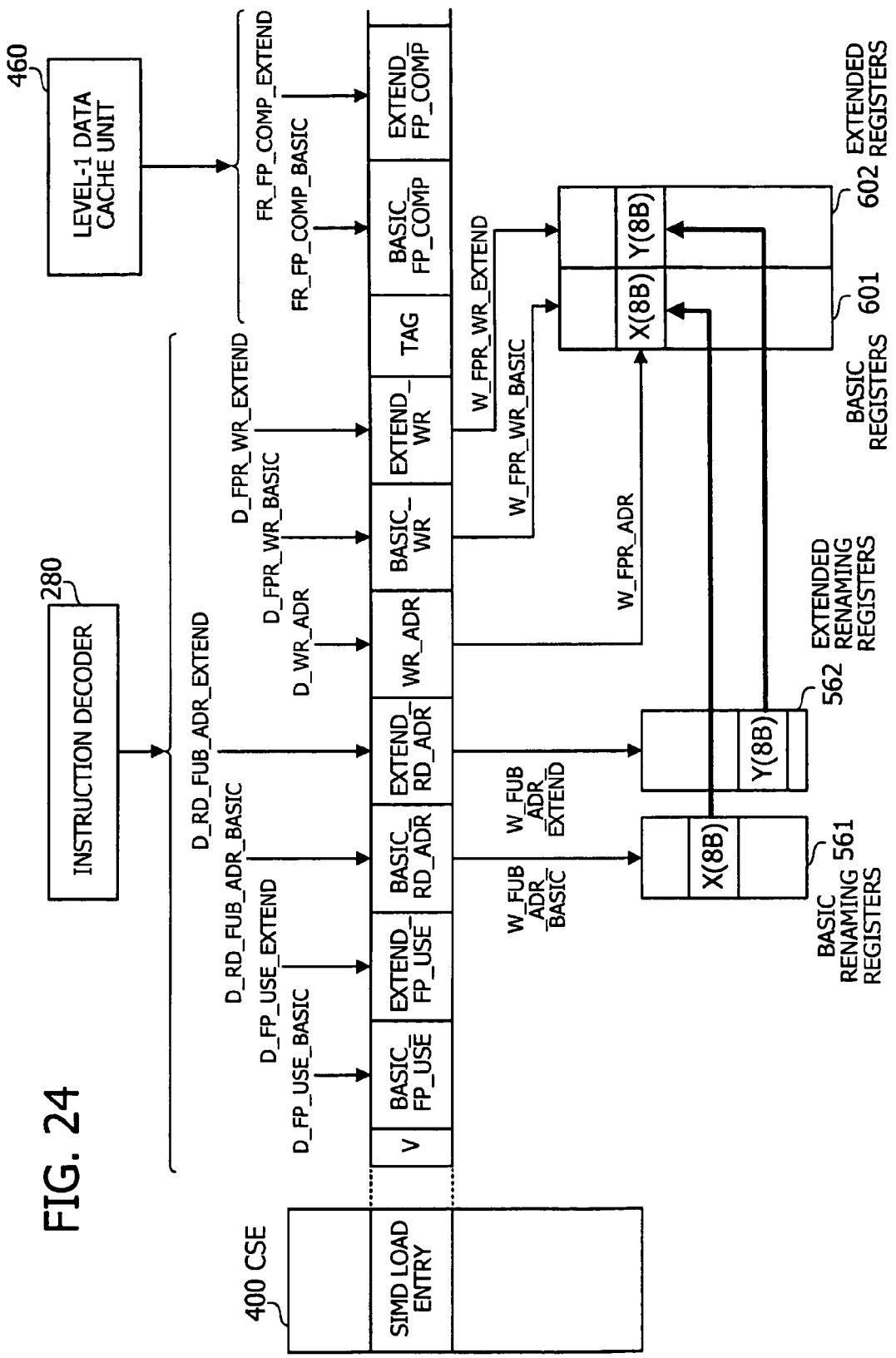
FIG. 24 illustrates a load data transfer operation performed as part of an SIMD load instruction.

FIG. 24 illustrates a load data transfer operation performed as part of an SIMD load instruction. In the case where the instruction decoded in D cycle is an SIMD load instruction, the instruction decoder 280 turns on both control signals D_FP_USE_BASIC and D_FP_USE_EXTEND. In the resulting entry of CSE 400, signals BASIC_FP_USE and EXTEND_FP_USE are both in the ON state, as are signals BASIC_WR and EXTEND_WR. Further, renaming register addresses are recorded as addresses BASIC_RD_ADR and EXTEND_RD_ADR.

Afterwards, the level-1 data cache unit 460 sends control signals FR_FP_COMP_BASIC and FR_FP_COMP_EXTEND to the CSE 400 in FR cycle, so as to inform that the basic load register 462 and extended load register 463 have their data ready. These control signals FR_FP_COMP_BASIC and FR_FP_COMP_EXTEND turn on the signals BASIC_FP_COMP and EXTEND_FP_COMP in the corresponding entry of CSE 400.

In the case where signals BASIC_FP_USE and EXTEND_FP_USE are both in the ON state, the completion check circuit 406 in the CSE 400 interprets the ON state of the above signals BASIC_FP_COMP and EXTEND_FP_COMP as indicating completion of the instruction. This processing makes it possible to recognize the completion of instructions correctly, even when the basic load register 462 and extended load register 463 receive their data at different times.

W cycle begins upon completion of the instruction. Specifically, the signal output circuit 407 in the CSE 400 outputs address values of BASIC_RD_ADR and EXTEND_RD_ADR to the basic renaming registers 561 and extended renaming registers 562, respectively, thus requesting load data stored in those addresses. The signal output circuit 407 also supplies an address WR_ADR, together with signals BASIC_WR and EXTEND_WR, to the basic registers 601 and extended registers 602, thereby initiating a write operation of the load data to a set of basic register 601 and extended register 602 at address WR_ADR. The load data is thus transferred from the basic renaming register 561 and extended renaming register 562 to the specified basic register 601 and extended register 602.

Figure 25:
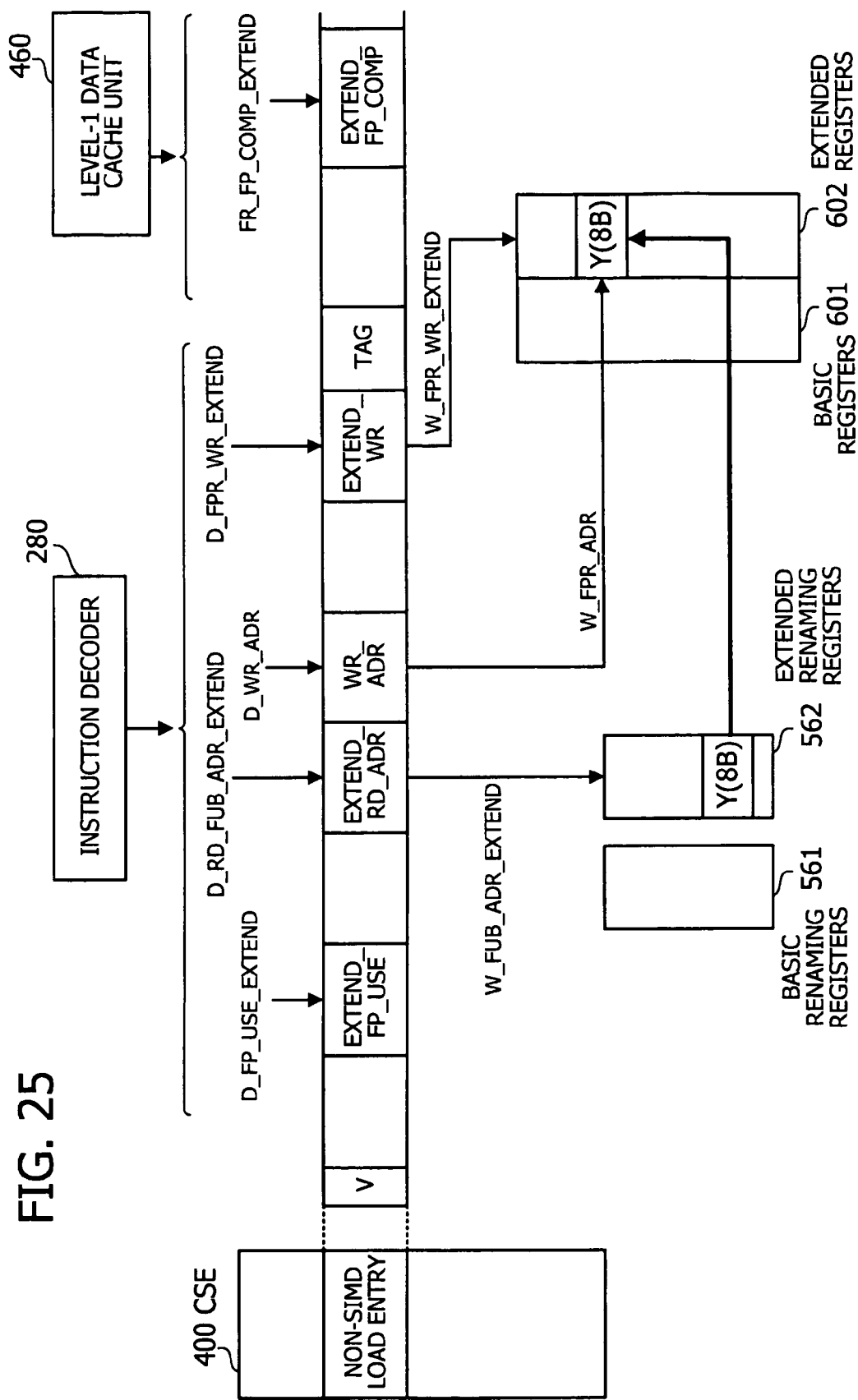
FIG. 25 illustrates a load data transfer operation performed as part of a non-SIMD load instruction.

FIG. 25 illustrates a load data transfer operation performed as part of a non-SIMD load instruction. In the case where the instruction decoded in D cycle is a non-SIMD load instruction, the instruction decoder 280 turns on one of the control signals D_FP_USE_BASIC and D_FP_USE_EXTEND, but not both. In the example of FIG. 25, only the latter control signal D_FP_USE_EXTEND is in the ON state. Accordingly, the illustrated entry of CSE 400 contains signals EXTEND_FP_USE and EXTEND_WR in the ON state, and the address of a specific renaming register is set in the address field of EXTEND_RD_ADR.

Afterwards, the level-1 data cache unit 460 sends a control signal FR_FP_COMP_EXTEND to the CSE 400 in FR cycle, so as to inform that the extended load register 463 has its data ready. This control signal FR_FP_COMP_EXTEND turns on signal EXTEND_FP_COMP in the entry of the CSE 400.

As mentioned above, signal EXTEND_FP_USE in the CSE entry is in the ON state, whereas BASIC_FP_USE is not. Accordingly, the completion check circuit 406 in the CSE 400 interprets the ON state of the above signal EXTEND_FP_COMP as indicating completion of the instruction, and thus commences W cycle.

The signal output circuit 407 in the CSE 400 outputs an address value of EXTEND_RD_ADR to the extended renaming registers 562, thus requesting load data stored in that address. The signal output circuit 407 also supplies address WR_ADR, together with signal EXTEND_WR, to the extended registers 602, thereby requesting a write operation to an extended register 602 corresponding to the address WR_ADR. As a result, the load data is transferred from the extended renaming register 562 to the extended register 602 alone.

As can be seen from the above-described processing of floating-point load instructions, SIMD load instructions use a basic register 601 and an extended register 602 at the same address as the destination of load data. Non-SIMD load instructions, on the other hand, use any one of those basic registers 601 and extended registers 602 as the destination of load data, meaning that the floating-point SIMD registers 600 can be used efficiently. This feature permits a non-SIMD load instruction to choose a load data destination out of twice as many registers as SIMD load instructions can. Regarding register renaming for SIMD load instructions, the present embodiment offers basic renaming registers 561 and extended renaming registers 562 that can be mapped on some basic registers 601 and extended registers 602, respectively. The present embodiment also allows assignment of renaming registers with different addresses to a pair of basic and extended registers. In the case of non-SIMD instructions, a basic renaming register 561 is assigned for a basic register 601, or alternatively, an extended renaming registers 562 is assigned to an extended register 602, depending on which register the operand data is destined for. With this arrangement, the present embodiment makes efficient use of floating-point renaming registers 560 even in the case where the program contains both SIMD instructions and non-SIMD instructions. This also means that it may be possible to reduce the number of floating-point renaming registers 560.

The instruction decoder 280 is designed to send bus designation signals to the level-1 data cache unit 460 via the RSA 320, operand data selection unit 430, and operand address generator 440, so as to designate whether to use a basic bus, as well as whether to use an extended bus, for the purpose of transporting load data. This feature of bus designation signals enables the level-1 data cache unit 460 to determine whether to forward fetched load data to a basic renaming register 561 or to an extended renaming register 562. The bus designation signals are also delivered to the CSE 400. With those bus designation signals, the CSE 400 can correctly recognize the completion of an instruction and store the load data in a floating-point SIMD register 600 at the specified address. The bus designation signals are thus used to transfer load data in a correct and efficient way.

Execution of Floating-Point Computation Instruction

When a floating-point computation instruction is decoded, the CPU core 111 reads source data from registers specified by the source operands and writes the result data in a register specified by the destination operand. For illustrative purposes, the following explanation assumes a floating-point computation instruction that consumes 6 machine cycles for execution. More specifically, an SIMD instruction for a floating-point operation (hereafter, SIMD computation instruction) is expressed in the form of, for example, "Simdfmad %127*% f100+% f50=% f10." This instruction specifies three registers "%127," "% f100," and "% f50" as source operands. Each specified register in those operands offers two 8-byte data values, which are subjected to the dual parallel processing of multiply-and-add operations. Their respective computation results are written into a floating-point SIMD register 600 specified by the destination operand "% f10" of the instruction.

Non-SIMD instructions for a floating-point operation (hereafter, non-SIMD computation instruction) are also coded in the format described above, except for their operation codes. A non-SIMD computation instruction instructs the CPU core 111 to read 8-byte data values from registers specified in the source operands. The instruction subjects these 8-byte data values to a series of operations, the computation result of which is supposed to be written back to a register belonging to the floating-point SIMD registers 600 as designated by the destination operand.

As in the foregoing case of floating-point load instructions, the destination operand of an SIMD computation instruction gives a register number in the range of 0 to 127, and that of a non-SIMD computation instruction gives a register number in the range of 0 to 255.

Figure 26:
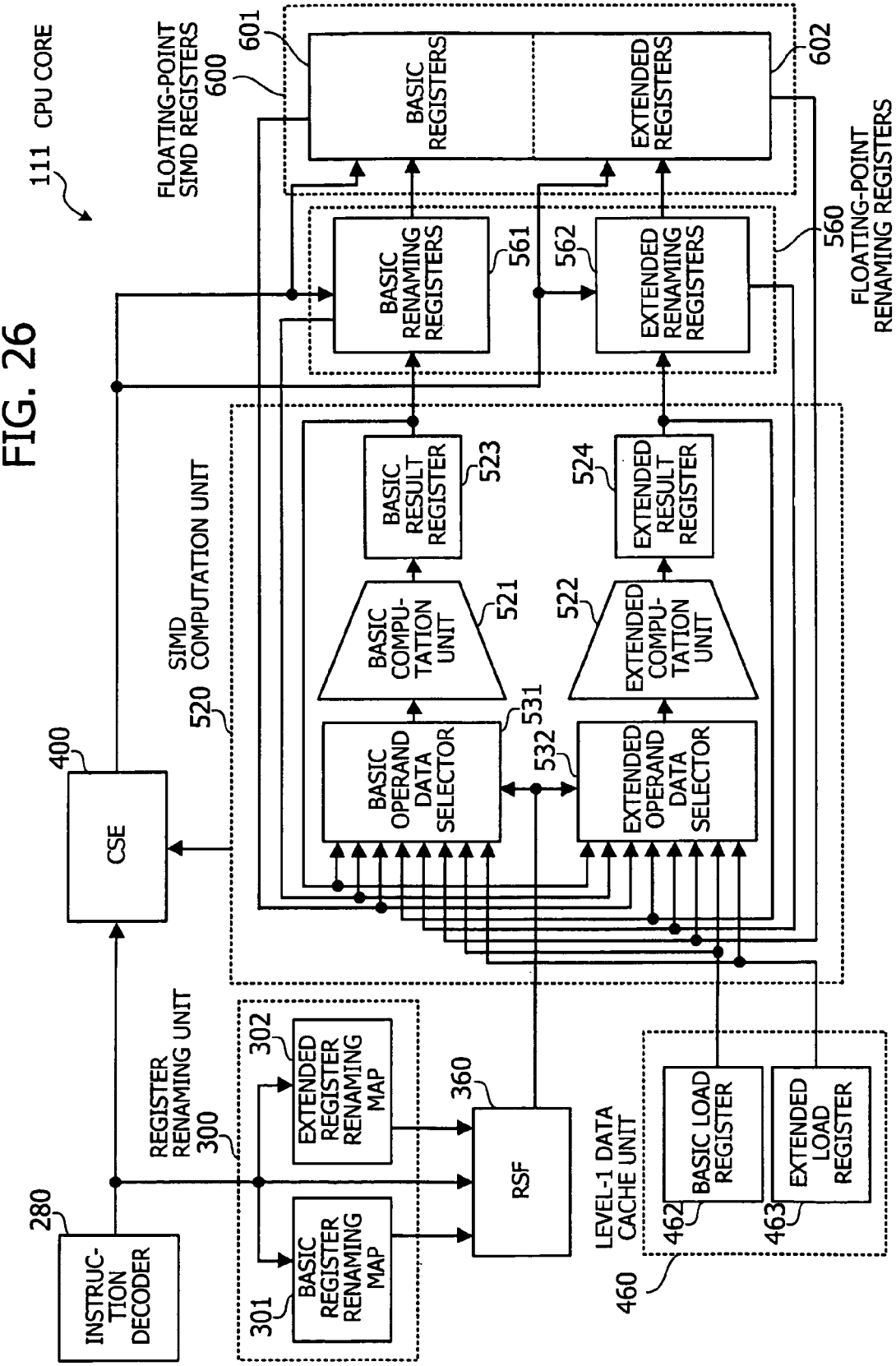
FIG. 26 illustrates components of a CPU core which execute a floating-point computation instruction.

FIG. 26 illustrates components of a CPU core which are involved in execution of a floating-point computation instruction. Upon decoding a floating-point computation instruction, the instruction decoder 280 adds an entry for the instruction to the CSE 400 and RSF 360. The instruction decoder 280 also assigns a floating-point renaming register 560 to the floating-point SIMD register 600 that is specified as the destination of computation results. The address of each assigned renaming register is recorded in the basic register renaming map 301 and extended register renaming map 302 of the register renaming unit 300, as well as in relevant entries of the CSE 400 and RSF 360.

The operand data of the instruction may reside in a floating-point renaming register 560. When this is the case, the storage address is retrieved from the basic register renaming map 301 and extended register renaming map 302 and recorded in a relevant entry of the RSF 360.

The SIMD computation unit 520 selects operand data based on an entry dispatched from the RSF 360 and performs computation on that data. To this end, the SIMD computation unit 520 includes a basic computation unit 521, an extended computation unit 522, a basic result register 523, an extended result register 524, a basic operand data selector 531, and an extended operand data selector 532.

The basic computation unit 521 and extended computation unit 522 each operate on given 8-byte data values. The basic operand data selector 531 selects operand data for the basic computation unit 521, based on an entry dispatched from the RSF 360. Similarly, the extended operand data selector 532 selects operand data for the extended computation unit 522, based on an entry dispatched from the RSF 360. There are a plurality of data sources for selection by the basic operand data selector 531 and extended operand data selector 532, which include data obtained in the course of the current instruction and data obtained as a result of committed instructions.

While FIG. 26 depicts only one set of basic operand data selector 531 and extended operand data selector 532, the CPU core 111 employs as many such selector pairs as the number of source operands that the instructions may specify. For example, the aforementioned instruction "Simdfmad %127*% f100+% f50=% f10" use three sets of such basic operand data selector 531 and extended operand data selector 532 when it is executed.

The basic result register 523 temporarily holds a computation result of the basic computation unit 521 before it is sent to the basic renaming register 561. The extended result register 524 temporarily holds a computation result of the extended computation unit 522 before it is sent to the extended renaming register 562. When the computation result is ready in the basic result register 523 and extended result register 524, the SIMD computation unit 520 notifies the CSE 400 that the computation has been finished.

The above arrangement enables a computation result of the basic computation unit 521 to be saved first in a basic renaming register 561 via the basic result register 523, and then transferred to a basic register 601. Also, a computation result of the extended computation unit 522 is saved first in an extended renaming register 562 via the extended result register 524, and then transferred to an extended register 602. As in the case of the foregoing floating-point load instructions, the term "basic bus" will be used to refer to the former transfer route of data, i.e., the bus running through the basic result register 523, basic renaming registers 561, and basic registers 601 in that order. Also, the term "extended bus" will be used to refer to the latter transfer route of data, i.e., the bus running through the extended result register 524, extended renaming registers 562, and extended registers 602 in that order.

The basic operand data selector 531 is configured to select any of the following registers as a source of operand data: floating-point SIMD register 600, floating-point renaming register 560, basic result register 523, extended result register 524, basic load register 462, and extended load register 463. The same applies to the extended operand data selector 532.

Figure 27:
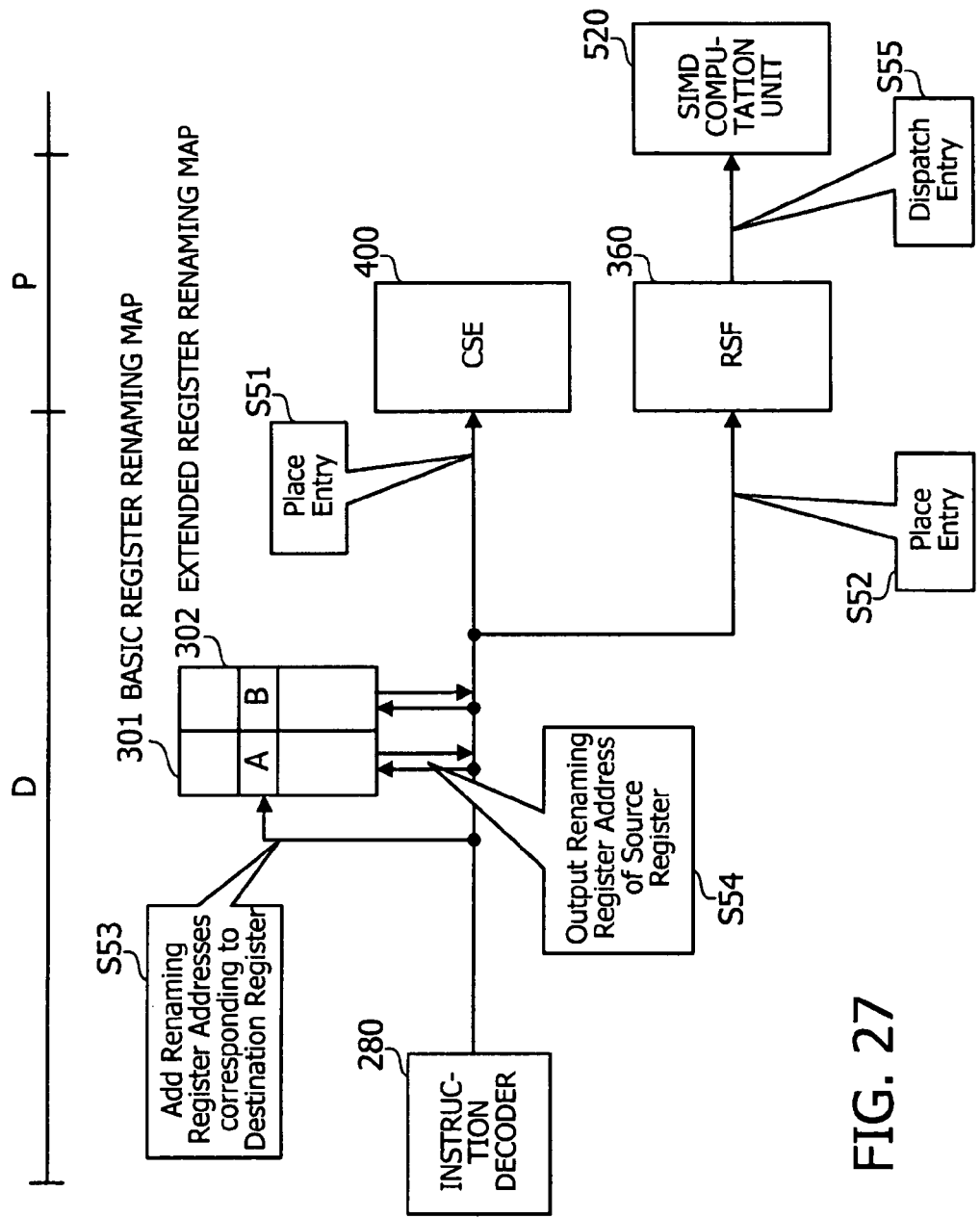
FIG. 27 is a first diagram illustrating operation of a pipeline to execute a floating-point computation instruction.
Figure 28:
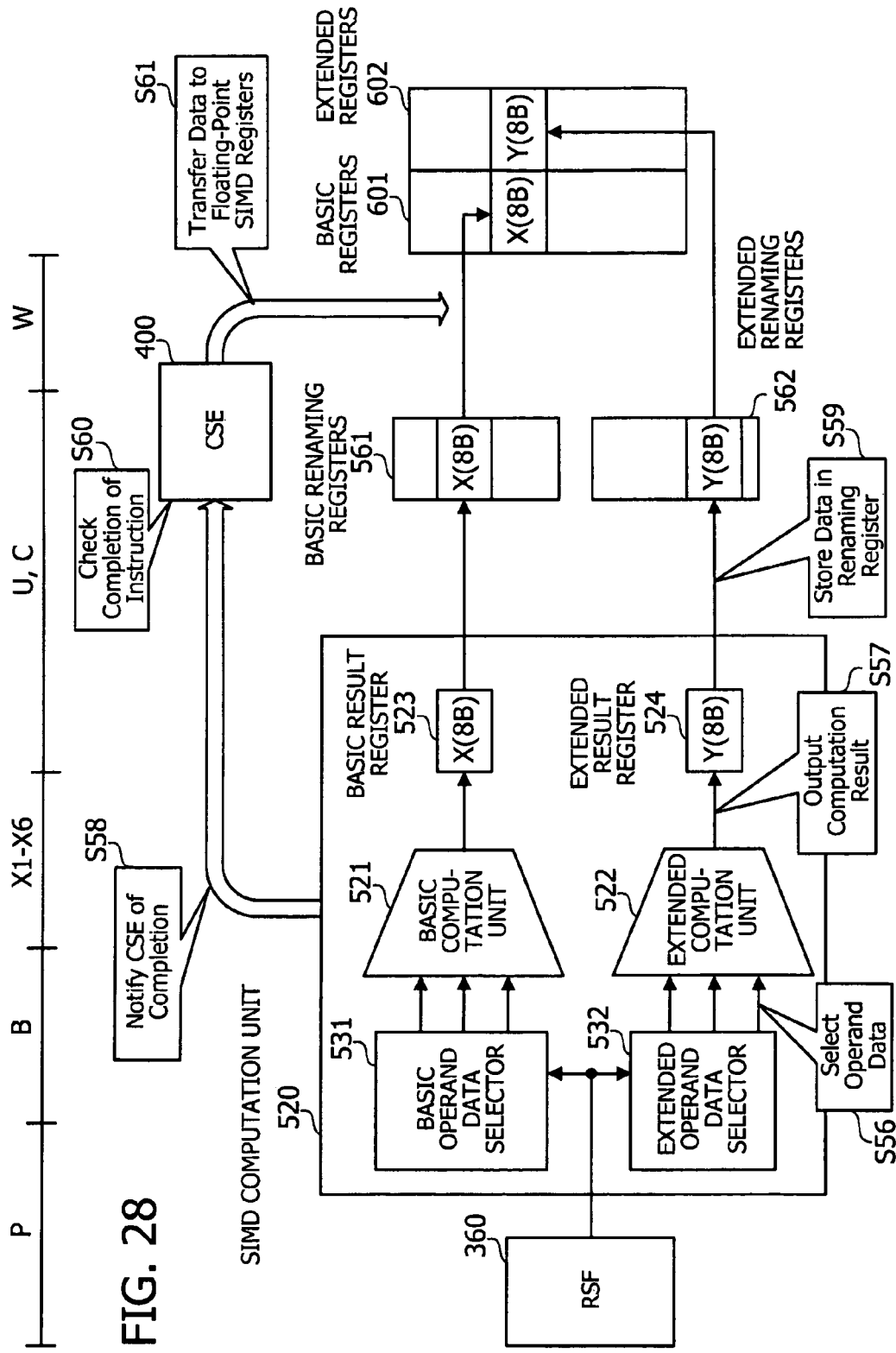
FIG. 28 is a second diagram illustrating operation of a pipeline to execute a floating-point computation instruction.

FIGS. 27 and 28 illustrate a pipeline to execute a floating-point computation instruction. The pipeline for floating-point computation instructions is formed from, for example, D cycle, P cycle, B cycle, X1 to X6 cycles, U cycle, C cycle, and W cycle in that order. It is noted that U cycle and C cycle may execute in parallel.

In D cycle, a given instruction is decoded. Specifically, the instruction decoder 280 decodes a floating-point computation instruction in D cycle. Based on the decoding result, the instruction decoder 280 places an entry of the instruction in the CSE 400 (step S51), as well as doing the same to the RSF 360 (step S52).

What the instruction decoder 280 gives in this step to the CSE 400 is primarily a piece of information about the destination of computation results. The instruction decoder 280 also assigns a floating-point renaming register 560 to the destination floating-point SIMD register 600 and records that assignment in a relevant register renaming map (step S53). This processing step is similar to the case of floating-point load instructions and thus uses the same method discussed in FIGS. 5 and 6.

That is, upon decoding an SIMD computation instruction, the instruction decoder 280 enters the address of a basic renaming register 561 in one entry of the basic register renaming map 301 that corresponds to the destination register. The instruction decoder 280 also enters the address of an extended renaming register 562 in one entry of the extended register renaming map 302 that corresponds to the destination register. In the example of FIG. 27, the assigned basic renaming register 561 has an address of "A," while the assigned extended renaming register 562 has an address of "B." The instruction decoder 280 also records those addresses of the assigned basic renaming register 561 and extended renaming register 562 in relevant entries of the CSE 400 and RSF 360.

In addition to the renaming register addresses for the destination register, the instruction decoder 280 also adds some information about source data in the relevant entry of the RSF 360. For example, the instruction decoder 280 records the read address of a floating-point SIMD register 600 that the instruction specifies as a source of operand data. In the case of SIMD computation instructions, operand data corresponding to a single source operand is read out, not only from a basic register 601, but also from an extended register 602.

In the case where a renaming register has been assigned to the read address of operand data in the floating-point SIMD registers 600, the renaming map outputs the address of that renaming register (step S54). The RSF 360 records this renaming register address. More specifically, in the case where the decoded instruction is an SIMD computation instruction, both the basic register renaming map 301 and extended register renaming map 302 provide their respective renaming register addresses corresponding to a single source register specified by a source operand. Accordingly, the RSF 360 records those two addresses. In the case where the decoded instruction is a non-SIMD computation instruction, either the basic register renaming map 301 or the extended register renaming map 302 provides a renaming register address for a single source register specified by a source operand.

P cycle (priority cycle) is where the RSF 360 waits for necessary data to become ready. As described earlier, the RSF 360 contains a plurality of entries, and some of those entries may have necessary data ready in relevant registers. The RSF 360 dispatches the oldest one of those data-ready entries. The execution advances to B cycle (step S55) when an entry corresponding to the current floating-point load instruction is dispatched from the RSF 360 to the SIMD computation unit 520.

In B cycle, the basic operand data selector 531 and extended operand data selector 532 in the SIMD computation unit 520 select operand data (step S56). In the case of an SIMD computation instruction, both the basic operand data selector 531 and extended operand data selector 532 select and send their respective operand data to the basic computation unit 521 and extended computation unit 522.

In subsequent X1 to X6 cycles (execute-1 cycle to execute-6 cycle), the computation is performed. Finally, X6 cycle outputs the computation result to result registers (step S57). In the case of an SIMD computation instruction, the basic computation unit 521 and extended computation unit 522 execute their computation concurrently and send the results to the basic result register 523 and extended result register 524, respectively. FIG. 28 depicts two 8-byte result data values as "X(8B)" and "Y(8B)" which are stored in the basic result register 523 and extended result register 524, respectively. In X6 cycle, the SIMD computation unit 520 notifies the CSE 400 of the completion of the computation (step S58).

Subsequently, U cycle (update cycle) saves the computation result in renaming registers (step S59). In the case of an SIMD computation instruction, the computation results are transported from the basic result register 523 and extended result register 524 to a basic renaming register 561 and an extended renaming register 562, respectively. In the case of a non-SIMD computation instruction, the computation result goes to either a basic renaming register 561 or an extended renaming register 562.

In C cycle (commit cycle), the instruction is committed. In the present example, the CSE 400 determines that the floating-point computation instruction has been completed (step S60), based on computation completion notification from the SIMD computation unit 520. This C cycle may execute in parallel with, for example, U cycle and terminate together with U cycle in the fastest case.

In W cycle (write cycle), the registers are updated. Specifically, one computation result stored in a basic renaming register 561 is transferred to a relevant address of the basic registers 601, while another computation result stored in an extended renaming register 562 is transferred to a relevant address of the extended registers 602. These data transfer operations are controlled by the CSE 400 (step S61).

That is, the computation results of an SIMD computation instruction are stored in both a basic renaming register 561 and an extended renaming register 562. Accordingly, the CSE 400 transfers these two computation results to a basic register 601 and an extended register 602 with the same register number.

Figure 29:
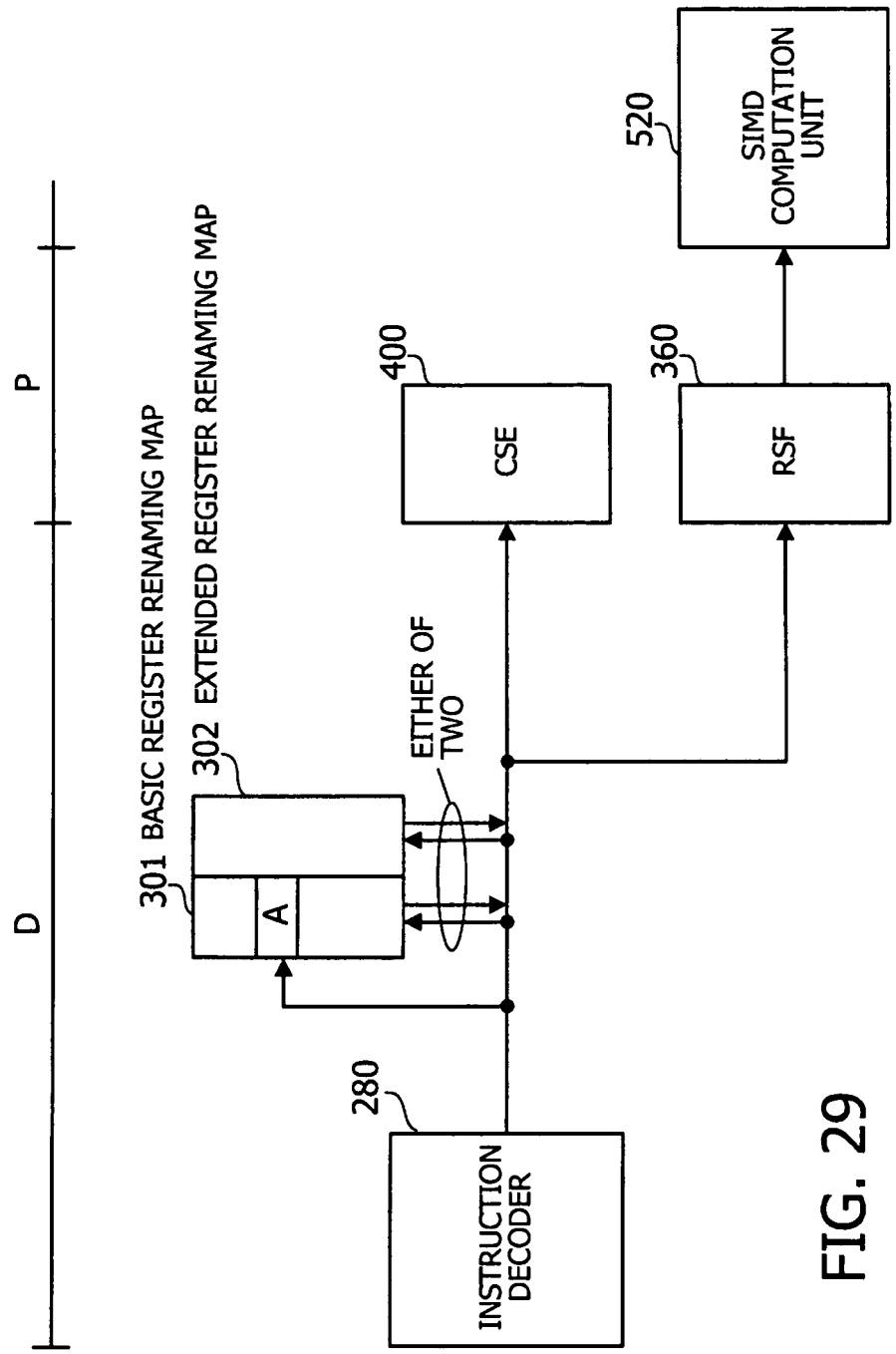
FIG. 29 is a first diagram illustrating a data flow during execution of a non-SIMD computation instruction is executed.
Figure 30:
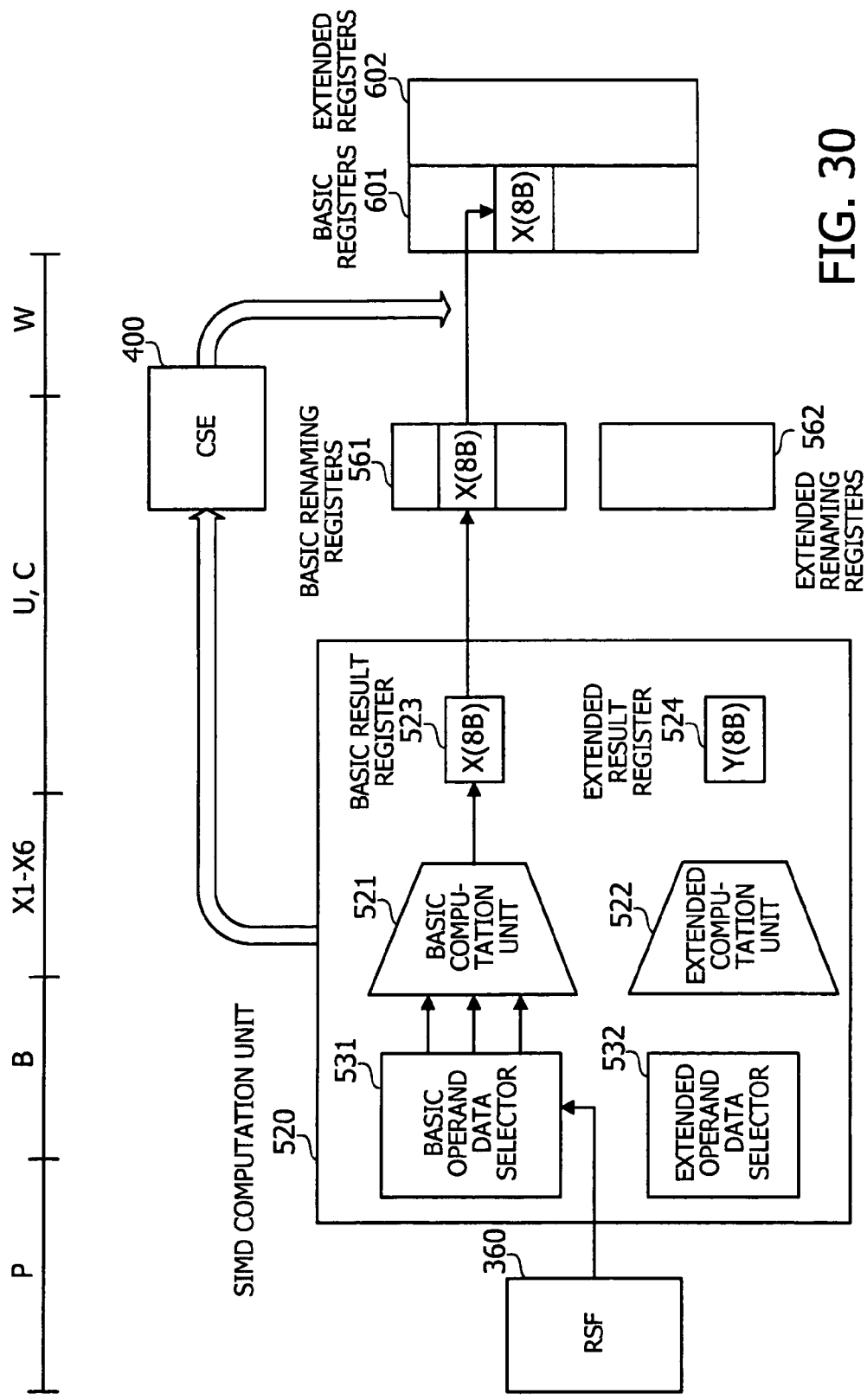
FIG. 30 is a second diagram illustrating a data flow during execution of a non-SIMD computation instruction.

FIGS. 29 and 30 illustrate a data flow during execution of a non-SIMD computation instruction. The following description will use FIGS. 29 and 30 to discuss how a non-SIMD computation instruction is executed differently from SIMD computation instructions.

Just as with non-SIMD load instructions, non-SIMD computation instructions specify one of the basic registers 601 and extended registers 602 as the destination of their computation results. When a non-SIMD computation instruction is decoded in D cycle, the instruction decoder 280 assigns a renaming register to the destination register of computation results. FIG. 29 illustrates the case where one of the basic registers 601 is designated as the destination of computation results. In this case, the address of the basic renaming register 561 assigned by the instruction decoder 280 is recorded in a corresponding field of the basic register renaming map 301.

Non-SIMD computation instructions specify, in a source operand, one of the basic registers 601 and extended registers 602 as a source register of operand data. A renaming register may be assigned to the specified basic register 601 or extended register 602, in which case the address of the assigned renaming register is read out of either the basic register renaming map 301 or the extended register renaming map 302 and recorded in the RSF 360.

In B cycle, either the basic operand data selector 531 or the extended operand data selector 532 selects operand data, based on an entry dispatched by the RSF 360. Accordingly, the subsequent computation in X1 to X6 cycles takes place in only one of the basic computation unit 521 and extended computation unit 522.

The basic operand data selector 531 selects operand data when a basic register 601 is specified as the destination of computation results. The extended operand data selector 532 selects operand data when an extended register 602 is specified as the destination of computation results. Note that the operand data sources on the basic bus and extended bus are equally available to both the basic operand data selector 531 and extended operand data selector 532.

FIG. 30 illustrates the case where the basic operand data selector 531 has selected operand data. The basic computation unit 521 executes a specified computation, stores its result in a basic renaming register 561 via the basic result register 523. When the computation result is set to the basic result register 523, the CSE 400 recognizes that fact and, then in W cycle, causes the basic renaming register 561 to transfer its content to the associated basic register 601.

As can be seen from the above, the execution of non-SIMD computation instructions is similar to the execution of floating-point load instructions in that the floating-point SIMD registers 600 serve as discrete registers each having a data width of 8 bytes. Likewise, the floating-point renaming registers 560 also serve as discrete registers each having a data width of 8 bytes. This feature prevents the floating-point renaming registers 560 and floating-point SIMD registers 600 from being wasted, thus enabling more efficient use of storage space.

It is also possible for non-SIMD computation instructions to use a floating-point SIMD register 600 or floating-point renaming register 560 as a source of operand data. During the course of reading operand data, the floating-point SIMD registers 600 and floating-point renaming registers 560 serve as discrete registers each having a data width of 8 bytes. In other words, the source of operand data can be selected from among those 8-byte-wide registers constituting the floating-point SIMD registers 600 or floating-point renaming registers 560. This feature provides more choices of registers in program coding, besides improving the efficiency of storage space usage.

Figure 31:
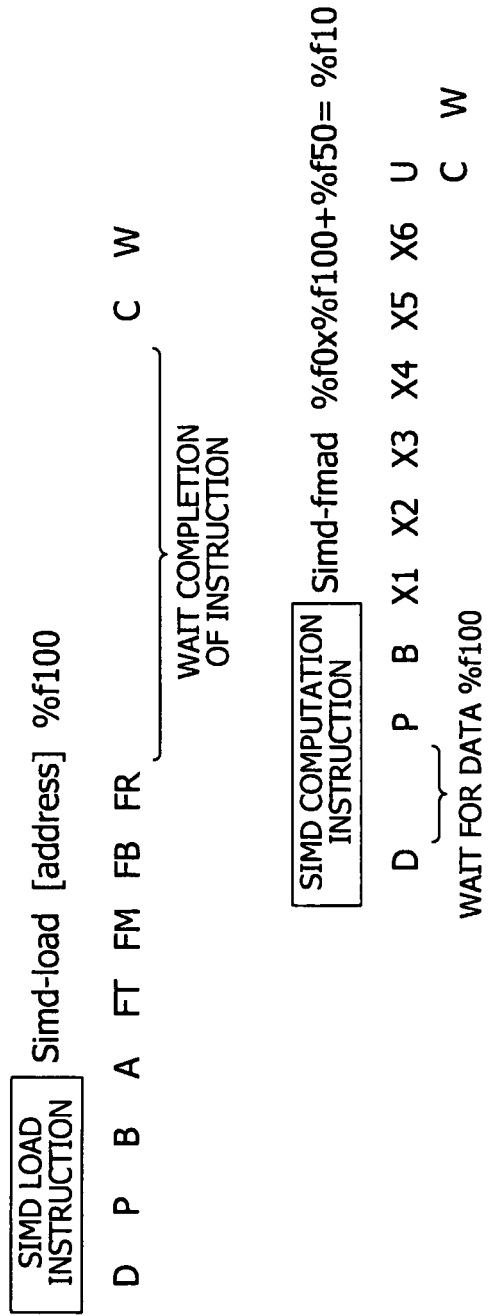
FIG. 31 is an example timing diagram illustrating a case where operand data is supplied from a renaming register to execute a floating-point computation instruction.

FIG. 31 is an example timing diagram illustrating the case where operand data is supplied from a renaming register to execute a floating-point computation instruction. Specifically, FIG. 31 illustrates an example of pipelined processing when an SIMD computation instruction is decoded subsequently to an SIMD load instruction. The SIMD load instruction designates a floating-point SIMD register 600 of "% f100" as the destination of load data. The SIMD computation instruction, on the other hand, designates the same floating-point SIMD register 600 of "% f100" as the source of operand data. The SIMD computation instruction thus depends on the SIMD load instruction through its use of the floating-point SIMD register 600.

The pipeline of the SIMD load instruction is experiencing a delay of C cycle because the CSE 400 waits completion of the instruction. On the other hand, the pipeline of the SIMD computation instruction executes B cycle to select operand data before entering C cycle. For this reason, a renaming register has been assigned to the floating-point SIMD register 600 specified by "% f100." It is thus possible, in B cycle of the SIMD computation instruction, to read the data destined for the register "% f100" from the renaming register assigned to the register "% f100." The execution speed of computation can be increased in this way.

The following description will now provide details of each circuit block participating in the execution of a floating-point computation instruction. Also discussed in the following description is the flow of signals between those blocks. It is assumed, for illustrative purposes, that the instruction specifies three registers in its source operands as in "Simd-fmad %f27*%f100+%f50=%f10." It is also assumed that either a floating-point SIMD register 600 or a floating-point renaming register 560 is selected as the source of operand data.

Figure 32:
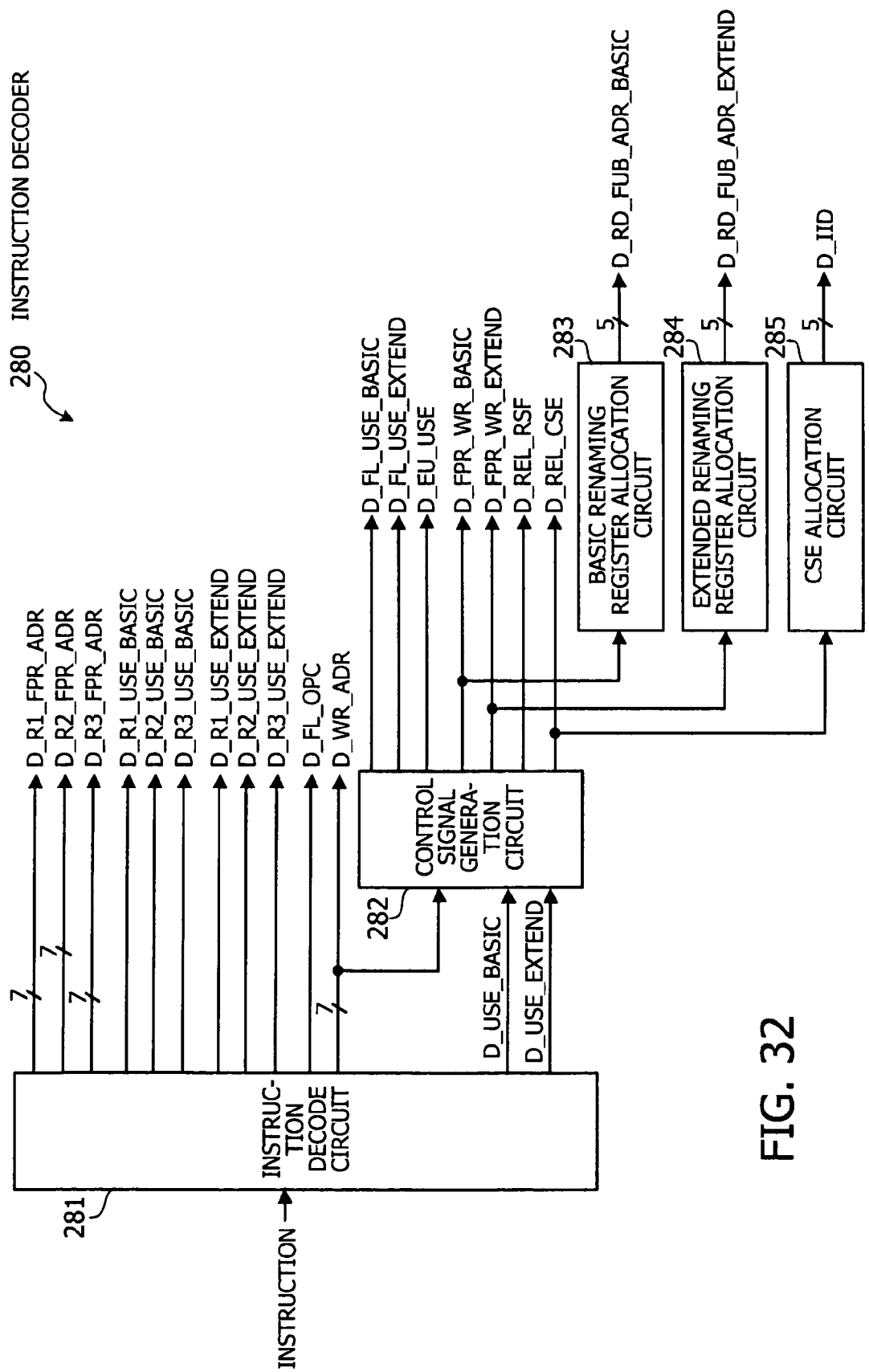
FIG. 32 illustrates output signals produced by an instruction decoder during execution of a floating-point computation instruction.

FIG. 32 illustrates output signals that are produced by the instruction decoder 281 during execution of a floating-point computation instruction. FIG. 32 omits some existing signals in order to focus on the control signals and address signals used in D cycle of a floating-point computation instruction.

When a floating-point computation instruction is decoded, the instruction decode circuit 281 produces a control signal D_FL_OPC to indicate which type of floating-point computation instruction the instruction is to perform. This control signal D_FL_OPC is supplied to the RSF 360.

The instruction decode circuit 281 also supplies the basic register renaming map 301, extended register renaming map 302, CSE 400, and control signal generation circuit 282 with an address signal D_WR_ADR that designates a specific floating-point SIMD register 600 as the destination of computation results. This address signal D_WR_ADR takes a value in the range of 0 to 127.

The instruction decode circuit 281 also supplies the basic register renaming map 301, extended register renaming map 302, and RSF 360 with three address signals D_R1_FPR_ADR, D_R2_FPR_ADR, and D_R3_FPR_ADR. These address signals D_R1_FPR_ADR, D_R2_FPR_ADR and D_R3_FPR_ADR point to specific floating-point SIMD registers 600 specified in the three source operands of the floating-point computation instruction.

The instruction decode circuit 281 further provides the RSF 360 with control signals D_R1_USE_BASIC, D_R1_USE_EXTEND, D_R2_USE_BASIC, D_R2_USE_EXTEND, D_R3_USE_BASIC, and D_R3_USE_EXTEND, associated with the above address signals D_R1_FPR_ADR, D_R2_FPR_ADR, and D_R3_FPR_ADR. The first two control signals D_R1_USE_BASIC and D_R1_USE_EXTEND respectively indicate whether the first source operand specifies a register on the basic bus, and whether the first source operand specifies a register on the extended bus. Likewise, the second two control signals D_R2_USE_BASIC and D_R2_USE_EXTEND respectively indicate whether the second source operand specifies a register on the basic bus, and whether the second source operand specifies a register on the extended bus. The third two control signals D_R3_USE_BASIC and D_R3_USE_EXTEND respectively indicate whether the third source operand specifies a register on the basic bus, and whether the third source operand specifies a register on the extended bus.

The above-noted address signal D_R1_FPR_ADR and control signals D_R1_USE_BASIC and D_R1_USE_EXTEND are produced based on the type of the floating-point computation instruction and the first source operand of the same. This procedure is similar to the procedure illustrated in the flowchart of FIG. 14, which produces an address signal D_WR_ADR and control signal D_USE_BASIC and D_USE_EXTEND based on a given operation code and address.

More specifically, when the decoded instruction is an SIMD computation instruction, the instruction decode circuit 281 produces an address signal D_R1_FPR_ADR by assigning to it a register number (or address) found in the first source operand of the decoded SIMD computation instruction. The instruction decode circuit 281 also turns on both control signals D_R1_USE_BASIC and D_R1_USE_EXTEND.

When the decoded instruction is a non-SIMD computation instruction, the instruction decode circuit 281 similarly produces an address signal D_R1_FPR_ADR by assigning to it the register number (or address) in the first source operand of the instruction, if it is equal to or smaller than 127. In this case, the instruction decode circuit 281 turns on one control signal D_R1_USE_BASIC, while turning off the other control signal D_R1_USE_EXTEND.

When the decoded instruction is a non-SIMD computation instruction, and if the register number (or address) in the first source operand of the instruction exceeds 127, the instruction decode circuit 281 subtracts 128 from that register number and assigns the resulting difference to an address signal D_R1_FPR_ADR. In this case, the instruction decode circuit 281 turns on one control signal D_R1_USE_EXTEND, while turning off the other control signal D_R1_USE_BASIC.

The address signal D_R2_FPR_ADR and control signals D_R2_USE_BASIC and D_R2_USE_EXTEND are produced similarly to the above, based on the instruction type and the register number specified in the second source operand. The address signal D_R3_FPR_ADR and control signals D_R3_USE_BASIC and D_R3_USE_EXTEND are also produced similarly to the above, based on the instruction type and the register number specified in the third source operand.

The instruction decode circuit 281 also supplies the control signal generation circuit 282 with signals D_USE_BASIC and D_USE_EXTEND respectively indicating whether a basic register 601 and an extended register 602 have been designated as the destination of computation results.

Upon receipt of address signal D_WR_ADR from the instruction decode circuit 281, the control signal generation circuit 282 produces several control signals as follows: Control signal D_FL_USE_BASIC indicates whether to use the basic bus. Control signal D_FL_USE_EXTEND indicates whether to use the extended bus. These two control signals D_FL_USE_BASIC and D_FL_USE_EXTEND are sent together to the RSF 360. Control signal D_EU_USE is supplied to the CSE 400 to indicate whether at least one of the basic computation unit 521 and extended computation unit 522 is used. Control signal D_REL_RSF requests the RSF 360 to create an entry. Control signal D_FPR_WR_BASIC indicates whether the computation result is to be written to a basic register 601. Control signal D_FPR_WR_EXTEND indicates whether the computation result is to be written to an extended register 602. Actually, these control signals D_FPR_WR_BASIC and D_FPR_WR_EXTEND are the same signals discussed earlier in FIG. 13.

The basic renaming register allocation circuit 283 and extended renaming register allocation circuit 284 produce the same signals as those in the case of floating-point load instructions. The CSE allocation circuit 285 assigns an entry identification signal D_IID to an entry for the CSE 400, as in the case of floating-point load instructions.

The procedure of assigning renaming registers for a floating-point computation instruction is basically the same as what has been discussed in FIG. 14. This also applies to the way of producing control signals D_FPR_WR_BASIC and D_FPR_WR_EXTEND and address signal D_WR_ADR. For floating-point computation instructions, however, the control signals D_FP_USE_BASIC and D_FP_USE_EXTEND in FIG. 14 have to be replaced with control signals D_FL_USE_BASIC and D_FL_USE_EXTEND. The noted procedure indicates which registers will be used in execution of the given floating-point computation instruction, thus permitting the subsequent processing blocks to correctly identify the registers they are supposed to use.

Figure 33:
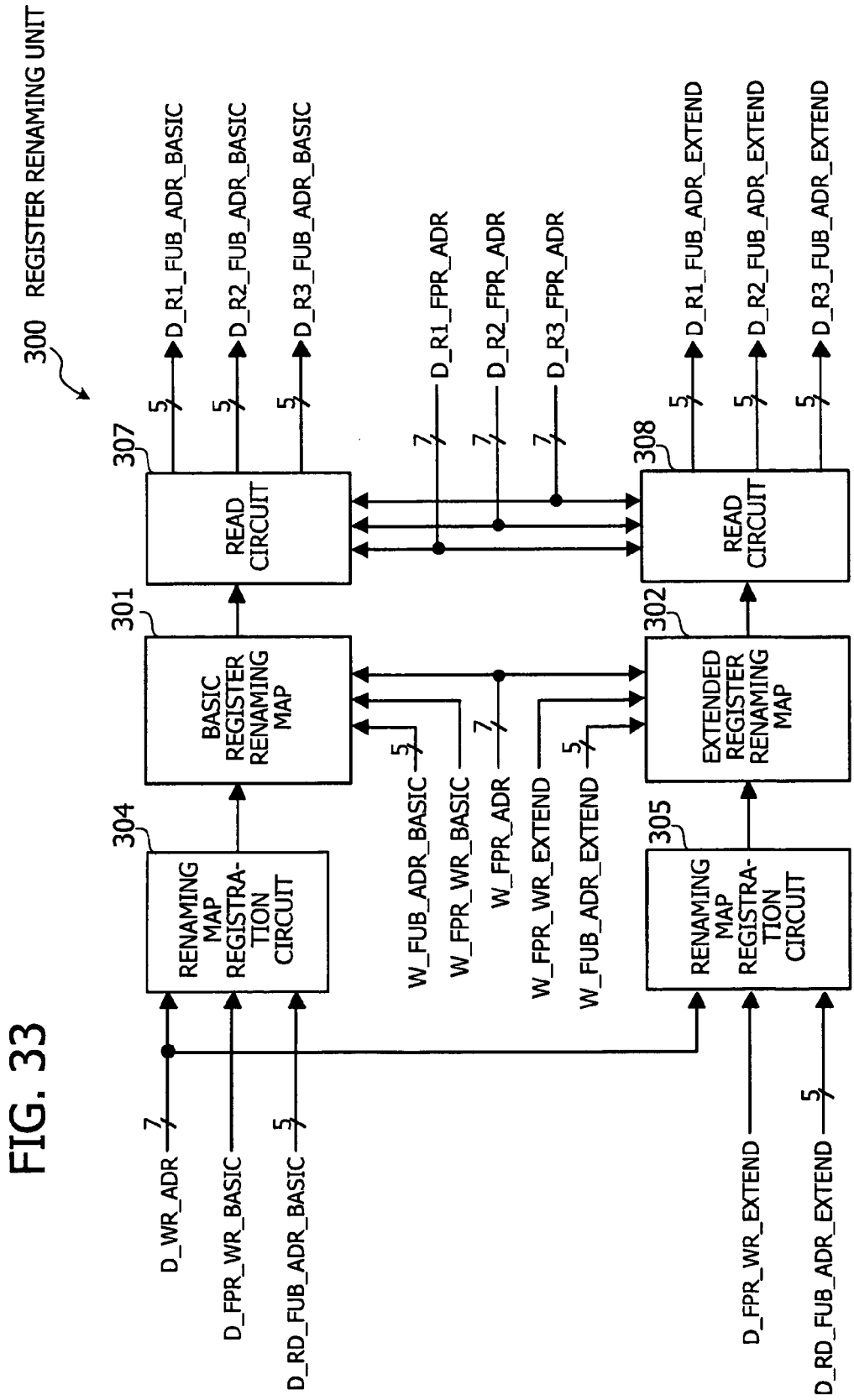
FIG. 33 illustrates input and output signals of a register renaming unit which relate to execution of floating-point computation instructions.

FIG. 33 illustrates input and output signals of the register renaming unit 300 which relate to execution of floating-point computation instructions. Note that FIG. 33 focuses on the control signals and address signals used to execute floating-point computation instructions, thus omitting some other existing signals.

The renaming map registration circuits 304 and 305 receive the same signals as in the case of floating-point load instructions. Accordingly, the addresses of renaming registers associated with the destination of computation results are recorded in at least one of the basic register renaming map 301 and extended register renaming map 302 in the same way as described for floating-point load instructions.

When executing a floating-point computation instruction, the instruction decoder 280 supplies the read circuits 307 and 308 with three address signals D_R1_FPR_ADR, D_R2_FPR_ADR, and D_R3_FPR_ADR. Address signal D_R1_FPR_ADR specifies a basic register 601. When a renaming register is assigned to that basic register 601, one read circuit 307 reads out the address of this renaming register from the basic register renaming map 301 and supplies the address to the RSF 360 as an address signal D_R1_FUB_ADR_BASIC. Similarly, address signal D_R2_FPR_ADR specifies another basic register 601. When a renaming register is assigned to that basic register 601, the read circuit 307 reads out the address of this renaming register from the basic register renaming map 301 and supplies the address to the RSF 360 as another address signal D_R2_FUB_ADR_BASIC. Further, address signal D_R3_FPR_ADR specifies yet another basic register 601. When a renaming register is assigned to that basic register 601, the read circuit 307 reads out the address of this renaming register from the basic register renaming map 301 and supplies the address to the RSF 360 as yet another address signal D_R3_FUB_ADR_BASIC.

Address signal D_R1_FPR_ADR also specifies an extended register 602. When a renaming register may be assigned to that extended register 602, the other read circuit 308 reads out the address of this renaming register from the extended register renaming map 302 and supplies the address to the RSF 360 as an address signal D_R1_FUB_ADR_EXTEND. Similarly, address signal D_R2_FPR_ADR specifies another extended register 602. When a renaming register is assigned to that extended register 602, the read circuit 308 reads out the address of this renaming register from the extended register renaming map 302 and supplies the address to the RSF 360 as another address signal D_R2_FUB_ADR_EXTEND. Further, address signal D_R3_FPR_ADR specifies yet another extended register 602. When a renaming register is assigned to that extended register 602, the read circuit 308 reads out the address of this renaming register from the extended register renaming map 302 and supplies the address to the RSF 360 as yet another address signal D_R3_FUB_ADR_EXTEND.

Those entries of the basic register renaming map 301 and extended register renaming map 302 will be nullified in W cycle according to address signals from the CSE 900, in the same way as described for floating-point load instructions.

Figure 34:
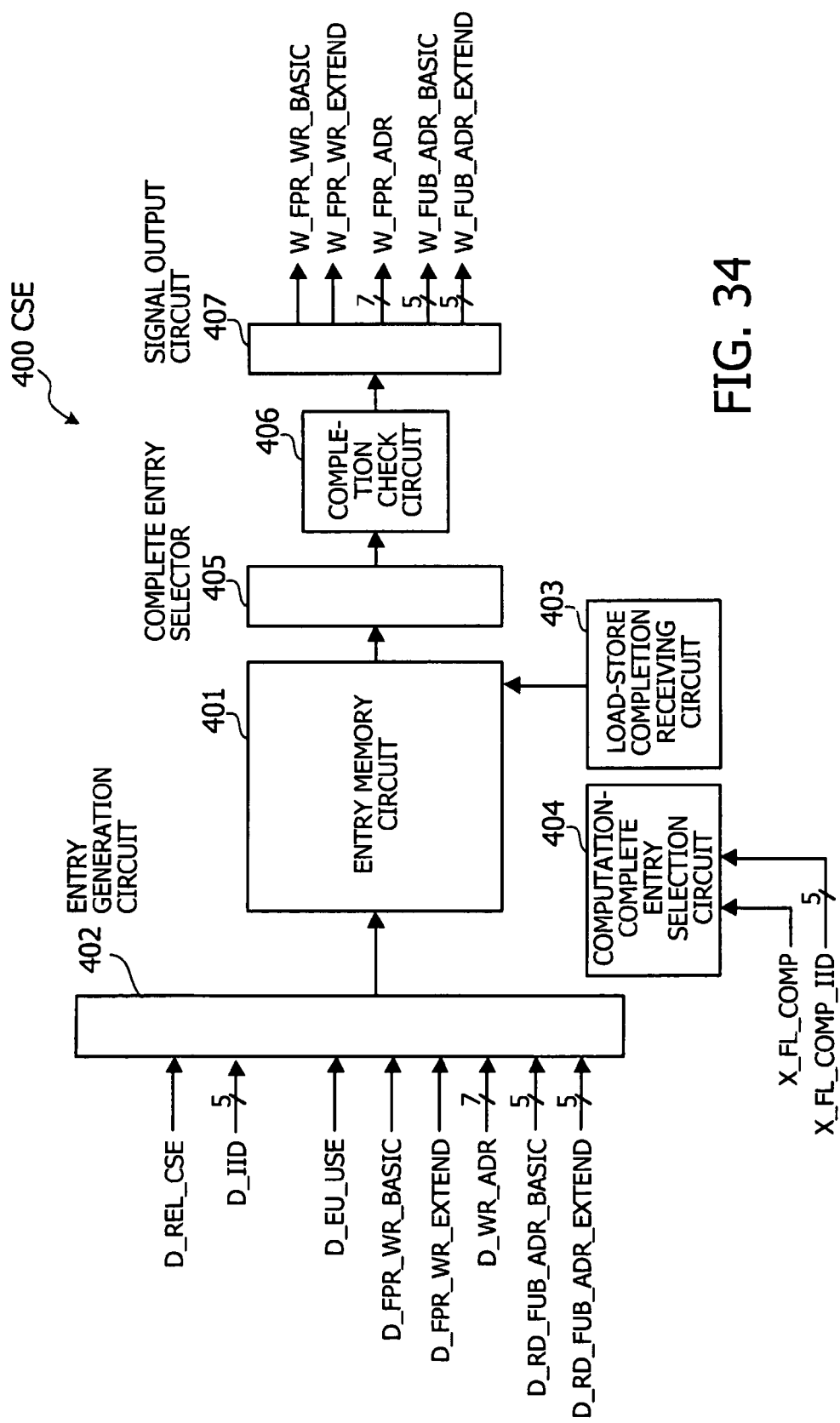
FIG. 34 illustrates input and output signals of the CSE which relate to execution of floating-point computation instructions.

FIG. 34 illustrates input and output signals of the CSE 400 which relate to execution of floating-point computation instructions. Note that FIG. 34 focuses on the control signals and address signals used to execute floating-point computation instructions, thus omitting some other existing signals.

When executing a floating-point computation instruction, the entry generation circuit 402 receives a control signal D_EU_USE from the instruction decoder 280, instead of control signals D_FP_USE_BASIC and D_FP_USE_EXTEND. This means that the CSE 400 checks the execution of computation, not individually, but collectively for the basic computation unit 521 and extended computation unit 522, unlike the case of floating-point load instruction.

In X6 cycle, the computation-complete entry selection circuit 404 receives a control signal X_FL_COMP and an entry identification signal X_FL_COMP_IID from the SIMD computation unit 520. The received control signal X_FL_COMP indicates that the SIMD computation unit 520 has finished floating-point computation, and the received entry identification signal X_FL_COMP_IID identifies the relevant entry of the CSE 400.

In C cycle, the complete entry selector 405 reads out the topmost entry in the entry memory circuit 401 and subjects it to the completion check circuit 406. Based on the content of this entry, the completion check circuit 406 determines whether the processing operation for the entry has been completed. When executing a floating-point computation instruction, the completion check circuit 406 makes this determination based on the above control signal X_FL_COMP, as well as on the signals of an entry identified by the above entry identification signal X_FL_COMP_IID.

The signal output circuit 407 produces output signals and distributes them to their respective destinations, in the same way as it does for floating-point load instructions.

Figure 35:
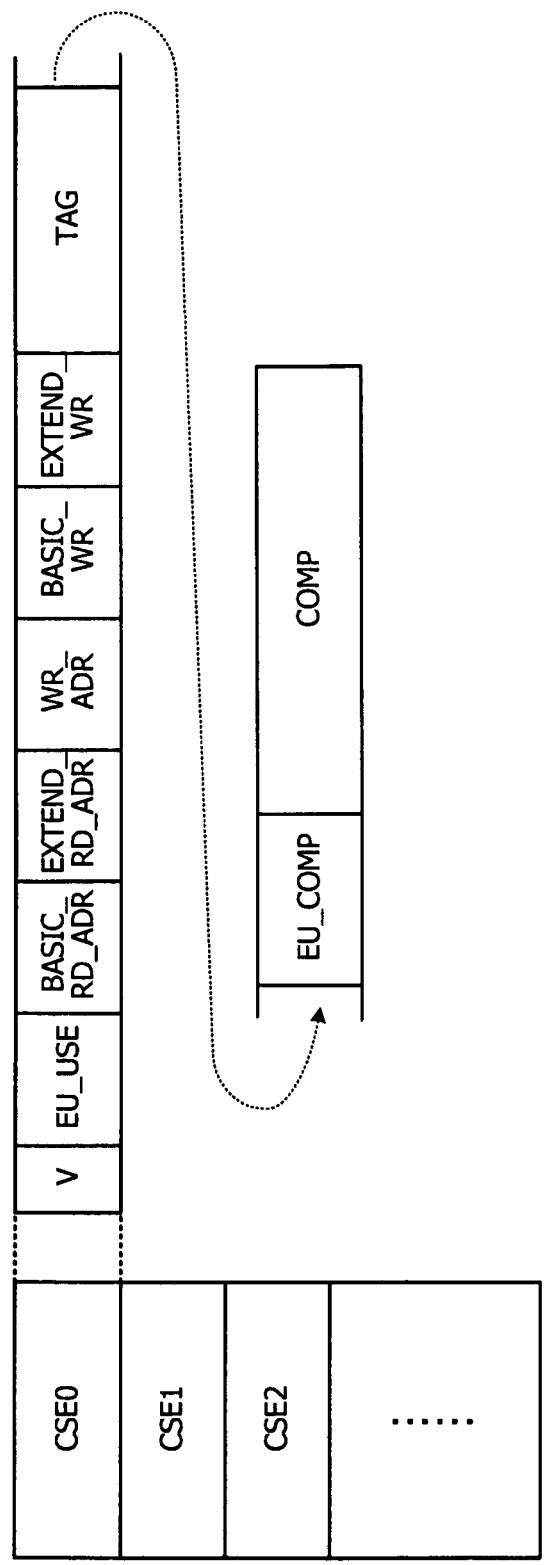
FIG. 35 illustrates details of a CSE entry for a floating-point computation instruction.

FIG. 35 illustrates details of a CSE entry for a floating-point computation instruction. The CSE 400 contains entries for floating-point computation instructions, which are different from those for floating-point load instructions in a few points. One difference is that a signal EU_USE is recorded in place of the signals BASIC_FP_USE and EXTEND_FP_USE. Another difference is that a signal EU_COMP is recorded in place of the signal BASIC_FP_COMP and EXTEND_FP_COMP.

Signal EU_USE indicates whether at least one of the basic computation unit 521 and extended computation unit 522 is used. This signal EU_USE is turned on according to control signal D_EU_USE from the instruction decoder 280. Signal EU_COMP indicates whether the computation has been completed. The CSE 400 turns on this signal EU_COMP in X6 cycle, in response to control signal X_FL_COMP from the SIMD computation unit 520.

Figure 36:
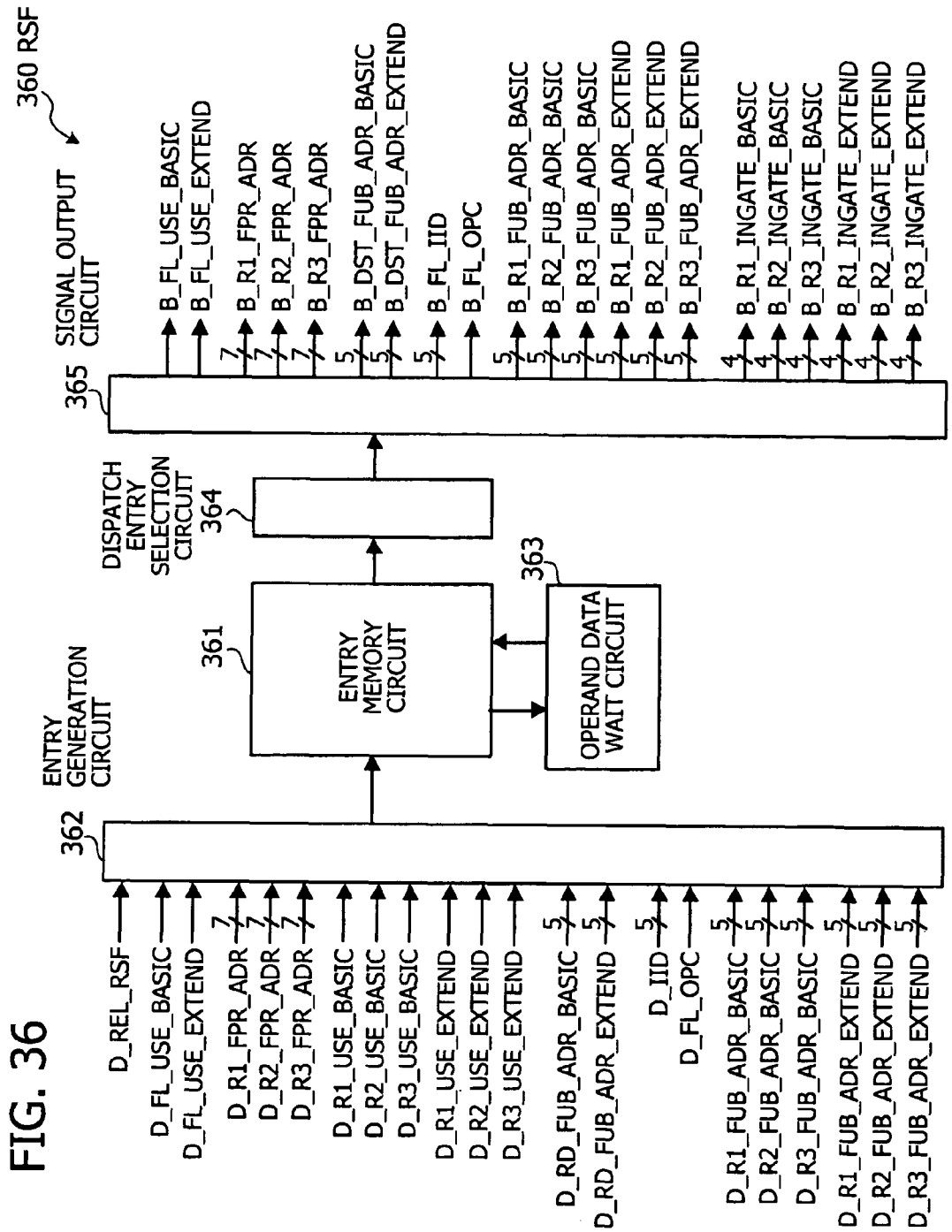
FIG. 36 illustrates input and output signals of RSF which relate to execution of floating-point computation instructions.

FIG. 36 illustrates input and output signals of the RSF 360 which relate to execution of floating-point computation instructions. Note that FIG. 36 focuses on the control signals and address signals used to execute floating-point computation instructions, thus omitting some other existing signals.

The illustrated RSF 360 includes an entry memory circuit 361, an entry generation circuit 362, an operand data wait circuit 363, a dispatch entry selection circuit 364, and a signal output circuit 365.

In D cycle, the entry generation circuit 362 receives control signal D_REL_RSF from the instruction decoder 280, produces an entry corresponding to entry identification signal D_IID supplied from the instruction decoder 280, and places the produced entry in the entry memory circuit 361. That is, the entry generation circuit 362 produces an entry for a floating-point computation instruction in response to control signal D_REL_RSF.

During this entry generation, the entry generation circuit 362 receives three address signals D_R1_FPR_ADR, D_R2_FPR_ADR, and D_R3_FPR_ADR from the instruction decoder 280. In the case where the decoded instruction is an SIMD computation instruction, the entry generation circuit 362 further receives control signals D_R1_USE_BASIC, D_R2_USE_BASIC, D_R3_USE_BASIC, D_R1_USE_EXTEND, D_R2_USE_EXTEND, and D_R3_USE_EXTEND from the instruction decoder 280. In the case of a non-SIMD computation instruction, the instruction decoder 280 turns on only one of the control signals D_R1_USE_BASIC and D_R1_USE_EXTEND. This is also true to another pair of control signals D_R2_USE_BASIC and D_R2_USE_EXTEND, as well as to yet another pair of control signals D_R3_USE_BASIC and D_R3_USE_EXTEND.

In the case where the decoded instruction is an SIMD computation instruction, the entry generation circuit 362 receives control signals D_FL_USE_BASIC and D_FL_USE_EXTEND, together with address signals D_RD_FUB_ADR_BASIC and D_RD_FUB_ADR_EXTEND, from the instruction decoder 280. In the case where the decoded instruction is a non-SIMD computation instruction, only one of the two control signals D_FL_USE_BASIC and D_FL_USE_EXTEND is in the ON state, and only one of the two address signals D_RD_FUB_ADR_BASIC and D_RD_FUB_ADR_EXTEND carries a valid address value.

The source register specified by a source operand of the instruction may be renamed. In that case, the basic register renaming map 301 supplies the entry generation circuit 362 with one of three address signals D_R1_FUB_ADR_BASIC, D_R2_FUB_ADR_BASIC, and D_R3_FUB_ADR_BASIC that corresponds to the renamed source register. Also, in that case, the extended register renaming map 302 supplies the entry generation circuit 362 with one of three address signals D_R1_FUB_ADR_EXTEND, D_R2_FUB_ADR_EXTEND, and D_R3_FUB_ADR_EXTEND that corresponds to the renamed source register.

In the case where the decoded instruction is an SIMD computation instruction, address signal D_R1_FUB_ADR_BASIC is provided together with address signal D_R1_FUB_ADR_EXTEND. This is also true to another pair of address signals D_R2_FUB_ADR_BASIC and D_R2_FUB_ADR_EXTEND, and to yet another pair of address signals D_R3_FUB_ADR_BASIC and D_R3_FUB_ADR_EXTEND. In the case where the decoded instruction is a non-SIMD instruction, only one of two address signals D_R1_FUB_ADR_BASIC and D_R1_FUB_ADR_EXTEND is provided. This is also true to another pair of address signals D_R2_FUB_ADR_BASIC and D_R2_FUB_ADR_EXTEND, and yet another pair of address signals D_R3_FUB_ADR_BASIC, D_R3_FUB_ADR_EXTEND.

The operand data wait circuit 363 waits for operand data to be ready in the registers specified by, for example, address signals D_R1_FUB_ADR_BASIC, D_R1_FUB_ADR_EXTEND, D_R2_FUB_ADR_BASIC, D_R2_FUB_ADR_EXTEND, D_R3_FUB_ADR_BASIC, and D_R3_FUB_ADR_EXTEND. The entry memory circuit 361 stores a plurality of entries, and some of those entries may have necessary data ready in relevant registers in relevant registers. The dispatch entry selection circuit 364 selects the oldest one of those data-ready entries and sends it to the signal output circuit 365.

When an RSF entry corresponding to the current floating-point computation instruction is received from the dispatch entry selection circuit 364, the signal output circuit 365 outputs the following signals for that RSF entry: control signals B_FL_USE_BASIC, B_FL_USE_EXTEND, B_FL_OPC; selection signals B_R1_INGATE_BASIC, B_R2_INGATE_BASIC, B_R3_INGATE_BASIC, B_R1_INGATE_EXTEND, B_R2_INGATE_EXTEND, and B_R3_INGATE_EXTEND; an entry identification signal B_FL_IID; and address signals B_R1_FPR_ADR, B_R2_FPR_ADR, B_R3_FPR_ADR, B_R1_FUB_ADR_BASIC, B_R2_FUB_ADR_BASIC, B_R3_FUB_ADR_BASIC, B_R1_FUB_ADR_EXTEND, B_R2_FUB_ADR_EXTEND, and B_R3_FUB_EXTEND.

Figure 37:
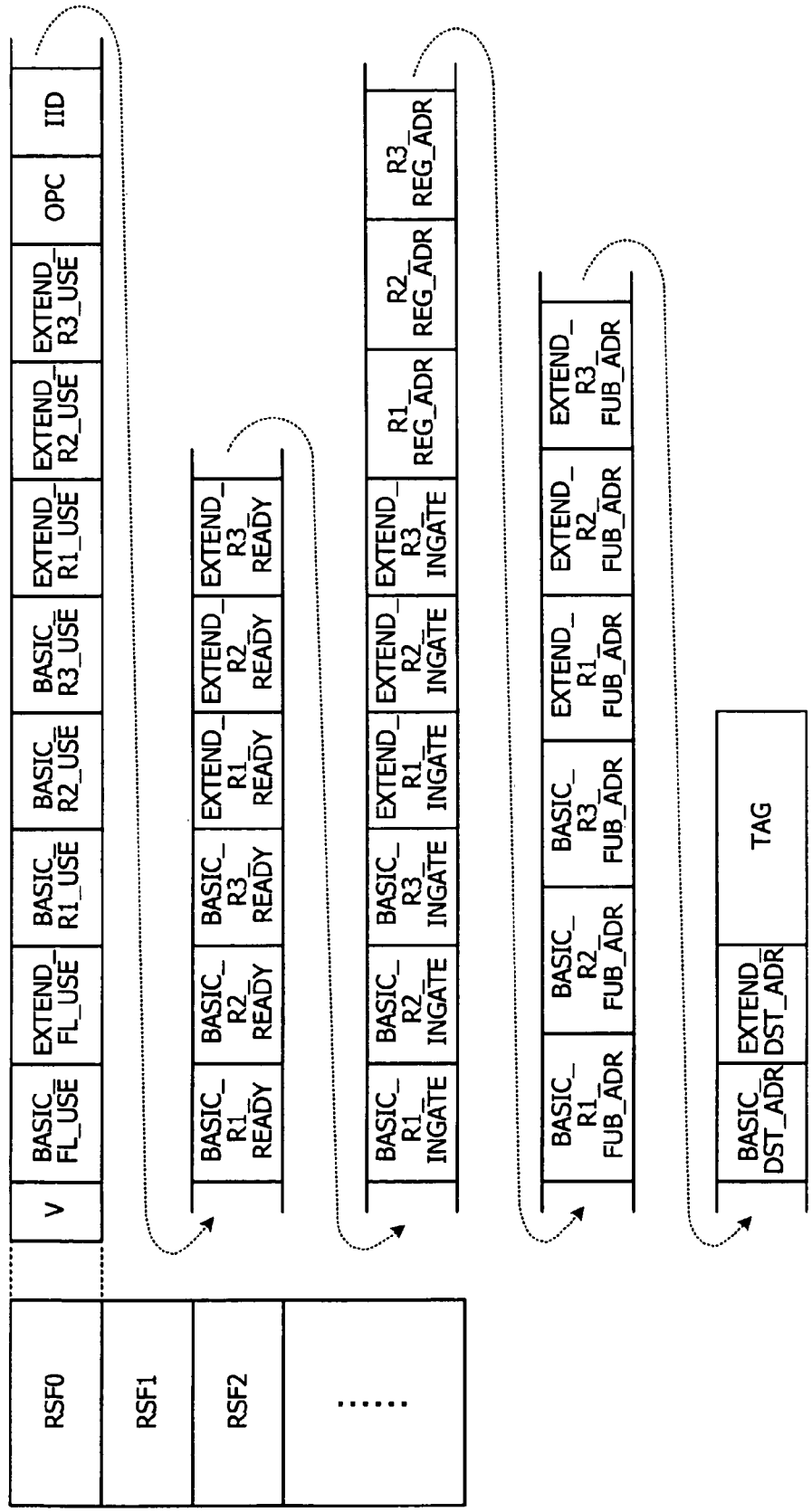
FIG. 37 illustrates details of an RSF entry for a floating-point computation instruction.

FIG. 37 illustrates details of RSF entries for floating-point computation instructions. A registered entry of the RSF 360 contains the following signals and address values in the case where the entry is of a floating-point load instruction. Signal V indicates whether the entry is valid. Signals BASIC_FL_USE and EXTEND_FL_USE indicate whether to use a basic computation unit 521 and whether to use an extended computation unit 522, respectively. Specifically, the value of signal BASIC_FL_USE derives from control signal D_FL_USE_BASIC from the instruction decoder 280. Also, the value of signal EXTEND_FL_USE derives from control signal D_FL_USE_EXTEND from the instruction decoder 280. Accordingly, both signals BASIC_FL_USE and EXTEND_FL_USE are in the ON state when executing an SIMD computation instruction, whereas either BASIC_FL_USE or EXTEND_FL_USE is in the ON state when executing a non-SIMD computation instruction. When dispatching its entry, the RSF 360 outputs those signal values of BASIC_FL_USE and EXTEND_FL_USE as control signals B_FL_USE_BASIC and B_FL_USE_EXTEND, respectively.

Signals BASIC_R1_USE, BASIC_R2_USE, and BASIC_R3_USE respectively indicate whether the first, second, and third source operands specify a register on the basic bus. Signals EXTEND_R1_USE, EXTEND_R2_USE, and EXTEND_R3_USE respectively indicate whether the first, second, and third source operands specify a register on the extended bus. These signals BASIC_R1_USE, BASIC_R2_USE, BASIC_R3_USE, EXTEND_R1_USE, EXTEND_R2_USE, and EXTEND_R3_USE respectively take the same values as control signals D_R1_USE_BASIC, D_R2_USE_BASIC, D_R3_USE_BASIC, D_R1_USE_EXTEND, D_R2_USE_EXTEND, and D_R3_USE_EXTEND received from the instruction decoder 280.

Signal OPC indicates the type of computation and has a value deriving from control signal D_FL_OPC provided by the instruction decoder 280. When dispatching an entry, the RSF 360 outputs the value of this signal OPC as a control signal B_FL_OPC. Signal IID specifies a corresponding entry of the CSE 400 and has a value deriving from the entry identification signal D_IID provided by the instruction decoder 280. When dispatching an entry, the RSF 360 outputs the value of this signal IID as an entry identification signal B_FL_IID.

Signals BASIC_R1_READY, BASIC_R2_READY, and BASIC_R3_READY indicate whether operand data is ready in their corresponding registers on the basic bus. The values of these signals are given by the operand data wait circuit 363. Similarly, signals EXTEND_R1_READY, EXTEND_R2_READY, and EXTEND_R3_READY indicate whether operand data is ready in their corresponding registers on the extended bus. The values of these signals are given by the operand data wait circuit 363.

Signals BASIC_R1_INGATE, BASIC_R2_INGATE, BASIC_R3_INGATE are selection signals for the basic operand data selector 531 to select one of data inputs supplied thereto. The values of these signals are given by the operand data wait circuit 363 when signal BASIC_FL_USE is in the ON state. Similarly, signals EXTEND_R1_INGATE, EXTEND_R2_INGATE, EXTEND_R3_INGATE are selection signals for the extended operand data selector 532 to select one of data inputs supplied thereto. The values of these signals are given by the operand data wait circuit 363 when signal EXTEND_FL_USE is in the ON state.

According to the present embodiment, the basic operand data selector 531 and extended operand data selector 532 are each configured to select one of eight inputs, as will be described later. It is also noted that the basic operand data selector 531 and extended operand data selector 532 may select none of their inputs in some situation. Accordingly, their selection signals BASIC_R1_INGATE, BASIC_R2_INGATE, BASIC_R3_INGATE, EXTEND_R1_INGATE, EXTEND_R2_INGATE, and EXTEND_R3_INGATE are 4-bit signals. When dispatching its entry, the RSF 360 outputs the values of those signals BASIC_R1_INGATE, BASIC_R2_INGATE, BASIC_R3_INGATE, EXTEND_R1_INGATE, EXTEND_R2_INGATE, and EXTEND_R3_INGATE as selection signals B_R1_INGATE_BASIC, B_R2_INGATE_BASIC, B_R3_INGATE_BASIC, B_R1_INGATE_EXTEND, B_R2_INGATE_EXTEND, and B_R3_INGATE_EXTEND, respectively.

Addresses R1_REG_ADR, R2_REG_ADR, and R3_REG_ADR each indicate the read address of operand data in the floating-point SIMD registers 600, the values of which are respectively derived from control signals D_R1_FPR_ADR, D_R2_FPR_ADR, and D_R3_FPR_ADR produced by the instruction decoder 280. When dispatching its entry, the RSF 360 outputs the values of these addresses R1_REG_ADR, R2_REG_ADR, and R3_REG_ADR as control signals B_R1_FPR_ADR, B_R2_FPR_ADR, and B_R3_FPR_ADR, respectively.

Addresses BASIC_R1_FUB_ADR, BASIC_R2_FUB_ADR, and BASIC_R3_FUB_ADR each indicate the read address of operand data in the basic renaming registers 561, the values of which are respectively derived from address signals D_R1_FUB_ADR_BASIC, D_R2_FUB_ADR_BASIC, and D_R3_FUB_ADR_BASIC of the basic register renaming map 301. When dispatching its entry, the RSF 360 outputs the values of these addresses BASIC_R1_FUB_ADR, BASIC_R2_FUB_ADR, and BASIC_R3_FUB_ADR as address signals B_R1_FUB_ADR_BASIC, B_R2_FUB_ADR_BASIC, and B_R3_FUB_ADR_BASIC, respectively.

Addresses EXTEND_R1_FUB_ADR, EXTEND_R2_FUB_ADR, EXTEND_R3_FUB_ADR each indicate the read address of operand data in the extended renaming register 562, the values of which are respectively derived from address signals D_R1_FUB_ADR_EXTEND, D_R2_FUB_ADR_EXTEND, and D_R3_FUB_ADR_EXTEND of the extended register renaming map 302. When dispatching its entry, the RSF 360 outputs the values of these addresses EXTEND_R1_FUB_ADR, EXTEND_R2_FUB_ADR, and EXTEND_R3_FUB_ADR as address signals B_R1_FUB_ADR_EXTEND, B_R2_FUB_ADR_EXTEND, and B_R3_FUB_ADR_EXTEND, respectively.

An entry may be dispatched with the signals BASIC_R1_USE, BASIC_R2_USE, and BASIC_R3_USE in the ON state. When, in this case, address BASIC_R1_FUB_ADR has been given a specific value, the RSF 360 outputs its corresponding address signal B_R1_FUB_ADR_BASIC, instead of B_R1_FPR_ADR. Similarly, when addresses BASIC_R2_FUB_ADR and BASIC_R3_FUB_ADR have been given a specific value, the RSF 360 outputs their corresponding address signals B_R2_FUB_ADR_BASIC and B_R3_FUB_ADR_BASIC, instead of B_R2_FPR_ADR and B_R3_FPR_ADR. When, in turn, address BASIC_R1_FUB_ADR has no assigned values, the RSF 360 outputs address signal B_R1_FPR_ADR, instead of B_R1_FUB_ADR_BASIC. Similarly, when addresses BASIC_R2_FUB_ADR and BASIC_R3_FUB_ADR have no assigned values, the RSF 360 outputs address signals B_R2_FPR_ADR B_R3_FPR_ADR, instead of B_R2_FUB_ADR_BASIC and B_R3_FUB_ADR_BASIC.

An entry may be dispatched with the signals EXTEND_R1_USE, EXTEND_R2_USE, and EXTEND_R3_USE in the ON state. When, in this case, address EXTEND_R1_FUB_ADR has been given a specific value, the RSF 360 outputs its corresponding address signal B_R1_FUB_ADR_EXTEND, instead of B_R1_FPR_ADR. Similarly, when addresses EXTEND_R2_FUB_ADR and EXTEND_R3_FUB_ADR have been given a specific value, the RSF 360 outputs their corresponding address signals B_R2_FUB_ADR_EXTEND and B_R3_FUB_ADR_EXTEND, instead of B_R2_FPR_ADR and B_R3_FPR_ADR. When, in turn, address EXTEND_R1_FUB_ADR has no assigned values, the RSF 360 outputs address signal B_R1_FPR_ADR, instead of B_R1_FUB_ADR_EXTEND. Similarly, when addresses EXTEND_R2_FUB_ADR and EXTEND_R3_FUB_ADR have no assigned values, the RSF 360 outputs address signals B_R2_FPR_ADR B_R3_FPR_ADR, instead of B_R2_FUB_ADR_EXTEND and B_R3_FUB_ADR_EXTEND.

Addresses BASIC_DST_ADR and EXTEND_DST_ADR are write addresses respectively indicating for which basic renaming register 561, and for which extended renaming register 562, the computation results are destined. Specifically, the values of BASIC_DST_ADR and EXTEND_DST_ADR are respectively derived from address signals D_RD_FUB_ADR_BASIC and D_RD_FUB_ADR_EXTEND in D cycle. When dispatching its entry, the RSF 360 outputs the values of these addresses BASIC_DST_ADR and EXTEND_DST_ADR as address signals B_DST_FUB_ADR_BASIC and B_DST_FUB_ADR_EXTEND, respectively.

TAG field is a field containing other tag data.

Figure 38:
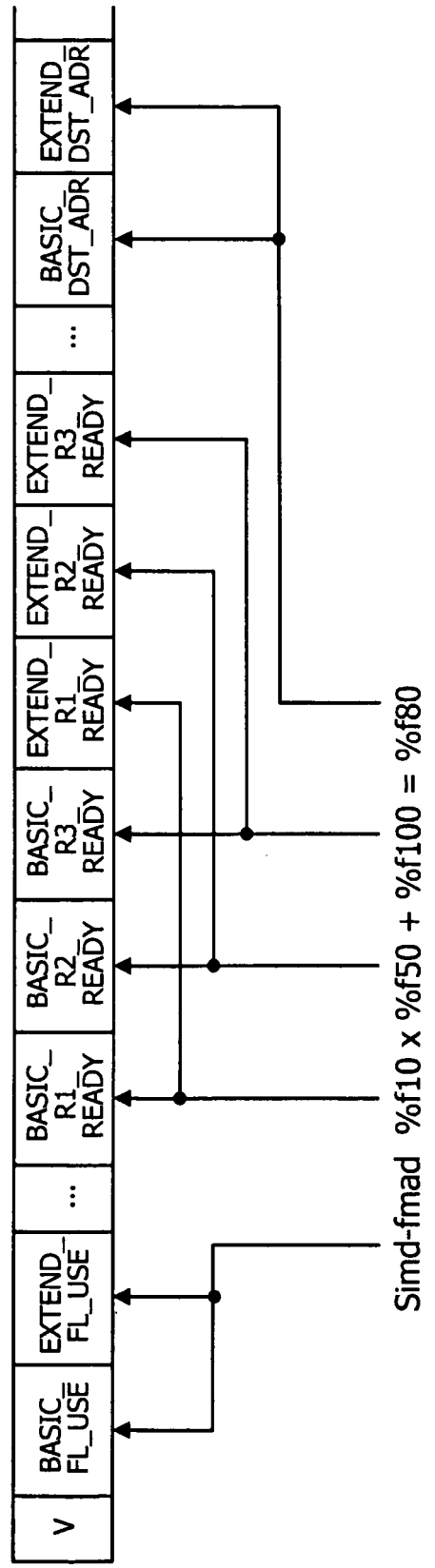
FIG. 38 illustrates details of an RSF entry for an SIMD computation instruction.

FIG. 38 illustrates an RSF entry for an SIMD computation instruction. According to the present embodiment, a floating-point computation instruction has three source operands to specify source registers. This means that the computation is performed on data values of six source registers in the case of an SIMD computation instruction.

An entry of an SIMD computation instruction allows the RSF 360 to manage operand data of such six source registers. Specifically, the six source registers specified by three source operands may be those on the basic bus (i.e., basic registers 601, basic renaming registers 561, basic result register 523, and basic load register 462) or those on the extended bus (i.e., extended registers 602, extended renaming registers 562, extended result register 524, and extended load register 463). Signals BASIC_R1_READY, BASIC_R2_READY, and BASIC_R3_READY in the entry indicate whether the former group of registers are ready to provide operand data. Signals EXTEND_R1_READY, EXTEND_R2_READY, and EXTEND_R3_READY in the entry indicate whether the latter group of registers are ready to provide operand data. The values of those signals BASIC_R1_READY, BASIC_R2_READY, BASIC_R3_READY, EXTEND_R1_READY, EXTEND_R2_READY, and EXTEND_R3_READY are given by the operand data wait circuit 363. The dispatch entry selection circuit 364 does not dispatch the entry until all those signals BASIC_R1_READY, BASIC_R2_READY, BASIC_R3_READY, EXTEND_R1_READY, EXTEND_R2_READY, and EXTEND_R3_READY are turned on.

Figure 39:
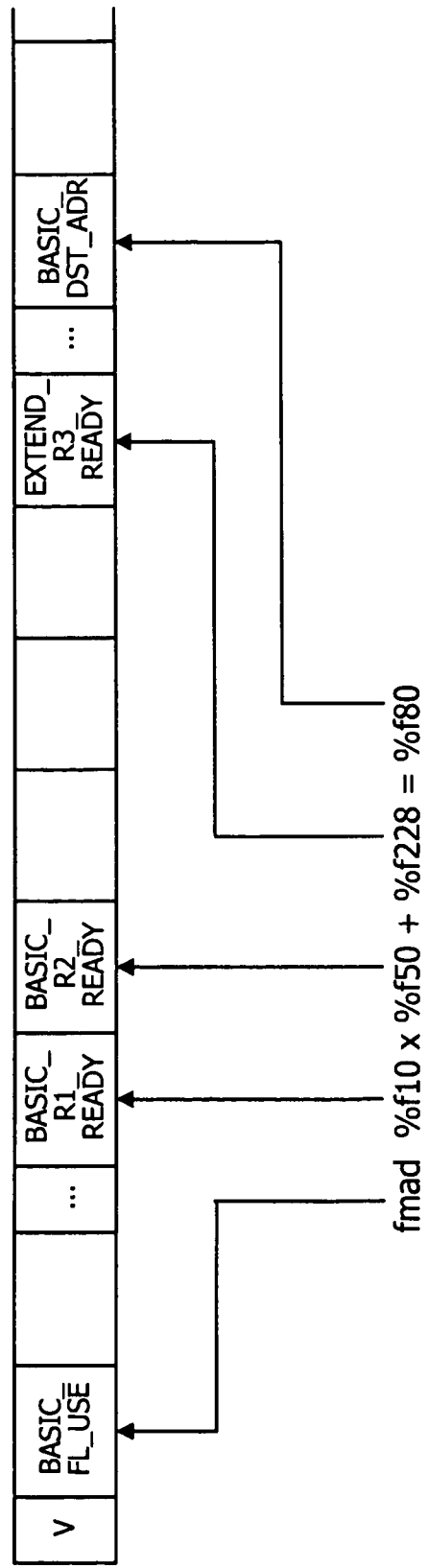
FIG. 39 illustrates an RSF entry for a non-SIMD computation instruction.

FIG. 39 illustrates an RSF entry for a non-SIMD computation instruction. A non-SIMD computation instruction is executed with data values read out of three source registers. The RSF entry of this instruction thus has either signal BASIC_R1_USE or signal EXTEND_R1_USE in the ON state. In the case where signal BASIC_R1_USE is in the ON state and signal EXTEND_R1_USE is in the OFF state, signal EXTEND_R1_READY is set to the ON state when the entry is created. Signal BASIC_R1_READY, on the other hand, is not turned on until the corresponding data is ready to read. In the case where signal BASIC_R1_USE is in the OFF state and signal EXTEND_R1_USE is in the ON state, signal BASIC_R1_READY is set to the ON state when the entry is created. Signal EXTEND_R1_READY, on the other hand, is not turned on until the corresponding data is ready to read.

The above-described relationships of signals BASIC_R1_USE and EXTEND_R1_USE with signals BASIC_R1_READY and EXTEND_R1_READY also apply to signals BASIC_R2_USE and EXTEND_R2_USE with signals BASIC_R2_READY and EXTEND_R2_READY, as well as to signals BASIC_R3_USE and EXTEND_R3_USE with signals BASIC_R3_READY and EXTEND_R3_READY. Accordingly, the dispatch entry selection circuit 364 will not dispatch entries until their signals BASIC_R1_READY, BASIC_R2_READY, BASIC_R3_READY, EXTEND_R1_READY, EXTEND_R2_READY, and EXTEND_R3_READY are all in the ON state, as in the case of SIMD computation instructions.

In the specific example of FIG. 39, the instruction code specifies two registers on the basic bus as its first and second source registers, and a register on the extended bus as its third source register. Since non-SIMD computation instructions are allowed to specify a source register address in the range of 0 to 255, all registers on the basic bus and extended bus are available for use as a source register of operand data.

FIGS. 40 to 44 are flowcharts illustrating how the operand data wait circuit 363 updates entries. Note that FIGS. 40 to 44 focus on the first operand of instructions for illustrative purposes.

Figure 40:
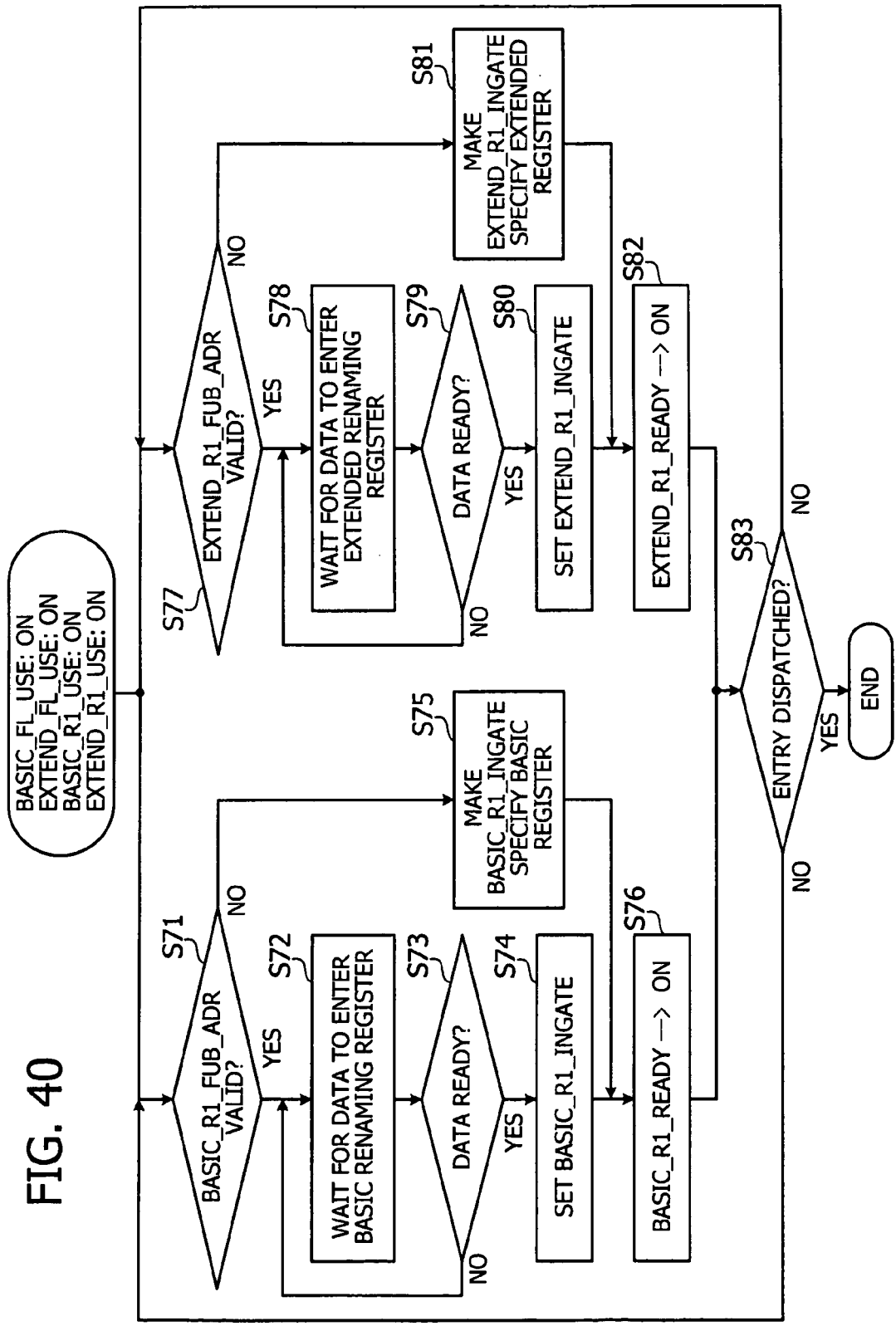
FIG. 40 is a first flowchart illustrating how an operand data wait circuit updates entries.

Referring to FIG. 40, the operand data wait circuit 363 executes the following process when all the signals BASIC_FL_USE, EXTEND_FL_USE, BASIC_R1_USE, and EXTEND_R1_USE in an entry of the RSF 360 are in the ON state.

(Step S71) The operand data wait circuit 363 determines whether the value of address BASIC_R1_FUB_ADR is valid. If the entry contains a valid value for that address, the process advances to step S72. If not, the process branches to step S75.

(Step S72) The operand data wait circuit 363 waits for operand data to enter the basic renaming register 561 specified by the address BASIC_R1_FUB_ADR.

(Step S73) The operand data wait circuit 363 determines whether the operand data is ready in the basic renaming register 561 specified by the address BASIC_R1_FUB_ADR. The operand data wait circuit 363 waits until the operand data is ready, and then proceeds to step S74.

(Step S74) The operand data wait circuit 363 determines which of the basic renaming registers 561, basic result register 523, and basic load register 462 the basic operand data selector 531 should select as a source of operand data. The operand data wait circuit 363 now assigns a specific value to signal BASIC_R1_INGATE in the entry so as to make it specify the determined source register. The process then advances to step S76.

(Step S75) The operand data wait circuit 363 determines that the basic operand data selector 531 is to select a basic register 601 as the source of operand data. The operand data wait circuit 363 now assigns a specific value to signal BASIC_R1_INGATE in the entry so as to make it specify the determined source register. The process then advances to step S76.

(Step S76) The operand data wait circuit 363 turns on signal BASIC_R1_READY in the entry, thereby indicating that the necessary operand data is available.

(Step S77) The operand data wait circuit 363 determines whether the value of address EXTEND_R1_FUB_ADR is valid. If the entry contains a valid value for that address, the process advances to step S78. If not, the process branches to step S81.

(Step S78) The operand data wait circuit 363 waits for operand data to enter the extended renaming register 562 specified by the address EXTEND_R1_FUB_ADR.

(Step S79) The operand data wait circuit 363 determines whether operand data is ready in the extended renaming register 562 at the address EXTEND_R1_FUB_ADR. The operand data wait circuit 363 waits until the operand data is ready, and then proceeds to step S80.

(Step S80) The operand data wait circuit 363 determines which of the extended renaming registers 562, extended result register 524, and extended load register 463 the extended operand data selector 532 should select as a source of operand data. The operand data wait circuit 363 now assigns a specific value to signal EXTEND_R1_INGATE in the entry so as to make it specify the determined source register. The process then advances to step S82.

(Step S81) The operand data wait circuit 363 determines that the extended operand data selector 532 is to select an extended register 602 as the source of operand data. The operand data wait circuit 363 now assigns a specific value to signal EXTEND_R1_INGATE in the entry so as to make it specify the determined source register. The process then advances to step S82.

(Step S82) The operand data wait circuit 363 turns on signal EXTEND_R1_READY in the entry, thereby indicating that the necessary operand data is available.

(Step S83) In the case where the dispatch entry selection circuit 364 has dispatched the above entry, the process is terminated because there is no more need to wait for operand data. In the case where the above entry is still pending, the operand data wait circuit 363 executes steps S71 to S82 again.

The above-described process waits for multiple operand data values individually. This means that the operand data values may become available, not necessarily at the same time, but in different cycles. It is noted, however, the dispatch entry selection circuit 364 is configured not to dispatch its entry until all the relevant operand data values are ready. This control of the dispatch entry selection circuit 364 enables the operand data wait circuit 363 to wait for multiple operand data individually.

Figure 41:
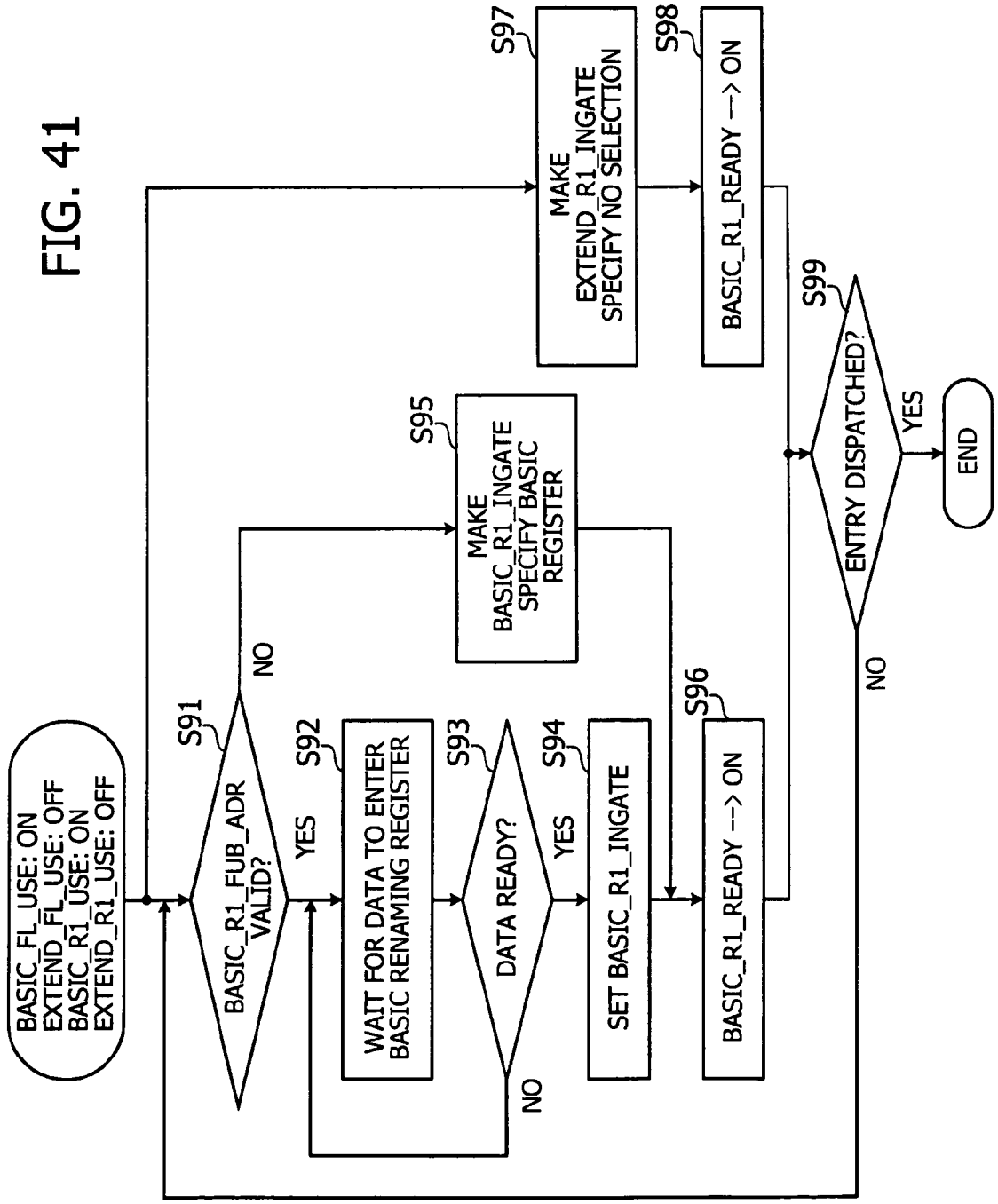
FIG. 41 is a second flowchart illustrating how the operand data wait circuit updates entries.

Referring now to FIG. 41, the operand data wait circuit 363 executes the following process when signals BASIC_FL_USE and BASIC_R1_USE are in the ON state, while signals EXTEND_FL_USE and EXTEND_R1_USE are in the OFF state, in an entry of the RSF 360.

(Step S91) The operand data wait circuit 363 determines whether the value of address BASIC_R1_FUB_ADR is valid. If the entry contains a valid value for that address, the process advances to step S92. If not, the process branches to step S95.

(Step S92) The operand data wait circuit 363 waits for operand data to enter the basic renaming register 561 specified by the address BASIC_R1_FUB_ADR.

(Step S93) The operand data wait circuit 363 determines whether the operand data is ready in the basic renaming register 561 specified by the address BASIC_R1_FUB_ADR. The operand data wait circuit 363 waits until the operand data is ready, and then proceeds to step S94.

(Step S94) The operand data wait circuit 363 determines which of the basic renaming registers 561, basic result register 523, and basic load register 462 the basic operand data selector 531 should select as a source of operand data. The operand data wait circuit 363 now assigns a specific value to signal BASIC_R1_INGATE in the entry so as to make it specify the determined source register. The process then advances to step S96.

(Step S95) The operand data wait circuit 363 determines that the basic operand data selector 531 is to select a basic register 601 as the source of operand data. The operand data wait circuit 363 now assigns a specific value to signal BASIC_R1_INGATE in the entry so as to make it specify the determined source register. The process then advances to step S96.

(Step S96) The operand data wait circuit 363 turns on signal BASIC_R1_READY in the entry, thereby indicating that the necessary operand data is available.

(Step S97) The operand data wait circuit 363 now assigns a specific value to the signal EXTEND_R1_INGATE in the entry, so that the extended operand data selector 532 will select none of its signal inputs.

(Step S98) The operand data wait circuit 363 turns on signal EXTEND_R1_READY in the entry.

(Step S99) In the case where the dispatch entry selection circuit 364 has dispatched the above entry, the process is terminated because there is no more need to wait for operand data. In the case where the above entry is still pending, the operand data wait circuit 363 executes steps S91 to S96 again.

Figure 42:
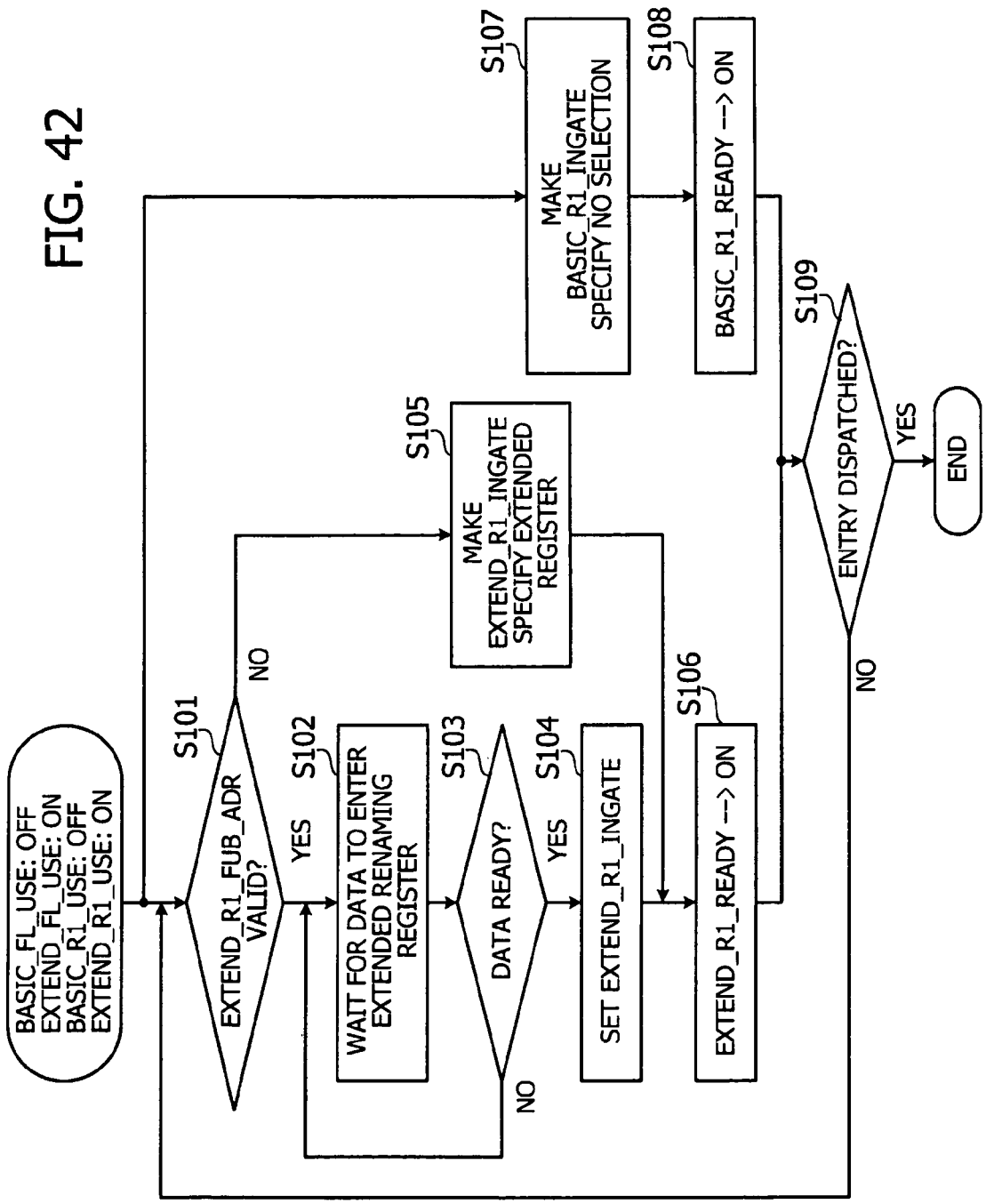
FIG. 42 is a third flowchart illustrating how the operand data wait circuit updates entries.

Referring now to FIG. 42, the operand data wait circuit 363 executes the following process when signals BASIC_FL_USE and BASIC_R1_USE are in the OFF state, while signals EXTEND_FL_USE and EXTEND_R1_USE are in the ON state, in an entry of the RSF 360.

(Step S101) The operand data wait circuit 363 determines whether the value of address EXTEND_R1_FUB_ADR is valid. If the entry contains a valid value for that address, the process advances to step S102. If not, the process branches to step S105.

(Step S102) The operand data wait circuit 363 waits for operand data to enter the extended renaming register 562 specified by the address EXTEND_R1_FUB_ADR.

(Step S103) The operand data wait circuit 363 determines whether operand data is ready in the extended renaming register 562 at the address EXTEND_R1_FUB_ADR. The operand data wait circuit 363 waits until the operand data is ready, and then proceeds to step S104.

(Step S104) The operand data wait circuit 363 determines which of the extended renaming registers 562, extended result register 524, and extended load register 463 the extended operand data selector 532 should select as a source of operand data. The operand data wait circuit 363 now assigns a specific value to signal EXTEND_R1_INGATE in the entry so as to make it specify the determined source register. The process then advances to step S106.

(Step S105) The operand data wait circuit 363 determines that the extended operand data selector 532 is to select an extended register 602 as the source of operand data. The operand data wait circuit 363 now assigns a specific value to signal EXTEND_R1_INGATE in the entry so as to make it specify the determined source register. The process then advances to step S106.

(Step S106) The operand data wait circuit 363 turns on signal EXTEND_R1_READY in the entry, thereby indicating that the necessary operand data is available.

(Step S107) The operand data wait circuit 363 now assigns a specific value to signal BASIC_R1_INGATE in the entry, so that the basic operand data selector 531 will select none of its signal inputs.

(Step S108) The operand data wait circuit 363 turns on signal BASIC_R1_READY in the entry.

(Step S109) In the case where the dispatch entry selection circuit 364 has dispatched the above entry, the process is terminated because there is no more need to wait for operand data. In the case where the above entry is still pending, the operand data wait circuit 363 executes steps S101 to S106 again.

Figure 43:
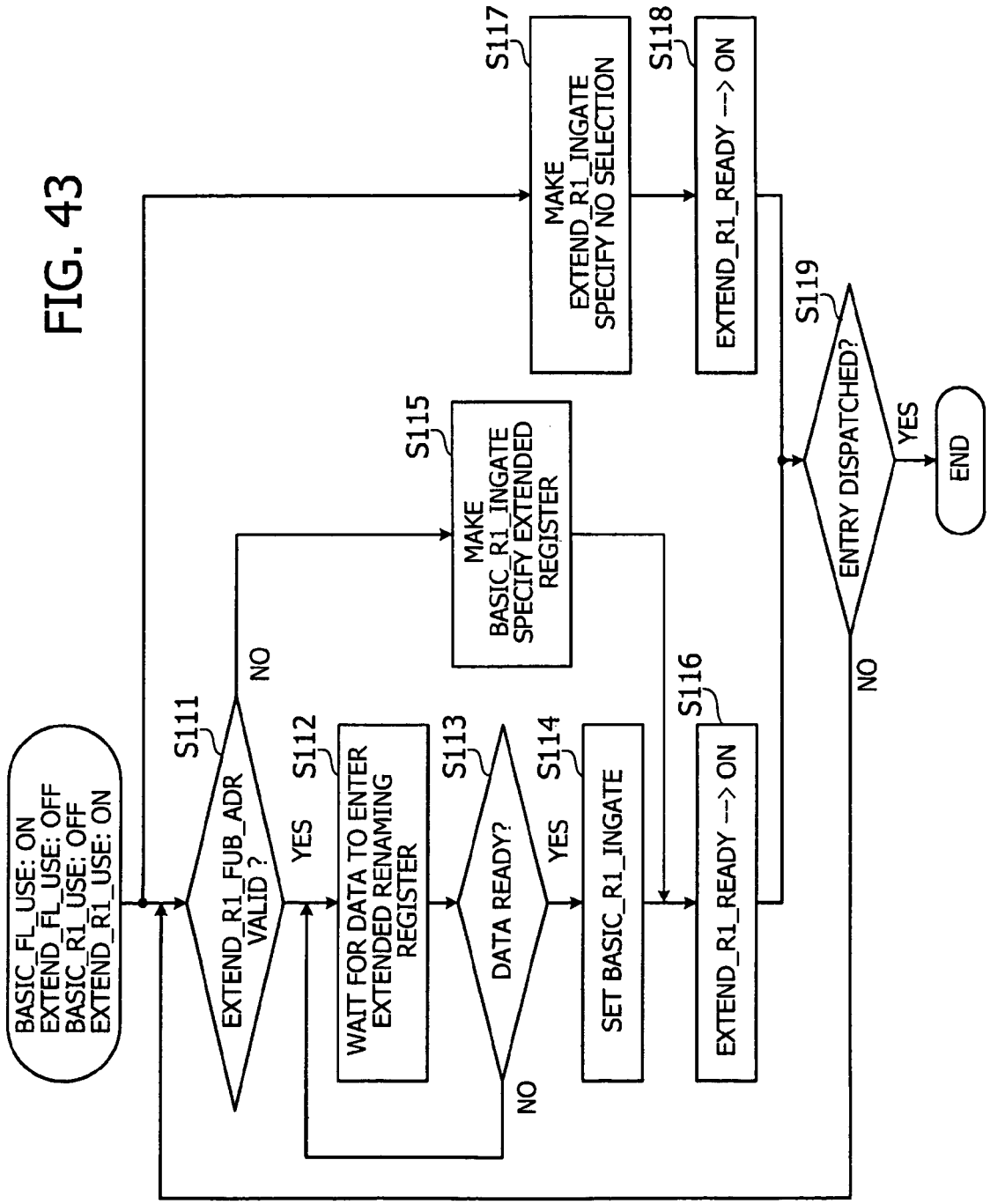
FIG. 43 is a fourth flowchart illustrating how the operand data wait circuit updates entries.

Referring now to FIG. 43, the operand data wait circuit 363 executes the following process when signals BASIC_FL_USE and EXTEND_R1_USE are in the ON state, while signals EXTEND_FL_USE and BASIC_R1_USE are in the OFF state, in an entry of the RSF 360.

(Step S111) The operand data wait circuit 363 determines whether the value of address EXTEND_R1_FUB_ADR is valid. If the entry contains a valid value for that address, the process advances to step S112. If not, the process branches to step S115.

(Step S112) The operand data wait circuit 363 waits for operand data to enter the extended renaming register 562 specified by the address EXTEND_R1_FUB_ADR.

(Step S113) The operand data wait circuit 363 determines whether operand data is ready in the extended renaming register 562 at the address EXTEND_R1_FUB_ADR. The operand data wait circuit 363 waits until the operand data is ready, and then proceeds to step S114.

(Step S114) The operand data wait circuit 363 determines which of the extended renaming registers 562, extended result register 524, and extended load register 463 the basic operand data selector 531 should select as a source of operand data. The operand data wait circuit 363 now assigns a specific value to signal BASIC_R1_INGATE in the entry so as to make it specify the determined source register. The process then advances to step S116.

(Step S115) The operand data wait circuit 363 determines that the basic operand data selector 531 is to select an extended register 602 as the source of operand data. The operand data wait circuit 363 now assigns a specific value to signal BASIC_R1_INGATE in the entry so as to make it specify the determined source register. The process then advances to step S116.

(Step S116) The operand data wait circuit 363 turns on signal EXTEND_R1_READY in the entry, thereby indicating that the necessary operand data is available.

(Step S117) The operand data wait circuit 363 now assigns a specific value to the signal EXTEND_R1_INGATE in the entry, so that the extended operand data selector 532 will select none of its signal inputs.

(Step S118) The operand data wait circuit 363 turns on signal BASIC_R1_READY in the entry.

(Step S119) In the case where the dispatch entry selection circuit 364 has dispatched the above entry, the process is terminated because there is no more need to wait for operand data. In the case where the above entry is still pending, the operand data wait circuit 363 executes steps S111 to S116 again.

Figure 44:
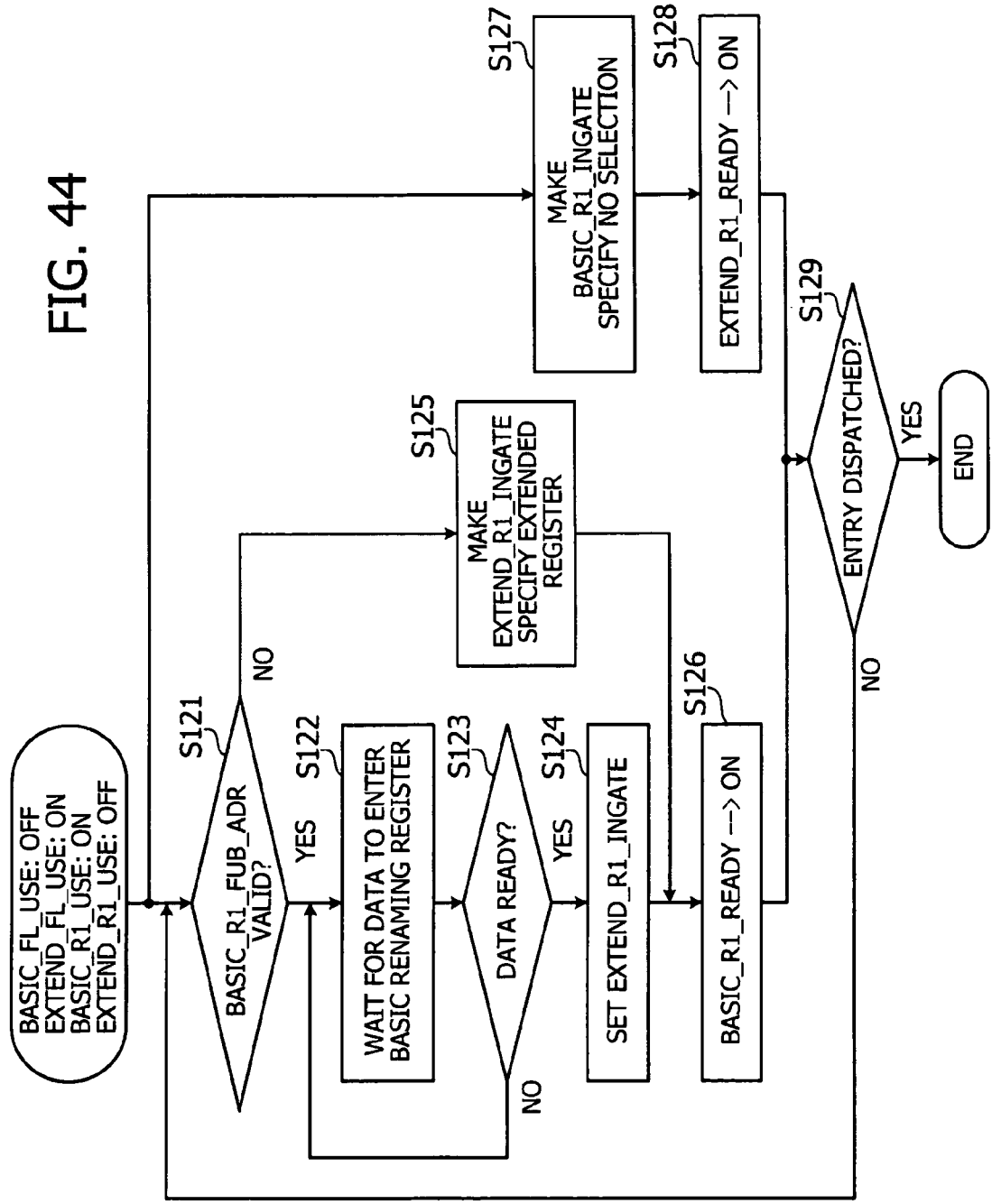
FIG. 44 is a fifth flowchart illustrating how the operand data wait circuit updates entries.

Referring now to FIG. 44, the operand data wait circuit 363 executes the following process when signals EXTEND_FL_USE and BASIC_R1_USE are in the ON state, while signals BASIC_FL_USE and EXTEND_R1_USE are in the OFF state, in an entry of the RSF 360.

(Step S121) The operand data wait circuit 363 determines whether the value of address BASIC_R1_FUB_ADR is valid. If the entry contains a valid value for that address, the process advances to step S122. If not, the process branches to step S125.

(Step S122) The operand data wait circuit 363 waits for operand data to enter the basic renaming register 561 specified by the address BASIC_R1_FUB_ADR.

(Step S123) The operand data wait circuit 363 determines whether the operand data is ready in the basic renaming register 561 specified by the address BASIC_R1_FUB_ADR. The operand data wait circuit 363 waits until the operand data is ready, and then proceeds to step S124.

(Step S124) The operand data wait circuit 363 determines which of the basic renaming registers 561, basic result register 523, and basic load register 462 the extended operand data selector 532 should select as a source of operand data. The operand data wait circuit 363 now assigns a specific value to signal EXTEND_R1_INGATE in the entry so as to make it specify the determined source register. The process then advances to step S126.

(Step S125) The operand data wait circuit 363 determines that the extended operand data selector 532 is to select an extended register 602 as the source of operand data. The operand data wait circuit 363 now assigns a specific value to signal EXTEND_R1_INGATE in the entry so as to make it specify the determined source register. The process then advances to step S126.

(Step S126) The operand data wait circuit 363 turns on signal BASIC_R1_READY in the entry, thereby indicating that the necessary operand data is available.

(Step S127) The operand data wait circuit 363 now assigns a specific value to signal BASIC_R1_INGATE in the entry, so that the basic operand data selector 531 will select none of its signal inputs.

(Step S128) The operand data wait circuit 363 turns on signal EXTEND_R1_READY in the entry.

(Step S129) In the case where the dispatch entry selection circuit 364 has dispatched the above entry, the process is terminated because there is no more need to wait for operand data. In the case where the above entry is still pending, the operand data wait circuit 363 executes steps S121 to S126 again.

While FIGS. 40 to 44 illustrate how the first source operand is processed, the second and third operands can also be handled through a similar procedure of waiting necessary data and updating entries. For example, the second source operand can be handled similarly with the foregoing steps of FIGS. 40 to 44, but using control signals BASIC_R2_USE, EXTEND_R2_USE, BASIC_R2_READY, EXTEND_R2_READY, BASIC_R2_INGATE, and EXTEND_R2_INGATE and addresses BASIC_R2_FUB_ADR, EXTEND_R2_FUB_ADR, and R2_REG_ADR in place of the control signals BASIC_R1_USE, EXTEND_R1_USE, BASIC_R1_READY, EXTEND_R1_READY, BASIC_R1_INGATE, and EXTEND_R1_INGATE and the addresses BASIC_R1_FUB_ADR, EXTEND_R1_FUB_ADR, and R1_REG_ADR, respectively. Likewise, the third source operand can be handled similarly with the foregoing steps of FIGS. 40 to 44, but using control signals BASIC_R3_USE, EXTEND_R3_USE, BASIC_R3_READY, EXTEND_R3_READY, BASIC_R3_INGATE, and EXTEND_R3_INGATE and addresses BASIC_R3_FUB_ADR, EXTEND_R3_FUB_ADR, and R3_REG_ADR in place of the control signals BASIC_R1_USE, EXTEND_R1_USE, BASIC_R1_READY, EXTEND_R1_READY, BASIC_R1_INGATE, and EXTEND_R1_INGATE and the addresses BASIC_R1_FUB_ADR, EXTEND_R1_FUB_and R1_REG_ADR, respectively.

Figure 45:
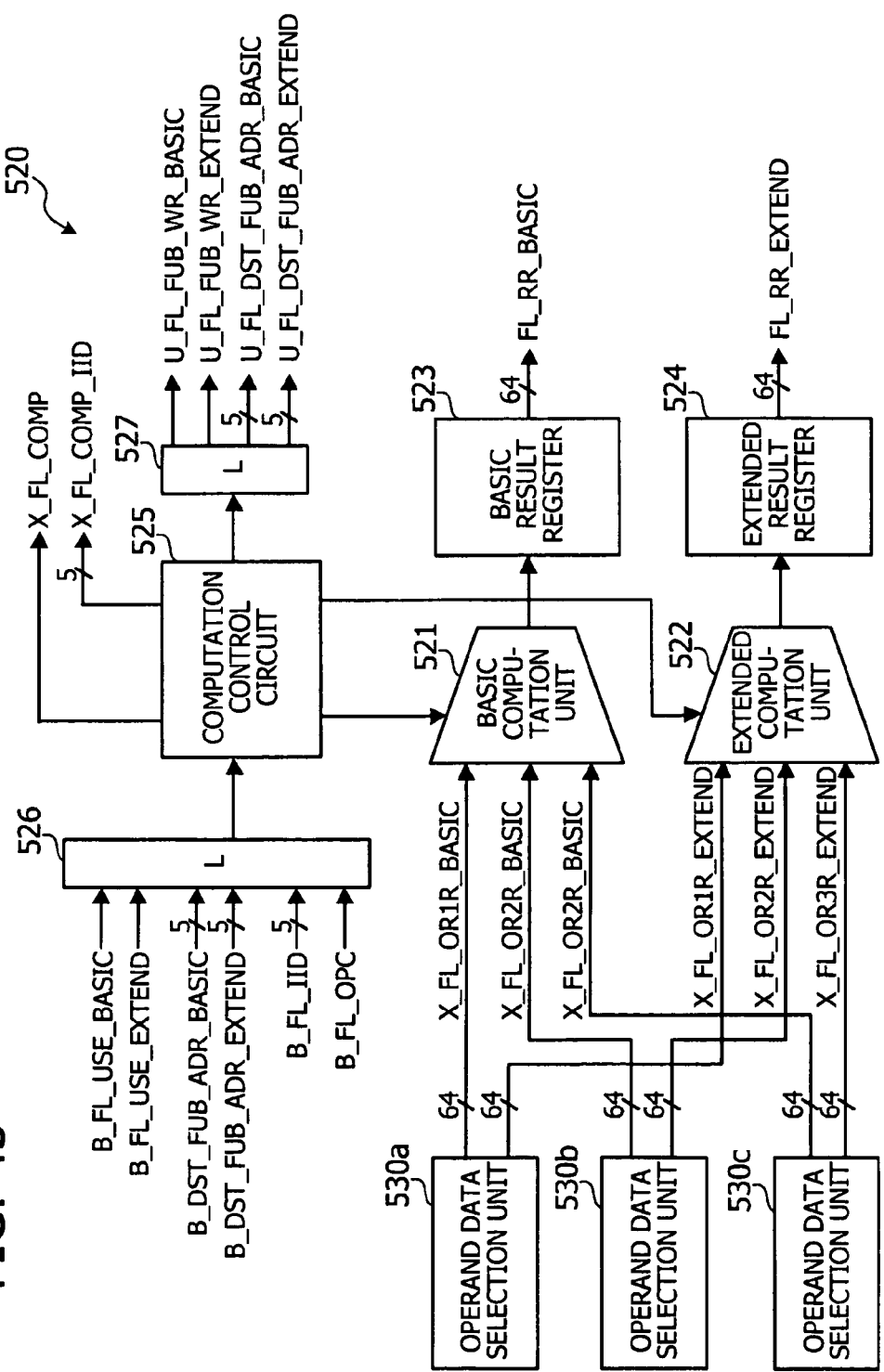
FIG. 45 illustrates input and output signals of an SIMD computation unit which relate to execution of floating-point computation instructions.

FIG. 45 illustrates input and output signals of the SIMD computation unit 520 which relate to execution of floating-point computation instructions. Note that FIG. 45 focuses on the control signals and address signals used to execute floating-point computation instructions, thus omitting some other existing signals.

The illustrated SIMD computation unit 520 includes a basic computation unit 521, an extended computation unit 522, a basic result register 523, an extended result register 524, a computation control circuit 525, and latch circuits 526 and 527. Coupled to the basic computation unit 521 and extended computation unit 522 are three operand data selection units 530a to 530c.

One operand data selection unit 530a reads operand data corresponding to the first source operand in a given instruction code, out of a register(s) specified by the RSF 360, and supplies the data to the basic computation unit 521 and extended computation unit 522. Another operand data selection unit 530b reads operand data corresponding to the second source operand in the given instruction code, out of a register(s) specified by the RSF 360, and supplies the data to the basic computation unit 521 and extended computation unit 522. Yet another operand data selection unit 530c reads operand data corresponding to the third source operand in the given instruction code, out of a register(s) specified by the RSF 360, and supplies the data to the basic computation unit 521 and extended computation unit 522.

In the case of an SIMD computation instruction, the above operand data selection units 530a to 530c supply operand data to both the basic computation unit 521 and extended computation unit 522. In the case of a non-SIMD computation instruction, the operand data selection units 530a to 530c supply operand data to either the basic computation unit 521 or the extended computation unit 522, as necessary for the specified computation.

Figure 46:
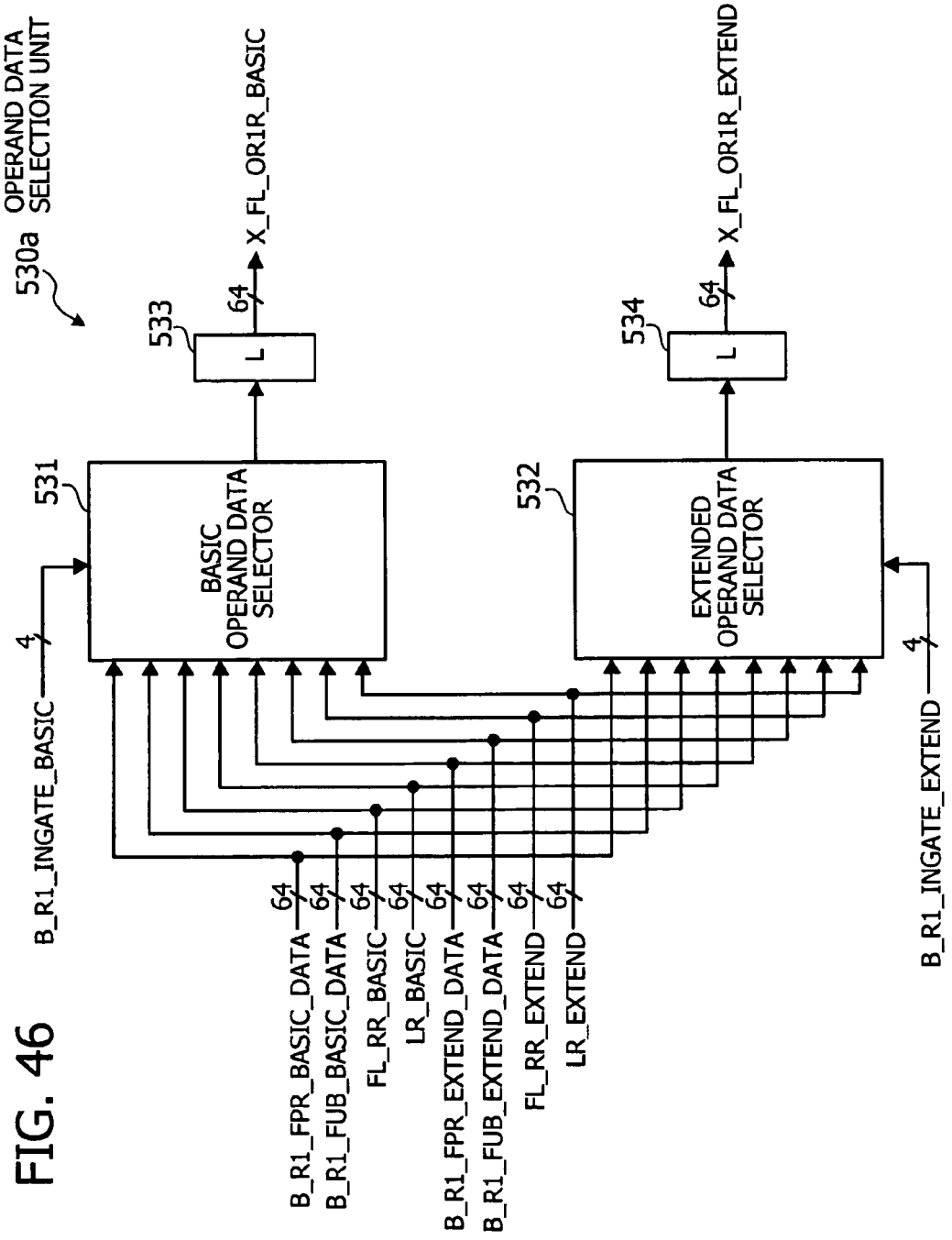
FIG. 46 illustrates an internal structure of an operand data selection unit.

FIG. 46 illustrates an internal structure of an operand data selection unit. While FIG. 46 only illustrates one operand data selection unit 530a, the illustrated structure applies to all the three operand data selection units 530a to 530c.

The operand data selection unit 530a is formed from a basic operand data selector 531, an extended operand data selector 532, and latch circuits 533 and 534. Both the basic operand data selector 531 and extended operand data selector 532 receive data signals B_R1_FPR_BASIC_DATA, B_R1_FUB_BASIC_DATA, FL_RR_BASIC, LR_BASIC, B_R1_FPR_EXTEND_DATA, B_R1_FUB_EXTEND_DATA, FL_RR_EXTEND, and LR_EXTEND.

Data signals B_R1_FPR_BASIC_DATA, B_R1_FUB_BASIC_DATA, FL_RR_BASIC, and LR_BASIC are supplied from a basic register 601, basic renaming register 561, basic result register 523, and basic load register 462, respectively. Those data signals represent the data values available in their corresponding registers at the moment when an entry is dispatched by the RSF 360.

Data signals B_R1_FPR_EXTEND_DATA, B_R1_FUB_EXTEND_DATA, FL_RR_EXTEND, and LR_EXTEND are supplied from an extended register 602, extended renaming register 562, extended result register 524, and extended load register 463, respectively. Those data signals represent the data values available in their corresponding registers at the moment when an entry is dispatched by the RSF 360.

In B cycle, the operand data selection unit 530a receives all the above-noted data signals. According to selection signal B_R1_INGATE_BASIC from the RSF 360, the basic operand data selector 531 selects one of its input data signals and sends the selected data signal to a latch circuit 533. This output data signal is supplied as a data signal X_FL_OR1R_BASIC to the basic computation unit 521 via the latch circuit 533. Similarly, according to another selection signal B_R1_INGATE_EXTEND from the RSF 360, the extended operand data selector 532 selects one of its input data signals and sends the selected data signal to a latch circuit 534. This output data signal is supplied as a data signal X_FL_OR1R_EXTEND to the extended computation unit 522 via the latch circuit 534.

The above description also applies to another operand data selection unit 530b, except for the following things. The basic operand data selector 531 and extended operand data selector 532 receive data signals B_R2_FPR_BASIC_DATA, B_R2_FUB_BASIC_DATA, B_R2_FPR_EXTEND_DATA, and B_R2_FUB_EXTEND_DATA, in place of the foregoing data signals B_R1_FPR_BASIC_DATA, B_R1_FUB_BASIC_DATA, B_R1_FPR_EXTEND_DATA, and B_R1_FUB_EXTEND_DATA. The selection of data signals is specified, not by the selection signals B_R1_INGATE_BASIC and B_R1_INGATE_EXTEND, but by selection signals B_R2_INGATE_BASIC and B_R2_INGATE_EXTEND. The selected data signals are supplied respectively to the basic computation unit 521 and extended computation unit 522 as X_FL_OR2R_BASIC and X_FL_OR2R_EXTEND.

The above description also applies to yet another operand data selection unit 530c, except for the following things. The basic operand data selector 531 and extended operand data selector 532 receive data signals B_R3_FPR_BASIC_DATA, B_R3_FUB_BASIC_DATA, B_R3_FPR_EXTEND_DATA, and B_R3_FUB_EXTEND_DATA, in place of the foregoing data signals B_R1_FPR_BASIC_DATA, B_R1_FUB_BASIC_DATA, B_R1_FPR_EXTEND_DATA, and B_R1_FUB_EXTEND_DATA. The selection of data signals is specified, not by the selection signals B_R1_INGATE_BASIC and B_R1_INGATE_EXTEND, but by selection signals B_R3_INGATE_BASIC and B_R3_INGATE_EXTEND. The selected data signals are supplied respectively to the basic computation unit 521 and extended computation unit 522 as X_FL_OR3R_BASIC and X_FL_OR3R_EXTEND.

Referring again to FIG. 45, the description of the SIMD computation unit 520 continues. In X1 cycle, the latch circuit 526 receives control signals B_FL_USE_BASIC, B_FL_USE_EXTEND, and B_FL_OPC, address signals B_DST_FUB_ADR_BASIC and B_DST_FUB_ADR_EXTEND, and an entry identification signal B_FL_IID from the RSF 360. These signals are then forwarded from the latch circuit 526 to the computation control circuit 525.

Control signal B_FL_OPC enables the computation control circuit 525 to determine what type of computation the SIMD computation unit 520 is supposed to execute. When control signal B_FL_USE_BASIC is in the ON state, the computation control circuit 525 requests the basic computation unit 521 to execute the determined computation. When control signal B_FL_USE_EXTEND is in the ON state, the computation control circuit 525 requests the extended computation unit 522 to execute the determined computation.

After issuing the above execution requests, the computation control circuit 525 sends a control signal X_FL_COMP and an entry identification signal X_FL_COMP_IID to the CSE 400 in X6 cycle, thus indicating completion of the computation. Here the entry identification signal X_FL_COMP_IID has the same value as the entry identification signal B_FL_IID received from the RSF 360.

The basic computation unit 521 executes a computational operation using the operand data supplied from the operand data selection units 530a to 530c, according to the request from the computation control circuit 525. The computation result is sent to the basic result register 523 in X6 cycle. The extended computation unit 522 also executes a computational operation using the operand data supplied from the operand data selection units 530a to 530c, according to the request from the computation control circuit 525. The computation result is sent to the extended result register 524 in X6 cycle. In U cycle, the computation results in the basic result register 523 and extended result register 524 are sent to the floating-point renaming registers 560 as data signals FL_RR_BASIC and FL_RR_EXTEND, respectively.

In the case of an SIMD computation instruction, both the basic computation unit 521 and extended computation unit 522 execute their computation simultaneously, and the two computation results are saved in the basic result register 523 and extended result register 524 simultaneously. In the case of a non-SIMD computation instruction, the computation takes place in either the basic computation unit 521 or the extended computation unit 522, and the computation result is saved in either the basic result register 523 or the extended result register 524.

The computation control circuit 525 outputs control signals U_FL_FUB_WR_BASIC and U_FL_FUB_WR_EXTEND, address signals U_FL_DST_FUB_ADR_BASIC and U_FL_DST_FUB_ADR_EXTEND in X6 cycle, which respectively derive from the control signals B_FL_USE_BASIC and B_FL_USE_EXTEND and the address signals B_DST_FUB_ADR_BASIC and B_DST_FUB_ADR_EXTEND received from the RSF 360. The latch circuit 527 adjusts the output timing of those control signals and address signals, so as to synchronize them with the data output of the basic result register 523 and extended result register 524. These control signals and address signals are then supplied to the floating-point renaming registers 560.

Figure 47:
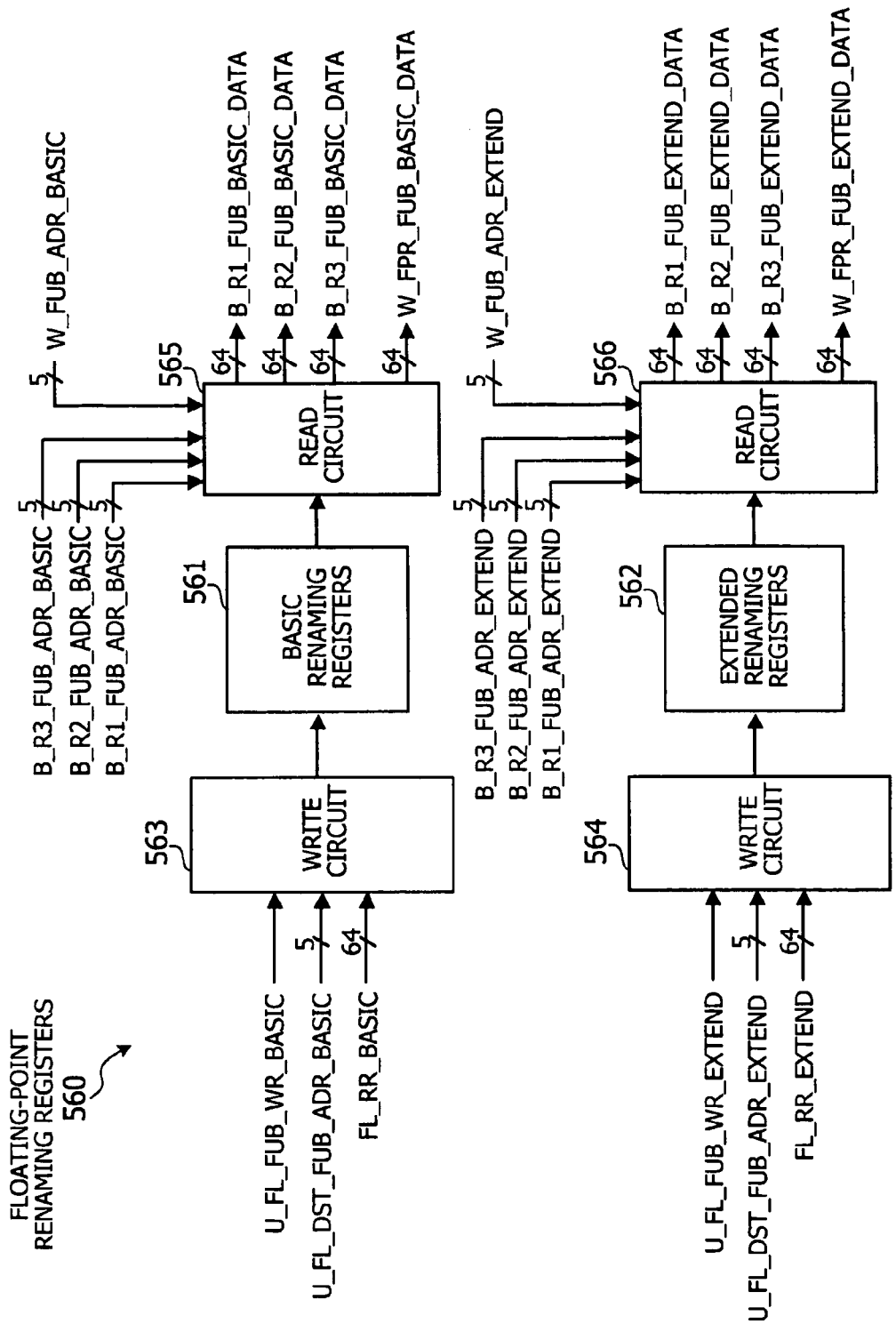
FIG. 47 illustrates input and output signals of floating-point renaming registers which relate to execution of floating-point computation instructions.

FIG. 47 illustrates input and output signals of floating-point renaming registers which relate to execution of floating-point computation instructions. Note that FIG. 47 focuses on the control signals and address signals used to execute floating-point computation instructions, thus omitting some other existing signals.

In B cycle, a read circuit 565 reads data out of basic renaming registers 561 corresponding to address signals B_R1_FUB_ADR_BASIC, B_R2_FUB_ADR_BASIC, and B_R3_FUB_ADR_BASIC supplied from the RSF 360. The operand data selection units 530a, 530b, and 530c receive the resulting data signals B_R1_FUB_BASIC_DATA, B_R2_FUB_BASIC_DATA, and B_R3_FUB_BASIC_DATA corresponding to the address signals B_R1_FUB_ADR_BASIC, B_R2_FUB_ADR_BASIC, and B_R3_FUB_ADR_BASIC.

Also in B cycle, another read circuit 566 reads data out of extended renaming registers 562 corresponding to address signals B_R1_FUB_ADR_EXTEND, B_R2_FUB_ADR_EXTEND, and B_R3_FUB_ADR_EXTEND supplied from the RSF 360. The operand data selection units 530a, 530b, and 530c receive the resulting data signals B_R1_FUB_EXTEND_DATA, B_R2_FUB_EXTEND_DATA, and B_R3_FUB_EXTEND_DATA corresponding to the address signals B_R1_FUB_ADR_EXTEND, B_R2_FUB_ADR_EXTEND, and B_R3_FUB_ADR_EXTEND.

In U cycle, a write circuit 563 receives a data signal FL_RR_BASIC from the basic result register 523 and writes that data value to a basic renaming register 561 specified by address signal U_FL_DST_FUB_ADR_BASIC when control signal U_FL_FUB_WR_BASIC is in the ON state. Here the control signal U_FL_FUB_WR_BASIC and address signal U_FL_DST_FUB_ADR_BASIC are both supplied from the SIMD computation unit 520.

Also in U cycle, another write circuit 564 receives a data signal FL_RR_EXTEND from the extended result register 524 and writes that data value to an extended renaming register 562 specified by address signal U_FL_DST_FUB_ADR_EXTEND when control signal U_FL_FUB_WR_EXTEND is in the ON state. Here the control signal U_FL_FUB_WR_EXTEND and address signal U_FL_DST_FUB_ADR_EXTEND are both supplied from the SIMD computation unit 520.

In W cycle, the read circuit 565 reads a stored computation result from a basic renaming register 561 specified by an address signal W_FUB_ADR_BASIC received from the CSE 400 and supplies it to the floating-point SIMD registers 600 as a data signal W_FPR_FUB_BASIC_DATA. Similarly, the read circuit 566 reads a stored computation result from an extended renaming register 562 specified by an address signal W_FUB_ADR_EXTEND received from the CSE 400 and supplies it to the floating-point SIMD registers 600 as a data signal W_FPR_FUB_EXTEND_DATA.

Figure 48:
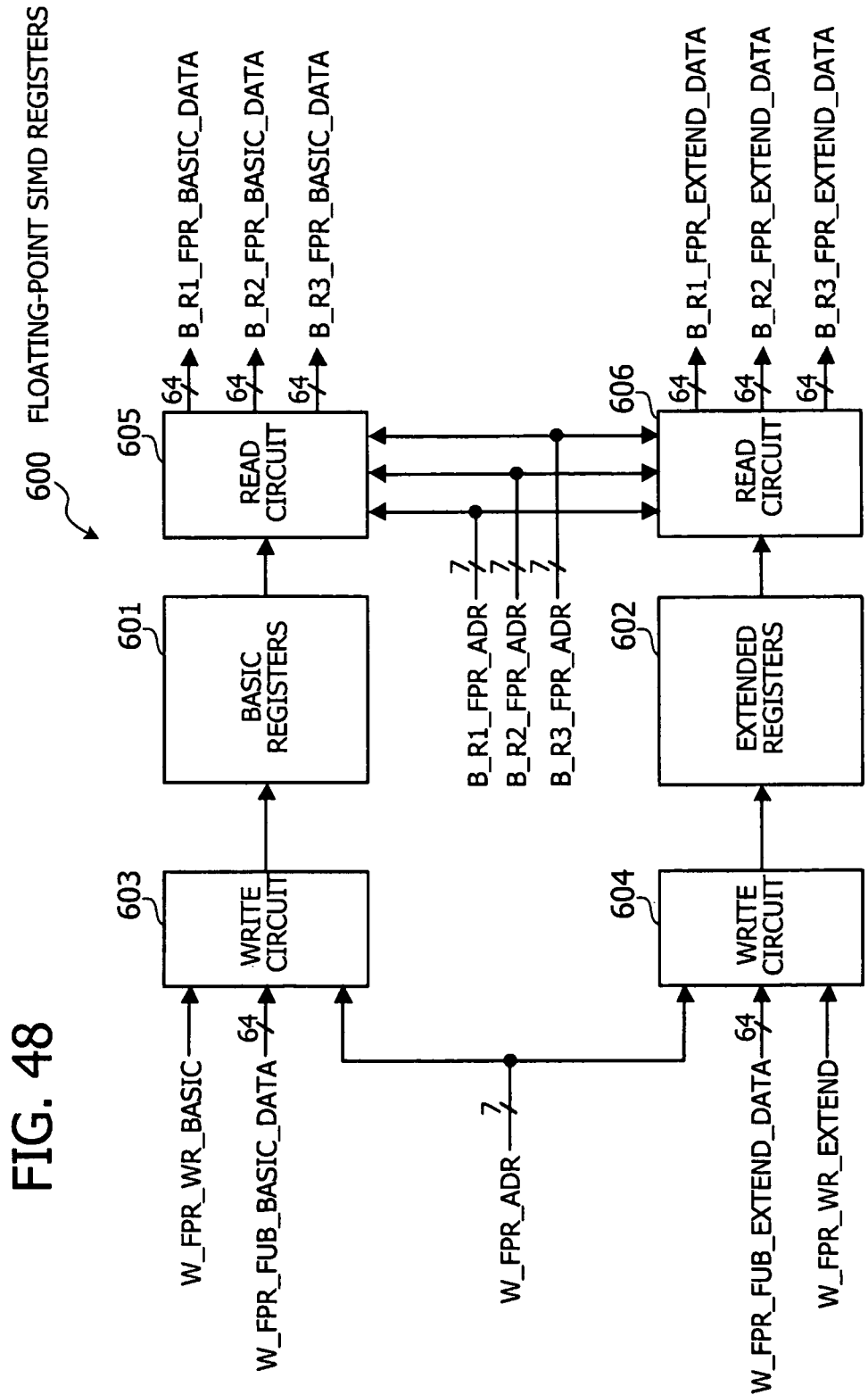
FIG. 48 illustrates input and output signals of floating-point SIMD registers which relate to execution of floating-point computation instructions.

FIG. 48 illustrates input and output signals of floating-point SIMD registers which relate to execution of floating-point computation instructions. Note that FIG. 48 focuses on the control signals and address signals used to execute floating-point computation instructions, thus omitting some other existing signals.

In B cycle, two read circuits 605 and 606 read data out of basic registers 601 and extended registers 602 specified by address signals B_R1_FPR_ADR, B_R2_FPR_ADR, and B_R3_FPR_ADR supplied from the RSF 360. One read circuit 605 sends the read data to the operand data selection units 530a, 530b, and 530c as data signals B_R1_FPR_BASIC_DATA, B_R2_FPR_BASIC_DATA, and B_R3_FPR_BASIC_DATA corresponding to the address signals B_R1_FPR_ADR, B_R2_FPR_ADR, and B_R3_FPR_ADR, respectively. Similarly, the other read circuit 606 sends the read data to the operand data selection units 530a, 530b, and 530c as data signals B_R1_FPR_EXTEND_DATA, B_R2_FPR_EXTEND_DATA, and B_R3_FPR_EXTEND_DATA corresponding to the address signals B_R1_FPR_ADR, B_R2_FPR_ADR, and B_R3_FPR_ADR, respectively.

The above-described structure allows both read circuits 605 and 606 to supply data to the operand data selection units 530a to 530c when a specific source address of a non-SIMD computation instruction is given by, for example, address signal B_R1_FPR_ADR. In the case of non-SIMD computation instructions, however, the operand data selection units 530a to 530c use their constituent basic operand data selector 531 or extended operand data selector 532, but not both. For this reason, the computation will eventually use only one of the two read circuits 605 and 606 to read data therefor.

In W cycle, the computation result is saved in floating-point SIMD registers 600. When control signal W_FPR_WR_BASIC is in the ON state, one write circuit 603 writes a data signal W_FPR_FUB_BASIC_DATA to a basic register 601 specified by address signal W_FPR_ADR. When control signal W_FPR_WR_EXTEND is in the ON state, the other write circuit 604 writes a data signal W_FPR_FUB_EXTEND_DATA to an extended register 602 specified by address signal W_FPR_ADR.

Figure 49:
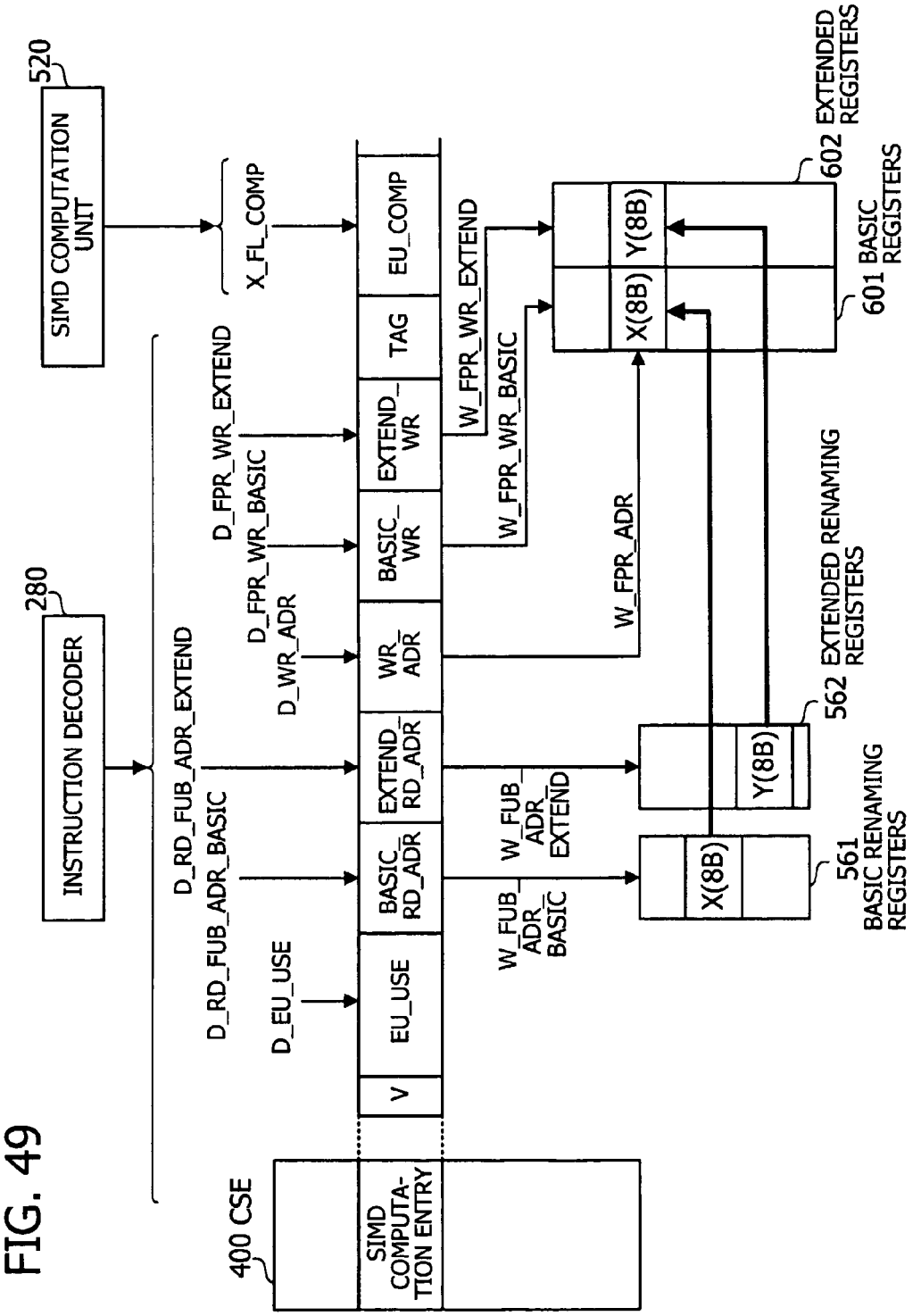
FIG. 49 illustrates how a computation result of an SIMD computation instruction is stored.
Figure 50:
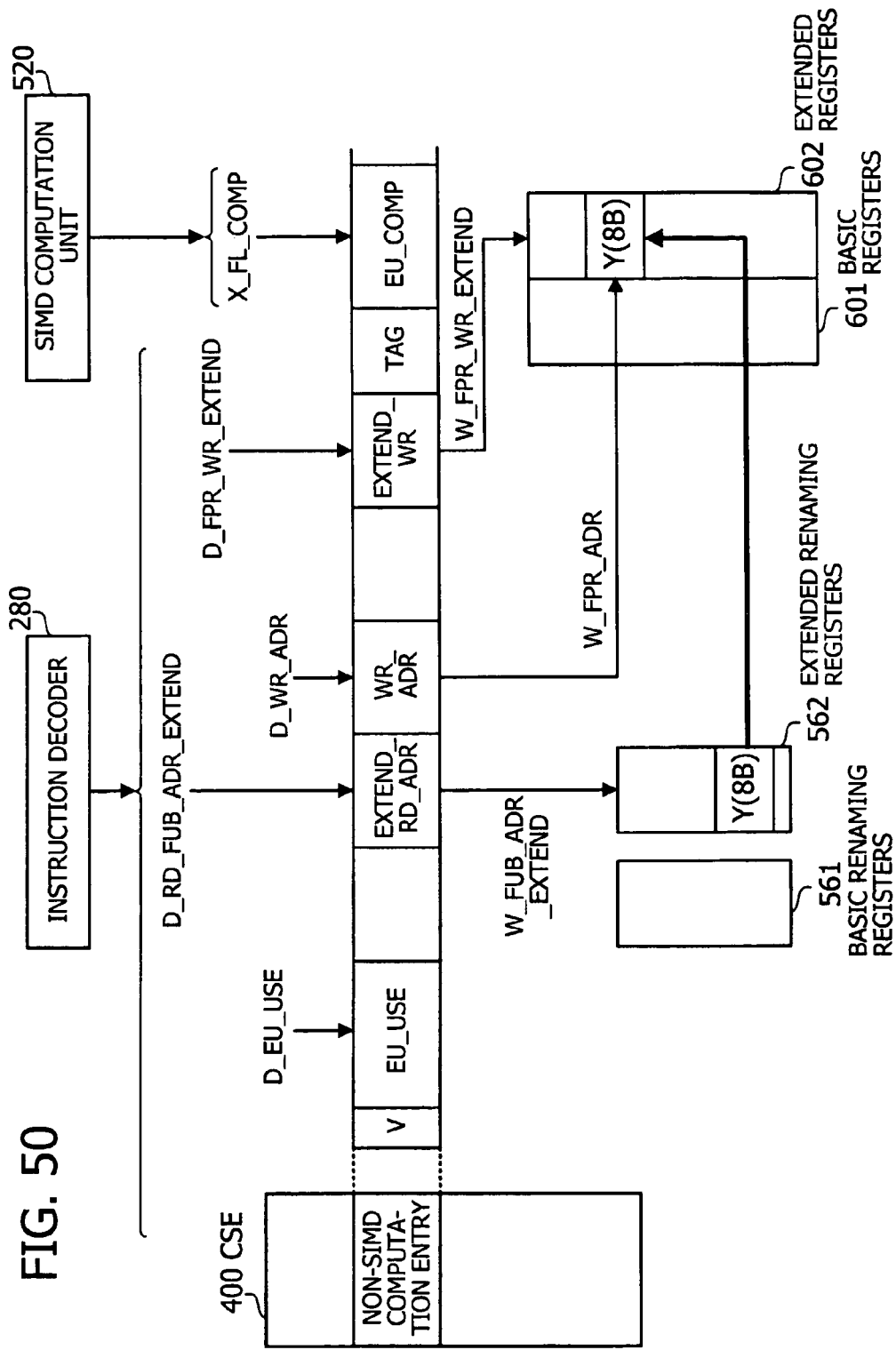
FIG. 50 illustrates how a computation result of a non-SIMD computation instruction is stored.

FIG. 49 illustrates how a computation result of an SIMD computation instruction is stored. FIG. 50 illustrates how a computation result of a non-SIMD computation instruction is stored.

As described earlier, an SIMD computation instruction causes both the basic computation unit 521 and extended computation unit 522 to execute their computation in a parallel fashion, and the two computation results are saved respectively in the basic result register 523 and extended result register 524. It is noted that the data write operation from the basic computation unit 521 to the basic result register 523 occurs simultaneously with the data write operation from the extended computation unit 522 to the extended result register 524. Accordingly, there is no need, in the case of floating-point computation instructions, to check the completion of operation in the basic computation unit 521 and extended computation unit 522 individually. This is unlike the execution of floating-point load instructions.

For the reasons described above, the completion check circuit 406 in the CSE 400 interprets reception of a control signal X_FL_COMP from the SIMD computation unit 520 as signifying completion of the current instruction, whether it is an SIMD computation instruction or a non-SIMD computation instruction. Then, in the subsequent W cycle, the completion check circuit 406 causes the computation result stored in a floating-point renaming register 560 to be transferred to a floating-point SIMD register 600.

In W cycle of an SIMD computation instruction, the signal output circuit 407 in the CSE 400 outputs address values of BASIC_RD_ADR and EXTEND_RD_ADR to the basic renaming registers 561 and extended renaming registers 562, respectively, thus requesting data stored in those addresses. The signal output circuit 407 also supplies an address WR_ADR, together with signals BASIC_WR and EXTEND_WR, to the basic registers 601 and extended registers 602, thereby initiating a write operation of the data to a pair of basic register 601 and extended register 602 with the same address WR_ADR. The computation result is thus transferred from the basic renaming register 561 and extended renaming register 562 to the specified basic register 601 and extended register 602, respectively.

In contrast to the above, an entry of the CSE 400 for a non-SIMD computation instruction has either BASIC_WR or EXTEND_WR in the ON state, besides holding a specific renaming register address in either BASIC_RD_ADR or EXTEND_RD_ADR. Referring to the example of FIG. 50, signal EXTEND_WR is in the ON state, while signal BASIC_WR is not. In W cycle under this context, the signal output circuit 407 outputs the address value of EXTEND_RD_ADR to the extended renaming registers 562, thus requesting data stored in that address. The signal output circuit 407 also supplies an address WR_ADR, together with a signal EXTEND_WR, to the extended registers 602, thus initiating a write operation of the data to an extended register 602 with that address WR_ADR. As a result, the computation result in the extended renaming register 562 is transferred to the extended register 602 alone.

As can be seen from the above processing of floating-point computation instructions, SIMD computation instructions use a basic register 601 and an extended register 602 with the same address as the destination of computation results. Non-SIMD computation instructions, on the other hand, use any one of those basic registers 601 and extended registers 602 as the destination of computation results, thus making efficient use of floating-point SIMD registers 600. This feature permits a non-SIMD computation instruction to choose a destination of its computation result from among twice as many registers as SIMD computation instructions can choose.

The present embodiment offers renaming register for the basic register 601 and extended register 602 by using the same method described earlier for floating-point instruction decoding. With this feature, the present embodiment makes efficient use of floating-point renaming registers 560 even in the case where the program contains both SIMD instructions and non-SIMD instructions. This also means that it may be possible to reduce the number of floating-point renaming registers 560.

The present embodiment also allows a floating-point computation instruction to specify floating-point SIMD registers 600 as the source of operand data. During execution of an SIMD computation instruction, a set of basic register 601 and extended register 602 with the same address provides multiple operand data for parallel computation.

In the case where the specified basic register 601 and extended register 602 have their corresponding renaming registers, the operand data may be read out of those renaming registers. Here, the assigned basic renaming register 561 and extended renaming register 562 may have different addresses. Accordingly, the RSF 360 has a record of those addresses of the assigned basic renaming register 561 and extended renaming register 562 in its entry. The recorded addresses are used to select a source of operand data, thus ensuring the operation of reading operand data from renaming registers.

The present embodiment, on the other hand, allows a non-SIMD computation instruction to specify one of the basic registers 601 and extended registers 602 as the source of operand data. In the case where the specified register has its corresponding renaming register, the operand data may be read out of the renaming register.

The above-described arrangement enables both the SIMD and non-SIMD computation instructions to use the floating-point SIMD registers 600 and floating-point renaming registers 560 as 8-byte registers for reading operand data. The present embodiment thus enables efficient use of floating-point SIMD registers 600 and floating-point renaming registers 560.

Execution of Floating-Point Store Instruction

Upon decoding a floating-point store instruction, the CPU core 111 reads data from a register specified by its source operand and writes the data in a main memory address specified by its destination operand. The instruction code of an SIMD instruction for storing floating-point values (hereafter, "SIMD store instruction") is expressed in the form of, for example, "Simd-store % f100 [address]." This instruction instructs the CPU core 111 to read two 8-byte data values stored in registers specified by the source operand % f100 and then write those 8-byte data values in main memory addresses specified by the destination operand [address].

Non-SIMD instructions for floating-point data store operation (hereafter, non-SIMD store instruction) are also coded in the format described above, except for their operation code. This non-SIMD store instruction instructs the CPU core 111 to read an 8-byte data value stored in a register specified by the source operand and then write that 8-byte data value in a main memory address specified by the destination operand.

The source operand may specify, for example, the address of a specific floating-point SIMD register 600. The present embodiment assumes, for illustrative purposes, that the destination operand is specified with an address of a fixed-point register 580. That is, the destination operand specifies a specific fixed-point registers 580, and a destination address is produced on the basis of operand data read out of the specified register.

Figure 51:
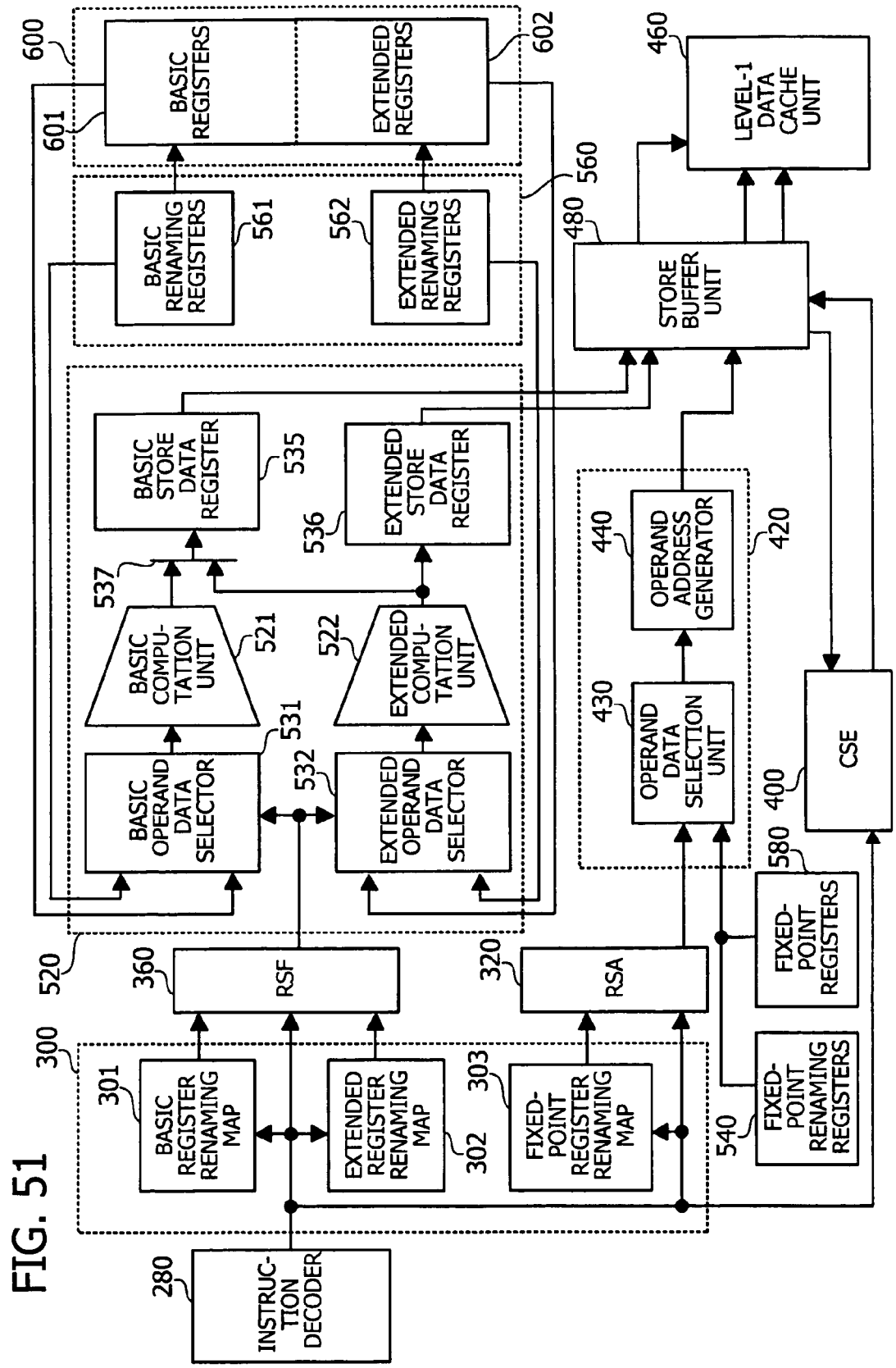
FIG. 51 illustrates components of a CPU core which execute a floating-point store instruction.

FIG. 51 illustrates components of the CPU core 111 which execute a floating-point store instruction; upon decoding a floating-point store instruction, the instruction decoder 280 places an entry for the instruction in the CSE 400, RSA 320, and RSF 360. A renaming register may be assigned to the fixed-point register 580 that contains operand data corresponding to store address. If this is the case, the address of that renaming register is read out of the fixed-point register renaming map 303 and recorded in the RSA 320. A renaming registers may also be assigned to the floating-point SIMD register 600 containing store data. If this is the case, the address of that renaming register is read out of the basic register renaming map 301 or the extended register renaming map 302 and recorded in the RSF 360.

Store address is created based on an entry dispatched from the RSA 320. Specifically, when an entry for a floating-point store instruction is dispatched from the RSA 320, the operand data selection unit 430 selects operand data corresponding to store address and supplies the operand data to the operand address generator 440. The operand address generator 440 generates a specific store address value from the supplied operand data and places it in an entry of the store buffer unit

480. Note that the operand data selection unit 430 is allowed to read operand data from the fixed-point registers 580 or fixed-point renaming registers 540.

The store data, on the other hand, is obtained based on an entry dispatched from the RSF 360. Specifically, when an entry for a floating-point store instruction is dispatched from the RSF 360, either the basic operand data selector 531 or the extended operand data selector 532 selects store data. This store data is a result of the instruction that is currently executed or has been completed.

FIG. 51 illustrates basic registers 601, extended registers 602, basic renaming registers 561, and extended renaming registers 562 as possible sources of store data. It is noted that the basic load register 462 and extended load register 463 may be among other possible sources of store data.

The SIMD computation unit 520 includes a basic store data register 535, an extended store data register 536, and a store data selector 537, in addition to the components discussed in the preceding sections. Store data selected by the basic operand data selector 531 goes through the basic computation unit 521 and store data selector 537, and enters the basic store data register 535 serving as temporary storage. Store data selected by the extended operand data selector 532, on the other hand, goes through the extended computation unit 522 and enters the extended store data register 536 serving as temporary storage. Also, the store data selector 537 may route the store data from the extended operand data selector 532 to the basic store data register 535. The store data in the basic store data register 535 and extended store data register 536 is recorded in an entry of the store buffer unit 480.

The store buffer unit 480 now has an entry containing both store address and store data. Upon completion of the store instruction, the store buffer unit 480 passes the store address and store data to the level-1 data cache unit 460, thus requesting a store operation of the store data. Besides holding the store data in its storage space, the level-1 data cache unit 460 interacts with the level-2 data cache, so that the store data will be stored in a maim memory via the level-2 data cache.

Figure 52:
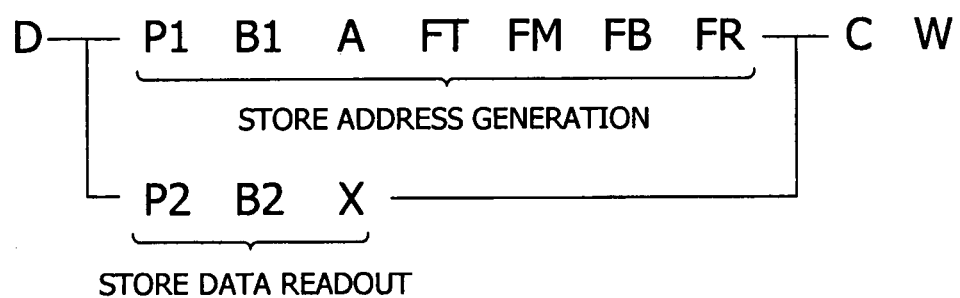
FIG. 52 illustrates operation of a pipeline to execute a floating-point store instruction.

FIG. 52 illustrates operation of a pipeline to execute a floating-point store instruction. The execution of a floating-point store instruction begins with an instruction decoding cycle (D cycle), and then proceeds to store address generation cycles (P1, B1, A, FT, FM, FB, and FR cycles). Executed in parallel with the address generation cycles are store data readout cycles (P2, B2, and X cycles). When both of the store address generation and store data readout are done, instruction commit cycle (C cycle) and store data write cycle (W cycle) are executed in that order.

In the example pipelining illustrated in FIG. 52, P1 and P2 cycles appear to execute at the same time, as do B1 and B2 cycles, and A and X cycles. This may, however, not always be the case. That is, the pipeline only requires P1, B1, A, FT, FM, FB, and FR cycles, as well as P2, B2, and X cycles, to finish before C cycle begins.

Figure 53:
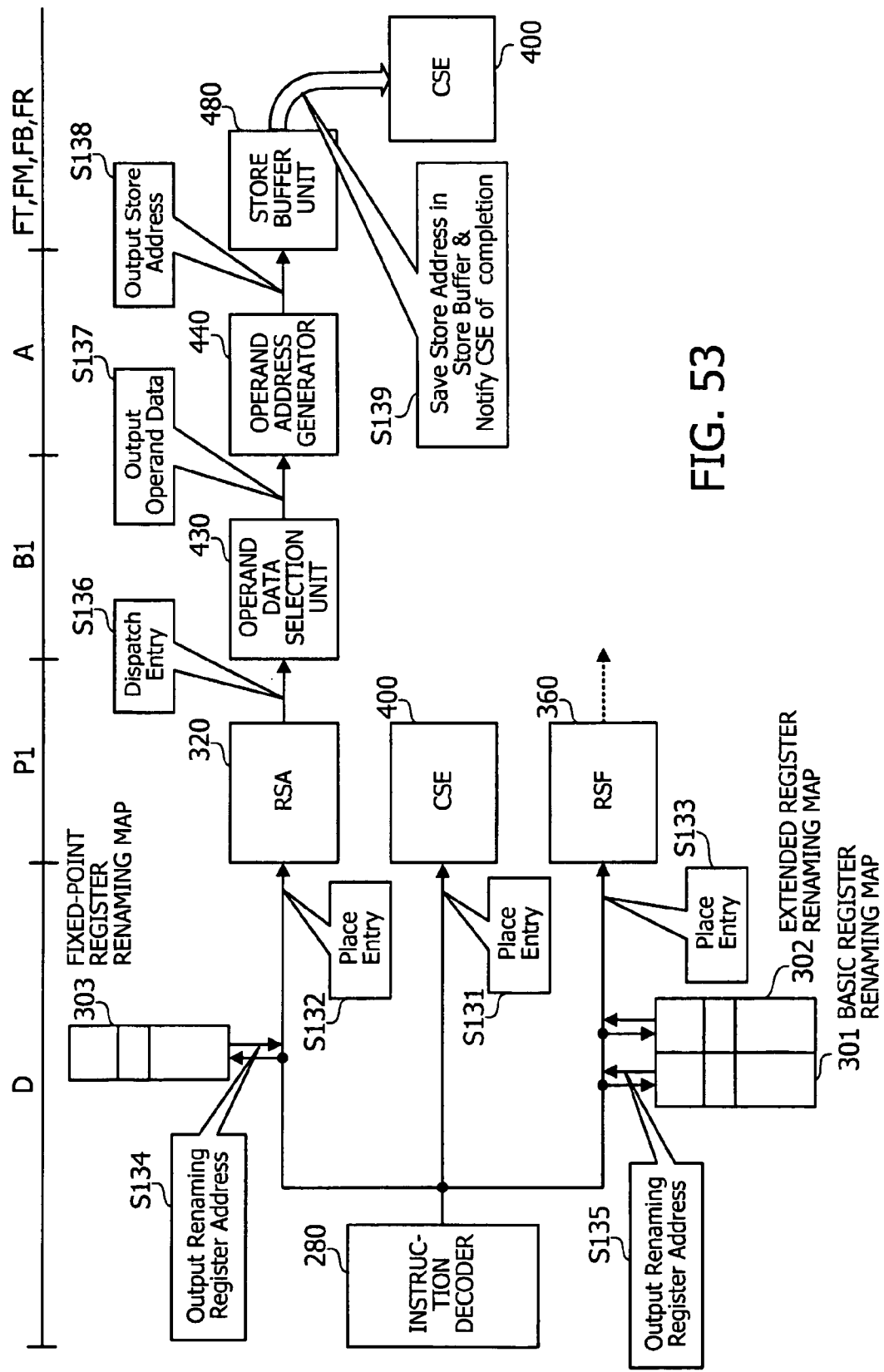
FIG. 53 is a first diagram illustrating operation of a pipeline to execute an SIMD store instruction.
Figure 54:
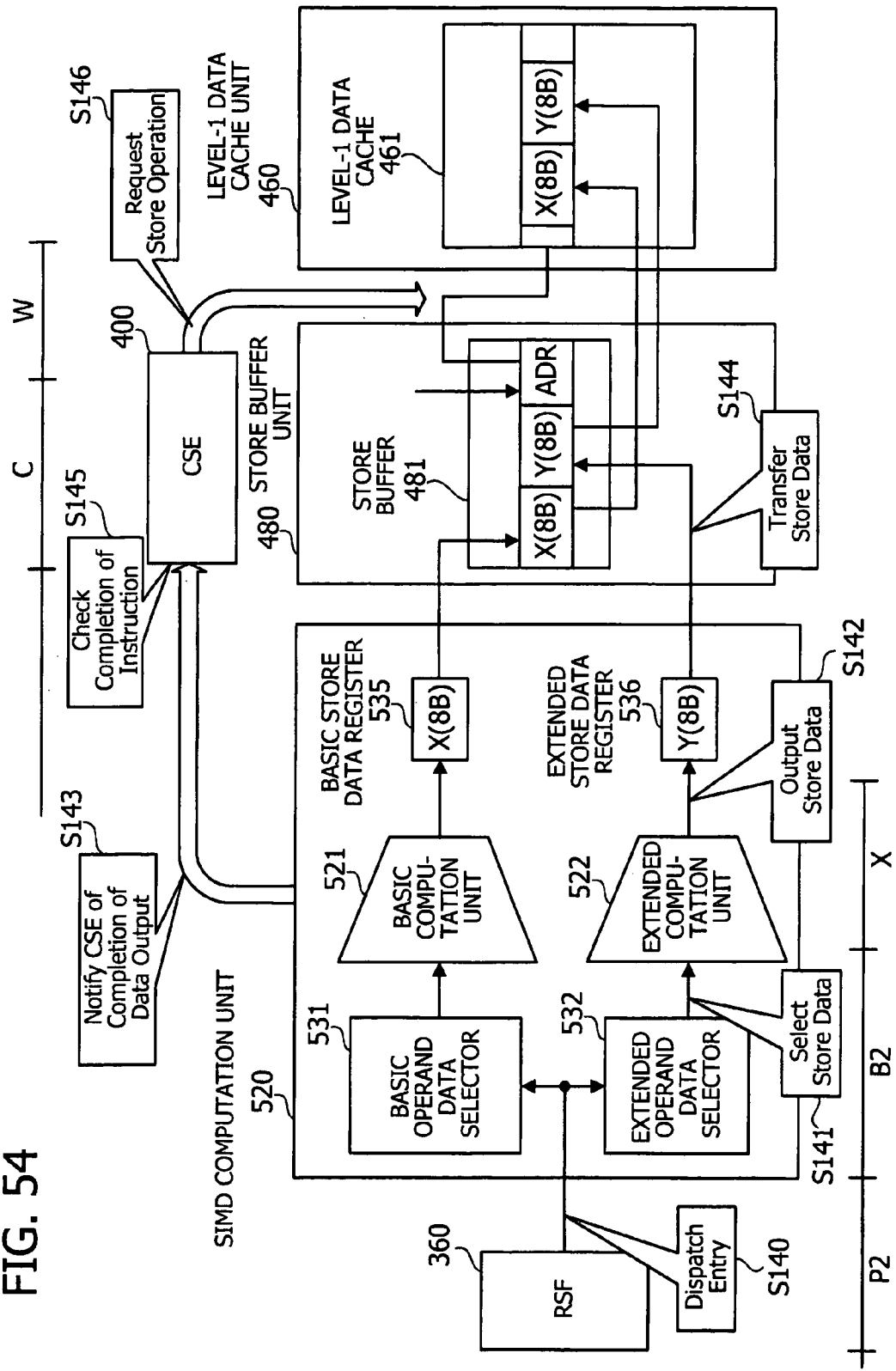
FIG. 54 is a second diagram illustrating operation of a pipeline to execute an SIMD store instruction.

FIGS. 53 and 54 illustrate a pipeline to execute an SIMD store instruction. Specifically, the instruction decoder 280 decodes a floating-point store instruction in D cycle. Based on the decoding result, the instruction decoder 280 places an entry of the instruction in the CSE 400 (step S131), as well as doing the same to the RSA 320 (step S132), and to the RSF 360 (step S133).

The instruction decoder 280 adds some information necessary for source address generation to the entry of the RSA 320. For example, the instruction decoder 280 records the address of a fixed-point register 580 that the instruction specifies in its destination operand.

A fixed-point renaming register 540 may have been assigned to the address of the specified fixed-point register 580. When this is the case, the fixed-point register renaming map 303 outputs the address of that fixed-point renaming register 540 (step S134). The RSA 320 records this renaming register address in its entry.

The instruction decoder 280 also adds some information necessary for store data readout to the entry of the RSF 360. For example, the instruction decoder 280 records the read address of a floating-point SIMD register 600 that the source operand specifies as the source of operand data. In the case of SIMD store instructions, operand data corresponding to a single source operand is actually read out, not only from a basic register 601, but also from an extended register 602.

A renaming register may have been assigned to the read address of the floating-point SIMD registers 600 specified as the source of operand data. When this is the case, the renaming map outputs the address of that renaming register (step S135). The RSF 360 records this renaming register address in its entry. More specifically, in the case where the decoded instruction is an SIMD store instruction, both the basic register renaming map 301 and extended register renaming map 302 provide their respective renaming register addresses corresponding to a single source register specified by the source operand. Accordingly, the RSF 360 records those two addresses in its entry. In the case where the decoded instruction is a non-SIMD store instruction, either the basic register renaming map 301 or the extended register renaming map 302 provides a renaming register address for a single source register specified by the source operand.

The above entry registration processing is followed by parallel execution of P1 cycle and P2 cycle. FIG. 53 illustrates P1 cycle subsequent to the above-described processing. P2 cycle is illustrated in FIG. 54.

In P1 cycle, the RSA 320 waits for necessary data to become ready. As describe earlier, the RSA 320 stores a plurality of entries, and some of those entries may have necessary data ready in relevant registers. The RSA 320 dispatches the oldest one of those data-ready entries. The execution proceeds to B1 cycle (step S136) when an entry corresponding to the current floating-point store instruction is dispatched from the RSA 320 to the operand data selection unit 430.

The procedure of store address generation based on an entry dispatched from the RSA 320 is basically the same as the foregoing read address generation process executed to read out load data for a floating-point load instruction. That is, in B1 cycle, the operand data selection unit 430 reads operand data from a fixed-point register 580 or a fixed-point renaming register 540 according to the entry that the RSA 320 has dispatched. The operand data selection unit 430 then outputs the obtained operand data to the operand address generator 440 (step S137). Subsequently, in A cycle, the operand address generator 440 produces a store address for which the store data is destined, based on the operand data received from the operand data selection unit 430. The operand address generator 440 outputs the produced store address to the store buffer unit 480 (step S138).

In FT, FM, FB, and FR cycles, the store buffer unit 480 saves the store address in its local store buffer 481. Finally in FR cycle, the store buffer unit 480 notifies the CSE 400 that the store address is now ready in the store buffer 481 (step S139).

In P2 cycle, on the other hand, the RSF 360 waits for necessary data to become ready. As described earlier, the RSF 360 stores a plurality of entries, and some of those entries may have necessary data ready in relevant registers. The RSF 360 dispatches the oldest one of those data-ready entries. The execution proceeds to B2 cycle when the entry corresponding to the current floating-point store instruction is dispatched from the RSF 360 to the SIMD computation unit 520 (step S140).

In B2 cycle, the basic operand data selector 531 and extended operand data selector 532 in the SIMD computation unit 520 select store data (step S141). In the case of an SIMD store instruction, both the basic operand data selector 531 and extended operand data selector 532 select and send their respective store data values to the basic computation unit 521 and extended computation unit 522.

In X cycle, the computation unit outputs store data to its subsequent store data register for temporary storage purposes (step S142). In the case of an SIMD store instruction, both the basic computation unit 521 and extended computation unit 522 output their respective store data values. Specifically, the basic store data register 535 stores store data sent from the basic computation unit 521, while the extended store data register 536 stores store data sent from the extended computation unit 522. FIG. 52 depicts two 8-byte store data values as "X(8B)" and "Y(8B)" which are stored in the basic store data register 535 and extended store data register 536, respectively. It is noted that the basic computation unit 521 and extended computation unit 522 do not perform any particular computational operations, but output given signals as is. Also in X cycle, the SIMD computation unit 520 notifies the CSE 400 that the store data is ready (step S143).

The store data in the basic store data register 535 and extended store data register 536 is transferred to an entry of the store buffer 481 (step S144) subsequently to the cycle that has brought the store data to the basic store data register 535 and extended store data register 536. In the case of an SIMD store instruction, two 8-byte data values in the basic store data register 535 and extended store data register 536 are transferred to the store buffer 481.

In FR cycle, the store buffer unit 480 has notified the CSE 400 that the store address is ready to use. In X cycle, the SIMD computation unit 520 notifies the CSE 400 that the store data is ready to store. The completion of these two notification events brings the execution process to C cycle. The CSE 400 determines in C cycle that the floating-point store instruction is completed (step S145).

Subsequently, in W cycle, the store address and store data in the store buffer 481 are sent together to the level-1 data cache unit 460 under the control of the CSE 400 (step S146). The level-1 data cache unit 460 stores the received store data in an area of the level-1 data cache 461 that is associated with the received store address. The level-1 data cache unit 460 further performs necessary control operations, so that the store data will be written in a main memory area corresponding to the received store address via a level-2 data cache.

Figure 55:
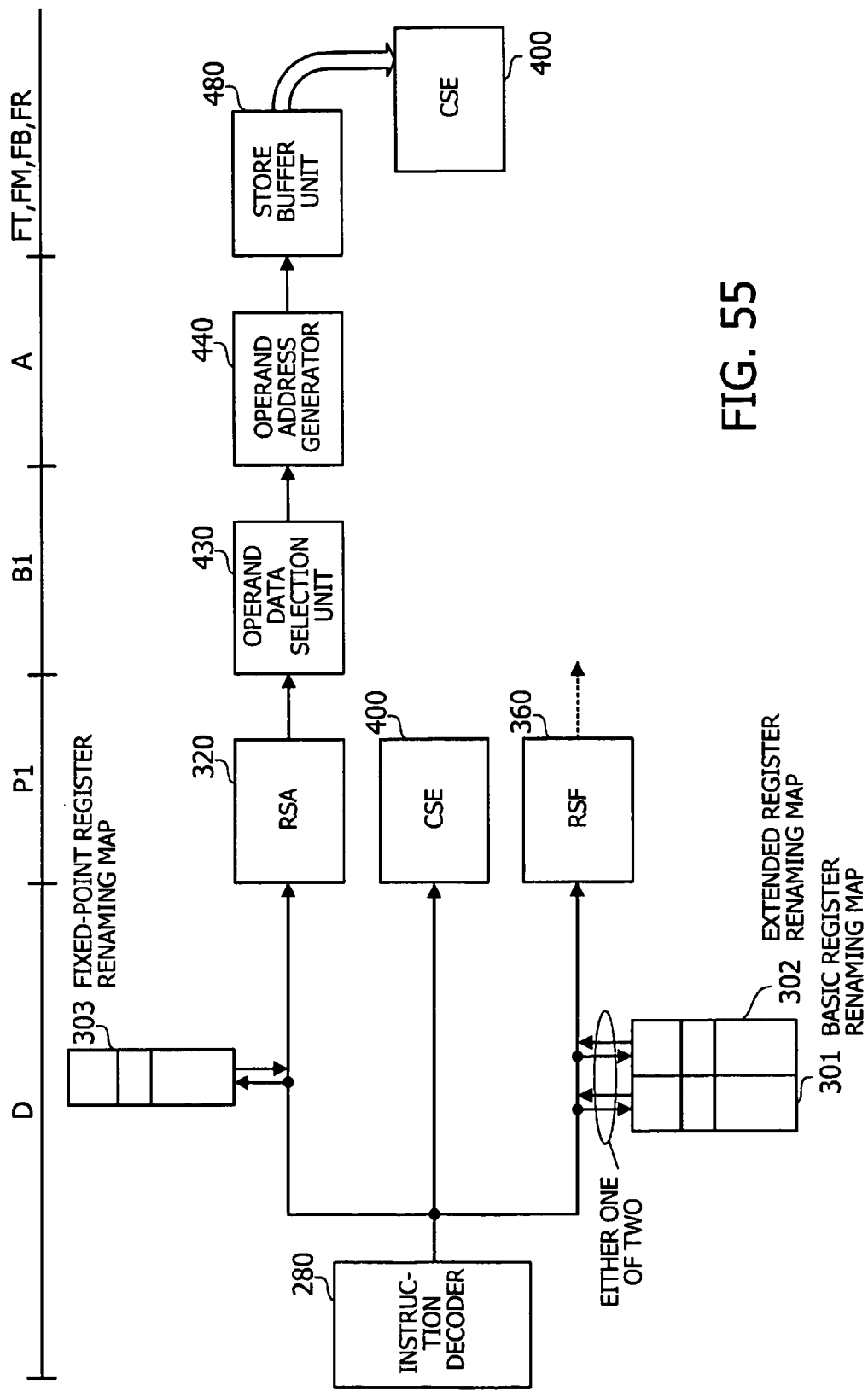
FIG. 55 is a first diagram illustrating operation of a pipeline to execute a non-SIMD store instruction.
Figure 56:
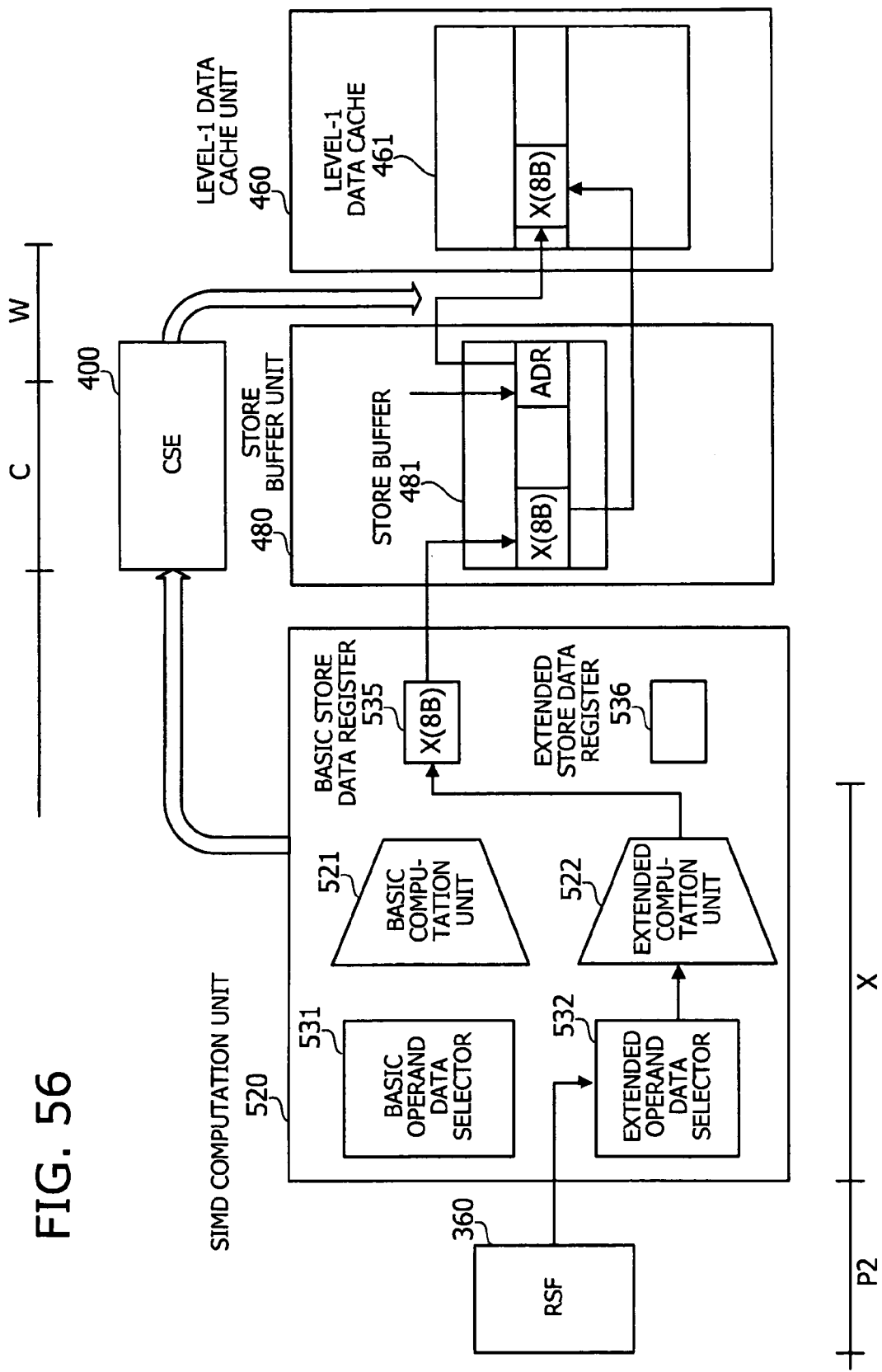
FIG. 56 is a second diagram illustrating operation of a pipeline to execute a non-SIMD store instruction.

FIGS. 55 and 56 illustrate a pipeline to execute a non-SIMD store instruction. The following description will use FIGS. 55 and 56 to discuss how a non-SIMD store instruction is executed differently from SIMD store instructions.

Non-SIMD store instructions specify one of the basic registers 601 and extended registers 602 as the source register of store data specified in their source operand. In the case where a renaming register is assigned to the specified basic register 601 or extended register 602, the address of the assigned renaming register is read out of either the basic register renaming map 301 or the extended register renaming map 302 and recorded in the RSF 360 in D cycle.

In B2 cycle, either the basic operand data selector 531 or the extended operand data selector 532 selects store data, based on an entry that the RSF 360 dispatches. Similarly to the foregoing non-SIMD computation instructions, non-SIMD store instructions allow both the basic bus and extended bus to offer a source register of store data, regardless of whether the basic operand data selector 531 or the extended operand data selector 532 is used. However, the present embodiment is configured, for the purpose of simplicity of control, to choose an appropriate operand data selector depending on which register serves as the source of store data. The present embodiment is further configured to send operand data to the basic store data register 535, no matter which of the basic operand data selector 531 and extended operand data selector 532 is used to select the data.

According to the present embodiment, the basic operand data selector 531 selects store data when a basic register 601 is specified as the source of store data. The selected store data then goes through the basic computation unit 521 and enters the basic store data register 535. Here the CSE 400 is notified of the readiness of store data.

When, on the other hand, a register on the extended bus is specified as the source of store data, the extended operand data selector 532 selects store data and supplies the selected data to the extended computation unit 522. The store data then goes through the extended computation unit 522 and store data selector 537, before reaching the basic store data register 535. Here the CSE 400 is notified of the readiness of store data. As can be seen, non-SIMD store instructions do not use the extended store data register 536 during their execution.

The 8-byte data in the basic store data register 535 is transferred to the store buffer 481, subsequent to the cycle that has brought the store data to the basic store data register 535. The CSE 400 confirms completion of the instruction in C cycle. Then in W cycle, the store data is sent from the store buffer 481 to the level-1 data cache unit 460.

The above processing of an SIMD store instruction is similar to that of floating-point computation instructions in that a set of a basic register 601 and an extended register 602 with the same address is specified as a source register of store data. Non-SIMD store instructions, on the other hand, are allowed to use any of the basic registers 601 and extended registers 602 as a source register of store data. This feature provides more choices of registers in program coding. Also, the floating-point SIMD registers 600 can be treated as discrete 8-byte registers in the case of non-SIMD store instructions. This feature enables more efficient use of the floating-point SIMD registers 600.

Store data may also be read out of a renaming register when it is assigned to the source register of store data. This feature speeds up the execution of store instructions. Further, the floating-point renaming registers 560 can be treated as discrete 8-byte registers. This feature enables more efficient use of the floating-point renaming registers 560.

The following description will now provide details of each circuit block participating in the execution of a floating-point store instruction. Also discussed in the following description is the flow of signals between those blocks.

Figure 57:
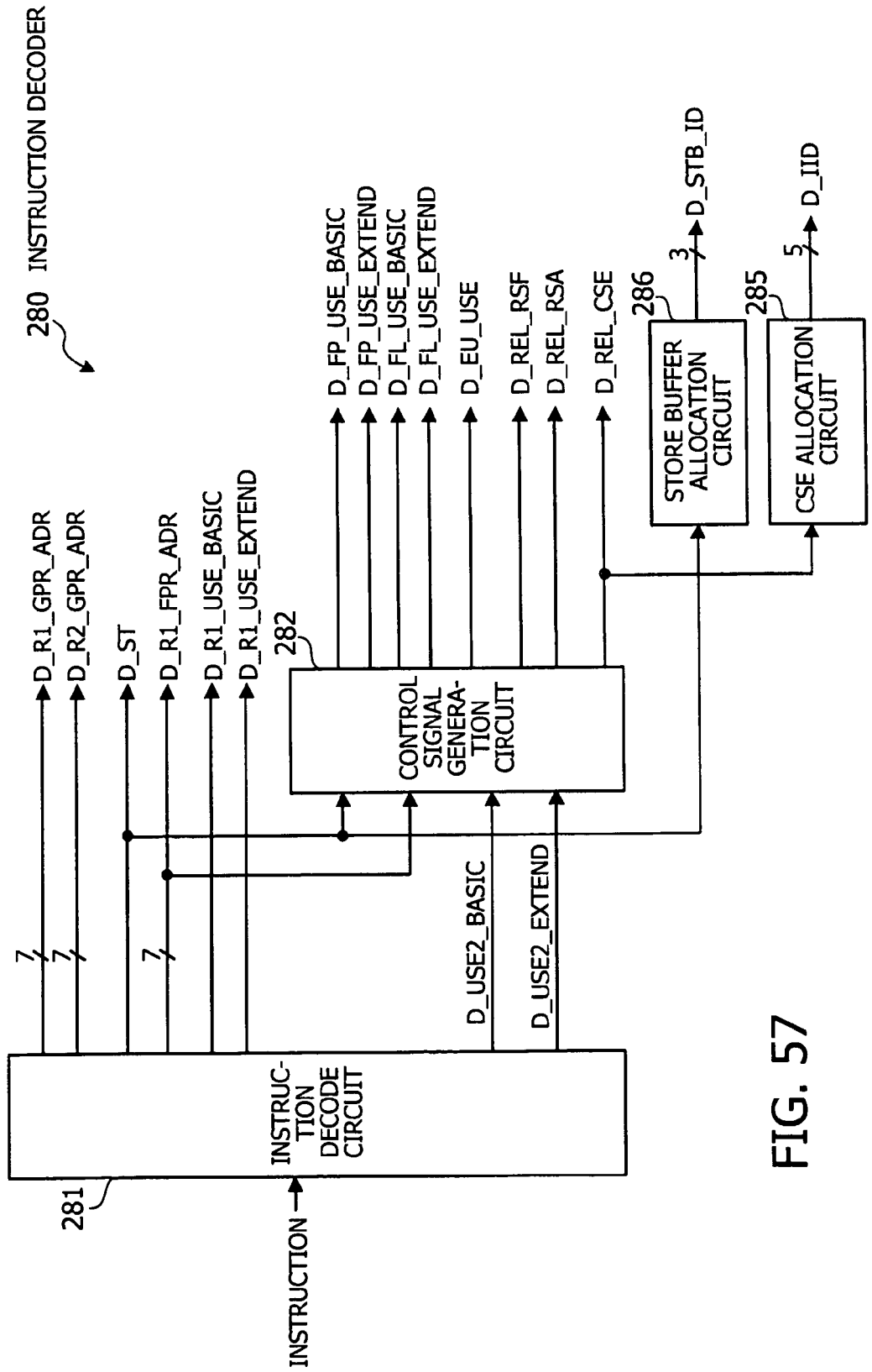
FIG. 57 illustrates output signals that the instruction decoder produces when executing a floating-point store instruction.

FIG. 57 illustrates output signals that the instruction 280 decoder produces when executing a floating-point store instruction. FIG. 57 omits some existing signals in order to focus on the control signals and address signals used in D cycle of a floating-point store instruction.

The illustrated instruction decoder 280 includes a store buffer allocation circuit 286, in addition to the instruction decode circuit 281, control signal generation circuit 282, and CSE allocation circuit 285 discussed in the preceding sections.

Upon decoding a floating-point store instruction, the instruction decode circuit 281 turns on control signal D_ST to indicate that the decoded instruction is a floating-point store instruction. This control signals D_ST is sent to the CSE 400, RSA 320, and RSF 360.

The instruction decode circuit 281 also produces address signals D_R1_GPR_ADR and D_R2_GPR_ADR each designating a source address of store address, based on the value of the destination operand. These address signals are supplied to the fixed-point register renaming map 303 and RSA 320.

The instruction decode circuit 281 further produces an address signal D_R1_FPR_ADR indicating a source address of store data, based on the value of the source operand. This address signal is supplied to the basic register renaming map 301, extended register renaming map 302, RSF 360, and control signal generation circuit 282. The instruction decode circuit 281 further supplies the RSF 360 with control signals D_R1_USE_BASIC and D_R1_USE_EXTEND. Control signal D_R1_USE_BASIC indicates whether to read store data from a register on the basic bus. Control signal D_R1_USE_EXTEND indicates whether to read store data from a register on the extended bus. The detailed procedure of producing the above address signal D_R1_FPR_ADR and control signals D_R1_USE_BASIC and D_R1_USE_EXTEND is similar to the case of floating-point computation instructions.

The instruction decode circuit 281 also supplies the control signal generation circuit 282 with control signals D_USE2_BASIC and D_USE2_EXTEND. Control signal D_USE2_BASIC indicates whether a basic register 601 is designated as a source of store data. Control signal D_USE2_EXTEND indicates whether an extended register 602 is designated as a source of store data. When the decoded instruction is an SIMD store instruction, the instruction decode circuit 281 turns on both control signals D_USE2_BASIC and D_USE2_EXTEND. When the decoded instruction is a non-SIMD store instruction, and if the source operand specifies a register number in the range of 0 to 127, the instruction decode circuit 281 turns on one control signal D_USE2_BASIC while turning off the other control signal D_USE2_EXTEND. When the decoded instruction is a non-SIMD store instruction, and if the source operand specifies a register number in the range of 128 to 255, the instruction decode circuit 281 turns on one control signal D_USE2_EXTEND, while turning off the other control signal D_USE2_BASIC. The instruction decode circuit 281 further subtracts 128 from the specified register number and assigns the resulting difference to address signal D_R1_FPR_ADR.

Upon receipt of address signal D_R1_FPR_ADR and control signal D_ST from the instruction decode circuit 281, the control signal generation circuit 282 produces several control signals as follows: Control signal D_FL_USE_BASIC indicates whether to use the basic computation unit 521 to output store data. Control signal D_FL_USE_EXTEND indicates whether to use the extended computation unit 522 to output store data. These control signals D_FL_USE_BASIC and D_FL_USE_EXTEND have the same values as the foregoing control signals D_USE2_BASIC and D_USE2_EXTEND and are supplied to the RSF 360.

The control signal generation circuit 282 also produces control signals D_FP_USE_BASIC and D_FP_USE_EXTEND as follows: When both control signals D_USE2_BASIC and D_USE2_EXTEND are in the ON state, control signals FP_USE_BASIC and D_FP_USE_EXTEND are turned on. When one of the control signals D_USE2_BASIC and D_USE2_EXTEND is in the ON state, one control signal D_FP_USE_BASIC is turned on while the other control signal D_FP_USE_EXTEND is turned off. The produced control signals D_FP_USE_BASIC and D_FP_USE_EXTEND are supplied to the RSA 320 and CSE 400.

The control signal generation circuit 282 sends control signal D_EU_USE to the CSE 400 to indicate whether at least one of the basic computation unit 521 and extended computation unit 522 is used. Control signal D_REL_RSF requests the RSF 360 to create an entry. Control signal D_REL_RSA requests the RSA 320 to create an entry. Control signal D_REL_CSE requests the CSE 400 to create an entry. This control signal D_REL_CSE is supplied not only to the CSE 400, but also to the CSE allocation circuit 285.

Upon receipt of control signal D_REL_CSE, the CSE allocation circuit 285 assigns an entry identification signal D_IID to an entry to be placed in the CSE 400 so as to distinguish it from existing CSE entries. Every instruction is assigned an entry identification signal D_IID in the order of decoding, before they are registered in the CSE 400.

Upon receipt of control signal D_ST, the store buffer allocation circuit 286 assigns an entry identification signal D_STB_ID to an entry to be placed in the store buffer 481 so as to distinguish it from existing entries. This entry identification signal D_STB_ID is sent to the RSA 320 and RSF 360. For illustrative purposes, the present embodiment assumes that the store buffer 481 handles eight entries. Accordingly, the entry identification signal D_STB_ID is 3 bits wide.

Figure 58:
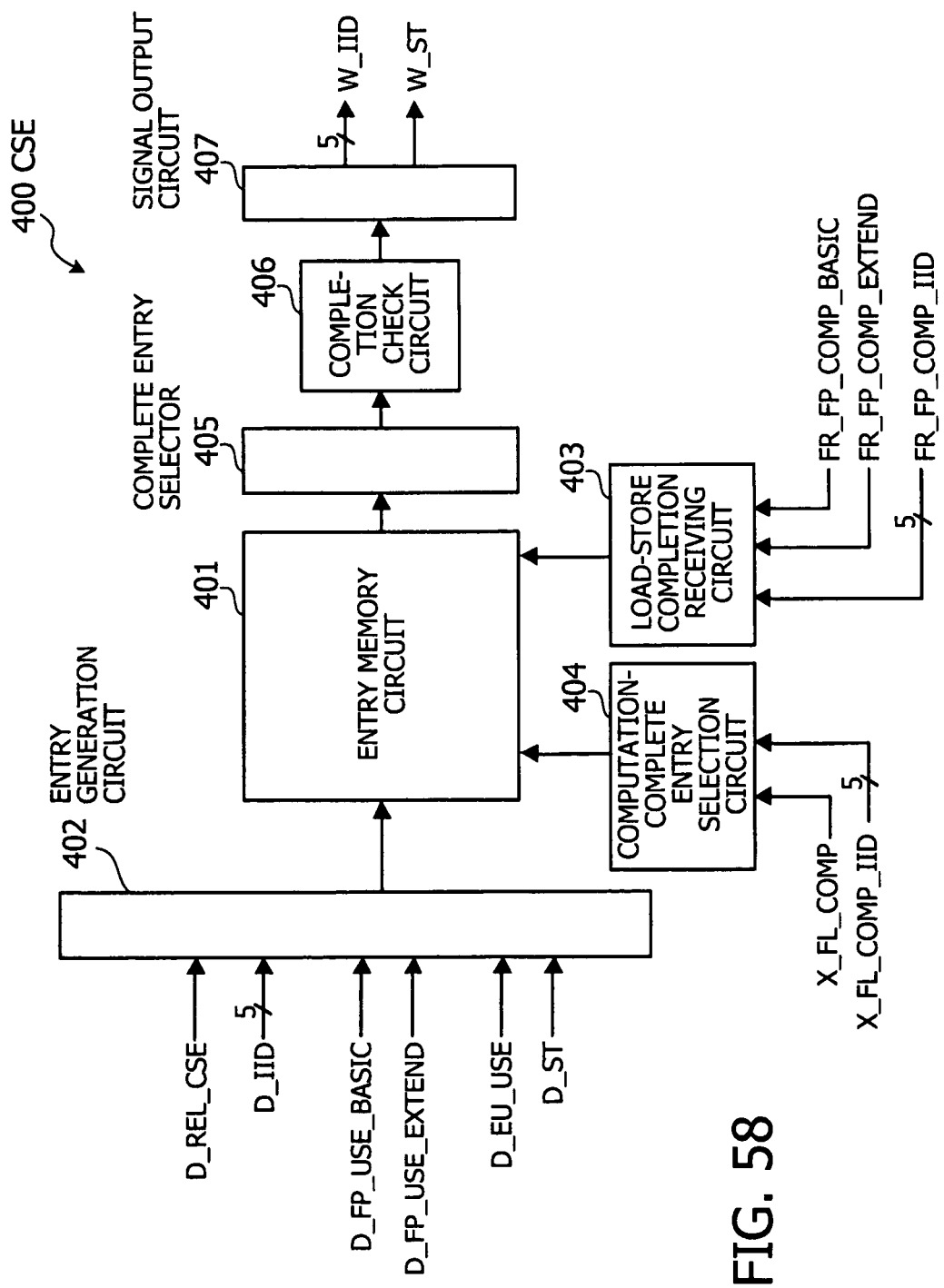
FIG. 58 illustrates input and output signals of the CSE which relate to execution of floating-point store instructions.

FIG. 58 illustrates input and output signals of the CSE 400 which relate to execution of floating-point store instructions. Note that FIG. 58 focuses on the control signals and address signals used to execute floating-point store instructions, thus omitting some other existing signals.

In D cycle of a floating-point store instruction, the entry generation circuit 402 receives control signal D_ST from the instruction decoder 280. In response, the entry generation circuit 402 creates an entry corresponding to entry identification signal D_IID also supplied from the instruction decoder 280 and places the produced entry in the entry memory circuit 401. Here the entry generation circuit 402 receives control signals D_REL_CSE, D_FP_USE_BASIC, and D_FP_USE_EXTEND, together with entry identification signal D_IID, from the instruction decoder 280, as in the case of floating-point load instructions. The entry generation circuit 402 also receives control signal D_EU_USE from the instruction decoder 280.

In FR cycle, the load-store completion receiving circuit 403 receives control signals FR_FP_COMP_BASIC and FR_FP_COMP_EXTEND, together with entry identification signal FR_FP_COMP_IID, from the store buffer unit 480. The control signals FR_FP_COMP_BASIC and FR_FP_COMP_EXTEND each indicate that the store address has been saved in the store buffer 481, and the entry identification signal FR_FP_COMP_IID identifies the CSE entry relevant to that saving operation of store address.

In X cycle, the computation-complete entry selection circuit 404 receives control signal X_FL_COMP and entry identification signal X_FL_COMP_IID from the SIMD computation unit 520. The control signal X_FL_COMP indicates that the SIMD computation unit 520 has sent out store data, and the entry identification signal X_FL_COMP_IID identifies the CSE entry relevant to that sending operation of store data.

In C cycle, the complete entry selector 405 reads the topmost entry from the entry memory circuit 401 and supplies it to the completion check circuit 406. Based on the content of this entry, the completion check circuit 406 determines whether the processing operation for the entry has been completed. When executing a floating-point store instruction, the completion check circuit 406 makes this determination based on the above control signals FR_FP_COMP_BASIC, FR_FP_COMP_EXTEND, and X_FL_COMP, as well as on the signals of entries identified by the above entry identification signals FR_FP_COMP_IID and X_FL_COMP_IID.

W cycle begins when the completion check circuit 406 determines that the floating-point store instruction is completed. In W cycle, the signal output circuit 407 supplies the entry identification signal W_IID and control signal W_ST to the store buffer unit 480.

Figure 59:
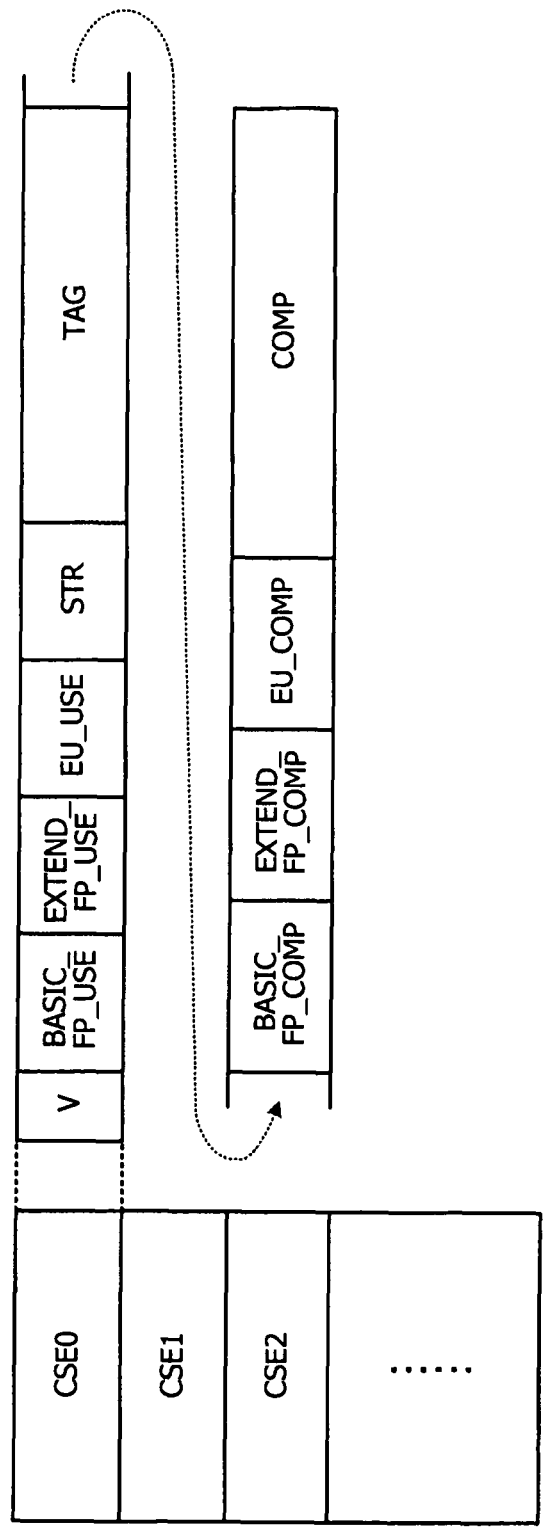
FIG. 59 illustrates details of a CSE entry for a floating-point store instruction.

FIG. 59 illustrates details of a CSE entry for a floating-point store instruction. The illustrated CSE 400 contains an entry for a floating-point store instruction, which is different from those for floating-point load instructions in several points. One difference is the absence of signals related to source and destination of data, i.e., address signals BASIC_RD_ADR and EXTEND_RD_ADR and signals BASIC_WR and EXTEND_WR.

The CSE entry of a floating-point store instruction contains signals EU_USE and STR. Signal EU_USE indicates that at least one of the basic computation unit 521 and extended computation unit 522 is used, and signal STR indicates that the instruction in process is a floating-point store instruction. These signals EU_USE and STR are respectively turned on in response to control signals D_EU_USE and D_ST received from the instruction decoder 280.

The CSE 400 also has a record of signals BASIC_FP_COMP and EXTEND_FP_COMP given by the load-store completion receiving circuit 403, the signals indicating that the store address has been saved. The CSE 400 further has a record of a signal EU_COMP given by the computation-complete entry selection circuit 404, the signal indicating that the store data has been saved.

The complete entry selector 405 selects an entry for the completion check circuit 406. Based on the content of this entry, the completion check circuit 406 determines whether the corresponding instruction has been completed. When the entry is of a floating-point store instruction, and when that instruction is an SIMD store instruction, both signals BASIC_FP_USE and EXTEND_FP_USE should be turned on. In this case, the completion check circuit 406 recognizes completion of the instruction when all the signals BASIC_FP_COMP, EXTEND_FP_COMP, and EU_COMP are in the ON state. When the instruction in process is a non-SIMD store instruction, signal BASIC_FP_USE should be turned on, while signal EXTEND_FP_USE should be turned off. In this case, the completion check circuit 406 recognizes completion of the instruction when the signals BASIC_FP_COMP and EU_COMP are in the ON state.

When the completion check circuit 406 determines that the floating-point store instruction is completed, the signal output circuit 407 supplies entry identification signal W_IID and control signal W_ST to the store buffer unit 480. Here the entry identification signal W_IID identifies the entry whose corresponding instruction is found completed. The control signal W_ST is a request signal causing the store buffer unit 480 to save data.

Figure 60:
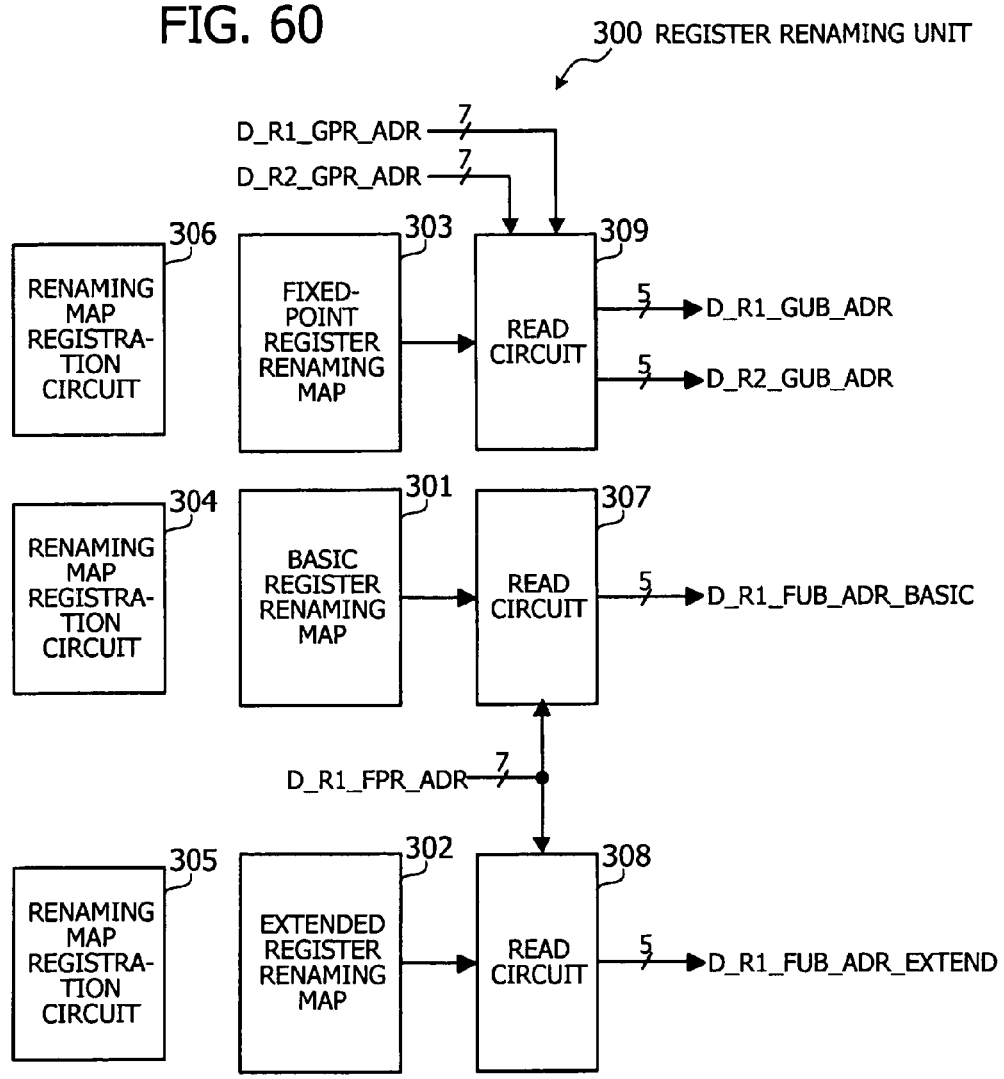
FIG. 60 illustrates input and output signals of the register renaming unit which relate to execution of floating-point store instructions.

FIG. 60 illustrates input and output signals of the register renaming unit 300 which relate to execution of floating-point store instructions. Note that FIG. 60 focuses on the control signals and address signals used to execute floating-point store instructions, thus omitting some other existing signals.

In D cycle, the fixed-point register renaming map 303 is requested to provide an address, in the same way as described earlier for floating-point load instructions. Specifically, the read circuit 309 receives two address signals D_R1_GPR_ADR and D_R2_GPR_ADR from the instruction decoder 280. Each of these address signals represents the source of operand data corresponding to a store address. The read circuit 309 looks up entries of the fixed-point register renaming map 303 that are specified by the address signals D_R1_GPR_ADR and D_R2_GPR_ADR. If those entries are valid, the read circuit 309 reads their assigned address values and outputs them as address signals D_R1_GUB_ADR and D_R2_GUB_ADR to the RSA 320. The former address signal D_R1_GUB_ADR indicates the address of a renaming register corresponding to address signal D_R1_GPR_ADR. The latter address signal D_R2_GUB_ADR indicates the address of a renaming register corresponding to address signal D_R2_GPR_ADR.

Also in D cycle, the basic register renaming map 301 and extended register renaming map 302 are requested to provide an address, in the same way as described earlier for floating-point computation instructions. Note that it is only one address that each of the basic register renaming map 301 and extended register renaming map 302 is supposed to provide.

Specifically, two read circuits 307 and 308 receive address signal D_R1_FPR_ADR from the instruction decoder 280. In the case where the basic register 601 specified by this address signal D_R1_FPR_ADR has an assigned renaming register, one read circuit 307 reads its address from the basic register renaming map 301 and supplies that renaming register address to the RSF 360 as an address signal D_R1_FUB_ADR_BASIC.

In the case where the extended register 602 specified by the address signal D_R1_FPR_ADR has an assigned renaming register, the other read circuit 308 reads its address from the extended register renaming map 302 and supplies that renaming register address to the RSF 360 as an address signal D_R1_FUB_ADR_EXTEND. It is noted that the renaming map registration circuits 304 to 306 have no active role to play during the execution of floating-point store instructions.

Figure 61:
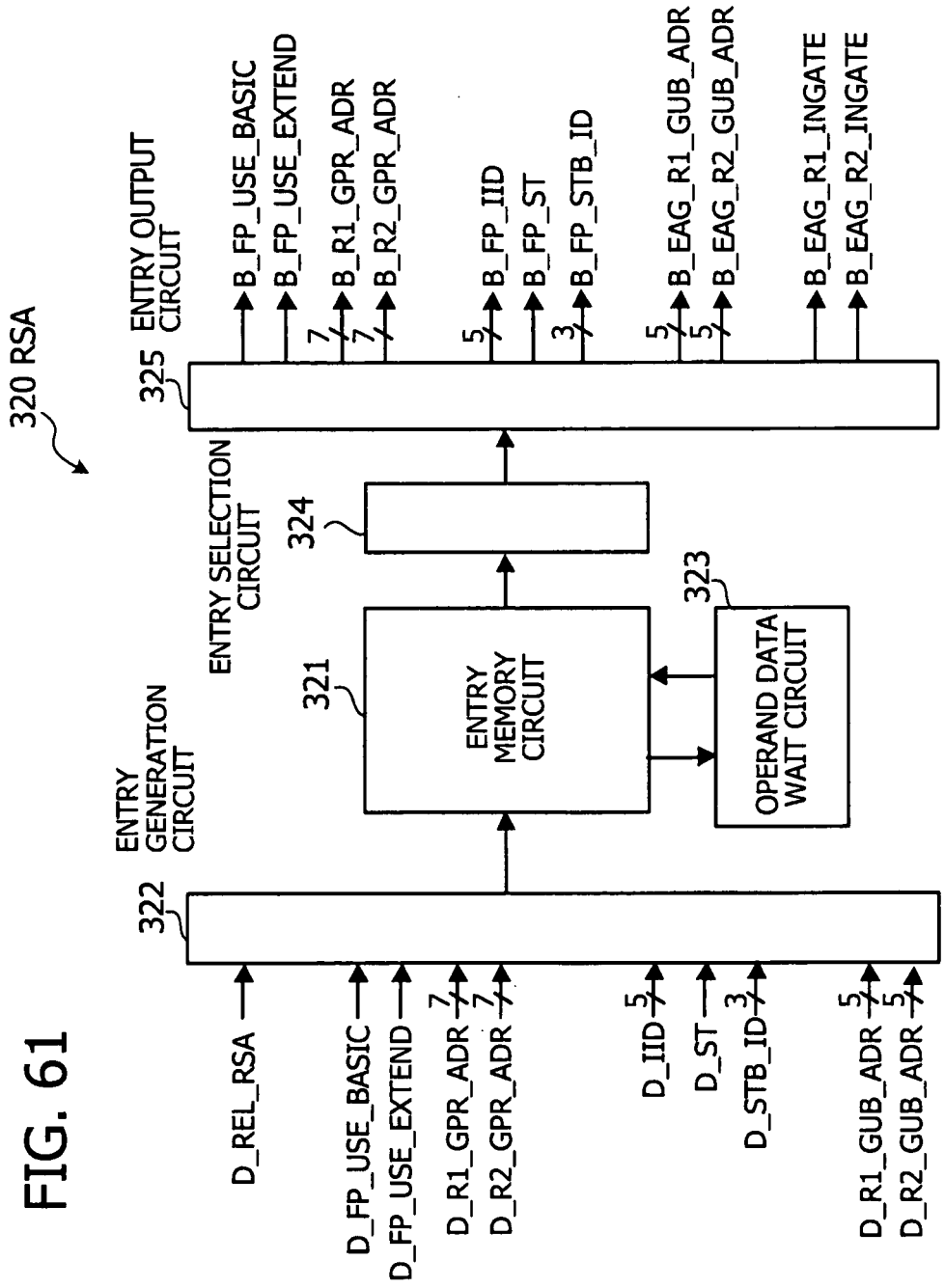
FIG. 61 illustrates input and output signals of the RSA which relate to execution of floating-point store instructions.

FIG. 61 illustrates input and output signals of the RSA 320 which relate to execution of floating-point store instructions. Note that FIG. 61 focuses on the control signals and address signals used to execute floating-point store instructions, thus omitting some other existing signals.

When executing a floating-point store instruction, the RSA 320 operates basically in the same way as it operates for floating-point load instructions. The floating-point store instruction, however, does not specify registers as the destination of its processing result. Accordingly, the entry generation circuit 322 in the RSA 320 does not receive address signals D_RD_FUB_ADR_BASIC and D_RD_FUB_ADR_EXTEND, which would specify renaming registers assigned to destination register. Further, instead of receiving control signal D_LOAD, the entry generation circuit 322 receives control signal D_ST indicating that the instruction in process is a floating-point store instruction, together with entry identification signal D_STB_ID indicating a specific entry of the store buffer 481. Upon receipt of those signals, the entry generation circuit 322 creates an entry corresponding to the floating-point store instruction in process and places that entry in the entry memory circuit 321.

The entry selection circuit 324 now selects an RSA entry corresponding to the floating-point store instruction in process. In response, the entry output circuit 325 produces control signals B_FP_USE_BASIC, B_FP_USE_EXTEND, B_FP_IID, B_FP_ST, B_EAG_R1_INGATE, and B_EAG_R2_INGATE, address signals B_R1_GPR_ADR, B_R2_GPR_ADR, B_EAG_R1_GUB_ADR, and B_EAG_R2_GUB_ADR, and entry identification signals B_FP_IID and B_FP_STB_ID. These signals are supplied to the operand data selection unit 430.

Figure 62:
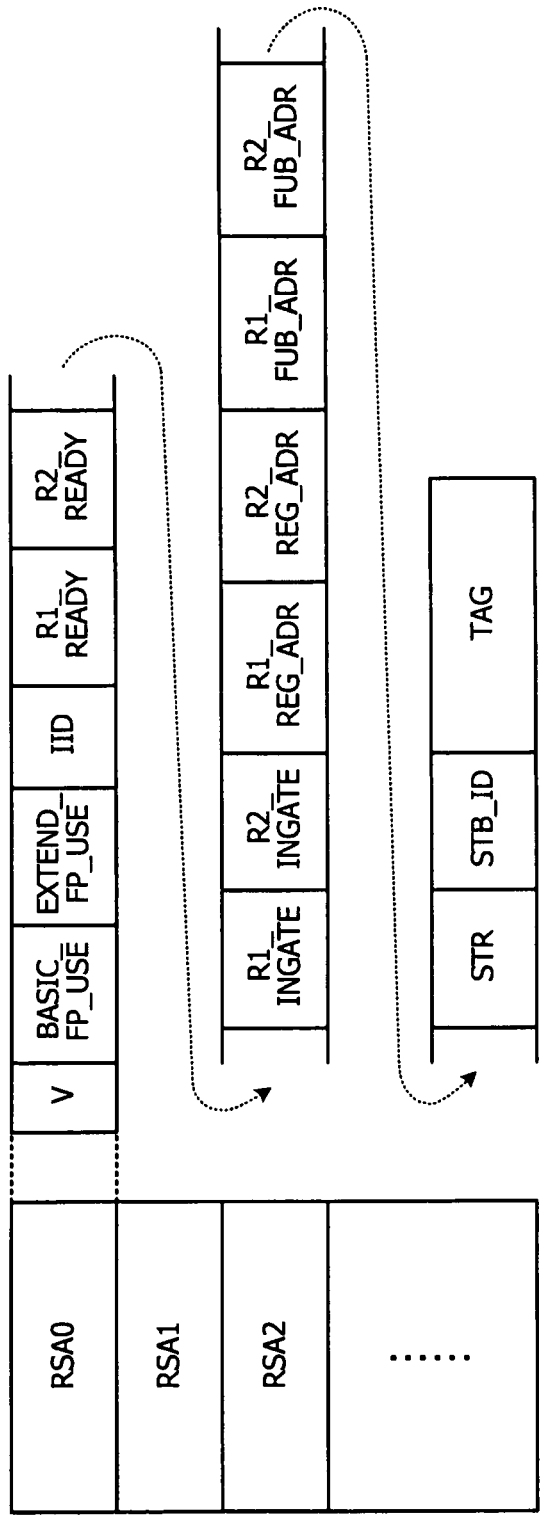
FIG. 62 illustrates details of an RSA entry for a floating-point store instruction.

FIG. 62 illustrates details of an RSA entry for a floating-point store instruction. The illustrated RSA 320 contains an entry for a floating-point store instruction, which is different from those for floating-point load instructions in several points. One difference is that the entry of a floating-point store instruction does not contain addresses BASIC_DST_ADR and EXTEND_DST_ADR indicating destination addresses of data.

The entry has a signal STR (instead of signal LOAD) indicating that the entry is of a floating-point store instruction, as well as an entry identification signal STB_ID identifying a specific entry of the store buffer 481. The signal STR is turned on when the entry is created, while the entry identification signal STB_ID is derived from entry identification signal D_STB_ID that the instruction decoder 280 provides.

The operand data wait circuit 323 waits for operand data based on the content of an entry in the same way as described earlier for floating-point load instructions. The entry selection circuit 324 is allowed to dispatch an entry when its signals R1_READY and R2_READY are both turned on. When an entry meets this condition and is thus to be dispatched, the values of its entry identification signals IID and STB_ID are supplied to the store buffer unit 480 as signals B_FP_IID and B_FP_STB_ID, along with a control signal B_FP_ST. Also, the values of signals BASIC_FP_USE and EXTEND_FP_USE are supplied to the store buffer unit 480 as control signals B_FP_USE_BASIC, B_FP_USE_EXTEND, respectively. The entry output circuit 325 outputs other signals based on their corresponding signals in the entry in the same way as discussed in FIG. 19.

The operand data selection unit 430 selects operand data in the same way as described in FIG. 20. That is, the operand data selectors 431 and 432 supply the operand address generator 440 with data values read out of a fixed-point register 580 or a fixed-point renaming register 540. In A cycle, the operand address generator 440 produces a store address based on the data values received from the operand data selectors 431 and 432 and sends it to the level-1 data cache unit 460.

Figure 63:
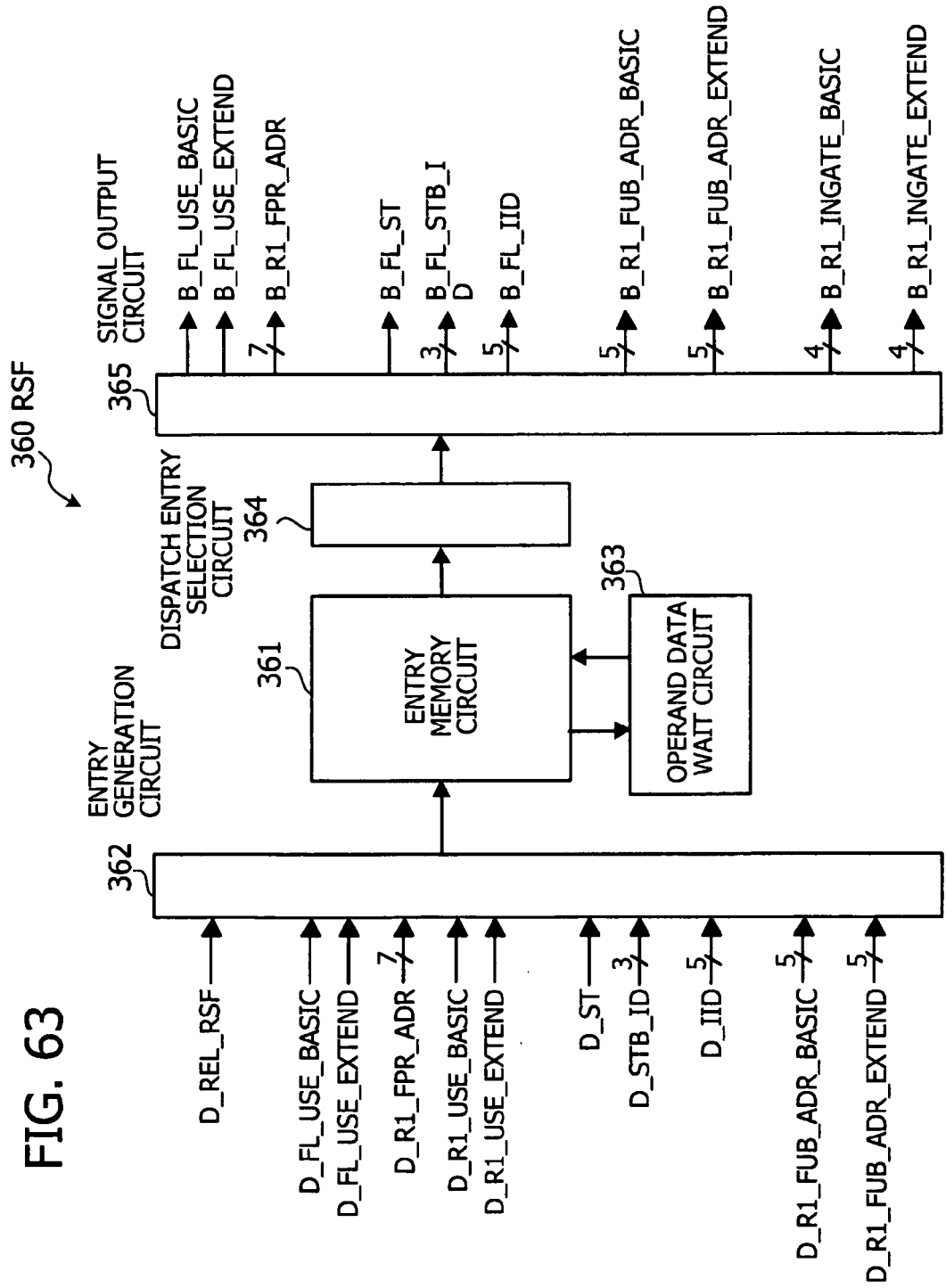
FIG. 63 illustrates input and output signals of the RSF which relate to execution of floating-point store instructions.

FIG. 63 illustrates input and output signals of the RSF 360 which relate to execution of floating-point store instructions. Note that FIG. 63 focuses on the control signals and address signals used to execute floating-point store instructions, thus omitting some other existing signals.

When executing a floating-point store instruction, the RSA 320 operates basically in the same way as it operates for floating-point load instructions. The floating-point store instruction, however, does not specify registers as the destination of its processing result. Accordingly, the entry generation circuit 362 does not receive address signals D_RD_FUB_ADR_BASIC and D_RD_FUB_ADR_EXTEND, which would specify renaming registers assigned to destination register.

Floating-point store instructions have a single source operand specifying a source register. The RSF 360 thus receives an address signal D_R1_FPR_ADR and control signals D_R1_USE_BASIC and D_R1_USE_EXTEND for the source register. Other address signals D_R2_FPR_ADR and D_R3_FPR_ADR and control signals D_R2_USE_BASIC, D_R2_USE_EXTEND, D_R3_USE_BASIC, and D_R3_USE_EXTEND are not supplied to the RSF 360 in the case of floating-point store instructions.

Renaming registers may have been assigned to a basic register 601 and an extended register 602 specified by the address signal D_R1_FPR_ADR. In that case, the RSF 360 receives address signals D_R1_FUB_ADR_BASIC and D_R1_FUB_ADR_EXTEND indicating the address of each assigned renaming register. The address signal D_R1_FUB_ADR_BASIC and D_R1_FUB_ADR_EXTEND come in a set when the instruction in process is an SIMD store instruction. In the case of a non-SIMD store instruction, either D_R1_FUB_ADR_BASIC or D_R1_FUB_ADR_EXTEND is supplied to the RSF 360, depending on the source register address specified in its source operand.

When executing a floating-point store instruction, the instruction decoder 280 provides a control signal D_ST, instead of control signal D_FL_OPC. This control signal D_ST indicates that the instruction in process is a floating-point store instruction. Also provided is an entry identification signal D_STB_ID, which indicates a specific entry of the store buffer 481. The entry generation circuit 362 creates an entry for the floating-point store instruction in response to control signal D_REL_RSF.

The dispatch entry selection circuit 364 selects an entry corresponding to a floating-point load instruction. In response, the signal output circuit 365 produces control signals B_FL_USE_BASIC, B_FL_USE_EXTEND, B_FL_ST, B_R1_INGATE_BASIC, and B_R1_INGATE_EXTEND, entry identification signal B_FL_STB_ID, and address signals B_R1_FUB_ADR_BASIC and B_R1_FUB_ADR_EXTEND.

Figure 64:
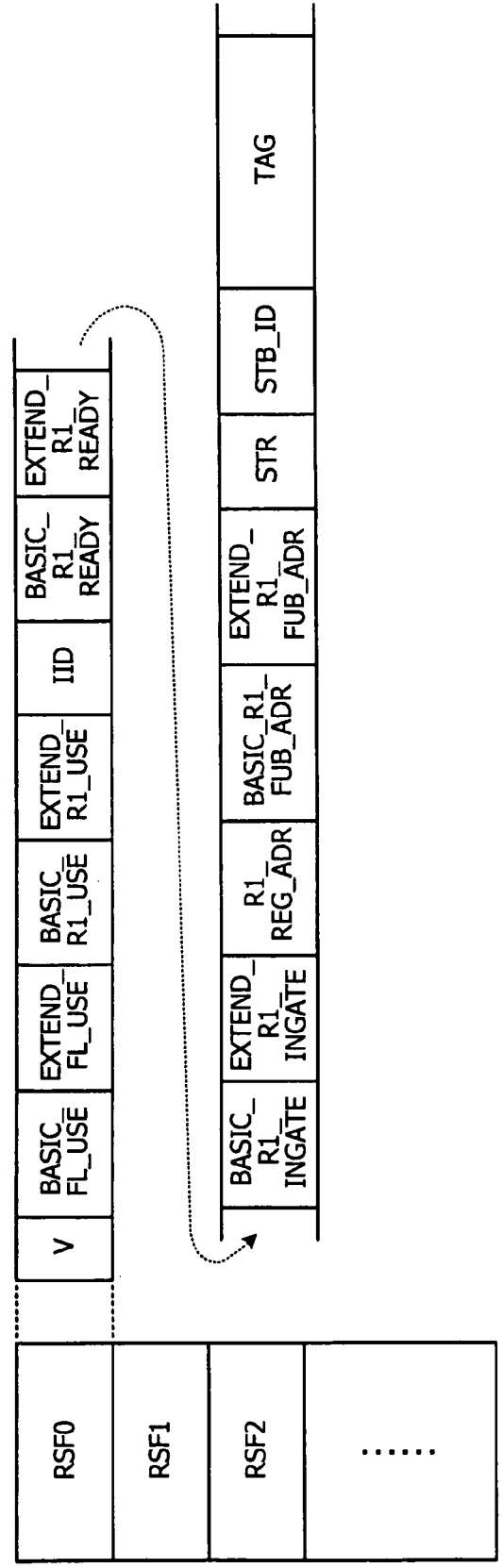
FIG. 64 illustrates details of an RSF entry for a floating-point store instruction.

FIG. 64 illustrates details of an RSF entry for a floating-point store instruction. The illustrated RSF 360 contains an entry of a floating-point store instruction, which is different from those of floating-point load instructions in several aspects. One difference is that the entry of a floating-point store instruction does not contain addresses BASIC_DST_ADR and EXTEND_DST_ADR indicating destination addresses of data.

As noted earlier, floating-point store instructions have a single source operand specifying a source register. For this reason, the RSF entry contains an address signal R1_FPR_ADR as the only source register address of store data. Accordingly, the RSF entry omits signals such as BASIC_R2_USE, EXTEND_R2_USE, BASIC_R3_USE, and EXTEND_R3_USE. In the case where the store data is ready in renaming registers, the RSF entry contains addresses BASIC_R1_FUB_ADR and EXTEND_R1_FUB_ADR to indicate the renaming registers corresponding to address R1_REG_ADR.

This entry has a signal STR, instead of signal OPC. Signal STR indicates that the entry is of a floating-point store instruction. The entry also has an entry identification signal STB_ID indicating a specific entry of the store buffer 481. The signal STR is turned on when the entry is created, while the entry identification signal STB_ID is derived from an entry identification signal D_STB_ID supplied from the instruction decoder 280.

The operand data wait circuit 363 in the RSF 360 waits for operand data to be ready, based on signals BASIC_FL_USE and EXTEND_FL_USE, as well as on addresses R1_REG_ADR, BASIC_R1_FUB_ADR, and EXTEND_R1_FUB_ADR, in the same way as described in FIGS. 40 to 44. Specifically, the operand data wait circuit 363 receives signals BASIC_FL_USE and EXTEND_FL_USE in the ON state when executing an SIMD store instruction, and thus determines whether store data is ready in registers on the basic bus and extended bus. When a register on the basic bus has store data, the operand data wait circuit 363 turns on signal BASIC_R1_READY and assigns a specific value to selection signal BASIC_R1_INGATE. When a register on the extended bus has store data, the operand data wait circuit 363 turns on signal EXTEND_R1_READY and assigns a specific value to selection signal EXTEND_R1_INGATE. In the case of an SIMD store instruction, the dispatch entry selection circuit 364 dispatches an entry when its signals BASIC_R1_READY, BASIC_R2_READY, BASIC_R3_READY, EXTEND_R1_READY, EXTEND_R2_READY, and EXTEND_R3_READY are all in the ON state.

In the case of a non-SIMD store instruction, only one of the signals BASIC_FL_USE and EXTEND_FL_USE is turned on. The operand data wait circuit 363 determines whether the store data is ready in a register on the basic bus, when signals BASIC_FL_USE is in the ON state while signal EXTEND_FL_USE is in the OFF state. When store data is found ready, the operand data wait circuit 363 turns on signal BASIC_R1_READY, and assigns a specific value to selection signal BASIC_R1_INGATE.

Similarly, the operand data wait circuit 363 determines whether store data is ready in a register on the extended bus, when signals EXTEND_FL_USE is in the ON state while signal BASIC_FL_USE is in the OFF state. When store data is found ready, the operand data wait circuit 363 turns on signal EXTEND_R1_READY, and assigns a specific value to selection signal EXTEND_R1_INGATE.

While not depicted, the entry of the RSF 360 further contains signals BASIC_R2_READY, EXTEND_R2_READY, BASIC_R3_READY, and EXTEND_R3_READY. All these signals are turned on when the entry is created.

The dispatch entry selection circuit 364 dispatches an entry when its signals BASIC_R1_READY, BASIC_R2_READY, BASIC_R3_READY, EXTEND_R1_READY, EXTEND_R2_READY, and EXTEND_R3_READY are all in the ON state. In the case where signal BASIC_FL_USE or EXTEND_FL_USE is in the OFF state, its corresponding signal BASIC_R1_READY or EXTEND_R1_READY in the entry is turned on when the entry is created in the RSF 360. As noted above, signals BASIC_R2_READY, EXTEND_R2_READY, BASIC_R3_READY, and EXTEND_R3_READY are turned on when the entry is created in the RSF 360.

When an entry is dispatched, the values of its entry identification signals IID and STB_ID are supplied to the SIMD computation unit 520 as signals B_FL_IID and B_FL_STB_ID, together with a control signal B_FL_ST. The values of signals BASIC_FL_USE and EXTEND_FL_USE are also supplied to the SIMD computation unit 520 as control signals B_FL_USE_BASIC and B_FL_USE_EXTEND, respectively. The entry output circuit 325 outputs other signals based on their corresponding signals in the entry in the same way as discussed in FIG. 37.

Address signal B_R1_FPR_ADR is supplied to the floating-point SIMD registers 600 when store data is ready in one of them. The store data in this case is read out of a basic register 601 and an extended register 602 at the address specified by the address signal B_R1_FPR_ADR and sent to the operand data selection unit 530*a*. The operand data selection unit 530*a* selects this read data of the basic register 601 and extended register 602, according to selection signals B_R1_INGATE_BASIC and B_R1_INGATE_EXTEND provided by the RSF 360. These control signals B_R1_INGATE_BASIC and B_R1_INGATE_EXTEND are derived from signals BASIC_R1_INGATE and EXTEND_R1_INGATE in the dispatched entry.

Address signal D_R1_FUB_ADR_BASIC is supplied to the floating-point renaming registers 560 when store data is ready in a basic renaming register 561. The store data in this case is read out of the basic renaming registers 561 at the address specified by the address signal D_R1_FUB_ADR_BASIC and sent to the operand data selection unit 530*a*. The operand data selection unit 530*a* selects this read data of the basic renaming register 561, according to selection signal B_R1_INGATE_BASIC provided by the RSF 360.

Address signal D_R1_FUB_ADR_EXTEND is supplied to the floating-point renaming registers 560 when store data is ready in an extended renaming register 562. The store data in this case is read out of the extended renaming registers 562 at the address specified by the address signal D_R1_FUB_ADR_EXTEND and sent to the operand data selection unit 530*a*. The operand data selection unit 530*a* selects this read data of the extended renaming register 562, according to selection signal B_R1_INGATE_EXTEND provided by the RSF 360.

Figure 65:
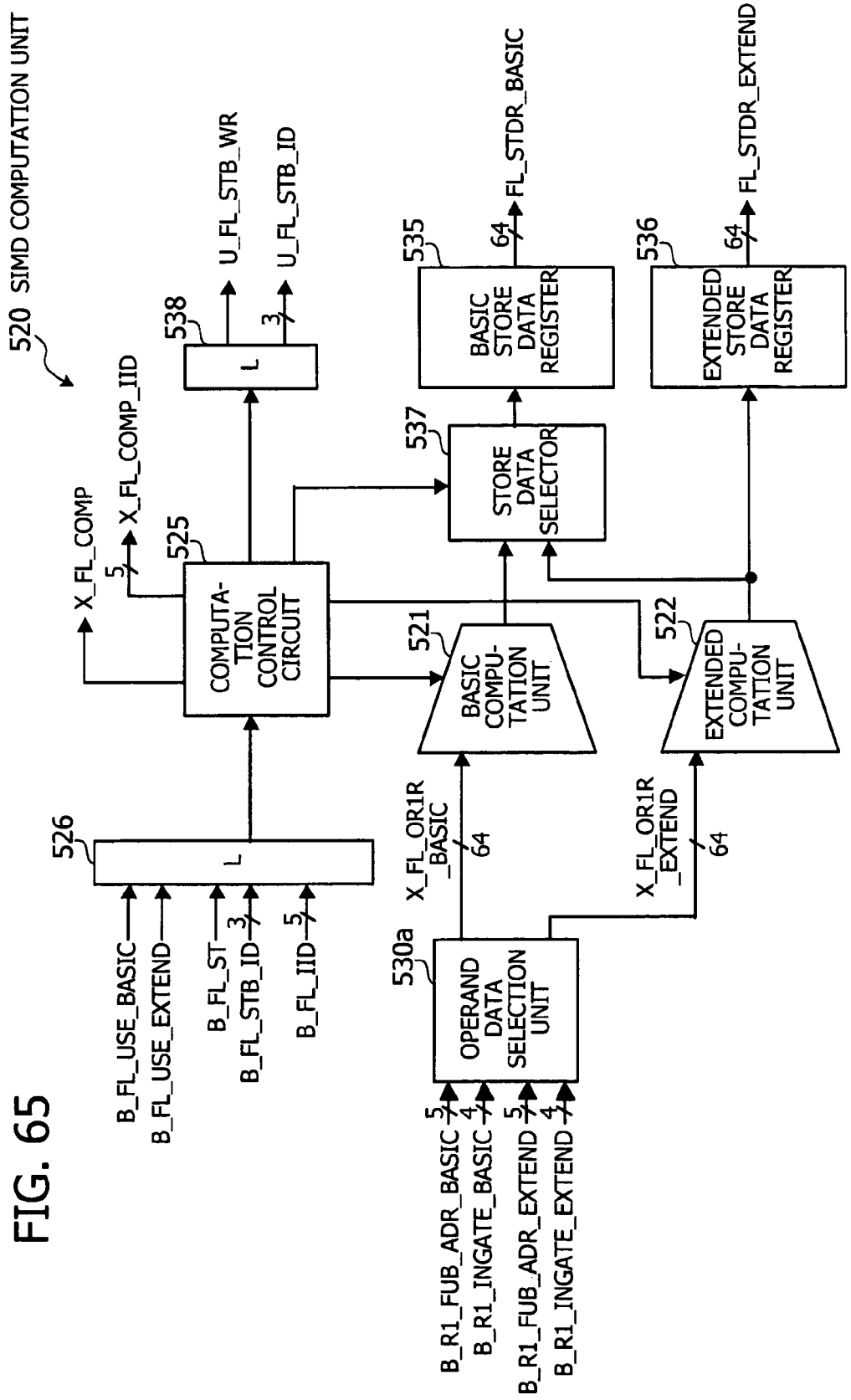
FIG. 65 illustrates input and output signals of the SIMD computation unit which relate to execution of floating-point store instructions.

FIG. 65 illustrates input and output signals of the SIMD computation unit 520 which relate to execution of floating-point store instructions. Note that FIG. 65 focuses on the control signals and address signals used to execute floating-point store instructions, thus omitting some other existing signals.

The operand data selection units 530*a* to 530*c* in the SIMD computation unit 530 have been described earlier. During execution of a floating-point store instruction, however, one operand data selection unit 530*a* plays an active role, but the other two operand data selection units 530*b* and 530*c* do not. The operand data selection unit 530*a* is configured and operates in the same way as described in FIG. 46. That is, inside the operand data selection unit 530*a*, the basic operand data selector 531 selects store data and sends it to the basic computation unit 521. Similarly, the extended operand data selector 532 selects store data and sends it to the extended computation unit 522.

In X cycle, the latch circuit 526 receives control signals B_FL_USE_BASIC, B_FL_USE_EXTEND, and B_FL_ST, together with entry identification signals B_FL_IID and B_FL_STB_ID, from the RSF 360. The received signals are then passed from the latch circuit 526 to the computation control circuit 525.

The control signal B_FL_ST permits the computation control circuit 525 to recognize that an entry has been dispatched for a floating-point store instruction. In response, the computation control circuit 525 activates the basic computation unit 521 if control signal B_FL_USE_BASIC is in the ON state, requesting the basic computation unit 521 to forward its input signal as is. The computation control circuit 525 also activates the extended computation unit 522 if control signal B_FL_USE_EXTEND is in the ON state, requesting the extended computation unit 522 to forward its input signal as is.

Further, the computation control circuit 525 causes the store data selector 537 to choose its input from the basic computation unit 521, when both control signals B_FL_USE_BASIC and B_FL_USE_EXTEND are, or control signal B_FL_USE_BASIC solely is, in the ON state. In the case where control signal B_FL_USE_EXTEND is solely in the ON state, the computation control circuit 525 causes the store data selector 537 to choose its input from the extended computation unit 522.

Under the above-described control of the computation control circuit 525, an SIMD store instruction activates both the basic computation unit 521 and extended computation unit 522 simultaneously. The operand data selection unit 530*a* outputs a data signal X_FL_OR1R_BASIC representing a store data value, which is then sent to the basic store data register 535 via the basic computation unit 521 and store data selector 537. Similarly, the operand data selection unit 530*a* outputs a data signal X_FL_OR1R_EXTEND representing another store data value, which is then sent to the extended store data register 536 via the extended computation unit 522.

In the case of a non-SIMD store instruction, only one of the basic computation unit 521 and extended computation unit 522 is activated. Whichever computation unit is activated, the resulting data signal goes to the basic store data register 535 via the store data selector 537.

Upon activation of at least one of the basic computation unit 521 and extended computation unit 522, the computation control circuit 525 supplies the CSE 400 with a control signal X_FL_COMP together with an entry identification signal X_FL_COMP_IID. This control signal X_FL_COMP notifies the CSE 400 that the store data is now present at the output of the SIMD computation unit 520. Here the entry identification signal X_FL_COMP_IID has the same values as the entry identification signal B_FL_IID received from the RSF 360.

The computation control circuit 525 supplies a control signal U_FL_STB_WR and an entry identification signal U_FL_STB_ID to the store buffer unit 480 via a latch circuit 538. The control signal U_FL_STB_WR is to request a write operation of store data to the store buffer 481, while the entry identification signal U_FL_STB_ID specifies an entry of the store buffer 481. The entry identification signal U_FL_STB_ID has the same value as the entry identification signal B_FL_STB_ID received from RSF 360. The output timing of the control signal U_FL_STB_WR and entry identification signal U_FL_STB_ID for the store buffer unit 480 is adjusted so as to synchronize with the store data which is to be transferred from the basic store data register 535 and extended store data register 536 to the store buffer unit 480.

Figure 66:
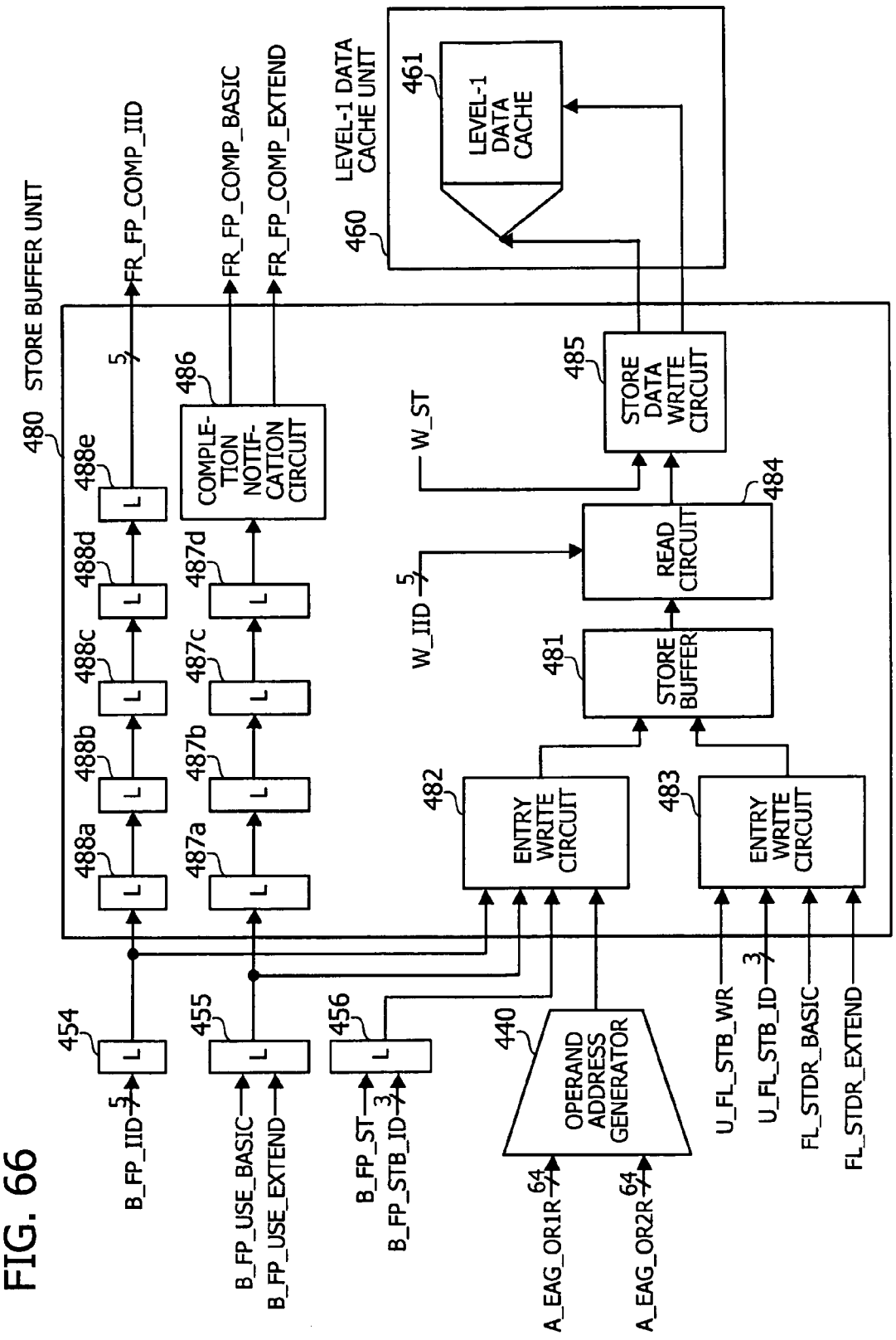
FIG. 66 illustrates input and output signals of a store buffer unit which relate to execution of floating-point store instructions.

FIG. 66 illustrates input and output signals of the store buffer unit 480 which relate to execution of floating-point store instructions. Note that FIG. 66 focuses on the control signals and address signals used to execute floating-point store instructions, thus omitting some other existing signals.

The illustrated store buffer unit 480 includes a store buffer 481, entry write circuits 482 and 483, a read circuit 484, a store data write circuit 485, a completion notification circuit 486, and latch circuits 487*a* to 487*d* and 488*a* to 488*e*. These constituent components of the store buffer unit 480 may be implemented as part of the level-1 data cache unit 460, for example.

One entry write circuit 482 receives a store address produced by the operand address generator 440. The entry write circuit 482 receives an entry identification signal B_FP_IID from the RSA 320 via a latch circuit 454. The entry write circuit 482 also receives control signals B_FP_USE_BASIC and B_FP_USE_EXTEND from the RSA 320 via a latch circuit 455, as well as a control signal B_FP_ST and an entry identification signal B_FP_STB_ID from the RSA 320 via a latch circuit 456. The latch circuits 454 to 456 are placed for the purpose of timing adjustment between output signals of the RSA 320 and address signals of the operand address generator 440.

In response to the received control signal B_FP_ST the entry write circuit 482 sends, in FT cycle, the store address produced by the operand address generator 440 to the store buffer 481, together with the entry identifier of a CSE entry that the entry identification signal B_FP_IID specifies. The store buffer 481 saves the provided information in its entry specified by entry identification signal B_FP_STB_ID.

Control signals B_FP_USE_BASIC and B_FP_USE_EXTEND are supplied to the completion notification circuit 486 via latch circuits 487*a* to 487*d*. In FR cycle, the completion notification circuit 486 supplies the values of control signals B_FP_USE_BASIC and B_FP_USE_EXTEND to the CSE 400 as control signals FR_FP_COMP_BASIC and FR_FP_COMP_EXTEND, respectively. By so doing, the completion notification circuit 486 notifies the CSE 400 that the store address has been sent to the store buffer 481. Also in FR cycle, entry identification signal B_FP_IID goes to the CSE 400 after propagating through latch circuits 488*a* to 488*e*.

The other entry write circuit 483 receives data signals FL_STDR_BASIC and FL_STDR_EXTEND, a control signal U_FL_STB_WR, and an entry identification signal U_FL_STB_ID from the SIMD computation unit 520. In response to the received control signal U_FL_STB_WR, the entry write circuit 483 saves store data values represented by the received data signals FL_STDR_BASIC and FL_STDR_EXTEND in an entry of the store buffer 481 that is specified by the received entry identification signal U_FL_STB_ID.

When executing an SIMD store instruction, the entry write circuit 483 receives both data signals FL_STDR_BASIC and FL_STDR_EXTEND. Accordingly, the entry write circuit 483 writes two 8-byte store data values to an entry of the store buffer 481. When executing a non-SIMD store instruction, the entry write circuit 483 receives only one data signal FL_STDR_BASIC. Accordingly, the entry write circuit 483 writes one 8-byte store data value to an entry of the store buffer 481.

As described in FIG. 65, the SIMD computation unit 520 notifies the CSE 400 that it has sent out store data, by sending control signal X_FL_COMP. The control signal U_FL_STB_WR is brought to the entry write circuit 483 thereafter.

As described in FIG. 59, the CSE 400 receives control signal X_FL_COMP from the SIMD computation unit 520, and control signals FR_FP_COMP_BASIC and FR_FP_COMP_EXTEND from the store buffer unit 480. After confirming completion of the instruction in C cycle, the CSE 400 outputs a control signal W_ST and entry identification signal W_IID to the store buffer unit 480 in W cycle. In W cycle, the read circuit 484 selects an entry containing an entry identifier of the CSE 400 that is specified by the entry identification signal W_IID. The selected entry contains a store address and store data, and the read circuit 484 supplies them to the store data write circuit 485.

In response to the received control signal W_ST, the store data write circuit 485 writes the store data supplied from the read circuit 484 in a storage area of the level-1 data cache 461 that is specified by the store address also supplied from the read circuit 484. As a result, two 8-byte store data values are written into the level-1 data cache 461, in the case of an SIMD store instruction. In the case of a non-SIMD store instruction, one 8-byte data value is written into level-1 data cache 461. Then, under the control of the level-1 data cache unit 460 and other related components, the store data in the level-1 data cache unit is written back in a level-2 data cache or main memory.

The above description has provided how the floating-point store instructions are executed. In the case of an SIMD store instruction, a basic register 601 and its associated extended register 602 are specified together as the source registers of store data. In the case of a non-SIMD store instruction, any of the basic registers 601 and extended registers 602 can be specified as the source register of store data. This feature provides more choices of registers in program coding, besides improving the efficiency of register usage in the floating-point SIMD registers 600.

Floating-point renaming registers 560 may also serve as a source of store data. When that is the case, the floating-point renaming registers 560 can be handled as 8-byte discrete registers. This means that the usage efficiency of floating-point renaming registers 560 is improved.

The above description of the second embodiment has discussed floating-point load instructions and floating-point computation instructions as an example of instructions that allow renaming of destination registers to store their processing results. The above-described procedure of renaming register assignment is, however, not limited to those specific types of instructions, but can similarly be applied to other instructions. The above description has also discussed floating-point computation instructions and floating-point store instruction as an example of instructions that allow renaming of source registers to read source data. The above-described procedure of reading source data from renaming registers is, however, not limited to those specific types of instructions, but can similarly be applied to other instructions.

In conclusion, the computing device discussed above enables more efficient use of registers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. A computing device comprising:
    an instruction decoding unit that decodes a multiple data processing instruction performing a processing operation on multiple data including first data and second data;
    a plurality of first allocatable registers to hold data;
    a plurality of second allocatable registers to hold data;
    an allocatable register selection unit that selects one of the first allocatable registers and one of the second allocatable registers based on a decoding result of the multiple data processing instruction, respectively;
    a first processing unit that performs first processing on the first data based on the decoding result of the multiple data processing instruction and makes the selected first allocatable register hold a first processing result obtained as a result of the first processing;
    a second processing unit that performs second processing on the second data based on the decoding result of the multiple data processing instruction and makes the selected second allocatable register hold a second processing result obtained as a result of the second processing;
    a first result register that stores the first processing result held in the selected first allocatable register; and
    a second result register that stores the second processing result held in the selected second allocatable register.

2. The computing device according to claim 1, wherein
    the instruction decoding unit further decodes a normal data processing instruction that performs a processing operation on third data with the same data width as the first data or the second data, and selects either the first result register or the second result register based on a decoding result of the normal data processing instruction,
    the allocatable register selection unit selects one of the first allocatable registers, the first processing unit performs the first processing on the third data to obtain a third processing result and makes the selected first allocatable register hold the third processing result, and the first result register stores the third processing result held in the selected first allocatable register when the instruction decoding unit selects the first result register, and
    the register selection unit selects one of the second allocatable registers, the second processing unit performs the second processing on the third data to obtain a fourth processing result and makes the selected second allocatable register hold the fourth processing result, and the second result register stores the fourth processing result held in the selected second allocatable register when the instruction decoding unit has selected the second result register.

3. The computing device according to claim 2, further comprising a data read control unit that
    reads the first data from one of the first allocatable registers and the second data from one of the second allocatable registers, respectively, when the instruction decoding unit decodes the multiple data processing instruction, and
    reads the third data from one of the first and second allocatable registers when the instruction decoding unit decodes the normal data processing instruction.

4. The computing device according to claim 2, further comprising a data store control unit that
    determines whether a processing result of an instruction decoded by the instruction decoding unit is held in an allocatable register among the first and second allocatable registers,
    commits the performed instruction in an order that the instruction is decoded by the instruction decoding unit, when the processing result of the performed instruction is determined to be held in an allocatable register among the first and second allocatable registers, and
    transfers the processing result of the committed instruction from one of the first allocatable registers to the first result register when the processing result is held in the one of the first allocatable registers, or transfers the processing result of the committed instruction from one of the second allocatable registers to the second result register when the processing result is held in one of the second allocatable registers.

5. The computing device according to claim 4, wherein the data store control unit further
    commits the multiple data processing instruction decoded by the instruction decoding unit when the first processing result and the second processing result are respectively held in the first allocatable register and the second allocatable register selected by the allocatable register selection unit, and
    commits the normal data processing instruction decoded by the instruction decoding unit, when the first result register is selected as a result of the decoding of the normal data processing instruction and when the third processing result is held in the first allocatable register selected by the register selection unit, or commits the normal data processing instruction decoded by the instruction decoding unit when the second result register is selected as a result of the decoding of the normal data processing instruction and when the fourth processing result is held in the second allocatable register selected by the register selection unit.

6. The computing device according to claim 2, wherein
    the first result register is provided in a plurality,
    the second result register is provided in a plurality, the multiple data processing instruction includes first register designation information specifying one of the first result registers as a destination of the first processing result thereof, the normal data processing instruction includes second register designation information specifying one of the first result registers and second result registers as a destination of a processing result thereof, and wherein the computing device further comprises a data store control unit that transfers the first processing result of the multiple data processing instruction decoded by the instruction decoding unit from the selected first allocatable register to the first result register specified by the first register designation information, transfers the second processing result of the multiple data processing instruction from the selected second allocatable register to the second result register having the same register identifier as the specified first result register, transfers the third processing result of the normal data processing instruction decoded by the instruction decoding unit from the selected first allocatable register to one of the first result registers when the one of the first result registers is specified by the second register designation information, and transfers the fourth processing result of the normal data processing instruction from the selected second allocatable register to one of the second result registers when the one of the second result registers is specified by the second register designation information.

7. The computing device according to claim 6, wherein the instruction decoding unit further decodes a multiple data load instruction as one kind of the multiple data processing instruction, the multiple data load instruction causing the first processing unit to output the first data read out of a cache memory as the first processing result, and causing the second processing unit to output the second data read out of the cache memory as the second processing result, the computing device further comprises a completion notification processing unit that produces a first completion signal and a second completion signal individually to indicate that the first data and the second data are read out of the cache memory, respectively, when the multiple data load instruction is decoded by the instruction decoding unit, and the data store control unit transfers the first processing result of the multiple data load instruction from the selected first allocatable register to the first result register specified by the first register designation information in response to the first completion signal, and transfers the second processing result of the multiple data load instruction from the selected second allocatable register to the second result register having the same register identifier as the first result register in response to the second completion signal.

8. The computing device according to claim 2, wherein the first result register is provided in a plurality, the second result register is provided in a plurality, the multiple data processing instruction includes first register designation information specifying one of the first result registers as a destination of the first processing result thereof, the normal data processing instruction includes second register designation information specifying one of the first result registers and second result registers as a destination of a processing result thereof, the allocatable register selection unit creates a record of register mapping data associating the selected first allocatable register with the first result register specified by the first register designation information, and creates another record of register mapping data which associates the selected second allocatable register with the second result register having the same register identifier as the specified first result register, and the allocatable register selection unit creates a record of register mapping data associating the selected first allocatable register with one of the first result registers when the one of the first result registers is specified by the second register designation information, and creates a record of register mapping data associating the selected second allocatable register with one of the second result registers when the one of the second result register is specified by the second register designation information.

9. The computing device according to claim 8, further comprising a data read control unit that reads the third data of the decoded normal data processing instruction from one of the first and second allocatable registers based on the register mapping data, and supplies the third data to the first processing unit when the third data has been read from one of the first allocatable registers, or supplies the third data to the second processing unit when the third data has been read from one of the second allocatable registers.

10. The computing device according to claim 9, wherein the data read control unit further reads the first data of the multiple data processing instruction decoded by the instruction decoding unit from one of the first allocatable registers based on the register mapping data and supplies the first data to the first processing unit, and reads the second data of the decoded multiple data processing instruction from one of the second allocatable registers based on the register mapping data and supplies the second data to the second processing unit.

11. The computing device according to claim 8, wherein the instruction decoding unit further decodes a normal data store instruction as one kind of the normal data processing instruction, the normal data store instruction causing the first processing unit or the second processing unit to store the third data in a storage device coupled to the computing device, and wherein the computing device further comprises a data read control unit that reads the third data of the decoded normal data store instruction from one of the first and second allocatable registers based on the register mapping data, supplies the third data to the first processing unit when the third data is read from one of the first allocatable registers, or supplies the third data to the second processing unit when the third data is read from one of the second allocatable registers.

12. The computing device according to claim 11, wherein the instruction decoding unit further decodes a multiple data store instruction as one kind of the multiple data processing instruction, the multiple data load instruction causing the first processing unit to store the first data in the storage device, as well as causing the second processing unit to store the second data in the storage device, and wherein the data read control unit further reads the first data of the decoded multiple data store instruction from one of the first allocatable registers based on the register mapping data, and supplies the first data to the first processing unit, and reads the second data of the decoded multiple data store instruction from one of the second allocatable registers based on the register mapping data, and supplies the second data to the second processing unit.

13. The computing device according to claim 1, wherein the first processing performed by the first processing unit is identical with the second processing performed by the second processing unit.

14. The computing device according to claim 1, wherein the first data and the second data have the same data width.

15. An information processing apparatus comprising:
a computing device comprising:
an instruction decoding unit that decodes a multiple data processing instruction performing a processing operation on multiple data comprising first data and second data,
a plurality of first allocatable registers to hold data,
a plurality of second allocatable registers to hold data,
an allocatable register selection unit that selects one of the first allocatable registers and one of the second allocatable registers based on a decoding result of the multiple data processing instruction, respectively,
a first processing unit that performs first processing on the first data based on the decoding result of the multiple data processing instruction and makes the selected first allocatable register hold a first processing result obtained as a result of the first processing,
a second processing unit that performs second processing on the second data based on the decoding result of the multiple data processing instruction and makes the selected second allocatable register hold a second processing result obtained as a result of the second processing,
a first result register that stores the first processing result held in the selected first allocatable register, and
a second result register that stores the second processing result held in the selected second allocatable register; and
a storage device coupled to the computing device to store the first data and the second data.

16. The information processing apparatus according to claim 15, wherein
the instruction decoding unit further decodes a normal data processing instruction that performs a processing operation on third data with the same data width as the first data or the second data, and selects either the first result register or the second result register based on a decoding result of the normal data processing instruction,
the allocatable register selection unit selects one of the first allocatable registers, the first processing unit performs the first processing on the third data to obtain a third processing result and makes the selected first allocatable register hold the third processing result, and the first result register stores the third processing result held in the selected first allocatable register when the instruction decoding unit selects the first result register, and
the register selection unit selects one of the second allocatable registers, the second processing unit performs the second processing on the third data to obtain a fourth processing result and makes the selected second allocatable register hold the fourth processing result, and the second result register stores the fourth processing result held in the selected second allocatable register when the instruction decoding unit has selected the second result register.

17. The information processing apparatus according to claim 16, wherein the computing device further comprises a data store control unit that
reads the first data from one of the first allocatable registers and the second data from one of the second allocatable registers, respectively, when the instruction decoding unit decodes the multiple data processing instruction, and
reads the third data from one of the first and second allocatable registers when the instruction decoding unit decodes the normal data processing instruction.

18. A method of controlling a computing device, the method comprising:
decoding an instruction that is entered and selecting result registers as a destination of processing results of the instruction;
selecting allocatable registers as temporary storage of processing results, based on a result of said decoding;
processing data based on the result of said decoding;
storing results of the processing in the allocatable registers selected by the selecting; and
transferring the stored results of the processing from the allocatable registers selected by the selecting to the result registers selected by the decoding;
wherein the decoding decodes a multiple data processing instruction that performs a processing operation on multiple data including first data and second data, and selects the result registers, one from a first result register set and another from a second result register set, to store each result of the processing operation, and wherein
the selecting selects the allocatable registers, one from a first allocatable register set and another from a second allocatable register set,
the processing performs first processing on the first data and sends a first processing result of the first processing to the allocatable register selected from the first allocatable register set,
the processing further performs second processing on the second data and send a second processing result of the second processing to the allocatable register selected from the second allocatable register set,
the transferring transfers the first processing result from the allocatable register selected from the first allocatable register set to the result register selected from the first result register set, and
the transferring further transfers the second processing result from the allocatable register selected from the second allocatable register set to the result register selected from the second result register set.

19. The method according to claim 18, wherein
the decoding further decodes a normal data processing instruction that performs a processing operation on third data and selects a result register from either the first result register set or the second result register set to store a result of the processing operation,
the selecting selects one allocatable register from the first allocatable register set, the processing performs the first processing on the third data to obtain a third processing result and sends the third processing result to the allocatable register selected from the first allocatable register set, and the transferring transfers the third processing result from the allocatable register selected from the first allocatable register set, to the result register selected from the first result register set, when the decoding has selected the result register from the first result register set for the decoded normal data processing instruction, and the selecting selects one allocatable register from the second allocatable register set, the processing performs, by the second processing unit, performs the second processing on the third data to obtain a fourth processing result and sends the fourth processing result to the allocatable register selected from the second allocatable register set, and the transferring transfers the fourth processing result from the allocatable register selected from the second allocatable register set, to the result register selected from the second result register set, when the decoding has selected the result register from the second result register set for the decoded normal data processing instruction.

20. The method according to claim 19, wherein the processing reads, by a data read control unit in the computing device, the first data from one allocatable register in the first allocatable register set and supplies the first data to the first processing unit, and the processing further reads the second data from one allocatable register in the second allocatable register set and supplies the second data to the second processing unit, when the decoding has decoded the multiple data processing instruction, and the processing reads the third data from one allocatable register in the first and second allocatable register sets and supplies the third data to the first processing unit or the second processing unit, when the decoding has decoded the normal data processing instruction.

* * * * *